United States Patent [19]

Ohtaki et al.

[11] Patent Number: 5,177,621
[45] Date of Patent: Jan. 5, 1993

[54] SELF-DIAGNOSTIC SYSTEM FOR IMAGE READING EQUIPMENT

[75] Inventors: Mitsuo Ohtaki; Akihiko Tanaka; Izumi Takashima, all of Kanagawa, Japan

[73] Assignee: Fuji Xerox Co., Ltd., Tokyo, Japan

[21] Appl. No.: 494,236

[22] Filed: Mar. 15, 1990

[30] Foreign Application Priority Data

Mar. 16, 1989 [JP] Japan .................................. 1-64266

[51] Int. Cl.⁵ .......................... H04N 1/00; H04N 1/32
[52] U.S. Cl. ...................................... 358/406; 358/405
[58] Field of Search .............. 357/411, 443, 444, 446, 357/448, 455, 458, 460, 461, 463, 80, 405, 406, 434, 435, 436, 437, 438, 439, 468, 448, 213.17

[56] References Cited

U.S. PATENT DOCUMENTS

| | | | |
|---|---|---|---|
| 4,438,453 | 3/1984 | Alston | 358/455 |
| 4,903,144 | 2/1990 | Stefanik et al. | 358/461 |

FOREIGN PATENT DOCUMENTS

| | | | |
|---|---|---|---|
| 58-69161 | 4/1983 | Japan | 358/406 |
| 58-153186 | 9/1983 | Japan | 358/406 |
| 59-154875A | 9/1984 | Japan | 358/406 |
| 2124851A | 2/1984 | United Kingdom | 358/406 |

Primary Examiner—Edward L. Coles, Sr.
Assistant Examiner—Jerome Grant, III
Attorney, Agent, or Firm—Finnegan, Henderson, Farabow, Garrett and Dunner

[57] ABSTRACT

A self-diagnostic system for image reading equipment having an imaging unit and at least one circuit board, including a pattern generator, which generates a prescribed pattern signal, disposed at the input end and/or the output end of the circuit board. According to this system, a source of problems occurring in the image reading equipment can be identified, that is, a faulty component can be identified by performing a copying operation for a pattern generated by the pattern generator.

25 Claims, 73 Drawing Sheets

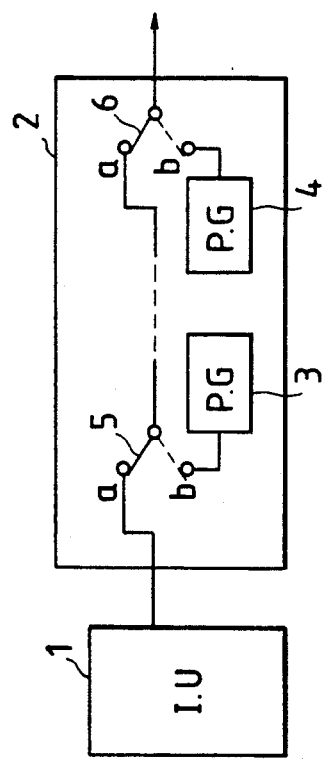
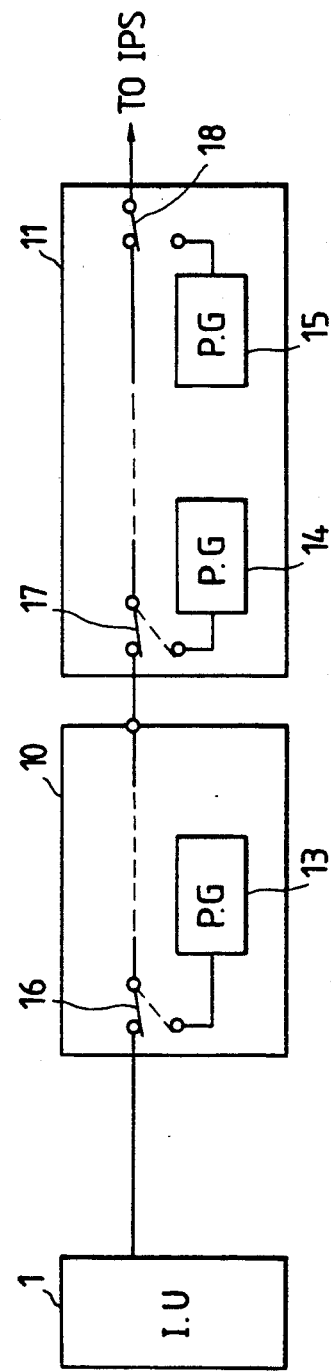
FIG. 1(a)
FIG. 1(b)

CURRENT FEED BACK

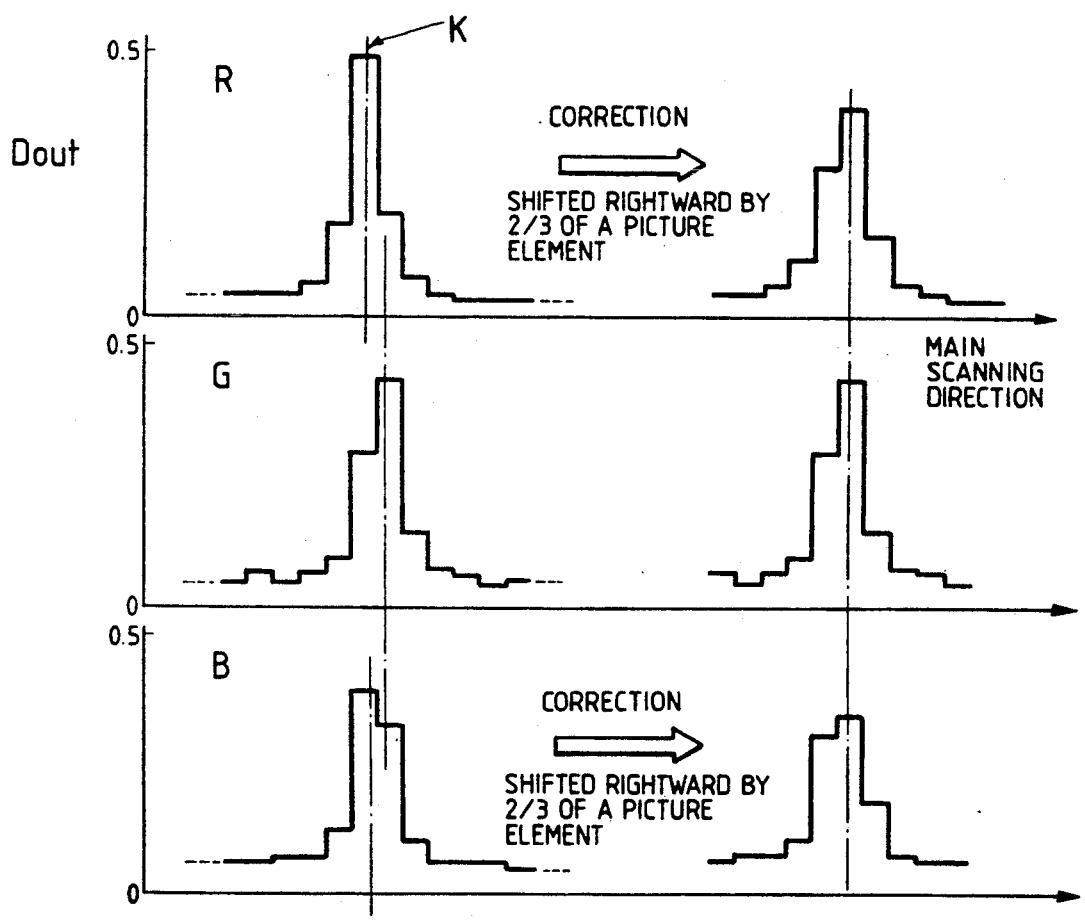

PICTURE ELEMENT

SELF-DIAGNOSTIC SYSTEM FOR IMAGE READING EQUIPMENT

BACKGROUND OF THE INVENTION

1. Field of the Invention

This invention relates to image reading equipment for an image recording apparatus, such as a digital copying machine, facsimile machine, or printer, and more particularly to a self-diagnostic system for such image reading equipment wherein such a system is capable of performing a source of error in a plural number of circuit boards in the image reading equipment easily and in a short time.

2. Description of the Related Art

In a conventional copying machine, which is discussed here as an example of image recording equipment, an original sheet is illuminated with a beam of light from a lamp and an image of the original is formed on a photosensitive drum or a photosensitive belt by way of an adequate optical system, to form a latent image. Hence, such image reading equipment consists of a lamp and its scanning system and/or an optical system. Therefore, in the event that a problem has developed in such image reading equipment, it is consequently sufficient to perform tests on the conduction of the lamp or checks on the on/off operations of the lamp, checks on the scanning system, and checks on the optical system.

In recent years, however, efforts have been made to attain higher image quality and to realize multiple functions through effective utilization of highly advanced controlling techniques and image data processing techniques made possible by the introduction of a computer system into such image recording equipment as copying machines, facsimile machines, and printers, and, specifically for image reading equipment as such, it has been extensively in practice to decompose the images on the original sheet into electric signals by means of a line sensor comprised of CCD, etc., to digitalize such signals and to perform the desired image processing operations.

Therefore, in case a problem has occurred in the image reading equipment, it is necessary to judge whether it is a problem in the line sensor or a problem in the circuit for processing video signals at a succeeding stage. In order to do so, it is necessary to measure the video signals in the various parts of the circuit, using a measuring instrument such as an oscilloscope, and yet there are problems in that it is quite troublesome to take an oscilloscope along for servicing and that well-developed skills and time are required for such services.

On the other hand, it is desired to reduce the servicing time. The shorter the servicing time is, the shorter the downtime of the machine will be, and this is desirable from the user's viewpoint, and when the servicing time can be reduced while satisfying the servicing needs, the number of the machines on which one serviceman can perform maintenance jobs will be increased, with the result that the servicing costs as a whole can be thereby reduced considerably.

SUMMARY OF THE INVENTION

This invention overcomes the problems mentioned above, and the object of this invention consists in offering a self-diagnostic system for image reading equipment wherein the system enables even unskilled persons to identify the source of a problem in image reading equipment easily and in a short time and without using any special measuring instrument or the like.

As illustrated in FIG. 1(a), the image reading equipment for this copying machine is provided with an imaging unit (IU) 1 and at least one board 2, which is mounted with two units of pattern generators (PG) 3 and 4 and two switches 5 and 6.

The IU 1 comprises a plurality of line sensors comprised of CCDs or the like, which are provided with color filters, and a driving unit for moving the line sensors in its scanning operation. The color video signals which are output from the line sensors are led to the board 2, where the signals are processed for amplification, offset control, A/D (analog-to-digital) conversion, color separation, shading correction, etc., and then the signals are led to the next board (not illustrated) and subjected to such various image processing operations as the conversion from the three primary colors, red (R), green (G), and blue (B) into the toner colors, cyan (C), magenta (M), yellow (Y), and black (K), the reducing and enlarging processes.

The input end and output end of the board 2 are provided with the switches 5 and 6, and it is so designed that the video signal from the IU 1 is supplied to the terminal a of the switch 5 and a signal from the PG 3 is supplied to the terminal b of the same switch and also that the video signal is supplied to the terminal a of the switch 6 and a signal from the PG 4 is supplied to the terminal b of the same switch 6.

In the construction just described, locating the source of a problem in the image reading equipment, that is, identifying a portion having the trouble, is accomplished by performing a copying operation with the switch 5 connected to the b-side and the switch 6 connected to the a-side, respectively, and with a prescribed pattern signal supplied from the PG 3. If the desired pattern is output as a result of these steps, it is ascertained that the board 2 and the subsequent parts are functioning properly and that the trouble has occurred in the IU 1. Thus, the problem can be removed by checking on the IU 1. Moreover, in case there still remains any abnormal condition in the output image obtained as a result of copying by the use of the PG 3, copying is performed by supplying a prescribed pattern signal from the PG 4, with the switch 6 being connected to the b-side. If the output image obtained as a result of these steps is in a favorable condition, it is found that the problem has occurred in the board 2. If the output image still remains inferior, it is found that the problem has occurred in a board at the subsequent stage.

As described hereinabove, the self-diagnostic system for image reading equipment according to the present invention makes it possible to located the source of a problem in the image reading equipment easily and in a short time simply by changing over the switch to the PG side. Moreover, the system can be constructed at a relatively low cost since it is sufficient to add the PG and the switch to the equipment.

In addition, it is evident that the operating procedure for the locating of a source of a problem can be reversed from that mentioned above, that is, the procedure can be started with the check performed by the use of the PG 4.

In the construction described above, the cited example accommodates the digital signal system and the analog signal system in one board. However, for separating the systems into two boards, that is, accommodating the processes down to the A/D conversion in the analog board and the subsequent processes in the digital board, it is feasible to install three PGs indicated by the reference numbers 13, 14, and 15 and three switches indicated by the numbers 16, 17, and 18 to form the system as illustrated in FIG. 1(b). With this construction, a source of a problem in the image reading equipment can be located by checking the output images according to the PGs, with the switches being changed over in turn from the front stage side or the subsequent stage side.

BRIEF DESCRIPTION OF THE DRAWINGS

The manner by which the above objects and other objects, features and advantages of the present invention are attained will be fully evident from the following detailed description when it is considered in light of the drawings, wherein:

FIGS. 1(a) and 1(b) are block diagrams illustrating one embodiment of the present invention;

FIG. 47 explains the correction for the deviations of picture elements;

DETAILED DESCRIPTION OF THE PREFERRED EMBODIMENT

Figure 2:
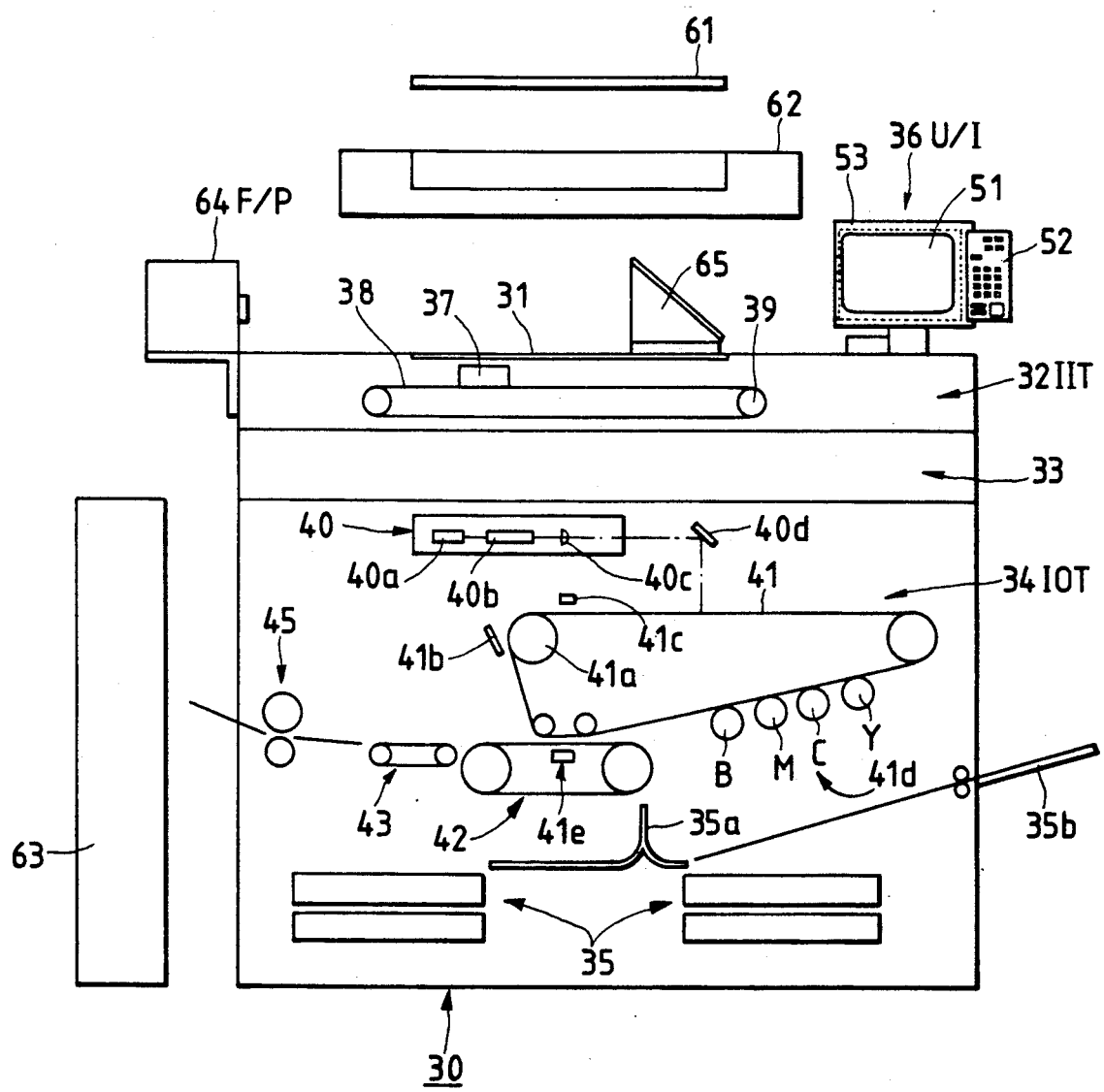
FIG. 2 is a chart illustrating one example of the overall construction of a color copying machine to which this invention is applied.

Reference will now be made in detail to the system of the present invention as illustrated in the accompanying drawings, in which reference characters designate like or corresponding parts throughout the several drawings.

In the following description, a color copying machine will be used as an example of the image recording apparatus. It should be understood, however, that the present invention is not limited to a color copying machine, but may, of course, be applied to other types of image recording apparatus, such as printers and facsimile devices.

The embodiment described in this specification is divided into the following sections and subsections. Sections I and II describe an overall system of a color copying machine incorporating the present invention. Section III describes in detail the embodiments of the present invention which are realized in the color copying machine.

(I) INTRODUCTION
    (I-1) System Configuration
    (I-2) Functions and Features
    (I-3) Electrical Control System
(II) SYSTEM DETAILS
    (II-1) General
    (II-2) Image Processing System (IPS)
    (II-3) Image Output Terminal (IOT)
    (II-4) User Interface (U/I)
    (II-5) Film Image Reading Device
(III) IMAGE INPUT TERMINAL (IIT)
    (III-1) Driving Mechanism for Imaging Unit
    (III-2) Control System for Stepping Motor
    (III-3) Control System for IIT
    (III-4) Imaging Unit
    (III-5) Video Signal Processing Circuit
    (III-6) Self-Diagnostic System (Principal Component of the Present Invention)

(I) INTRODUCTION

(I-1) System Configuration

FIG. 2 shows one example of the overall construction of a color copying machine to which this invention is applied.

In the color copying machine incorporating the present invention, a base machine 30 is comprised of a platen glass 31, an image input terminal (IIT) 32, an electric control housing 33, an image output terminal (IOT) 34, and a tray 35, and a user interface (U/I) 36. The base machine 30 optionally includes an editing pad 61, an automatic document feeder (ADF) 62, a sorter 63, and a film projector (F/P) 64.

Electrical hardware is required for controlling the IIT, IOT, U/I, etc. mentioned above, and the electrical hardware is divided into a plurality of circuit sections with different signal/data processing functions, such as IIT, IPS for processing the output image signals of the IIT, U/I, and F/P. These circuit sections are assembled into circuit boards, respectively. Together with a SYS board for controlling the above circuit boards, and an MCM (machine control board) for controlling the IOT, ADF, sorter, etc., these circuit boards are housed in the electrical control housing 33.

The IIT 32 is made up of an imaging unit 37, and the combination of a wire 38 and a drive pulley 39, which is for driving the imaging unit 37. The imaging unit 37 reads a color image on an original in terms of image signals of the primary colors, blue (B), green (G), and red (R), by using a CCD sensor and color filters, converts them into digital image signals, and sends the separated color image signals to an image processing system (IPS).

In the IPS, the B, G, and R signals mentioned above are transformed into the primary colors of the toner, i.e. Y (Yellow), C (Cyan), M (Magenta), and K (Black), and then, with various data processing being applied to the data so obtained for the purpose of enhancing the reproduction fidelity in terms of coloration, chromatic gradation, precision and fineness, and so forth, the IPS converts the toner signals of the process color in harmonious gradation into binary toner signals and outputs them to the IOT 34.

The IOT 34, which is provided with a scanner 40 and a photo-sensitive material belt 41, converts the image signals from the above-mentioned IPS into optical signals in the laser output part 40a and forms a latent image corresponding to the image on the original sheet on the photosensitive material belt 41 by way of the polygon mirror 40b, the f/θ lens 40c, and the reflexive mirror 40d. The photosensitive material belt 41, which is driven by the driving pulley 41a, has a cleaner 41b, a charging unit 41c, the individual developing devices for Y, M, C, and K, and a transfer device 41e arranged around it. And, opposite to this transfer device 41e is provided a transfer unit 42, which takes into it the sheet that comes transported to it from the paper tray 35 via the paper transport channel 35a and transfers the colors in the order of Y, M, C, and K, the transfer unit 42 being rotated four turns, for example, for full-color copying in four full colors. The sheet of paper on which the image is so transferred is then transported from the transfer unit 42 via the vacuum transport device 43 to the fixing device 45, where it is fixed, and is thereafter discharged from it. Moreover, the paper transport channel 35a is so designed as to accept the paper fed alternatively from the SSI (Single Sheet Inserter) 35b.

The U/I 36 is designed for use by the user for making the selections of the desired functions and for giving instructions regarding the conditions for the execution of the selected functions, and this system is provided with a color display unit 51 and a hardware control panel 52 installed by the side of the display unit, and it is further combined with an infrared ray touch board 53, so that instructions can be given directly with the "soft buttons" on the screen.

Next, a description is made of the optional items for the base machine 30. One of them is the editing pad 61, which is an input device based on a system of coordinates and, when it is to be placed on the platen glass plate 31, permits the editing of various types of images by means of an input pen or a memory card. Moreover, the base machine 30 is so designed as to accept the installation of the existing ADF 62 and the existing sorter 63.

Furthermore, one of the features characteristic of this embodiment is the capability of the system to produce a color copy directly from color film, with a mirror unit (M/U) 65 mounted on the platen glass plate 31 and the film image being projected onto the unit from the F/P 64, and the projected image being read as image signals by means of the imaging unit 37 of the IIT 32 The original sheet materials for this process are negative film, positive film, and slides, and this unit is provided with an automatic focusing device and an automatic changing device for the rectifying filter.

(I-2) Functions and Features

(A) Functions

This invention has a major characteristic feature in its offer of a full automatic system covering the entire copying process from the inlet of copying work to the exit thereof while providing fully variegated and multifarious functions dealing adequately with the users' needs and at the same time producing a system which everybody can operate with ease owing to such features as the selection of the functions, the selection of the executing conditions, and the display of other items on the menu, which are put on display on the CRT screen, etc. in the user interface mentioned above.

A principal function of the system embodying this invention is to be found in making it possible to make selection of the various kinds of functions by touching operations on the soft buttons on the primary screen, with operations performed on the hardware control panel for making the switching of start, stop, all clear, ten-key, interrupt, information, and language, i.e. the factors which cannot be delimited in the operational flow. Also, the system permits full-color and black-and-white copying work with such simple operations that a copying machine embodying this invention can be used with the operating impression of the conventional copying machine, owing to the features permitting the selection of various types of editing functions, such as marker editing, business editing, and creative editing, by a touch on the pathway tab corresponding to the pathway representing the region for the selection of functions.

This equipment offers the functions of full-color copying in four colors as its major characteristic feature, and additionally it permits the selection of three-color copying and black-and-white copying.

For the feeding of paper, this system permits automatic paper selection as well as the selection of a specified paper size.

For reduction or enlargement, this equipment accepts the setting of magnification by 1% in the range from 50% to 400%, and also the equipment is provided with the function of differential magnification, which sets the vertical magnification and the horizontal magnification independently of each other, and the function for the automatic selection of magnification.

The copying density is determined by automatic density adjustment with respect to black-and-white original sheets.

For color original sheets, the system performs automatic color balance adjustment, and, for color balance, the system permits the operator to specify the color a reduction of which is to be desired in its reproduction on the copy.

For the job program, the system permits the reading and writing of a job with a memory card, which can store eight jobs in the maximum. The memory capacity is 32 kilo bytes, and it is possible to perform the programming of the jobs other than those in the film projector mode.

Apart from these, the system is provided with such additional functions as copy output, copy sharpness, copy contrast, copy position, film projector, page programming, and margin.

With the copy output function, the selection of "Uncollated" while a sorter is attached as an optional item to the equipment sets the maximum adjustment function into operation, with the result that the set number of sheets is adjusted to fit within the maximum value of the sheets of paper that can be contained in the bin.

For the sharpness control function, by which the edges of the copied images are emphasized, provides such optional functions as manual sharpness control in seven steps as well as photograph sharpness control functions composed of photographs (Photo), characters (Character), mesh dot print (Print), mixture of photograph and characters (Photo/Character). And these functions can be set voluntarily by default and by the tool pathway.

The contrast of copies can be voluntarily adjusted in seven steps by the operator, and the default can be set voluntarily by the tool pathway.

The copy position function is the function for selecting the position where a copied image is to be placed on the paper, and, as an optional function, the system features the automatic centering function, which positions the center of the copied image in the center of the paper, and the default is automatic centering.

The film projector function makes it possible to get copies from various types of film, and this function permits the selection of 35 mm negative or positive projection, 35 mm negative positioned on the platen, 6 cm $\times$ 6 cm slide positioned on the platen, and 4 in $\times$ 4 in slide positioned on the platen. The film projector function makes automatic selection of the A4-size paper unless any other paper size is specifically selected. Moreover, a color balance function is provided in the film projector pop-up, and, with this color balance function set in the "Reddish" position, the coloration of the image reproduced on the copy will be rectified to assume an increased reddish tone and, when the function is set in "Bluish," the color reproduced on the copy will be rectified with an increased bluish tone. Moreover, this function offers unique automatic density control and manual density control.

For page-programming, this system provides the covering function, which puts a back cover or a front cover to copies, the inserting function, which puts a sheet of white paper or colored paper between one copy and another, the color mode function, which makes it possible to set the color mode page by page for the original sheets, and the paper selecting function, which makes it possible to select a proper paper tray page by page for the original sheets and which can be set together with the color mode function.

The margin function makes it possible to set the margin by 1 mm within the range from 0 mm to 30 mm and this function is specifiable only for one side of one original sheet.

The marker editing function is a function for performing editing and processing work in the area surrounded with markers.

This function is applicable to documents, and consequently the original sheets are treated as black-and-white original sheets, the images within the specified area being restored to the palette colors on the CRT and the areas other than the specified one being rendered in black on the copy. In the black and red mode, moreover, the image is changed into red while the areas other than the specified area is rendered in black and red on the copy. This function are accompanied with the trimming, masking, color mesh, black-to-color functions. Furthermore, the specification of the area is done either by drawing a closed loop on the original sheet or by specifying the area by means of the editing pad. The same procedure applies also to the specification of the area for processing in each of the editing functions mentioned hereinbelow. Additionally, the area so specified is displayed in an analogous figure in the bit map area on the CRT.

The trimming function works to copy only the image within the marked area in black-and-white rendition and to erase the images positioned outside the marked area.

The masking function works to erase the image within the marked area and to copy in black and white only the images positioned outside the marked area.

The color mesh function places a specified color mesh dot pattern in the marked area and reproduces the image in black and white on the copy, with the color of the color mesh being selected out of the eight standard colors (the specified colors as determined in advance) or out of the eight registered colors (the colors registered by the user; a maximum of eight colors can be registered at the same time out of 1,670 available colors), and a mesh pattern can be selected out of four patterns.

The black-to-color function permits the reproduction of the image within the marked area on the copy in any specified color selected out of the eight standard colors or out of the eight registered colors.

The business editing function aims at quickly producing high-quality original documents mainly for business documents, and the original sheet is treated as a full-color original sheet, for which it is necessary to specify the area or the point with respect to all the functions and for which a plural number of functions can be set for each original sheet. And, in the black and mono-color mode, the areas other than the specified one are reproduced in the form of a mono-color copy while the image in black in the specified area is converted into the palette colors on the CRT. In the black-and-red mode, moreover, the areas other than the specified one are rendered in a black-and-red copy while the image in the specified area is converted into a red color. And, in addition to the trimming, masking, color mesh, and black-to-color functions available for marker editing, the functions of logotype, line, paint 1, collection, and function clear are provided.

The logotype function is the function which makes it possible to insert a logogram or logograms, such as a symbol mark, at a point or points specified therefor, and this function makes it possible to place two types of logograms in a vertical position and a lateral position respectively. However, only one such logogram can be set up for each original sheet, and the logogram patterns are prepared for the individual customers and supplied in a ROM.

The line function offers the function of drawing a vertical line or a horizontal line in relationship to the axis X by marking two points for such a line, and the color of such a line can be selected for each such line out of the eight standard colors and the eight registered colors, the number of specifiable lines being unlimited and the number of the usable colors is seven colors in the maximum at any given time.

The paint 1 function performs the function of painting the overall area within a closed loop in any color selected for each such loop out of the eight standard colors or the eight registered colors, one point within a closed loop being specified therefor. The mesh function permits the selection of any mesh out of the four patterns for each area, the number of the specifiable loops being unlimited and the number of the usable color mesh patters being seven patterns in the maximum. The correcting function possesses the area/point change mode, by which the function set for each area can be ascertained and modified, the area/point correction mode, by which the area size and the position of the point can be changed by 1 mm, and the area/point canceling mode, by which the specified area can be ascertained, modified, changed, or erased.

The creative editing function contains the functions of image composition, copy-on-copy, color composition, partial image shifting, multiple-page enlargement, paint 1, color mesh, color conversion, negative/positive reversal, repeat, paint 2, density control, color balance, copy contrast, copy sharpness, color mode, trimming, masking, mirror image, margin, line, shift, logotype, split scanning, correction, function clear, and add function. In this function, the original sheets are treated as color original sheets, and the system permits the setting of a plural number of functions for each original sheet, the setting of functions in combination for each area, and the areas to be specified are a rectangular area with two points specified therefor and a point with one point specified therefor. The image composition function consists in the function for copying the base original in color in four cycles, and then, holding the paper on the transfer device, continuing to copy again the trimmed original sheet in four cycles, and thereafter outputting the copy.

The copy-on-copy function consists in the function for copying the first original in four cycles, and then, holding the paper on the transfer device, continuing again to copy the second original sheet in four cycles, and thereafter outputting the copy.

The color composition function consists in the function for copying the first original sheet in magenta, and, holding the paper on the transfer device, continuing to copy again the second original sheet in cyan, and then, holding the paper on the transfer device, continuing further to copy the third original sheet in yellow, and thereafter outputting the copy. In the case of the four-color composition, the copying process is performed again further to add black onto the copy, and then the copy is output from the system.

The partial image shift function consists in performing the copying process in color in four cycles and then, holding the paper on the transfer device, continuing to copying again in four cycles, and thereafter outputting the copy.

In the full-color mode as a part of the color mode, the copying process is performed in four cycles. In the three-color mode, the copying process is performed in three cycles unless the editing mode is turned on. In the black mode, the copying process is performed in one cycle except for the case where the editing mode is turned on. In the plus-one-color mode, the copying process is performed in one to three cycles.

In the tool pathway function, the system provides the auditron, machine set-up, default selection, color registration, film-type registration, color collection, presetting, film projector scanning area correction, audiotone, timer setting, billing meter, diagnostic mode, the maximum adjustment, and memory card formatting functions. For the setting and changing operations by this pathway function, it is required to input the appropriate cipher code. Otherwise, the system does not accept any attempt at putting this function into action. Therefore, it is the key operator and the customer engineer that can perform any setting operation or changing operation by the tool pathway. However, it is only the customer engineer that can enter into the diagnostic mode.

The color registration function is to be used for the registration of colors on the register color buttons on the color palette, and such registration is read by the CCD line sensor into the system from the color original sheet. The color collection function is employed for making fine adjustments of the colors registered on the register color buttons.

The film-type registration function is used for the registration of the registered film type which is to be used in the film projector mode, and, in case such a film type has not yet been registered, the system will be in the state in which it is not possible to select any register button on the screen in the film projector mode.

The presetting function performs the presetting of the reduction/enlargement values, the copy density in seven steps, the copy sharpness in seven steps, and the copying contrast in seven steps.

The film projector scanning area correction function is used for making adjustments of the scanning area at the time the operation is performed in the film projector mode. The audio-tone function is put into action for making adjustments of the volume of the sounds used in the selecting operation.

The timer-setting function is used for performing the setting of the time which can be released to the key operator. In addition to these functions, the system also provides such functions for dealing with abnormal conditions in the system as the crash recovery function, which initiates a restart in case the sub-system falls into the state of a crash, the function for initiating the fault mode in case the sub-system cannot be restored to its normal state even though the crash recovery operation is performed two times, and the function of making an emergency stop in the event of the occurrence of a jam.

Furthermore, it is possible also to use in combination the basic copying functions and the additional functions, the basic functions/the additional functions and the marker editing functions, the business editing functions, the creative editing functions.

As a whole, the system embodying this invention and possessing the functions mentioned hereinabove has the characteristic features mentioned in the following:

(B) Characteristic Features (a) Achievement of high-quality full-color copying For this equipment, efforts have been made to achieve high-quality full-color copying capable of vivid and clear reproductions of color documents through improvements made of the reproduction of image quality in black, the reproducing capabilities for pale colors and shades, the quality of generation copies, the quality of OHP images, the reproducing capabilities for fine lines, the reproducing capabilities for film copies, and the maintenance durability of the copies.

(b) Achievement of low costs

Efforts have been made to achieve reductions of the prime costs of the picture components and materials such as the photosensitive material, the developing device, and the toner and the costs of the expendable goods, as well as reductions of the service costs including the costs for the UMR, the component parts, and so forth, and efforts have been made further to make the copying machine compatible with black-and-white copying operations with the additional advantage of the black-and-white copying speed of 30 sheets of A4-size paper, which corresponds to approximately three times as much as that of the comparable existing model, so that a reduction of the overall running cost and the unit cost for copies may be achieved thereby.

(c) Improvement on productivity

It has been aimed to realize a high degree of productivity in this copying machine by installing the ADF and the sorter (optional items), in order to make it possible to process a multiple number of original sheets, by incorporating the magnification range from 50% to 400% available for selection, by providing for the maximum original sheet size of A3, with the paper trays ranging from B5 to B4 being accommodated at the upper stage, the paper trays ranging from B5 to B4 also being accommodated at the middle stage, the paper trays ranging from B5 to A3 being accommodated at the lower stage, and the SSI device accepting the paper sizes ranging from B5 to A3, by ensuring the full-color copying speeds of 4.8 CPM for A4 paper, 4.8 CPM for B4, and 2.4 CPM for A3, and the black-and-white copying speeds of 19.2 CPM for A4, 19.2 CPM for B4, and 9.6 CPM for A3, with the warm-up time within eight minutes and the FCOT of 28 seconds or less for the four-color full-color copying process and 7 seconds or less for the black-and-white copying process and with the continuous copying speeds of 7.5 sheets for A4 in full-color copying and 30 sheets for A4 in black-and-white copying.

(d) Improvements on operating ease and facility

This copying machine features enhanced operating facility with operations integrated in one place as much as possible, with the hardware buttons on the hardware control panel and the soft buttons on the soft panel on the CRT screen available for use side by side, so that the selection of the functions can be made directly in a manner easy for the beginners to understand and yet not troublesome to the highly skilled operators, and, at the same time, this machine has been designed to be capable of communicating the necessary information to the operator accurately through its effective utilization of colors. This copying machine has been so designed that its high-fidelity copying process is put into action only by operations at the hardware control panel and the primary screen (i.e. the opening menu screen) while the processes which cannot be regulated by the operational flow, such as start, stop, all clear, and insertion, are performed by the operations at the soft panel on the primary screen, but such operations as the selection of paper, size reduction and enlargement, copy density, picture-quality adjustment, color mode, and color balance adjustment are put into action by operations on the soft panel on the primary screen, making it possible for the users of the conventional monochromatic copying machines to use this machine well enough in a manner natural to them. Furthermore, this machine is designed to allow the users to open the proper pathway and to select the various types of its functions, such as the editing functions, merely by touching operations at the pathway tabs in the pathway region on the soft panel. Furthermore, this machine permits the automatic execution of the predetermined operations, with the copying modes, the conditions for their execution, and so forth being stored in advance in the memory card.

(e) Repletion of functions

With touching operations on the pathway tab for the pathway region on the soft panel, it is possible to open the pathway and to select the various types of editing functions. In the marker editing function, for example, it is possible to perform the editing and processing of documents in black and white, using the tool called the marker, and, in the business editing function, high-quality original documents can be produced quickly mainly for use as business documents. Moreover, in the creative editing function, various types of editing functions with many choices are made available in such a manner that this copying machine will be able to satisfy the needs of various specialists, such as designers, copying service agents, and key operators. In addition, the area specified by the editing functions is put on display in the form of a bit map area, so that the specified area can be ascertained thereby. Thus, such abundant editing functions and color creation capabilities of this system make it possible to achieve very considerable enhancements of the power of expression in writing.

(f) Achievement of power-saving features

This invention has achieved the materialization of a highly efficient four-color full-color copying machine with the power consumption of 1.5 kVA. For this purpose, a decision has been made on a control system in such a way as to realize the power consumption of 1.5 kVA in each of the operating modes, and the distribution of electric power to the individual functions has been decided so as to set the target values. Furthermore, an energy system table has been compiled in order to ascertain the channels for energy transmission, and the system is so designed for its control and verification by the energy systems.

(C) Examples of Differentiation

The copying machine to which this invention is applied can make its differentiation in respect of the use of copying machines in that this copying machine can be used for both full- color copying work and black-and-white copying work and additionally that they are so readily understandable to the beginners and yet not troublesome to the highly skilled operators in taking copies, and, at the same time, the copying machine permits not only mere copying work but the production of original documents as well, so that the machine will prove adequate for its utilization by specialists and artists. Examples of its uses are presented in the following.

For example, this copying machine can produce posters, calendars, cards, invitation cards, new year greeting cards with photographs, or the like, which have hitherto been produced by printing, at a cost much less expensive than the cost of production by printing so long as the number of copies required is not so large. Moreover, with the effective utilization of its editing, functions, it will be possible to produce original works suiting the preferred design, for example, in calendars or the like, which means that this copying machine will enable the individual departments to produce their own original and highly variegated calendars although it has been a regular practice in the past years to have a uniform calendar printed for the whole company.

Furthermore, as observed in the instances of interior goods and electric appliances in the recent years, color is a determinant of sales quantities, and, by copying colored designs even at the stage of the production of interior goods and dresses, it will be possible for two or more persons to evaluate the coloration together with the design of such products. Thus, it will be possible to develop new works featuring colors in such a way as to achieve an increase in the consumption of such goods. Above all, the apparel industry or the like will be able to specify the colors with a degree of accuracy higher than what has been the case in the past by sending copies of charts or illustrations showing the finish of the products as rendered in color when orders for products are to be placed with dress-making workshops located in distant places, thereby achieving an improvement on their operating efficiency.

Furthermore, since this equipment offers the benefit of a combination of color copying and black-and-white copying, it will enable the user to copy one original sheet in black and white and/or in color respectively in the necessary numbers of sheets as required. Accordingly, for studying chromatology in technical schools and colleges, for example, this copying machine will provide the advantage of expressing a colored design as rendered both in black and white copy and in color copy, so that each of these can be compared with the other to find at a glimpse the clear fact that red is nearly identical to gray in terms of brightness, i.e. the value of color, and thus it will be possible to learn the influence which brightness and coloration give to the visual sensation.

(I-3) Electrical Control System

This Section presents a description with respect to the hardware architecture, the software architecture, and the division of states.

(A) Hardware Architecture and Software Architecture

In case a color CRT is used as a user interface (UI) as is the case with the present system, the amount of data will be increased because of the color displaying features as compared with the case where a monochromatic display is used, and also there will be an increase in the amount of data if it is attempted to construct a friendlier UI by incorporating therein contrivances regarding the composition of the display screen and the transition of the screens.

In dealing with such an increase in the amount of data, it will be possible to employ a CPU mounted with a memory device with a larger capacity, and yet such a step would result in using a larger board, which will present such problems as the difficulty in accommodating it in the main unit of the copying machine, the difficulty in taking flexible measures for dealing with the changes in the specifications, and a resulting increase in the costs.

Therefore, it has been designed, with respect to this copying machine, to deal adequately with such an increase in the amount of the data by setting up separate CPU's as remote units, embodying therein those techniques which can be used in common with other models or machines, such as the CRT controller.

Figure 3:
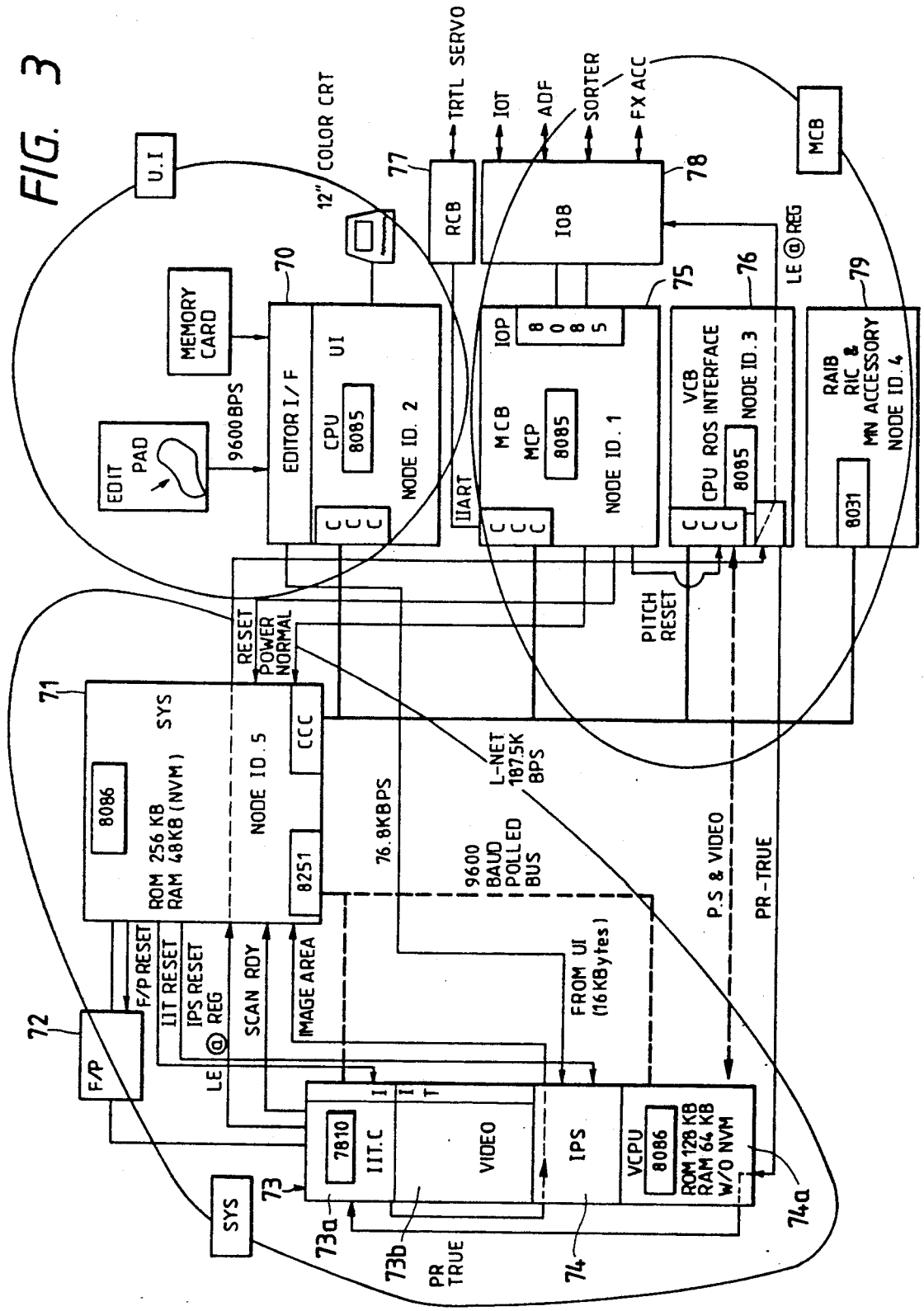
FIG. 3 illustrates the hardware architecture.

The electrical system hardware is divided into the three types of systems, the UI system, the SYS system, and the MCB system, as illustrated in FIG. 3. The UI system includes the UI remote unit 70 while the SYS system contains in separate units the F/P remote unit 72, which performs the control of the F/P, the IIT remote unit 73, which performs the reading of the original sheets, and the IPS remote unit 74, which performs the various forms of the processing of the images. The IIT remote unit 73 is provided with the IIT controller 73a, which performs control over the imaging unit, and the VIDEO circuit 73b, which converts the image signals read off into digital signals and transmits them to the IPS remote unit 74, and this IIT remote unit 73, as well as the IPS remote unit 74, is controlled by means of the VCPU 74a. The SYS (System) remote unit 71 is provided to function as a system which performs the overall and coordinating control of the above-mentioned remote units and those individual remote units to be mentioned later.

Now that the SYS remote unit 71 is in need of an enormous memory capacity for the execution of such programs as the one for controlling the transition of the screens for the UI, 8086, which is mounted with a 16-bit microcomputer, and yet also a microprocessor than 8086, such as 68000, for example, can be employed.

Moreover, the MCB system is provided with the VCB (Video Control Board) remote unit 76, which is a Raster Output Scan (ROS) interface for receiving the video signals from the IPS remote unit 74 for use of the signals in the formation of latent images by laser on the photosensitive material belt (Photo Receptor Belt) and for sending forth the signals to the IOT, with the RCB remote unit 77 for the servo operation of the image transfer device (turtle), and further with the IOB remote unit 78 for operation as the I/O port for the IOT, ADF, the sorter, and the accessories, and with the accessory remote unit 79, all of these forming separate units and being coordinated and controlled by the MCB (Master Control Board) remote unit 75, which is provided for the purpose of coordinating all these remote units for their overall control.

Furthermore, each of the individual remote units shown in the Figure is composed of a single board. In this Figure, moreover, the bold solid line represents the LNET high-speed communication network at 187.5 kbps, and the bold broken line indicates the master/slave system serial communication network at 9,600 bps, while the slender solid line indicates the hot line, which is the transmission channel for the control signals. Also, the line marked 76.8 kbps in the Figure is the exclusive-purpose transmission line for use in the issuing of notices of the information on the images drawn on the editing pad, the information on the copying modes as input from the memory card, and the graphic information in the editing area from the UI remote unit 70 to the IPS remote unit 74. Furthermore, what is marked CCC (Communication Control Chip) in the Figure is the integrated circuit (IC) which supports the protocol for the high-speed communication line LNET.

Figure 4:
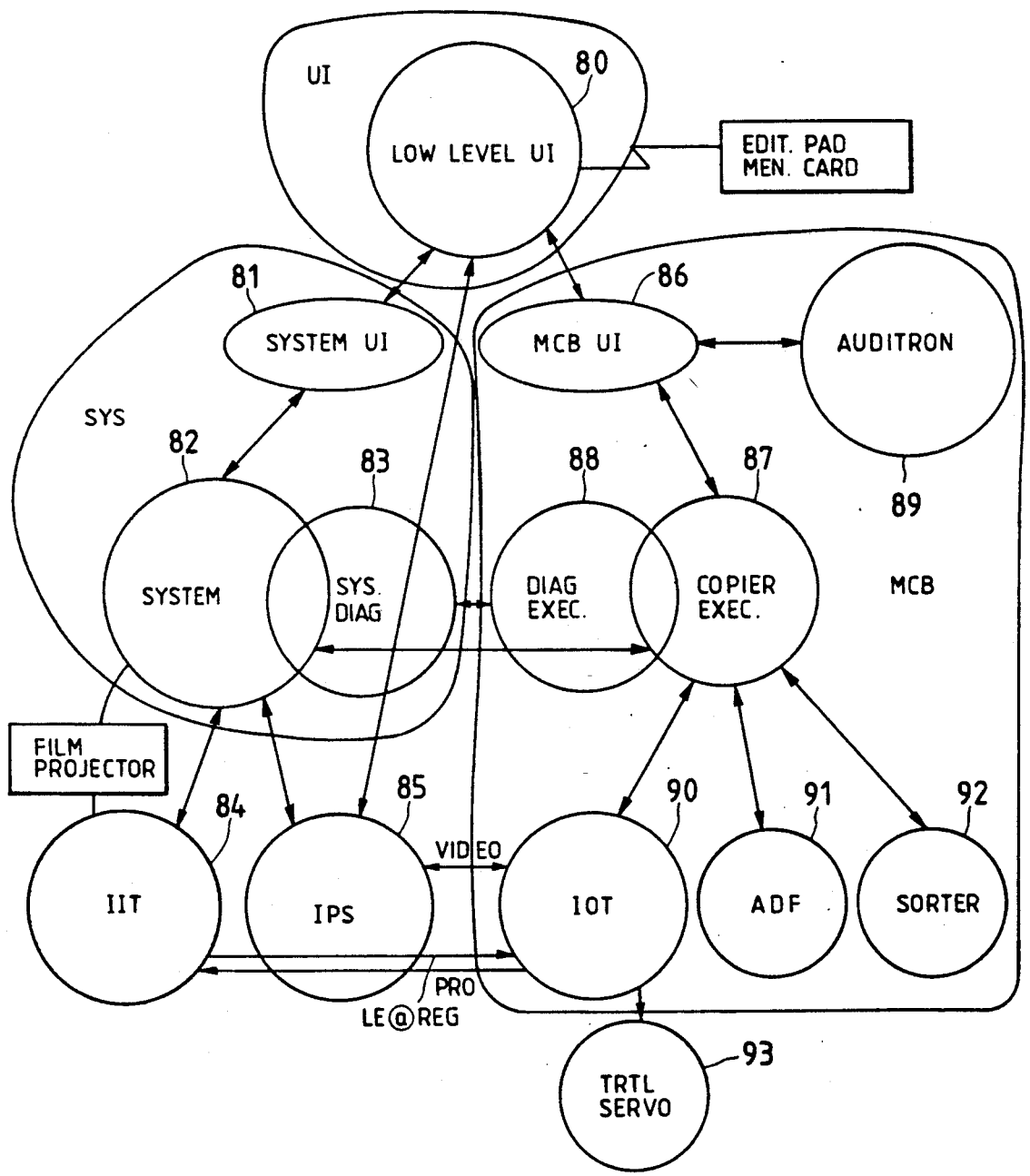
FIG. 4 illustrates the software architecture.

As described in the foregoing part, the architecture of the hardware is divided into the three major systems, which are the UI system, the SYS system, and the MCB system, and the assignment of these processing functions are described in the following part with reference to the software architecture presented in FIG. 4. In this regard, the arrow marks in the Figure represent the relationship of the signals in the transmission and reception of the data by the LNET high-speed communication network at 187.5 k bps and the master/slave system serial communication network at 9,600 bps or in the transmission of the control signals as performed via the hot line, as shown in FIG. 3.

The UI remote unit 70 is composed of the LL UI (Low Level UI) module 80 and the module (not shown in the Figure) which performs the processing operations with respect to the editing pad and the memory card. The LL UI module 80 is the same as what is ordinarily known as the CRT controller, and thus it is a module for displaying the screen on the color CRT, and hence it is controlled by the SYS UI module 81 or the MCB UI module 86 what picture image screen is to be put on display from time to time. It should be evident from this that this architecture makes it possible to develop the UI remote unit for common use with other models or other equipments. The reason is that the CRT controller is to be used together with the CRT although it differs from one model to another what a screen composition should be used and how the transitions of the screens should take place.

The SYS remote unit 71 is composed of the three modules, the SYS UI module 81, the SYSTEM module 82, and the SYS. DIAG module 83.

The SYS UI module 81 is a software module which controls the transition of the screens, and the SYSTEM module 82 is a module which contains the software for making the selection of the F/F (Feature Function), by which it is recognized what coordinates on the soft panel have been selected on a given screen, i.e. what job has been selected, the job validation software, by which the job is finally checked to determine whether or not the conditions for the execution of the copying job contain any contradiction, and the software for controlling the communications with the other modules for the transmission and reception of such various types of information on the selection of the F/F, the job recovery, and the machine state.

The SYS. DIAG module 83 is the module which operates in the customer simulation mode, in which the machine performs its copying operation in the diagnostic state for conducting a self-diagnosis. As the customer simulation mode is put into action for the same operations as in the ordinary copying process, and the SYS. DIAG module 83 is thus the same in substance as the SYSTEM module 82, but, since it is used in the diagnostic state, which is a special state, the module is described separately from, but in partial overlapping with, the SYSTEM module 82.

Moreover, the IIT remote unit 73 accommodates the IIT module 84, which performs the control of the stepping motor used for the imaging unit, and the IPS remote unit 74 accommodates the IPS module 85, which performs the various processing operations concerning the IPS, and these modules are controlled by the SYSTEM module 82.

In the meanwhile, the MCB remote unit 75 accommodates the individual software modules, i.e. the MCB UI module 86, which is a software for controlling the transition of screens in the diagnostic mode, in the Auditron mode, and in case of any fault, such as jamming, the IOT module 90, which performs such processing operations necessary for the performance of the copying operations as the control of the photosensitive material belt, the control of the developing agent, and the control of the fuser, the ADF module 91, which performs the control of the ADF, and the SORTER module 92, which performs the control of the sorter, as well as the copier executive module 87, which performs control over these software modules, and the DIAG. executive module 88, which performs the various kinds of diagnoses, and the Auditron module 89, which performs the processing of the copying charges through its access made to the electronic counter by the cipher numbers.

Moreover, the RCB remote unit 77 accommodates therein the turtle servo module 93, which performs the control of the action of the image transfer device, and the turtle servo module 93 is placed under the control of the IOT module 909 in order to take charge of the image transferring process of the zerography cycle. In this regard, the reason why the copier executive module 87 and the DIAG. executive module 83 are overlapping with each other is the same as the reason for the overlapping of the SYSTEM module 82 and the SYS. DIAG module 83.

Figure 5A:
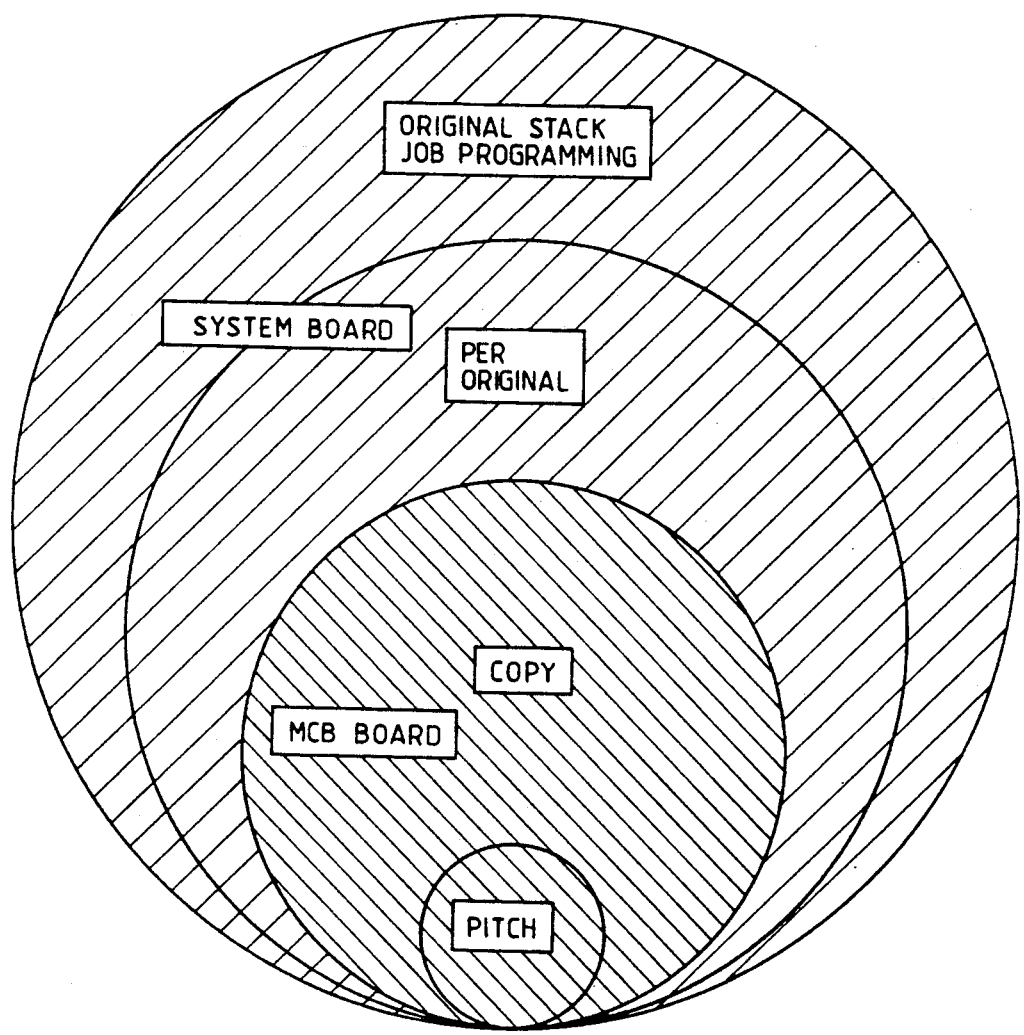
FIGS. 5(a) through 5(e) illustrate the copy protocol.

The assignments of the processing operations mentioned above are now described below with reference to the copying operations. The copying operations show repetitions of quite similar motions except for the differences in the colors developed, and, as illustrated in FIG. 5(a), the operations can be viewed in terms of several separate layers.

One sheet of copy is produced by repeating several times the minimum unit of operation called "pitch". In specific terms, the pitch relates to such actions as how the developing device, the transfer device, and so forth should be operated for the performance of the copying operation for a single color, how the detection of jamming should be performed, and, if the pitch operation is performed with respect to the three colors, Y, M, and C, one sheet of copy in three colors is finished, and, if the operation is performed for the four colors, Y, M, C, and K, one sheet of full-color copy in the four colors is finished. These are the copying layers, and, in terms of concrete operations, these layers represent the processes performed for transferring the toner for each color onto the paper, thereafter fixing the toner with the fuser, and then discharging the copy from the main unit of the copying machine. The control over the processes up to this point is performed by the copier executive module 87 in the MCB system. Of course, the IIT module 84 and the IPS module 85, which are included in the SYS system, are also put into action in the process of a pitch, and, for the purpose of such operations, the exchanges of the two signals called PR-TRUE and LE@-REG respectively are performed between the IOT module 90 and the IIT module 84 as shown in FIG. 3 and in FIG. 4. Specifically, the PR (PITCH RESET) signal, which sets the standard timing for the control of the IOT, is generated consecutively from the MCB for two or three divided parts of one turn of the photosensitive material belt. That is to say, since the photosensitive material belt is so designed as to be divided for the pitch, depending on the size of the copy paper used, in such a manner as two pitches for the A3-size copy paper and three pitches for the A4-size paper, for example, in order to achieve the highly efficient utilization of the photosensitive material belt and to achieve an improvement on the copying speed, the cycle of the PR signal generated for each pitch will get longer, i.e. three seconds for the copying operations in two pitches, while the cycle of the signal becomes shorter, i.e. two seconds for the copying operations in three pitches.

Now, the PR signal which is thus generated by the MCB will be distributed by way of the hot line to those necessary locations in the IOT, such as the VCB remote unit, which performs the processing operations related to the VIDEO signals.

The VCB has a gate circuit in it, and it selectively outputs to the IPS remote unit only those pitches in which the images can be given exposure to light for their registration on the photosensitive material belt. This signal is the PR-TRUE signal. In this regard, the information by which this PR-TRUE signal is generated on the basis of the PR signal received from the MCB via the hot line is transmitted from the MCB by the LNET system.

In contrast to this, a vacant pitch for one pitch is produced on the photosensitive material belt in the duration of time when images cannot be given any exposure for their registration on the photosensitive material belt, and the PR-TRUE signal will not be generated for any such vacant pitch. As the pitches in which the PR-TRUE signal is not generated, it possible to cite for example, the duration of time from the time when the machine discharges the paper upon completion of the transfer of images at the transfer device to the time when the next sheet of paper is fed into the transfer device. That is to say, when a lengthy sheet of paper, such as an A3-size sheet, for example, is discharged, the paper gives a shock, as its fore edge enters the inlet into the transfer device, to cause some deterioration in the quality of the copied images. Thus, for the paper in excess of a certain length, the system is designed not to discharge the paper as it is even when the final transfer is completed, but to discharge it only after it is transported one more round at a certain speed while it is held in the gripper to be described later. Therefore, it becomes necessary to provide the photosensitive material belt with a skip for one pitch.

Moreover, the PR-TRUE signal is not output in the duration from the start of the copying operation with the start key turned on to the time when the cycle up to the completion of the sequence is brought to a finish, since the reading of the original sheet is not yet completed and it is consequently not possible to give exposure to the image for registration thereof on the photosensitive material belt.

The PR-TRUE signal output from the VCB remote unit is received by the IPS remote unit and, at the same time, it is also transmitted as it is to the IIT remote unit, being used as the trigger signal for the start of the scanning operation in the IIT.

By this, it is possible to perform the pitch process, keeping the IIT remote unit 73 and the IPS remote unit 74 in synchronization with the IOT. Also, at this stage, the IPS remote unit 74 and the VCB remote unit 76 perform the transmission and reception of the video signals for performing the modulation of the laser light to be used for the formation of latent images on the photosensitive material belt, and such signals received by the VCB remote unit 76 are furnished to the laser output section 40a, after they are converted from the parallel signals into serial signals, for use as the VIDEO modulation signals to be fed directly to the ROS.

When the operations described above have been repeated four times, one sheet of full-color copy in four colors is finished, and one copying cycle is thereupon completed.

Next, with reference to the FIG. 5(b) through 5(e), the exchanges of signals and the timing thereof are described for the processes leading to the output of the image signals read by the IIT to the IOT and then to the transfer of images onto the paper finally at the transfer point.

Figure 5B:
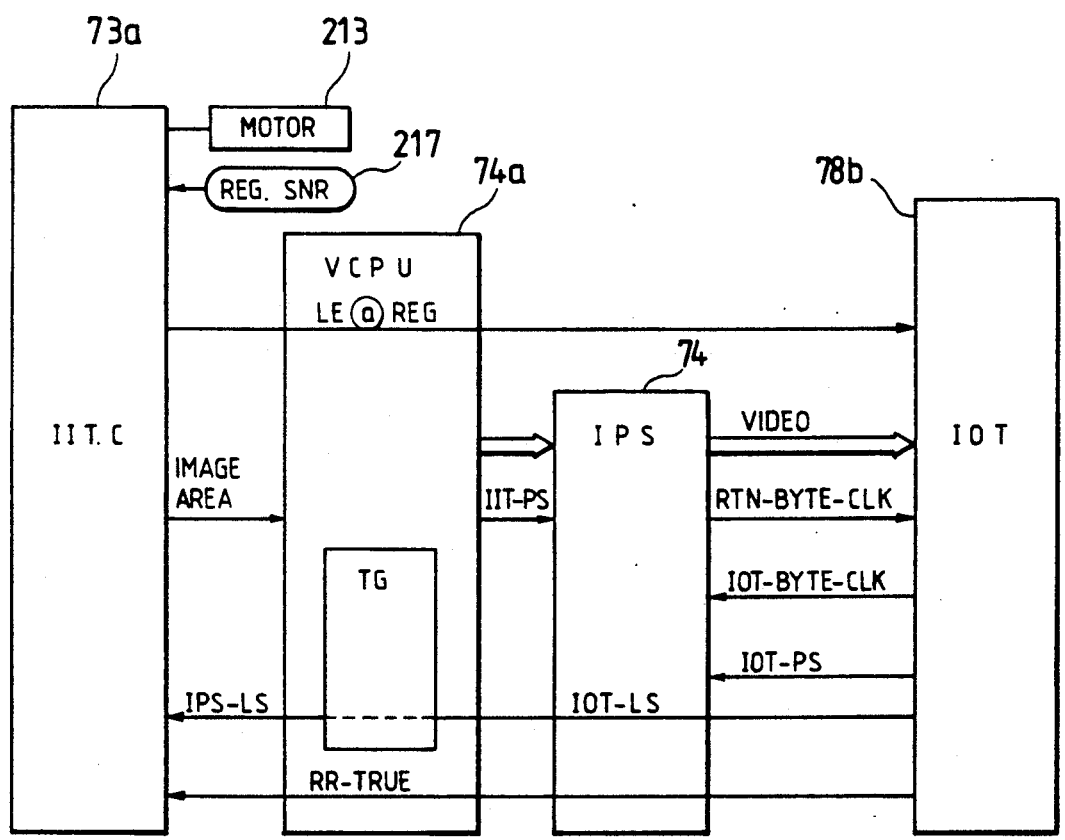
Figure 5C:
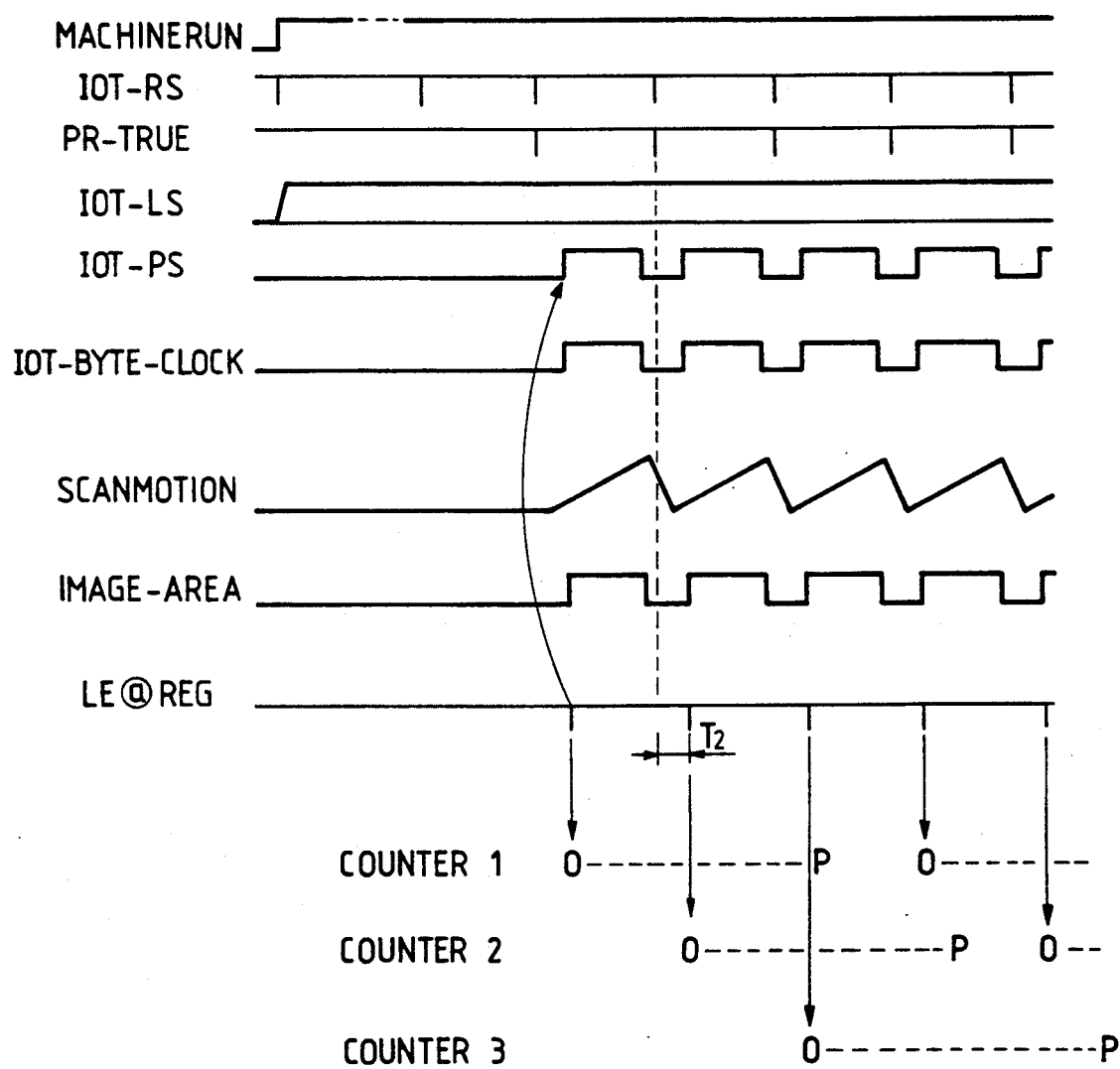
Figure 5D:
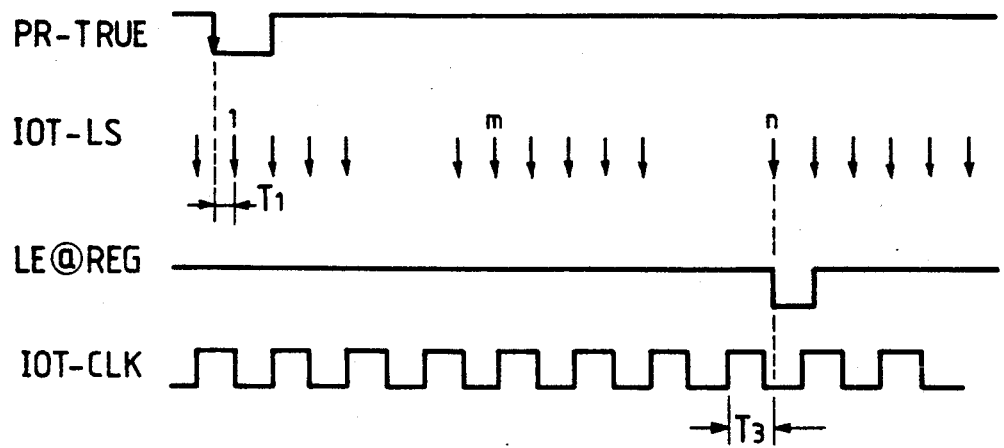

As shown in FIGS. 5(b) and 5(c), when the start job command is received from the SYS remote unit 71, the IOT 78b enter into the cycle start sequence, with such operating processes as the driving of the main motor and the start-up of the high-voltage power source. The IOT 78b outputs the PR (Pitch Reset) signal in order to cause a latent image corresponding to the length of the paper to be formed on the photosensitive material belt.

For example, each time the photosensitive material belt turns one round, the IOT 78b outputs a PR signal for three pitches for the A4-size paper and such a signal for two pitches for the A3-size paper. When the cycle start sequence of the IOT 78b is brought to a finish, then a PR-TRUE signal is output, in synchronization with the PR signal as from that point in time, to the IIT controller 73a only in correspondence with the pitches which require imaging.

Moreover, the IOT 78b transmits the IOT-LS (line sink) signal, which is output for each revolution for one line of the ROS (Rastor Output Scan) to the TG (Timing Generator) in the VCPU 74a and here transmits to the IIT controller 73a the IPS-LS with an apparent advance of the phase by the amount of lag in the total pipeline in the IPS as compared to the IOT-LS.

Upon the reception of the PR-TRUE signal, the IIT controller 73a enables the counter and counts the IOT-LS signal and starts the revolutions of the stepping motor 213, which drives the imaging unit 37, when the signal attains the prescribed number of counts, so that the imaging unit may begin its scanning of the original sheet. Then, the controller continues to perform the counting process and, after the elapse of T2 seconds, it generates the LE@REG in the position where the reading of the original sheet is started and transmits the same to the IOT 78b.

This position for starting the reading of the original sheet can be determined by driving the imaging unit for one time in advance, for example, after the power is turned on, thereby detecting the position of the register 217 (in the proximity of the register, which specifically is to be found at a point located approximately 10 mm closer towards the scanning side from the position of the register) and thereafter finding the real position of the register by arithmetic operations based on the detected position, and also it is possible to determined the ordinary stopping position (i.e. the home position) by arithmetic operations. Moreover, since the position of the register is different from one machine to another because of the individual differences or deviations among the units, it is possible to set the correct and accurate position for the start of the reading of the original sheet through correction at the time of the calculation of the real position of the register and the home position with the correcting value stored in the NVM. This corrected value can be modified for each factory, each serviceman, and such a correction can be put into practice merely by rewriting this correcting value electrically, and thus it is not necessary to make any mechanical adjustment of the value. In this regard, the reason why the position of the register 217 is set up with a deviation by approximately 10 mm towards the scanning side from the real position of the register is that such an arrangement renders the correction always in a negative value, offering greater simplicity in the adjustment and the software.

Moreover, the IIT controller 73a outputs the IMAGE-AREA signal in synchronization with the LE@REG. The length of this IMAGE-AREA signal is equal to the scanning length, which is defined by the start command transmitted from the SYSTEM module 82 to the IIT module 84. In specific terms, the scanning length corresponds to the length of the original sheet when the copying work is performed through detection of the original sheet size and the length is set by the divisor for the copy paper length and the magnification (with 100% in magnification taken as 1) in case the copying work is to be performed with a magnification being specified therefor. The IMAGE-AREA signal is channeled via the VCPU 74a, where the signal has its name changed to the IIT-PS (Page Sink) and is transmitted to the IPS 74. The IIT-PS is a signal indicating the time for the execution of the processing of the image.

When the LE@REG is output, the data for one line of the licensor is read in synchronization with the IOT-LS signal, and various types of correcting processes and the A/D conversion are performed in the VIDEO circuit (FIG. 3), and the signal so processed is transmitted to the IPS 74, which transmits to the IOT 78b the video data for one line in synchronization with the IOT-LS. At this time, the RTN-BYTE-CLK, which is a reversal signal of the IOT-BYTE-CLK, is transmitted back to the IOT, in parallel with the video data, thereby effecting a delay in the data in the same way as in the clock, so that synchronization can be achieved with certainty.

When the LE@REG is input into the IOT 78b, the video data are transmitted to the ROS in synchronization with the IOT-LS signal in the same manner, and a latent image is formed on the photosensitive material belt. Upon reception of the LE@REG input into it, the IOT 78b starts the counting process with the IOT-CLK, taking the LE@REG as the basis, and on the other hand the servo-motor for the image transfer device is controlled in such a way that the fore edge of the paper is positioned at the image transfer position at the prescribed number of counts. In this regard, the PR-TRUE signal output by the rotation of the photosensitive material belt and the IOT-LS signal output by the rotation of the ROS are originally not in any synchronization with each other. Therefore, the LE@REG will have a lag by the T1 time in relation to the PR-TRUE signal when the LE@REG is output at the count n when the counting process is started from the subsequent IOT-LS with the input of the PR-TRUE signal, putting the imaging unit into operation at the count m. This lag corresponds to an amount for one line sink in the maximum, and, in the case of full-color copying in the four colors, such lags accumulate with the result that such lags express themselves in the form of color deviations in the output image.

Figure 5E:
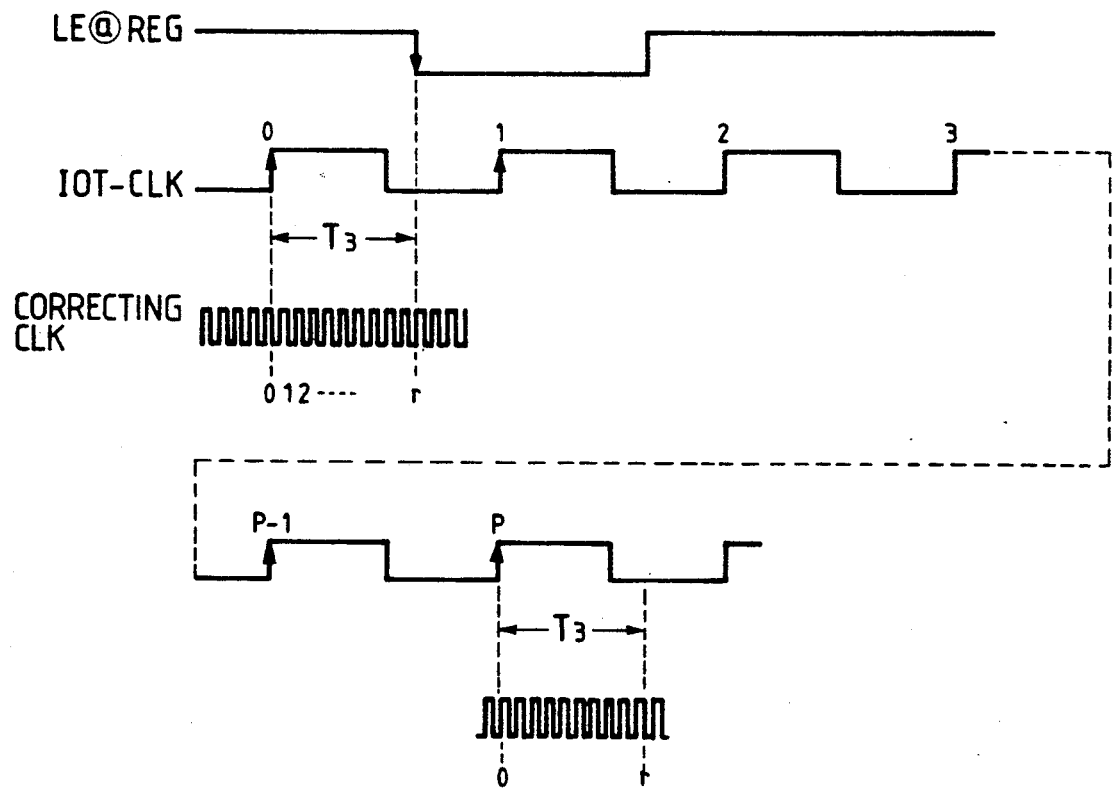

In dealing with this, the counter 1 starts the counting process when the initial LE@REG is input, and the counter 2 and the counter 3 start the counting process when the counting process when the second LE@REG and the third LE@REG are input, and, as shown in FIG. 5(c), when the respective counters attain the number of counts p, which marks the position for image transfer, they clear these, so that the counters are employed in the stated order in response to the input of the LE@REG at the fourth time and the subsequent times. And, as shown in FIG. 5(e), the time T3 from the pulse immediately preceding the IOT-CLK is counted with the correcting clock. When the latent image formed on the photosensitive material belt approaches the image transfer position and when the IOT-CLK has counted the number of counts p, which marks the counts up to the position of image transfer, then the correcting clock thereupon starts the counting process, and the point equivalent to the counts obtained by the addition of the number of counts r, which corresponds to the time T3 mentioned above, will be the exact position for the image transfer. This is placed on the control for the counter for controlling the image transfer position (timing) for the image transfer device, so that the servo-motor for the image transfer device is accurately controlled so as to achieve the exact synchronization of the fore edge of the paper in relation to the input of the LE@REG.

The operations mentioned so far correspond to the processes leading to the completion of the copy layers, in addition to which there is a process for setting the number of sheets to be copied for each original sheet, i.e. the setting of the number of times of the job to be performed by the copy as the unit for each original, and this is the process to be performed in the Per Original layer. Further, on top of this is the job programming layer, in which the process for making a change in the parameter for the job. Specifically, this process relates to the point whether or not the ADF is to be used, whether or not the color of a part of the original sheet is to be changed, and whether or not the differential magnification function is to be used. These processes, i.e. the per original process and the job programming process, are controlled by the SYS module 82 of the SYS system. For this purpose, the SYSTEM module 82 checks and finally establishes the contents of a job as transmitted from the LL UI module 80, and, preparing the necessary data, gives a notice of the data to the IIT module 84 and the IPS module 85 by the serial communication network at 9,600 bps and also notifies the contents of the job to the MCB system via the L NET.

As mentioned above, those sets of functions which perform independent processes and those which perform the processes that can be planned for common use with other models or other equipments are set up and grouped together to form separate sets of functions assigned to different remote units, and then those separate sets of functions are divided among the major categories of the UI system, the SYS system, and the MCB system, and then the modules which perform control over the copying operations in accordance with the layers of the processes. This approach has made it possible to achieve such meritorious effects as establishing a clearly defined framework for the work of the designing staff, attaining uniformity in the techniques for the development of software and so forth, setting the delivery date and the cost clearly and definitely, and dealing properly with changes or the like in the specifications, if any, by making modifications of the related modules only, thereby making it possible to improve the efficiency in the development work.

(B) Division of States

In the foregoing part, the assignment of the processes to the UI system, the SYS system, and the MCB system have been described, and, in this section, the processes which are performed by the UI system, the SYS system, and the MCB system, respectively, from time to time at each of the copying operations are described with reference to the sequence in which the copying operations are performed.

Figure 6:
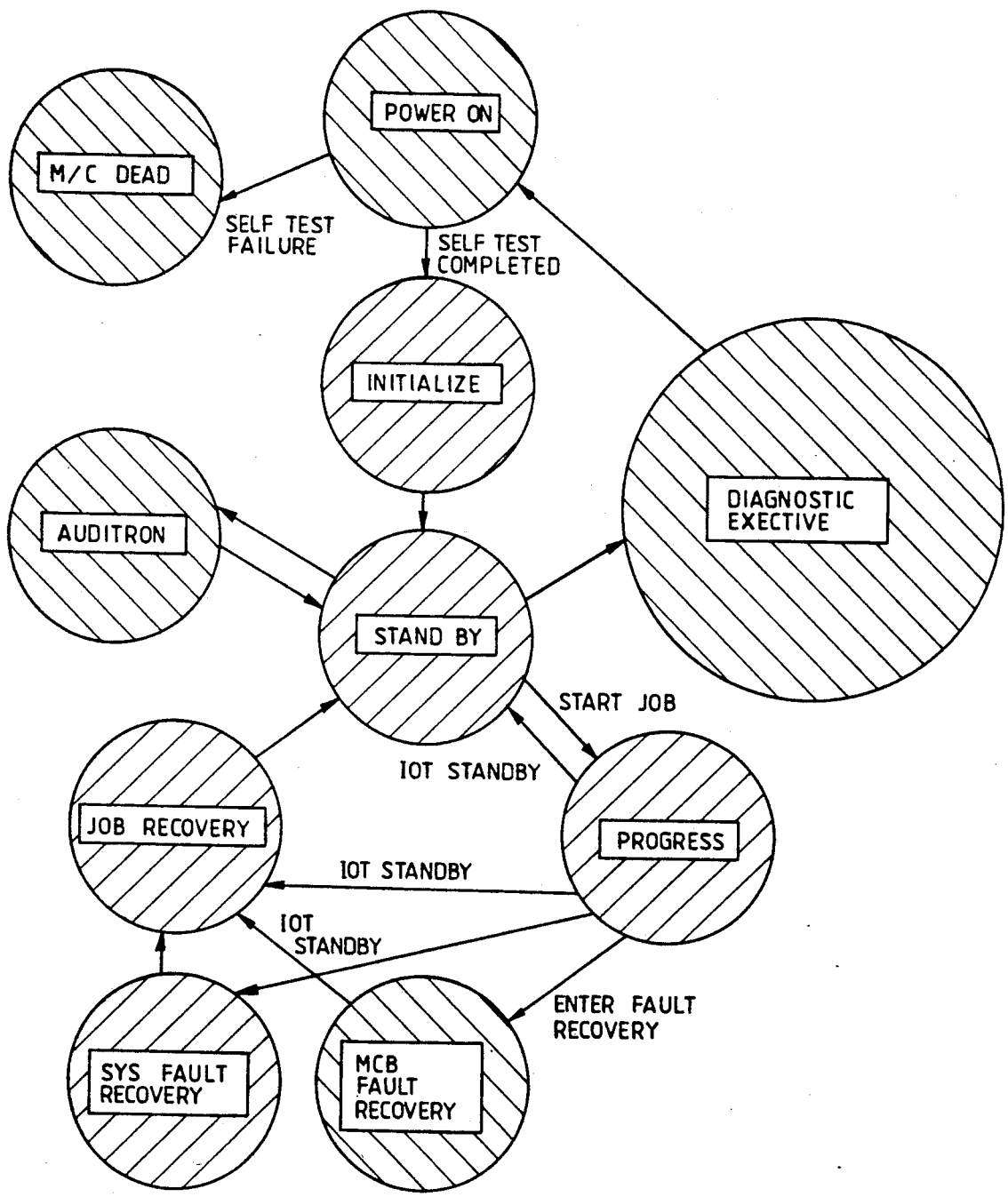
FIG. 6 illustrates the division of states.

For the copying machine, the power-ON operation and the subsequent copying operations, as well as the conditions after the completion of the copying operations, are divided respectively into several states, and the jobs performed in each of the states are determined, and, with the system designed not to move on to the next state unless it has completed all the jobs to be performed in each state, it is endeavored to warrant the expectation of the attainment of efficiency and accuracy in the controlling operations. This is called the state division, and, for this copying machine, the state division has been made as shown in FIG. 6.

What is characteristic of the stat division for this copying machine is that, in each state, the controlling authority for performing control over the entirety of a given state and the UI mastering authority for using the UI in the particular state rests with the SYS remote unit 71 at some time but rests with the MCB remote unit 75 at other times. In other words, the division of the operating functions between the separate CPU's as mentioned above produces the effect that the LL UI module 80 in the UI remote unit 70 can be controlled not only by the SYS UI module 81 but also by the MCB UI module 86, and, since the processes are thus assigned to the separate modules, so that the per original process and the job programming process are controlled by the SYS module 82 while the pitch process and the copying process are controlled by the copier executive module 87 in the MCB system, this setup results in the corresponding difference in the point which of the SYSTEM module 82 and the copier executive module 87 holds the overall controlling authority for the controlling operations or holds the UI mastering authority in each state. In FIG. 6, it is shown that the copier executive module 87 in the MCB system has the UI mastering authority over the state represented by the vertical lines while the SYSTEM module 82 has the UI mastering authority over the state represented in solid black.

Figure 7:
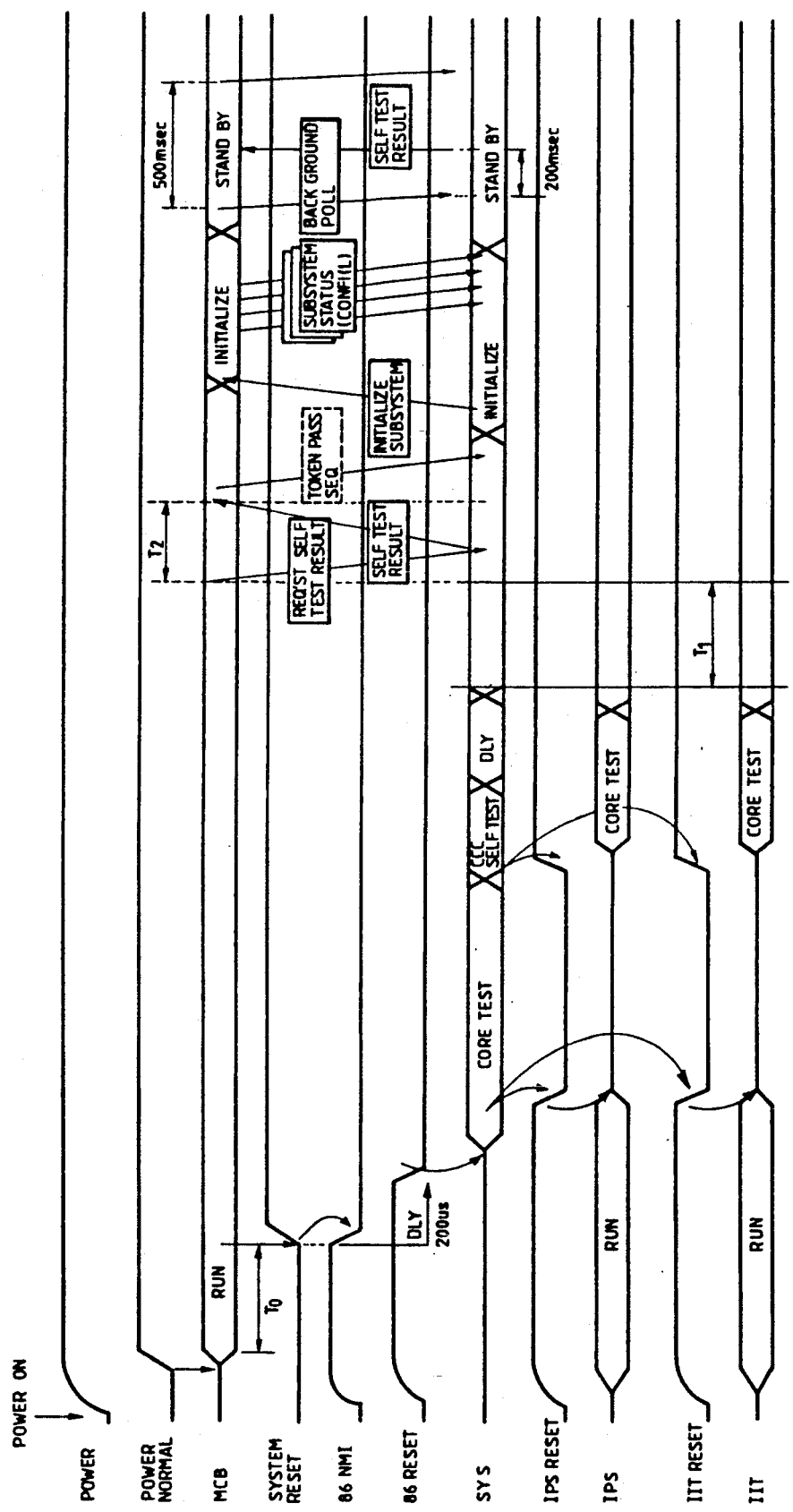
FIG. 7 illustrates the sequence from the power-on state to the stand-by state.

Of the state divisions shown in FIG. 6, those from the power-ON operation to the standby state are explained below with reference to FIG. 7.

When the power source is turned on to set the system in the power-ON state, the IPS reset signal and the IIT reset signal to be fed from the SYS remote unit 71 to the IIT remote unit 73 and the IPS remote unit 74, as shown in FIG. 3, become H (HIGH), and thereupon the IPS remote unit 74 and the IIT remote unit 73 are released from resetting and start their respective operations. Moreover, when the system detects that the voltage in the power source has attained its normal level, then the power-normal signal builds up, and the MCB remote unit 75 starts its operation, thereby establishing the controlling authority and the UI mastering authority and also conducting a test on the high-speed communication network LNET. Also, the power-normal signal is transmitted from the MCB remote unit 75 to the SYS remote 71 by way of the hot line.

After the passage of the prescribed length of time T0 after the MCB remote unit 75 starts its operation, the system reset signal which is fed from the MCB remote unit 75 to the SYS remote unit 71 via the hot line becomes H, with which the resetting of the SYS remote unit 71 is released and the unit starts its operation, at which time the start of the operation by the SYS remote unit 71 is delayed further by 200 μsec after the elapse of the above-mentioned time T0 by the effect of the two signals, 86NMI and 86 reset, which are signals in the inside of the SYS remote unit 71. This duration of time, 200 μsec, is provided in order to store in the nonvolatile memory the data on the state in which the system is operating at the moment when the machine is brought to a halt or runs out of control because of a transient trouble, such as a crash, a momentary failure of the power source, the running of the software out of control, or a bug in the software.

When the SYS remote unit 71 starts its operation, it conducts a core test for a duration of approximately 3.8 seconds, i.e. checks on the ROM and the RAM, and checks on the hardware and so forth. As any entry of undesired data or the like at this time may cause the system to run out of control, the SYS remote unit 71 sets the IPS reset signal and the IIT reset signal at L (Low) under its own supervisory control at the same time as the start of the core test, thereby resetting the IPS remote unit 74 and the IIT remote unit 73 to suspend them from their operation.

When the core test is completed, the SYS remote unit 71 conducts a CCC self-test for a duration ranging from 10 to 3,100 m seconds, also setting the IPS reset signal and the IIT reset signal at H and making the IPS remote unit 74 and the IIT remote unit 73 resume their operation and perform their respective core tests. The remote unit conducts the CCC self-test by transmitting the prescribed data to the LNET and then receiving the data back to itself, and checking whether the data so received ar identical to the data transmitted. Moreover, for the performance of the CCC self-test, a time is allocated to each CCC in such a way that there will not be any overlapping of the periods for the self-tests.

That is to say, the LNET is available by the contention system, by which the individual nodes in the SYS remote unit 71, the MCB remote unit 75, and so forth transmit signals when they desire to and, should there occur any collision of data, transmit the data again after the passage of the prescribed duration of time. Thus, if the SYS remote unit 71 conducts any CCC self-test while any other node is using the LNET, there occurs a collision of data, so that the self-test cannot be conducted. Therefore, when the SYS remote unit 71 begins any CCC self-test, the LNET test by the MCB remote unit 75 is already completed.

When the CCC self-test is completed, the SYS remote unit 71 waits until the IPS remote unit 74 and the IIT remote unit 73 complete their core tests, and then performs a communication test for the SYSTEM node in the duration T1. This communication test is a test on the serial communication network at 9,600 bps, and the transmission and reception of the prescribed data are performed in the prescribed sequence. When the communication test is completed, a communication test is conducted between the SYS remote unit 71 and the MCB remote unit 75 in the duration T2. That is to say, the MCB remote unit 75 demands the SYS remote unit 71 to give it the results of the self test, and the SYS remote unit 71, responding to the demand, issues the results of the tests which it has conducted so far as the Self-Test Results to the MCB remote unit 75.

Upon its reception of the self-test results, the MCB remote unit 75 issues a token pass to the SYS remote unit 71. The token pass is a tablet for transferring the UI mastering authority, and the delivery of the token pass to the SYS remote unit 71 effects the transfer of the UI mastering authority from the MCB remote unit 75 to the SYS remote unit 71. The steps up to this point constitute the power-on sequence. In the duration of the power-on sequence, the UI remote unit 70 indicates a message, such as "Please, wait a while!" and conducts its own various types of tests, such as the core test and a communication test.

During the power-on sequence mentioned above, there may be a failure in responding to the demand for the self-test results or there may occur an abnormal condition in the self-test results, in which case the MCB remote unit 75 renders the machine dead and, putting the UI controlling authority in action, the remote unit controls the UI remote unit 70 and puts on display a message to the effect that an abnormal condition has taken place. This is the machine dead state.

When the power-on state is completed, the system enters next into the initialize state in order to set up the individual remote units. In the initialize state, the SYS remote unit 71 holds the overall controlling authority and the UI mastering authority. Therefore, the SYS remote unit 71 initializes the SYS system and also issues the "INITIALIZE SUBSYSTEM" command to the MCB remote unit 75 to make also the MCB system initialized. The results come transmitted as the Subsystem Status Information from the MCB remote unit 75. With this, the IOT, for example, make preparations for the performance of the copying operations by heating the fuser and by placing the elevator for the tray in its prescribed position. The steps up to this point constitute the initialize state.

When the initialize state is completed, the individual remote units enter into their standby state, in which they are ready for operation. Even in this state, the SYS remote unit 71 still holds the UI mastering authority, and therefore the SYS remote unit 71 puts the F/F on the UI screen on the basis of the UI mastering authority, thereby entering into the state in which it is ready to accept the copy executing conditions. At this time, the MCB remote unit 75 is monitoring the IOT. Moreover, the MCB remote unit 75 issues the background pole once in every 500 m seconds to the SYS remote unit 71, in response to which the SYS remote unit 71 performs the process of returning the self-test results once in every 200 m seconds to the MCB remote unit 75. In case the self-test results are not returned or in case there is any abnormal condition in the contents of the self-test results at this stage, the MCB remote unit 75 gives the UI remote unit 70 a notice to the effect that an abnormal condition has taken place and causes the UI remote unit 70 to display a message to that effect.

When the Auditron is put into operation in the standby state, the system enters into the Auditron state, in which the MCB remote unit 75 performs the Auditron control operation and also controls the UI remote unit 70 to make the unit display a message for the Auditron. When the start key is pushed, with the F/F set, in the standby state, the system enters into the progress state, which is divided further into the six states of setup, cycle up, run, skip pitch, normal cycle down, and cycle down shut down, and these states are explained below with reference to FIG. 8.

Figure 8:
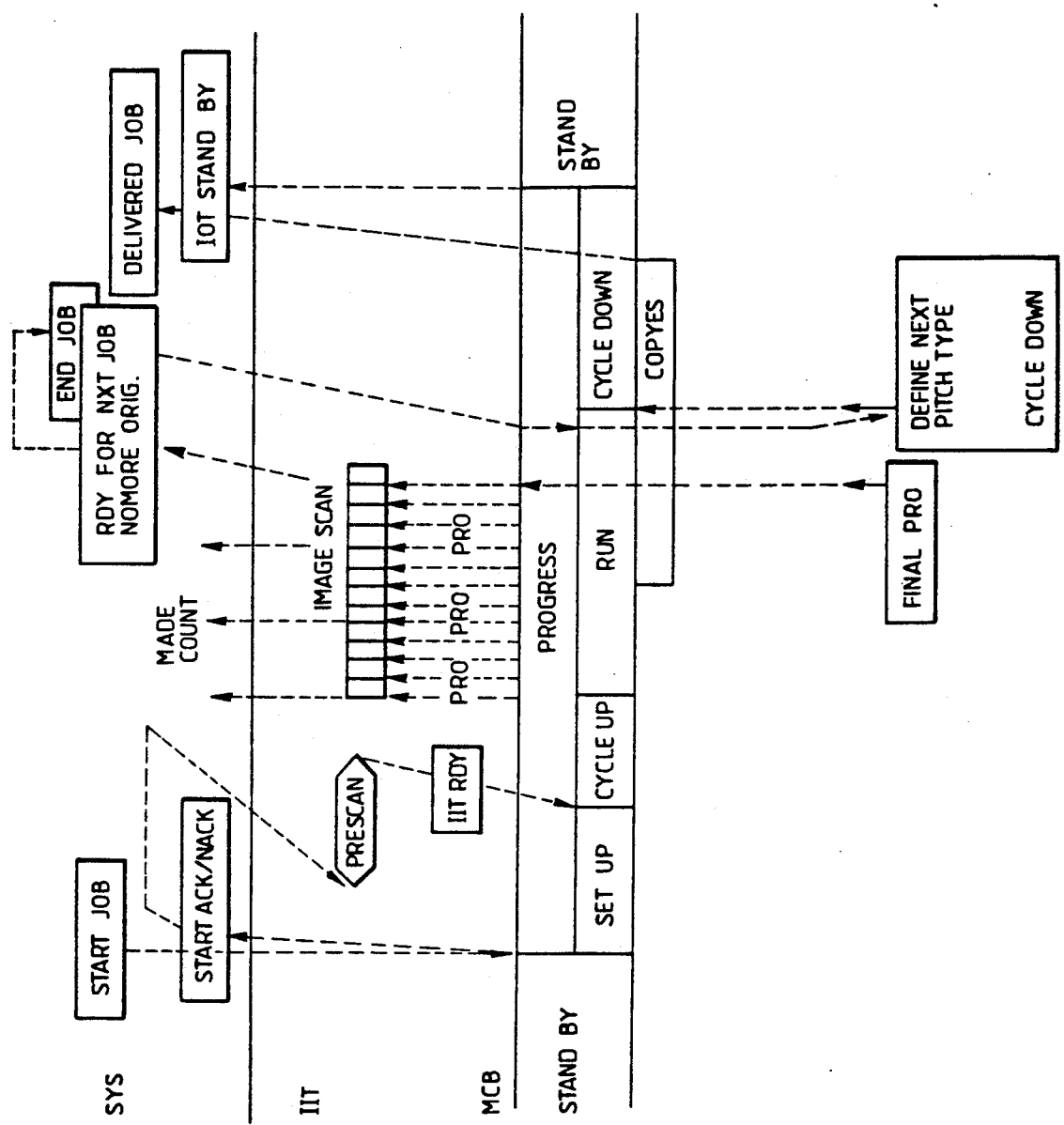
FIG. 8 illustrates the sequence of the progress state.

FIG. 8 presents the timing chart for the number of sheets of copies set at three for full-color copying with four colors in the platen mode.

When the SYS remote unit 71 detects that the start key has been pushed, the remote unit 71 transmits the particulars of the job to the IIT remote unit 73 and the IPS remote unit 74 and also issues the particulars of the job, together with a command called "the Start Job Command" to the copier executive module 87 located in the MCB remote unit 75. This puts the machine into the setup state, and the individual remote units make preliminary preparations for their performance of the jobs assigned to them respectively. For example, the IOT module 90 performs such jobs as the driving of the main motor and a proper adjustment of the parameter for the photosensitive material belt (i.e. the photo receptor belt).

When the SYS remote unit 71 ascertains that the ACK (Acknowledge), which is a response to the Start Job Command, has been sent back, the remote unit 71 makes the IIT remote unit 73 perform the prescanning operations. There are four types of prescanning operations, namely, the prescanning operation for detecting the size of the original sheet, the prescanning operation for detecting the color in the specified position on the original sheet, the prescanning operation for detecting the closed loop in case an outline drawing is to be processed for coloring, and the prescanning operation for the reading of the marker in the marker editing process, and, depending on the selected F/F, the system performs the prescanning operations up to three times in the maximum. While the prescanning operation is being performed, the UI puts on display such a message as "Please wait a moment!".

When the prescanning operation is completed, the system issues the command, "IIT Ready," to the copier executive module 87, and, at this point, the system enters into the "cycle up" state. This "cycle up" state is the one in which the system waits for the elapse of the building up time for the individual remote units, and the MCB remote unit 75 begins the operations of the IOT and the image transfer device, and the SYS remote unit 71 initializes the IPS remote unit 74. At this moment, the UI displays the message that the system is in the progress state, as well as the particulars of the selected job.

When the cycle up state is completed, the system enters into the run, commencing the copying operations, and, at this point, when the first piece of the PRO is issued from the IOT module 90 in the MCB remote unit 75, the IIT remote unit 73 performs the first scanning operation, and the IOT performs the development of the first color, and the processing of one pitch is completed thereupon. When the PRO is issued again at the next step, the system performs the development of the second color and completes the second pitch therewith. This operating process is repeated four times, and, when the processing operations for four pitches are completed, the IOT fixes the toner by means of the fuser, thereafter discharging the paper. With this, the system completes the copying operations for the first copy. With the repetition of the above-mentioned process three times, the machine produces three sheets of copies.

The processing of the pitch layer and the processing of the copy layer are controlled by the MCB remote unit 75, but the processing of the set number of sheets of copies, which is to be performed in the per original layer that represents a layer above those just mentioned, is performed by the SYS remote unit 71. Therefore, the system is so designed that, when the first PRO for each copy is issued, the MCB remote unit 75 issues a made count signal to the SYS remote unit 71 in order to enable the SYS remote unit 71 to recognize what page number of copy is being produced at the particular moment. Moreover, when the last PRO is issued, the MCB remote unit 75 issues the command, "RDY FOR NXT JOB" to the SYS remote unit 71 and demands the next job. At this point in time, the job can be continued if the Start Job command is issued, but, if the user does not set up the next job, the system will put an end to the job, when the SYS remote unit 71 issues the command, "END JOB," TO the MCB remote unit 75.

When the MCB remote unit 75 ascertains the completion of the job with the reception of the "END JOB" common, the machine enters into the normal cycle down state, in which the MCB remote unit 75 stops the operation of the IOT.

In the course of the cycle down state, the MCB remote unit 75 issues the "DELIVERED JOB" Command, when it is ascertained that all the copied sheets of paper have been discharged, to give a notice to that effect to the SYS remote unit 71, and also, when the machine comes to a stop upon the completion of the normal cycle down state, the MCB remote unit 75 gives a notice to that effect to the SYS remote unit 71 by issuing the "IOT STANDBY" Command. With this, the progress state is finished, and the standby state is resumed.

Furthermore, the example given above has not been described in relation to the skip pitch state or the cycle down shut down state, and yet, in the skip pitch state, the SYS remote unit 71 initializes the SYS system in preparation for the next job and the MCB remote unit 75 is in the standby state for the next copying operation. Moreover, since the cycle down shut down state is the state provided for the occurrence of faults, both the SYS remote unit 71 and the MCB remote unit 75 perform the processing of faults in this state.

In the progress state, as mentioned so far, the MCB remote unit 75 performs control over the pitch process and the copy process, and the SYS remote unit 71 controls the per original process and the job programming process. Therefore, the controlling authority for these processes is held by these remote units in accordance with the shares of the processes as assigned to them respectively. In contrast to this setup, the UI mastering authority rests with the SYS remote unit 71. The reason is that it is necessary for the UI to indicate such items as the number of sheets set for copying and the selected editing processes, which belong to the per original process or the job programming process, and, as such, are placed under the control by the SYS remote unit 71.

In the event that any fault occurs in the progress state, the system moves on to the fault recovery state. The term, "fault," is a general designation of such abnormal conditions in the machine as the absence of paper, jamming, and any failure or breakage of any component part, and there are two types of faults, one type consisting of those faults from which recovery can be made by the users by taking such steps as the resetting of the F/F but the other type consisting of those faults from which recovery can be attained only by the serviceman by such measures as the replacement of some component parts. As mentioned above, the displaying of faults is performed basically by the MCB UI module 86, but, since the F/F is controlled by the SYS module 82, the recovery from any of those faults which are correctable by the resetting of the F/F is to be performed by the SYS mode 82 while the recovery from all the other faults is to be made by the Copier Executive Module 87.

Moreover, the detection of faults is performed separately for the SYS system and the MCB system. In other words, the faults in the IIT, the IPS, and the F/P, which are controlled by the SYS remote unit 71, should be detected by the SYS remote unit 71 while the faults in the IOT, the ADF, and the sorter, which are controlled by the MCB remote unit 75, should be detected by the MCB remote unit 75. Accordingly, it can be understood that there are the following four types of faults in this copying machine.

(1) Faults detected by the SYS node and corrected for recovery therefrom by the SYS node For example, a fault occurs when the start key is pushed without the preparation of the F/P therefor, but the user can make recovery therefrom by setting the F/F again.

(2) Faults detected by the SYS node and corrected for recovery therefrom by the MCB node The faults of this type include, for example, a trouble in the registering sensor, an abnormal condition in the speed of the imaging unit, an overrun of the imaging unit, an abnormal condition in the PRO signal, an abnormal condition in the CCC, an abnormal condition in the serial communication network, and an error in checks on the ROM or the RAM, and, in the case of these faults, the UI will display such a message as "Please call the Serviceman!" as well as the particulars of the fault.

(3) Faults detected by the MCB node and corrected for recovery therefrom by the SYS node In case the sorter is specified on the F/F in spite of the fact that the sorter is not installed on the machine, a fault is detected by the MCB node, but a recovery from it can be made by the user by setting the F/F once again to effect a change to the mode in which the sorter is not to be used. The same applies also to the ADF. Also, a fault will occur when the toner has become short, when the tray is not set, or when the paper is not available. These faults are to be corrected essentially by the user by replenishing the toner, or by setting the tray, or by replenishing the paper, as appropriate, but, when the fault is due to the tray running out of paper, another tray may be used to make recovery from the fault, and, in case the toner in a given color has run short, it is possible to make recovery from the fault by specifying another color. That is to say, such faults can be corrected for recovery from them also by selections made on the F/F. Thus, the system is so designed as to perform the recovering operation with the SYS node.

(4) Faults detected by the MCB node and correctable for recovery therefrom by the MCB node For example, in case the developing device has a fault in operation, or the toner distribution is in an abnormal condition, or in case the motor clutch has a failure, or in case the fuser has a trouble, the MCB node detects any of these faults, and a message like "Please call the Serviceman!," as well as the location where the fault is present, is indicated on the U/I. Also, in case any jamming has occurred, the system indicates the location of the jamming, as well as the method of clearing the jamming, entrusting the user with the recovering job.

As described so far, the controlling authority, and the UI mastering authority is vested either in the SYS node or in the MCB node in the fault recovery state, depending on the location where a fault has occurred and the method of making recovery from it.

When the fault is corrected for recovery therefrom and the IOT standby command is issued from the MCB node, then the system moves on to the job recovery state and finishes the remaining job. For example, if it is assumed here that jamming has taken place while the machine is processing the second copy, with the number of copies set at three, the SYS node and the MCB node attain the recovery of the job by performing the processes which they respectively control since it is necessary for the machine to produce the remaining two copies after the jamming is cleared. Therefore, also in the recovery of the job, the controlling authority is held by both of the SYS node and the MCB node in accordance with their respective shares of the processes. However, the UI mastering authority is held by the SYS node. The reason is that it is necessary for making the job recovery to indicate such messages for the job recovery, for example, as "Please push the start key!" and "Set the remaining original sheet!" and that this function is an item regarding the per original process or the job programming process, which the SYS node controls.

Moreover, in case an IOT standby command is issued in the progress state, the system moves on to the standby state, waiting ready for the next job, when it is ascertained that the system has moved to the job recovery state and has completed the job. In the standby state, it is possible to enter the diagnostic state (which is hereinafter referred to simply as the DIAG) by performing the prescribed key operation.

Figure 9:
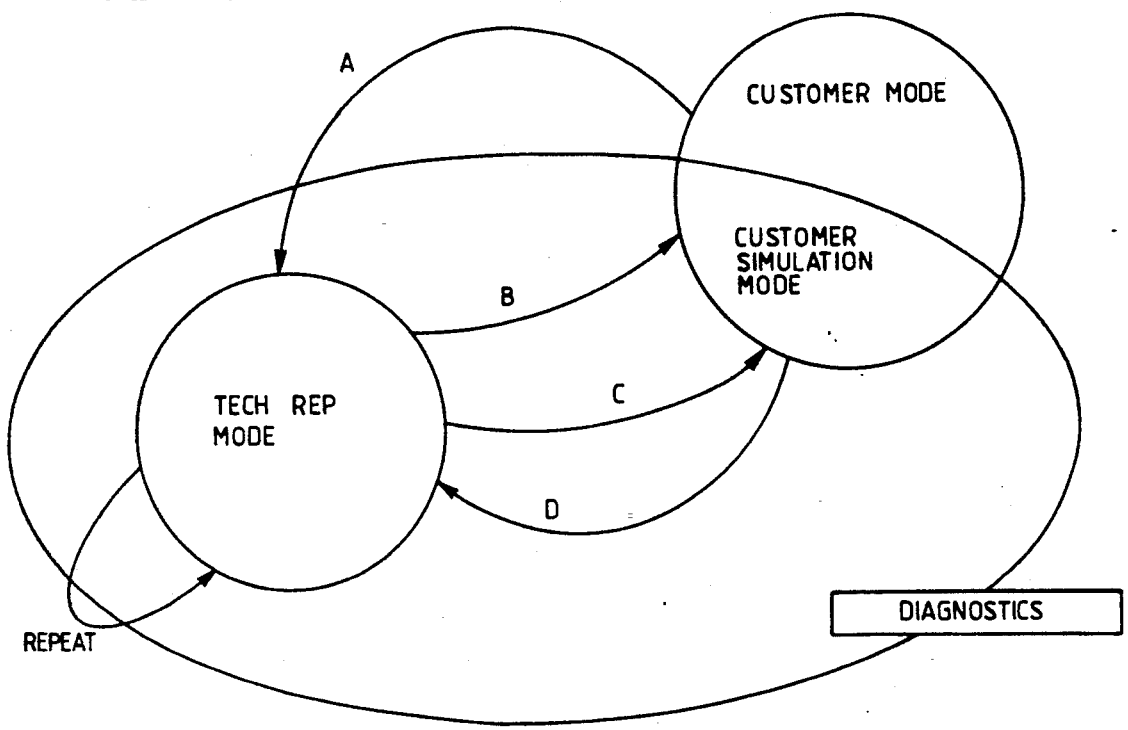
FIG. 9 explains the concept of the diagnostic process.

The DIAG. state is the state for performing self-diagnosis, which is applied to such jobs as the checks on the input into the component parts, the checks on the output, the setting of the various kinds of parameters, the setting of the various kinds of modes, and the initialization of the NVM (Non-volatile memory), and the concept of this state is illustrated in Fig. 9. As it is clearly seen in the Figure, the DIAG. state is provided with two modes, i.e. the TECH REP mode and the Customer Simulation mode.

The TECH REP mode is the mode which the Serviceman uses in performing diagnosis on the machine with respect to the checks on the input and those on the output, and the Customer Simulation mode is the mode for use in the diagnosis the customer mode which the user ordinarily uses in performing the copying job.

Now, assume that entry has been made by the prescribed operating procedure into the TECH REP mode by the route A shown in the Figure from the standby route in the customer mode. The TECH REP mode can be finished after simply having done the setting of the various kinds of checks and the setting of the parameters in this mode, and, to return to the customer mode (by the route B in the Figure), it is possible to move into the power-on state as shown in FIG. 6, by performing the prescribed key operation, and then return to the standby state by following the sequence indicated in FIG. 7. However, now that this copying machine performs color copying and that it is also provided with a variety of editing functions, it is necessary to ascertain through the actual copying performance, after the setting of the various parameters is completed in the TECH REP mode, whether or not the copying machine can really reproduce the colors as required by the users and whether or not the machine can perform editing functions as specified. It is the Customer Simulation mode that performs this task, and this mode is different from the customer mode in the point that this simulation mode does not execute any billing job and that this mode displays a message to the effect that the machine is being operated in the DIAG. state. This is the meaning of the Customer Simulation mode, in which the customer mode is used in the DIAG. state. In this regard, the shift from the TECH REP mode to the Customer Simulation mode (by the route C in the Figure) and the shift in the opposite direction from the Customer Simulation mode to the TECH REP mode (by the route D shown in the Figure) can be made respectively by the prescribed operating procedure. Moreover, as the TECH REP mode is performed by the DIAG. executive module 88 (FIG. 4), the MCB node holds both of the overall controlling authority and the UI mastering authority, but, with regard to the Customer Simulation mode, the SYS node has both of the overall controlling authority and the UI mastering authority because the machine performs its ordinary copying operations in this mode under the control of the SYS DIAG. module 83 (FIG. 4).

(II) SYSTEM DETAILS

(II-1) General

Figure 10:
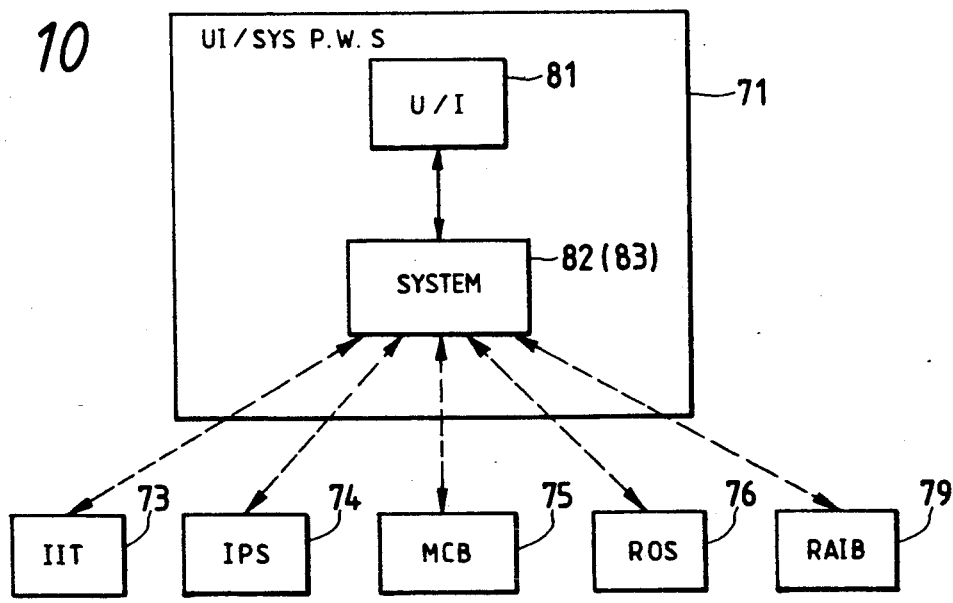
FIG. 10 illustrates the relationship between the system and the other remote units.

FIG. 10 is a chart illustrating the relationship between this system and the other remote units.

As mentioned earlier, the remote unit 71 is mounted with the SYS UI module 81 and the SYSTEM module 82, and, between the SYS UI module 81 and the SYSTEM module 82, data are exchanged via the intermodular interface, and a serial communication interface is provided to connect the SYSTEM module 82 and the IPS 73 and IPS 74 while the LNET high transmission rate communication network is provided to connect the MCB 75, the ROS 76, and the RAIB 76.

Next, a description is given with respect to the configuration of the modules in the system.

Figure 11:
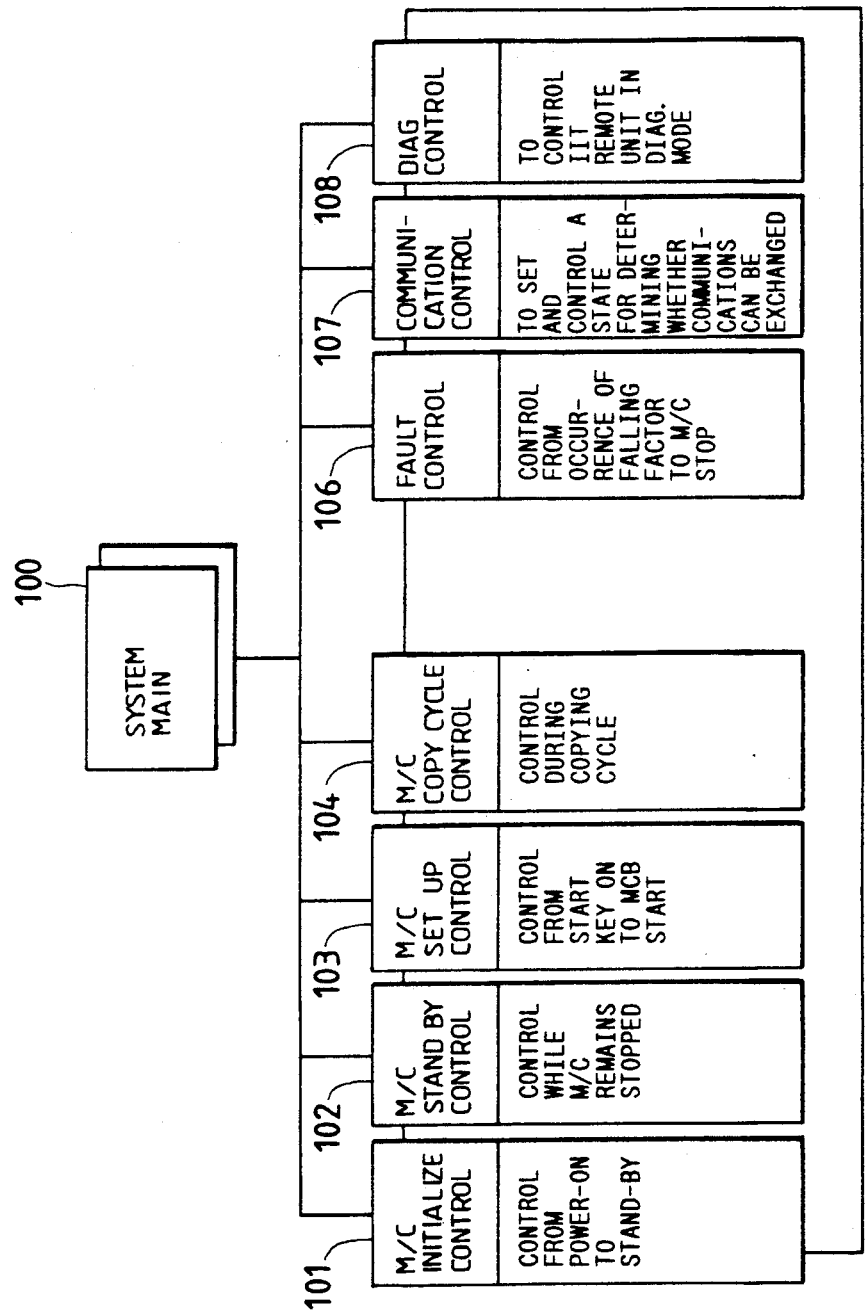
FIG. 11 illustrates the construction of the modules in the system.

FIG. 11 is a chart illustrating the configuration of the modules for the system.

For this copying machine, the individual modules for IIT, IPS, IOT, and so forth are conceived as though they were component parts, and the individual modules for the systems which perform control over these are conceived as though they had brains. And, with the adoption of the separate CPU system, the system takes charge of the per-original processing operation and the job-programming process, and, since the system has the control rights to the control over the initialize state, the stand-by state, the setup state, and the cycle state and also the UI master rights to the use of the UI in these states in correspondence to this set-up, the system has been constructed with such modules as are proper for its performance of these operations.

The System Main 100 takes into the internal buffer the data obtained through its reception from the SYS UI, the MCB, etc., and clears the data stored in the internal buffer, calls each of the modules in subordinate ranking to the System Main 100 and delivers the processes to it, and performs the process for the renewal of the system state.

The M/C initialize control module 101 performs control over the initializing sequence to continue from the time the power is turned on to the time when the system attains the stand-by state, and this module is started upon the completion of the power-on process for performing various types of tests subsequent to the power-on operation by the MCB.

The M/C setup control module 103 performs control over the setup sequence which continues from the time when the start key is pushed to the time when the MCB for performing the processing of the copy layer is started, the specific operation of this module consisting in the formation of a job mode on the basis of the FEATURE (i.e. the item of instructions to the M/C for fulfilling the user's requirements) as instructed from the SYS UI and then determining the setup sequence in accordance with the job mode so formed.

Figure 12A:
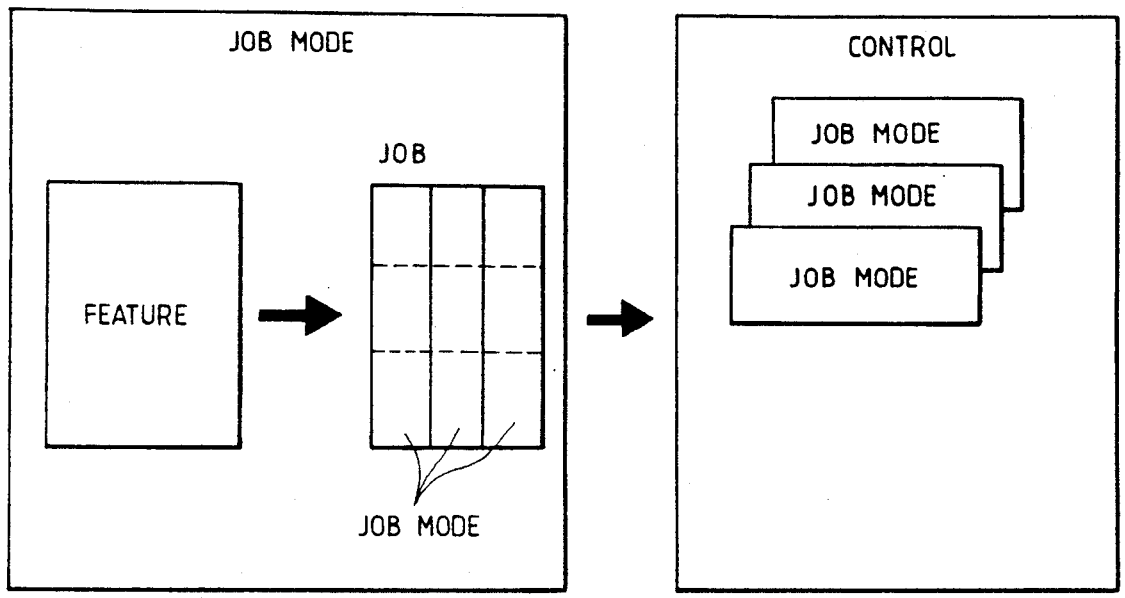
FIGS. 12(a) through 12(c) illustrate the creation of a job mode.
Figure 12B:
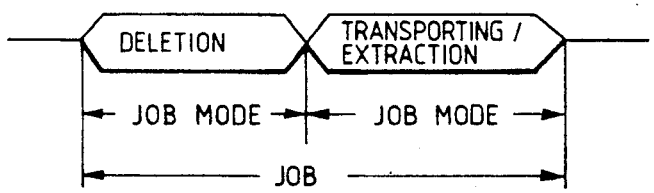
Figure 12C:
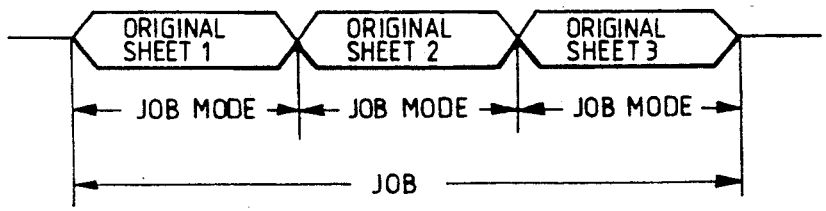

As shown in FIG. 12(a), the formation of the job mode is accomplished by analyzing the mode instructed by the F/F and dividing the job into its sections. In this case, the job represents the actions of the M/C from the time when the M/C is started by the user's demand to the time when the all the copies as required are discharged and the operation of the machine is brought to a halt, and thus a job is a collective body of the job modes, which represents the minimal units into which the job can be divided in relationship to the user's demand. For example, this can be explained with reference to the case of a synthesis with an image set into the base picture or text. As shown in FIG. 12(b), the job modes consist of a cut, a transfer, and an extraction, and the job is a collective body composed of these. Moreover, in the instance of the three ADF original sheets as shown in FIG. 12(c), the job modes are the feeding processes for the original sheet 1, the original sheet 2, and the original sheet 3, and the job is a collective body of all these.

And, the module performs document scanning in the case of the automatic mode, press scanning in the case of the mode for outline drawing for coloring, sample scanning in the case of the color detecting mode (the press scanning operation being performed three times in the maximum) and also distributes the copy mode necessary for the copy cycle to the IIT, the IPS, and the MCB, and then starts up the MCB at the time when the setup sequence is brought to a finish.

The M/C stand-by control module 102 controls the sequence in the course of the M/C stand-by and, in specific terms, it performs the reception of the start key, the control of the color registration, the entry into the DIAG. mode, and so forth.

The M/C copy cycle control module 104 performs the control of the copying sequence from the start of the MCB to the halt thereof, and, in specific terms, the module performs the notification of the paper feed count, the demand for the start-up of the IIT based on its identification of the completion of a job, and the demand of a falling operation of the IPS on the basis of its identification of the stopping of the MCB.

Moreover, this M/C copy cycle control module performs the function of notifying the correspondent remote unit about the through command which is generated while the M/C is being stopped or in the course of its operation.

The fall control module 106 performs the monitoring of the falling factors from the IIT and the IPS, and, when any such factor occurs, the module demand the MCB to perform the falling operation, and, in specific terms, this module performs the falling operations in response to a fail command from the IIT and the IPS, and also performs the recovering operation, for example, under a jam command from the MCB, judging and determining the recovery to be made at the time of a halt of the M/C after the occurrence of a demand for a fall from the MCB.

The communication control module 107 performs the setting of the IIT ready signal to be generated from the IIT and the setting of the ENABLE/DISABLE for the communication in the image area.

The DIAG control module 108 performs control in the input check mode and output check mode in the course of the DIAG mode.

Next, a description is made of the exchanges of data among these individual modules or with another subsystem.

Figure 13:
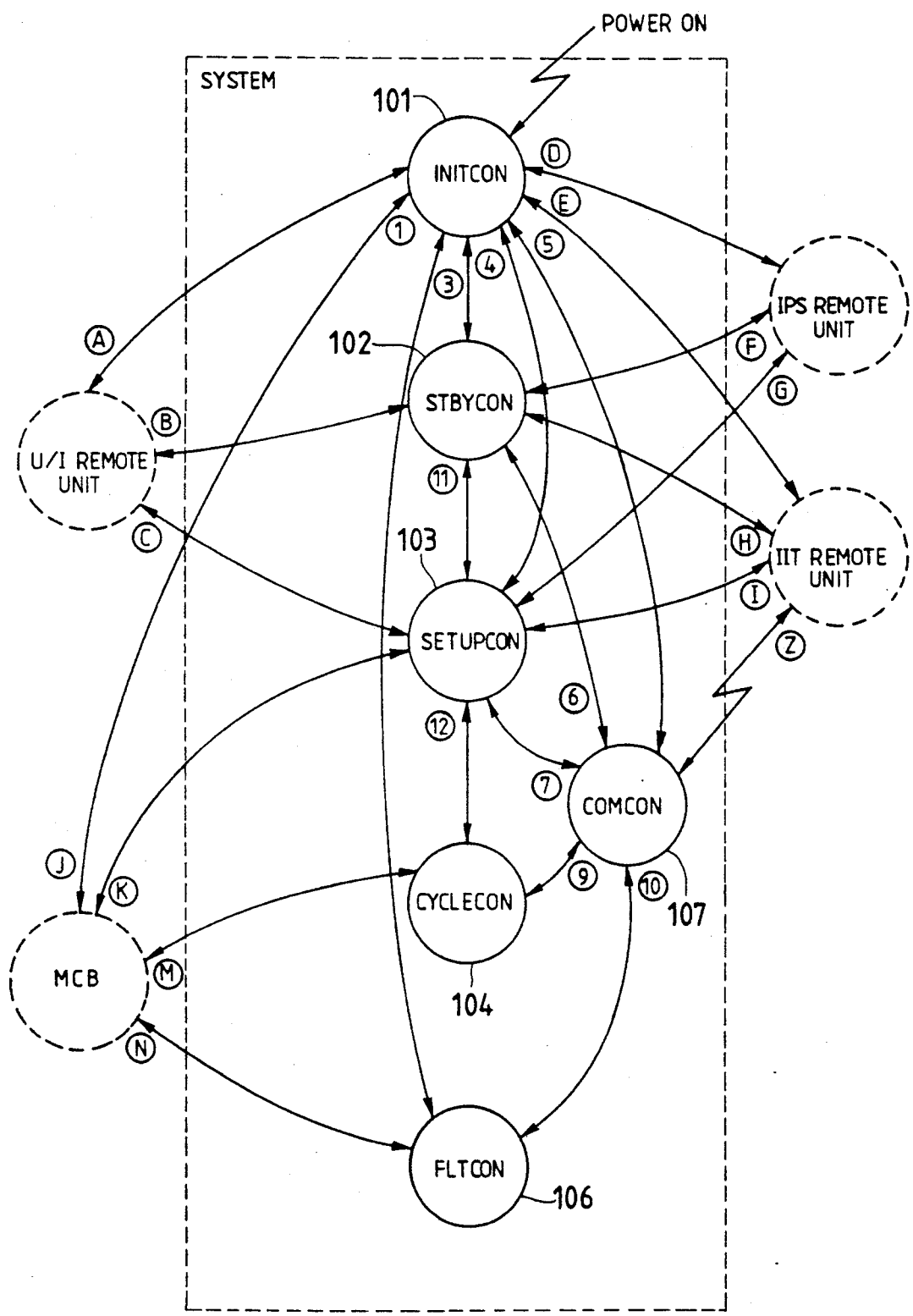
FIG. 13 illustrates the data flow between the system and each of the individual remote units as well as the data flow among the modules within the system.

FIG. 13 is a chart illustrating the flow of data among the individual remote units and the flow of data among the modules in the system. The marks from A to N represent the flows of serial communications, the mark Z represents the hot line, and the marks from (1) to (12) represent the data exchanged among the modules.

Between the SYS UI remote unit and the initialize control section 101, the SYS UI unit transmits the TOKEN command, which hands the rights to the control of the CRT over to the SYSTEM NODE, while the initialize control section 101 transmits the "config" command to the SYS UI unit.

Between the SYS UI remote unit and the stand-by control section 102, the SYS UI remote unit transmits the mode change command, the start copy command, the job cancel command, the color registration request command, and the tray command to the stand-by control section 102, which in its turn transmits the M/C status command, the tray status command, the toner status command, the recovery bottle status command, the color registration ANS command, and the TOKEN command to the SYS UI remote unit.

Between the SYS UI remote unit and the setup control section 103, the setup control section 103 transmits the M/C status command (progress) and the APMS status command to the former, which in its turn transmits the stop request command and the interrupt command to the latter 103.

Between the IPS remote unit and the initialize control section 101, the former transmits the initialize end command to the latter 101, which in its turn transmits the NVM parameter command to the former.

Between the IIT remote unit and the initialize control section 101, the former transmits the IIT ready command to the latter 101B, which in its turn transmits the NVM parameter command and the INITIALIZE command to the former.

Between the IPS remote unit and the stand-by control section 102, the former transmits the initialize free hand area command, the answer command, the remove area answer command, and the color information command to the latter 102, which in its turn transmits the color detection point command, the initialize free hand area command to the former.

Between the IPS remote unit and the setup control section 103, the former transmits the IPS ready command and the document information command to the latter 103, which in its turn transmits the scanning information command, the basic copy mode command, the editing mode command, and the M/C stop command to the former.

Between the IIT remote unit and the stand-by control section 102, the former transmits the IIT ready command, which conveys a notice of the completion of the press scanning process, to the latter 102, which in its turn transmits the sample scanning start command and the initialize command to the former.

Between the IIT remote unit and the setup control section 103, the former transmits the IIT ready command and the initialize end command to the latter 103, which in its turn transmits the document scanning start command, the sample scanning start command, and the copy scanning start command to the latter.

Between the MCB remote unit and the stand-by control section 102, the latter 102 transmits the initialize sub-system command and the stand-by selection command to the former, which in its turn transmits the sub-system status command to the latter.

Between the MCB remote unit and the setup control section 103, the latter 103 transmits the start job command, the IIT ready command, the stop job command, and the declare system fault command to the former, which in its turn transmits the IOT stand-by command and the declare MCB fault command to the latter 103.

Between the MCB remote unit and the cycle control section 104, the latter 104 transmits the stop job command to the former, which in its turn transmits the MADE command, the ready-for-next-job command, the job delivered command, and the IOT stand-by command to the former.

Between the MCB remote unit and the fault control section 106, the latter 106 transmits the declare system fault command and the system shutdown completion command to the MCB remote unit, which in its turn transmits the declare MCB fault command and the system shutdown command to the latter 106.

Between the IIT remote unit and the communication control section 107, the former transmits the scan ready signal and image area signal.

Next, a description is made of the interfaces among the individual modules.

The System Main 100 transmits the signal reception remote unit numbers and the data for reception to the individual modules (101 through 107), and these individual modules perform the transmission and reception of data with their respective remote units. On the other hand, nothing is transmitted from the individual modules (101 through 107) to the System Main 100.

The initialize control section 101 gives a notice of the system state (stand-by), upon the completion of the initializing process, to the fault control section 106 and the stand-by control section 102, respectively.

The communication control section 107 gives information on the possibility or impossibility of communications to the initialize control section 101, the stand-by control section 102, the setup control section 103, the copy cycle control section 104, and the fault control section 106, respectively. The stand-by control section 102 gives a notice of the system state (progress) to the setup control section 103 when the start key is pushed.

The setup control section 103 gives a notice of the system state (cycle) to the copy cycle control section 104 when the setup is completed.

(II-2) Image Processing System (IPS)

(A) Module Construction of IPS

Figure 14:
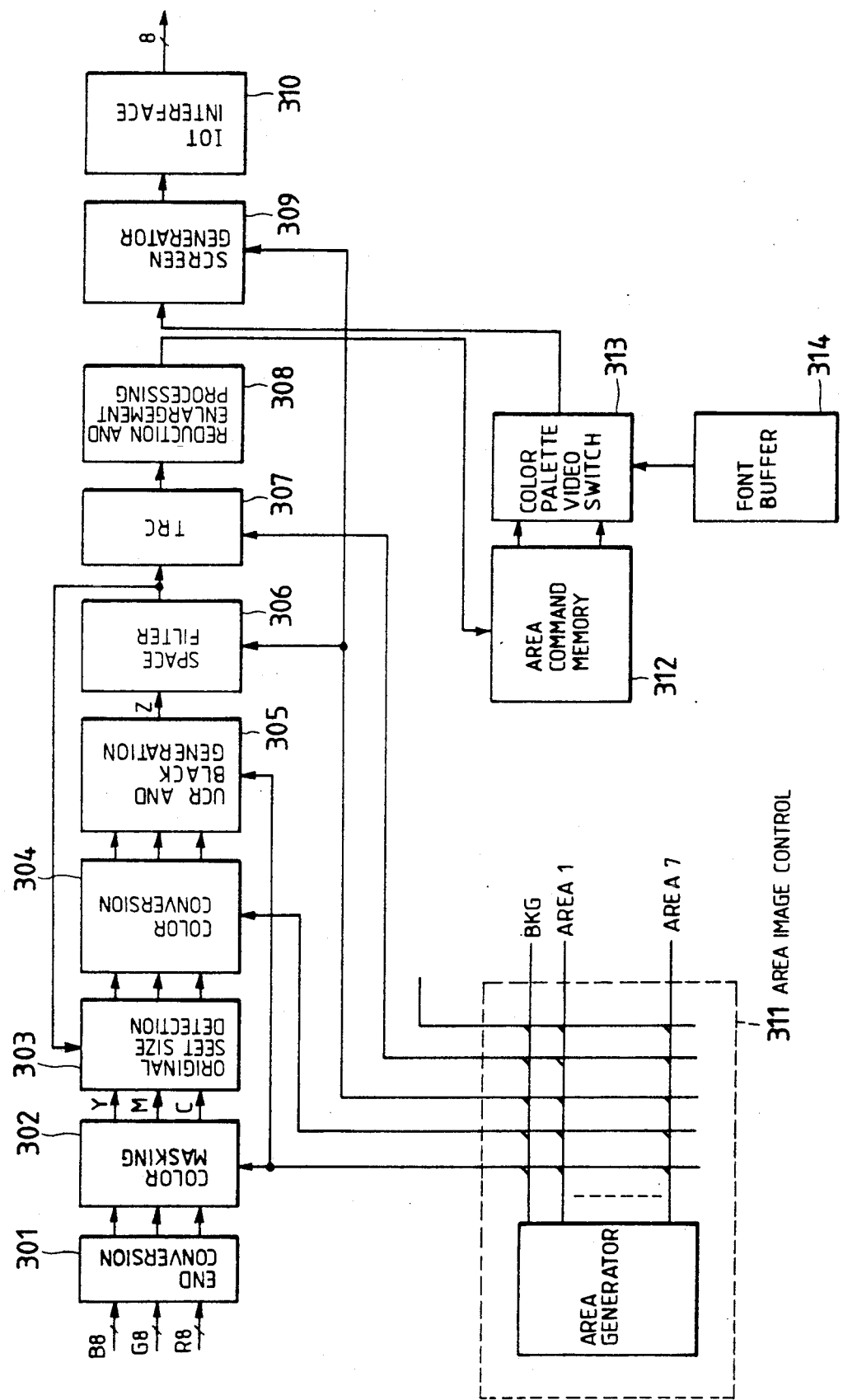
FIG. 14 illustrates the outline of the modules of the IPS.

FIG. 14 is a chart illustrating an outline of the module construction of the IPS.

In a color image forming equipment, an original sheet in color is read with the decomposition of the colors into the primary colors, i.e. B (blue), G (green), and R (red) by means of the CCD line sensors, and the data on the original sheet are further converted into the primary colors of the toners, namely, Y (yellow), M (magenta), C (Cyan), and, additionally, K (black), and a color picture image is reproduced with the exposure process, as well as development, with a laser beam equipment in the IOT (Image Output Terminal). In this case, with the image being decomposed into the toner images for Y, M, C, and K respectively, the copying process (pitch) with Y as the process color is performed once, and, in the same way, a copying cycle is performed one time each with M, C, and K taken as the process color, so that all the copying cycles so executed for a color image add up to a total of four times, and a color image is reproduced in full color with the overlapping effect of the images formed in the mesh dots obtained by these cyles. Accordingly, in the process of converting the color decomposition signals (i.e. B, G, and R signals) into the toner signals (i.e. Y, M, C, and K signals), there arise such questions as how to control the balance of the colors expressed in such signals, how to reproduce those colors in manners suitable for the reading characteristics of the IIT and the output characteristics of the IOT, how to make adjustments of the density and contrast of the image, and how to control the emphasis of the edges and the moire.

The IPS receives into it the input of the B, G, and R color decomposition signals from the IIT, performs various data-processing jobs for improving the reproducing characteristics, such as the color-reproducing features, the reproducing fidelity of colors in terms of chromatic gradation, and the reproducing capabilities of fine details, and then converts the toner signals for the developing process colors into ON/OFF signals, feeding the output of the signals to the IOT. And, as illustrated in FIG. 14, this system is composed of an END conversion (Equivalent Neutral Density Conversion) module 301, a color masking module 302, an original sheet size detecting module 303, a color conversion module 304, a UCR (Under Color Removal) and black-generating module 305, a space filter 306, a TRC (Tone Reproduction Control) module 307, a reduction and enlargement module 308, a screen generator 309, an IOT interface module 310, an area image control module 311 provided with an area-forming circuit and a switch matrix, an editing control module provided with the area command memory 312, a color palette video switch circuit 313, a font buffer 314, etc.

Then, eight-bit data (in 256 chromatic shades) are input from the IIT with respect to each of the B, G, and R color decomposition signals into the END conversion module 301, where they are converted into the toner signals for Y, M, C, and K. Thereafter, the system selects the toner signal X for the process color, converts this into a binary signal and then applies it as the ON/-OFF data for the toner signals of the process color, outputting the data from the IOT interface module 310 to the IOT. Therefore, in the case of the full-color copying operations, the IPS initially performs the pre-scanning process in which it performs the detection of the information on the size of the original sheet, the detection of the editing area, and the detection of other items of information on the original sheet, and thereafter this system first performs, for example, the copying cycle in which the toner signal X for the process color is applied to Y, and then the copying process in which the toner signal X for the process color is applied to M, and, each time such a copying cycle is carried out one after another in regular sequence, this system performs the processing of the signals corresponding to the scanning operations conducted four times for reading the original sheet.

The IIT reads one pixel in the size of 16 dots/mm with respect to each of B, G, and R, using the CCD sensors, and it outputs the data in 24 bits (three colors×8 bits; 256 chromatic shades). The CCD sensors are provided with filters for B, G, and R on their upper surface areas, and each of the sensors has a length of 300 mm with the density of 16 dots/mm, and they perform their scanning operation at the rate of 16 lines/mm at the process speed of 190.5 mm/sec. Therefore, the sensors read the original sheet at the speed of 15M pixels per second in respect of each color, thereafter outputting the resultant data. And, the IIT converts the information on the reflexive ratio to the information on density through logarithmic conversion of the analog data on the picture elements for B, G, and R, and then it further converts the data into digital data.

Next, a description is made of the individual modules.

FIGS. 15(a–q) are charts illustrating the individual modules of which the IPS is composed.

(a) END conversion module

The END conversion module 301 is the module for adjusting (i.e. converting) the signals obtained by optically reading the color original sheet by the IIT to obtain the gray-balanced color signals. The toner for the color image attains the equivalent amount in the case the color signal represents gray, and thus gray serves as the standard. However, the values of the B, G, and R color decomposition signals input from the IIT in reading an original sheet in gray color are not made equal because the light source and the spectroscopic characteristics, etc. of the color decomposing filters are not ideal. Therefore, the END conversion process is performed by the use of a conversion table (LUT: Look Up Table) like the one shown in FIG. 15(a) in order to balance the signals. Accordingly, the conversion table is one which has the characteristic features adapted for yielding the output of the signals, when the system reads the original sheet in gray color, as converted into the B, G, and R color decomposition signals always in their equivalent shades in correspondence to their levels (black→white), and, as such, the table is dependent upon the characteristics of the IIT. Moreover, the conversion table is prepared in a set of 16 tables in total, and, of these, eleven tables are those to be applied to the film projectors, including negative films, while three of them are tables to be used for ordinary copies, for photographs, and for generation copies.

(b) Color masking module

The color masking module 302 is one which converts the B, G, and R signals into the signals corresponding to the quantities of the toners for Y, M, and C by performing matrix operations thereof, and this module processes the signals after the gray balance adjustment is made of them in the END conversion process.

For the conversion matrices used for the color masking are employed three-by-three matrices which determine Y, M, and C, respectively, from B, G, and R purely by arithmetic operations. Yet, in order to take account not only of B, G, and R, but also of the effect of such components as BG, GR, RB, B2, G2, and R2, it is, of course, acceptable to employ various matrices or other matrices. As regards the conversion matrices, this system is provided with those for the usual color control and those for generating the intensity signals in the monochromatic mode.

In this manner, this system performs the gray-balance adjustment first of all in the processing of the video signals from the IIT by means of the IPS. If this process were to be performed after the color masking process, then it would be necessary to make adjustments of the gray balance with a gray original sheet which reflects considerations given to the characteristics of the color masking. Hence, the conversion tables to be used in such a case would be more complicated.

(c) Original sheet size detecting module

Figure 15A:
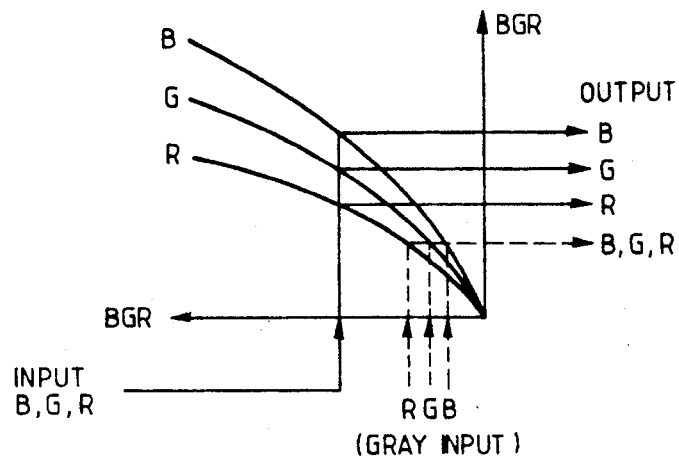
FIGS. 15(a) through 15(q) explain the individual modules of which the IPS is composed.
Figure 15B:
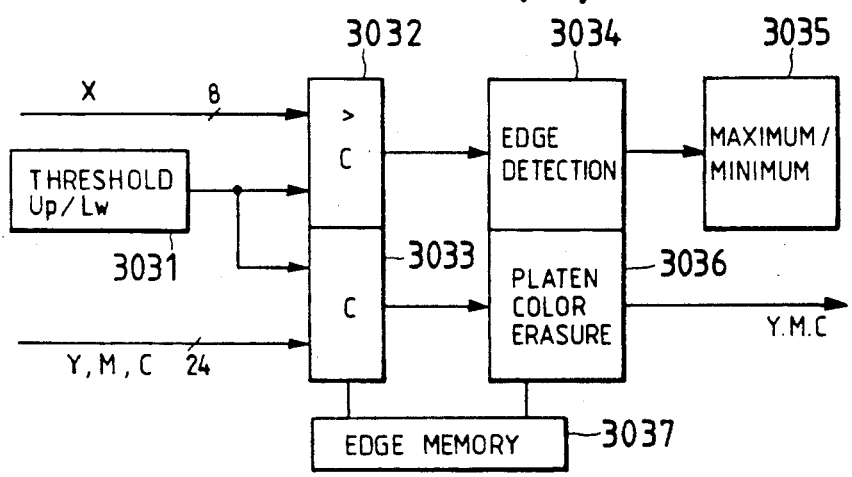

Not only the original sheets in the regular sizes, but also originals in arbitrarily chosen shapes, with patches of paper pasted thereon or otherwise, may be copied from time to time. In such a case, it is necessary to detect the size of the original sheet in order that the copying machine may select an adequate size of paper matching the size of the original sheet. Moreover, when the copying paper is larger than the size of the original sheet, the erasure of the outer areas will produce copies with an improved appearance in finish. For this reason, the original sheet size detecting module 303 performs the detection of the original sheet size at the time of the pre-scanning operation and also the erasure of the platen color (the erasure of the frame) at the time of the scanning operation for reading the original sheet. Therefore, the color of the platen should be a color (for example, black) which is easily distinguishable from that of the original sheet, and, as illustrated in FIG. 15(b), the upper limit value and the lower limit value for the recognition of the platen color are to be set in the threshold register 3031. And, in the course of pre-scanning, this system compares by means of the comparator 3032 the signals X as converted into information close to the reflexive ratio of the original sheet (F conversion) (for which the output from the space filter 306 described later is used) with the upper limit value and the lower limit value which are set in the threshold register 3031 and then detects the edge of the original sheet, then storing the maximum value and the minimum value of the coordinates (x, y) in the maximum/minimum sorter 3035.

Figure 15C:
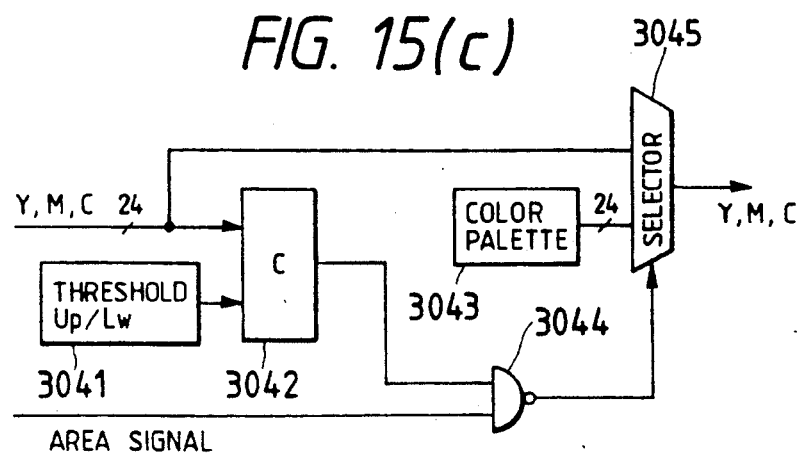
Figure 15D:
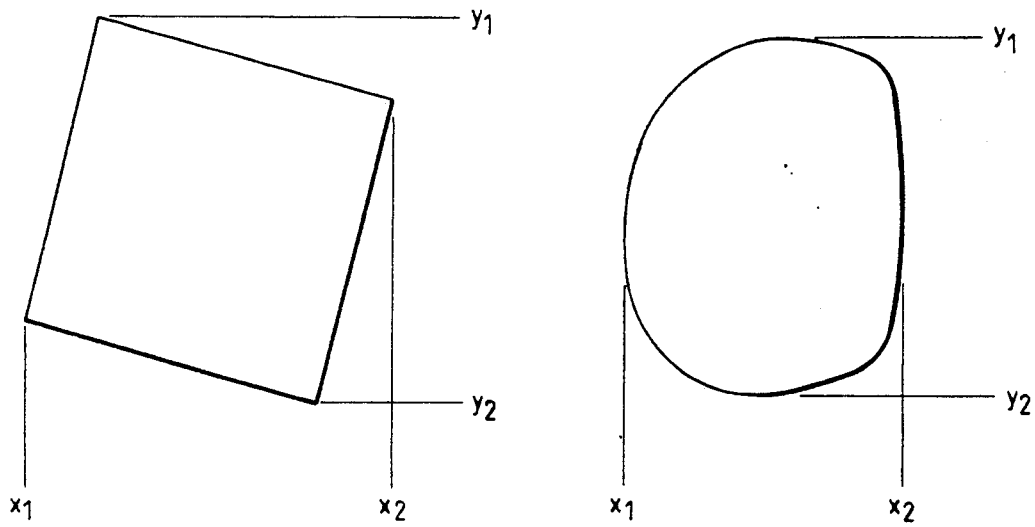

For example, as shown in FIG. 15(d), the maximum values and the minimum values (x1, x2, and y1, y2) for the top, the bottom, the left, and the right of the original sheet are detected and stored in memory in case the original sheet is aslant or not in a rectangular shape. Moreover, in the course of the scanning operation for reading the original sheet, the system compares, by means of the comparator 3033, the Y, M, and C of the original sheet, with the upper limit value/the lower limit value set in the threshold register 3031, and then performs the frame-erasing process by erasing the signals on the outer sides of the edges, i.e. the signals read of the platen, in the platen color erasing circuit 3036.

(d) Color conversion module

The color conversion module 305 is the module which makes it possible to convert the specified color in a specific area, and this module is provided with a window comparator 3052, a threshold register 3051, a color palette 3053, and so forth as illustrated in FIG. 15(c). For performing the color conversion process, this system sets the upper limit values/the lower limit values for the converted colors, Y, M, and C, respectively, in the threshold register 3051 and then sets in the color palette 3052 the values of the Y, M, and C for the colors into which the source colors are to be converted. And, the system controls the NAND gate 3054 in accordance with the area signals input from the area image control module, and, in case the area is not a color conversion area, the system sends out the Y, M, and C of the original sheet as they are from the selector 3055, but, if the system comes across with a color conversion area, it sends out the Y, M, and C signals set for the object conversion colors in the color palette 3053, effecting the switching of the selector 3052 with the output from the window comparator 3052 when the signals on the Y, M, and C of the original sheet comes between the upper limit value and the lower limit value of the Y, M, and C as set in the threshold register 3051.

As for the specified colors, the system recognizes the specified colors by working out the average values of the 25 picture elements for B, G, and R respectively in the neighborhood of the coordinates as specified at the time of pre-scanning, with the digitizer being used to point the area on the original sheet. Owing to this averaging operation, it is possible to recognize, for example, even the 150-line original sheet with a degree of accuracy within five in chromatic difference. For the reading of the data on the density of B, G, and R, the system reads out the specified coordinates, by converting them into the addresses, from the IIT shading correction RAM, and, for the conversion into the addresses, it is necessary to make readjustments of the portions of data adjusted in registration, in the same way as in the case of the detection of the original sheet size. In the pre-scanning process, the IIT operates in the sample scanning mode. The B, G, and R density data which are read out of the shading correction RAM are corrected by the software and then averaged and thereafter processed further for their END correction, and, after the color masking process is executed thereon, the resultant data are set in the window comparator 3052.

As for the registered colors, eight colors in the maximum can be registered on the color palette 3053 at the same time out of a total of 16,700 thousand colors, and the standard colors made available are 14 colors, which are Y, M, C, G, and B, the colors intermediate between these, and K and W.

(e) UCR and black-generating module

In case the Y, M, and C colors are in equivalent amounts, they will together form a gray color. Therefore, from a theoretical standpoint, it is possible to reproduce the same colors by replacing the Y, M, and C in equivalent amounts with black. From a practical standpoint, however, their replacement with black would cause turbidity in the colors, with the result that the reproduction effect of the colors is deteriorated. Therefore, the UCR and black-generating module perform the processes for generating an adequate amount of K, in such a way that turbidity will not occur in the color, and also for reducing the equivalent amounts of Y, M, and C in proportion to the amount of K so generated (the removal of the undercolors). In specific terms, the system detects the maximum values and the minimum values of Y, M, and C, and, in proportion to the differences between them, the system generates K in an amount equal to or less than the minimum values with reference to the conversion tables and performs the removal of the undercolors to certain degrees with respect to Y, M, and C in proportion to the amount of K so generated.

Figure 15E:
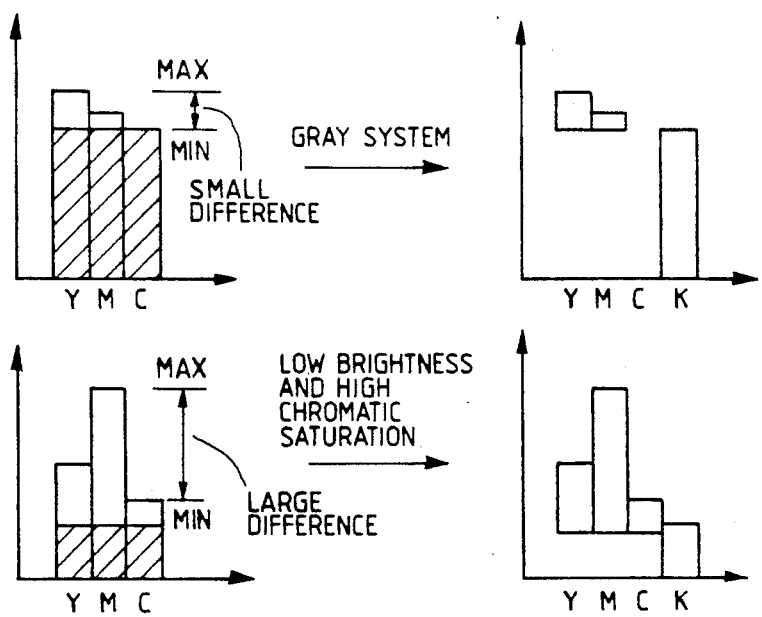

In the UCR and the generation of black, a color close to gray, for example, has a small difference between the maximum value and the minimum value, as shown in FIG. 15(e), and consequently K is generated by removing the amounts equivalent to the minimum values of Y, M, and C as they are. However, in case there is a considerable difference between the maximum value and the minimum value, the admixture of black and a decline in the chromatic saturation of those colors with low luminosity and high chromatic saturation are prevented by making the amounts of the removed color smaller than the minimum values for Y, M, and C and also by reducing the generated amount of K.

Figure 15F:
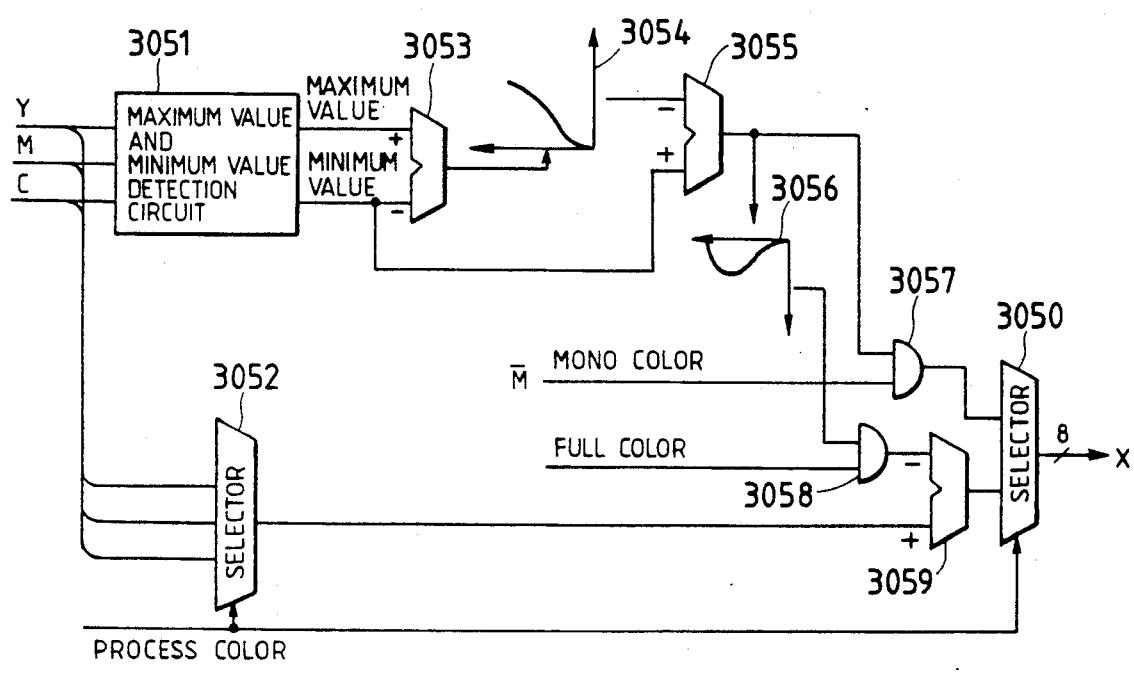

In FIG. 15(f), where examples of specific circuit constructions are presented, the system detects the maximum values and the minimum values of Y, M, and C by means of the maximum value/minimum value detecting circuit 3051 and works out the difference between them with the arithmetic operation circuit 3053, and generates K with the conversion table 3054 and the arithmetic operation circuit 3055. The conversion table 3054 makes adjustments of the value of K, and, when the difference between the minimum value and the maximum value is small, the value of the output from the conversion table 3054 turns out to be zero. Consequently, the minimum value is output, as it is, as the value of K from the arithmetic operation circuit 3055, but, when the difference between the maximum value and the minimum value is large, the value of the output from the conversion table 3054 will not be zero, and, therefore, the system outputs as the K value the value obtained by deducting the amount of the difference from the minimum value with the arithmetic operation circuit 3055. The conversion table 3056 is the table with which the system finds the values to be subtracted from the Y, M, and C in correspondence to the K, and the system performs the removal of the values from Y, M, and C in correspondence to K with the arithmetic operation circuit 3059 by way of the conversion table 3056. Moreover, the AND gates 3057 and 3058 are those for applying the gate process to the K-signal and the signals obtained after the removal of the undercolors of Y, M, and C, performing the process in accordance with the individual signals in the monochromatic mode and in the full-color mode, and the selectors 3052 and 3050 are those for selecting one of Y, M, C, and K on the basis of the process color signal. In practice, since the colors are reproduced in the mesh dots in Y, M, and C in this manner, the ratios for the removal of Y, M, and C and the ratio for the generation of K are set up by the use of curves and tables or the like which have been developed on the empirical basis.

(f) Space filter module

In the equipment applied to this copying machine, the original sheet is read by scanning the CCD with the IIT as described earlier, and, if the information so obtained is used as it is, the resulting output will be obscure information, and, additionally, since the system reproduces the original sheet in mesh dots, there occurs moire between the mesh dot cycle for the printed matter and the sampling cycle for 16 dots/mm. Moreover, moire appears also between the mesh dot cycle formed by the system itself and the mesh dot cycle of the original sheet. The space filter module 306 is the module which is provided with the function of recovering obscure images like these and the function of removing the moire. And, for the removal of the moire, a low pass filter is employed in order to cut off the mesh dot components while a high pass filter is used for processing the emphasis of the edges.

Figure 15G:
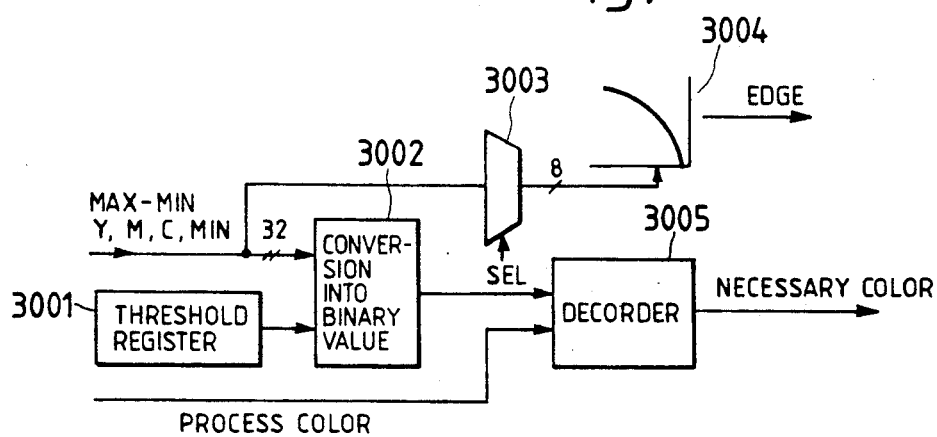

In the space filter module 306, one color out of Y, M, C, M, Min and Max-Min input signals is taken out with the selector 3003, as shown in FIG. 15(g), and then the data is converted into information close to the reflexive ratio with reference to the conversion table 3004. This approach is taken because it is easier to pick up the edges through this type of information, and Y, for example is selected as one of the colors for this process. Furthermore, with the threshold register 3001, the four-bit binary value conversion circuit 3002, and the data coder 3005, the system separates the signals for each picture element from Y, M, C, Min and Max-Min into the eight hues, i.e. Y, M, C, K, B, G, R, and W (White). The decoder 3005 shown in FIG. 15(g) recognizes the hue on the basis of the information for the binary data conversion, and it outputs the data in the form of one-bit information on the point whether or not the hue so recognized is a necessary color as viewed with reference to the process color.

Figure 15H:
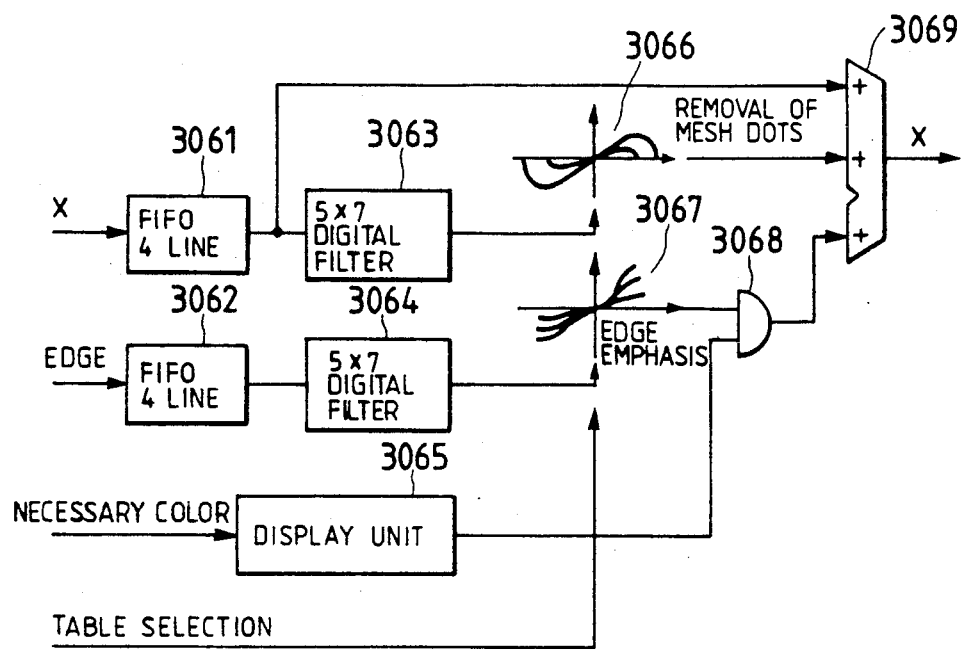

The output shown in FIG. 15(g) is input into the circuit shown in FIG. 15(h). Here, the information for the removal of the mesh dots is generated with the FIFO 3061 and the 5×7 digital filter 3063 and with the modulation table 3066, and the system generates the edge emphasis information from the information output as shown in FIG. 15(g) with the FIFO 3062 and the 5×7 digital filter 3064, the modulation table 3067, and the delay circuit 3065. The modulation tables 3066 and 3067 are selected in correspondence to the copying modes, such as the photomode, the exclusive mode for characters, and the mode for photographs and characters in mixture.

Figure 15J:
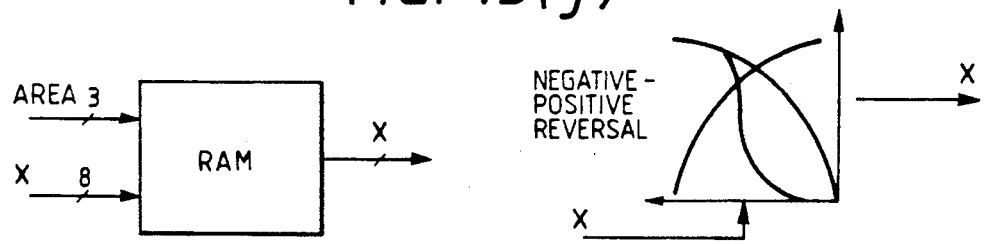
Figure 15K:
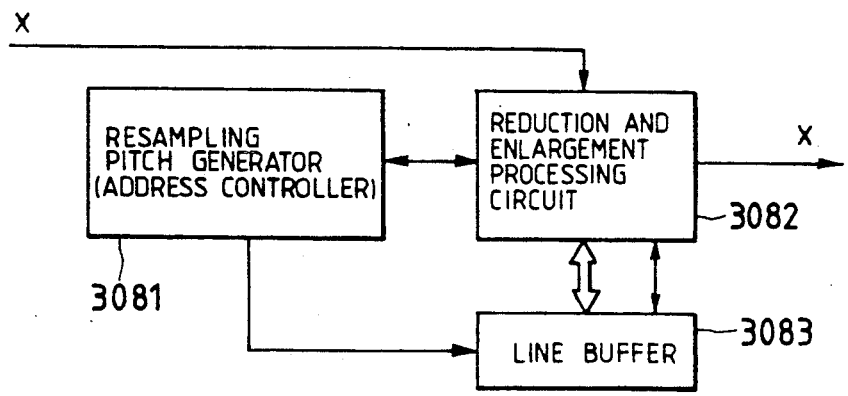
Figure 15I:
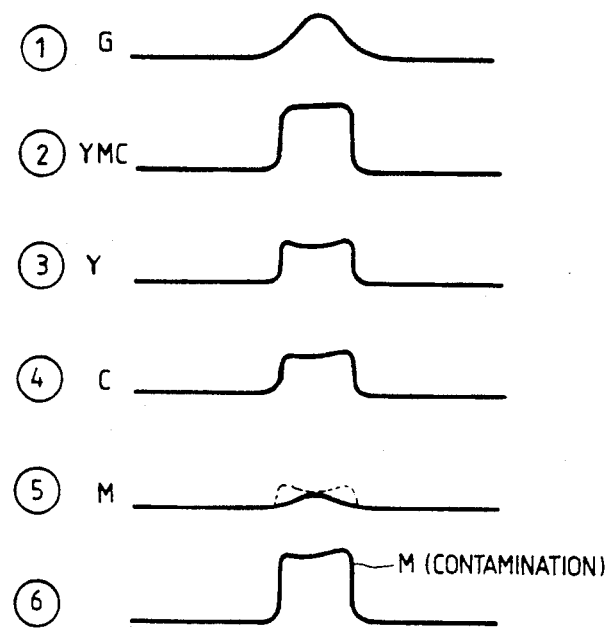
Figure 15L:
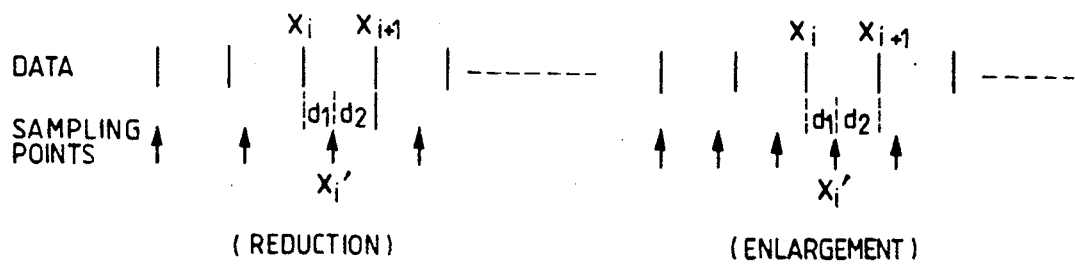

With regard to the emphasis of the edges, assume for example that it is intended to reproduce green-colored characters like those given in FIG. 15(i)(1) to appear as rendered in (2). For this purpose, Y and C are to be processed for emphasis as shown in (3) and (4) while M is not given any emphasizing treatment as shown by the solid line in (5). The switching operation for this is performed with the AND gate 3068. For the performance of this process, the emphasis in the manner shown by the dotted line under (5) will result in the occurrence of a turbid color in the edges as shown in (6) on account of the admixture of M. The delay circuit 3065 is a circuit which achieves the synchronization of the FIFO 3062 and the 5×7 digital filter 3064 for the purpose of switching the emphases like this for each process color by means of the AND gate 3068. If vivid green characters are reproduced by the ordinary process, magenta causes turbidity in the green characters in consequence of its admixture with green in them. For this reason, the system reduces the amount of M in order not to emphasize the edges of the character while it outputs Y and C as usual when it recognizes any character as one in green as mentioned above.

(g) TRC conversion module

The IOT makes it possible to reproduce full-color original sheets on copies through its performance of the copying cycle four times (in the case of full-color copy in four colors) by each of the process colors, Y, M, C, and K, in accordance with the ON/OFF signals transmitted from the IPS. As a matter of practice, however, it requires fine and delicate adjustments made in conjunction of the characteristics of the IOT to reproduce with high fidelity the colors theoretically identified through the processing of the signals. The TRC conversion module 309 is the module provided in order to make improvements on the features of reproducibility like this, and this system is provided with an address conversion table for accepting eight-bit image data as its address input in the RAM as shown in FIG. 15(j), the address conversion table being designed to work in correspondence to each of the combinations of the density values of the colors Y, M, and C, and this system is provided with such editing functions as density control, contrast control, negative-positive reversal, color balance control, character mode, and openwork synthesis, which are to be performed in accordance with the area signals. In the three upper bits in this RAM address are used the bit 0 through the bit 3 of the area signals. Moreover, the off-area mode permits the use of the above-mentioned functions in combination. Furthermore, this RAM possesses eight-face conversion tables composed, for example, of 2k bytes (256 bytes×8 faces), which are stored up to the maximum of eight faces in the course of the carriage return of the IIT for each cycle for Y, M, and C and they are selected in accordance with such operating factors as the specification of the area and the copying mode. Of course, it will be unnecessary to load the tables for each cycle of the operations if the RAM is given an increased capacity.

(h) Reduction and enlargement processing module

The reduction and enlargement processing module 308 performs the reduction and enlargement processes through the reduction and enlargement processing circuit 3082 in the process in which the system sends out the data X after once storing it in the line buffer 3083, and this module generates the read/write addresses for the sampling signals and the line buffer 3083 by means of the resampling generator and address controller 3081. The line buffer 3083 is designed in the form of a Ping-Pong buffer composed of buffers for two lines, so that the buffer will be capable of writing the next line data in one of the buffers at the same time as the data are read out of the other of the buffers. In the reduction and enlargement process, the operations in the main scanning direction are digitally performed with this reduction and enlargement processing module 308, but those in the supplementary scanning direction are performed by changing the speed of the scanning operations with the ITT. The scanning speed can be varied in the range from two times the rated speed to ¼th of the speed for making reductions or enlargements in the range from 50% to 400% of the original sheet size. In the digital processing, reductions are made by thinning out for complementation, while enlargements are made by adding for complementation, in the course of the reading/writing of data in the line buffer 3083. The data for the complementation will be generated by a weighting process in proportion to the distances to the data on both sides as illustrated in FIG. 15(*l*). In the case of the data $X_i'$, for instance, the data can be determined by arithmetic operation performed with the equation given in the following, on the basis of $X_i$ and $X_{i+1}$ used to express the data on the two sides and the distances d1 and d2 between these sets of data and the sampling point:

$$(X_i \times d_2) + (X_{i+1} \times d_1)$$

Wherein, $$d_1 + d_2 = 1$$

In the case of the reduction process, the system writes the data in the line buffer 3083 while processing the data for complementation thereof and, at the same time, transmits the data processed for reduction for the preceding line, reading the data out of the buffer. In the case of the enlargement process, the system once writes the data as they are and at the same time transmits the data for the preceding line while processing the data for complementation for enlargement. Although the complementation and enlargement process performed at the time of writing the data would make it necessary to increase the clock in proportion to the enlargement ratio for the time when the writing process is performed, the design of the process described above permits the writing/reading of the data with the same clock. Moreover, with this construction, it is possible to process the shift image in the main scanning direction by reading the data from a point in the middle of the sequence or reading the data with a delay in timing, and it is possible to perform the repeating process by reading the data in repetition, and it is also possible to perform the mirror image processing by reading the data in the reverse direction.

(i) Screen generator

The screen generator 309 outputs the signals on the chromatic gradation of the toner for the process color after it converts the signals into the binary value ON/OFF signals for the toner, and this generator performs the binary value conversion process and the error dispersion process through its comparison of the threshold value matrix and the value of the data expressed in chromatic gradation. The IOT inputs these binary value toner signals and reproduces the picture images in the halftone by turning on and off the laser beam in an oval shape approximately 80 $\mu m\phi$ in vertical diameter and 60 $\mu m\phi$ in horizontal diameter in such a way as to work with the signals in such a manner that they correspond to 16 dots/mm.

First, a description is made of the way how the chromatic gradation is expressed by the threshold matrix which composes halftone cells s 4×4, for example, are formed, as illustrated in FIG. 15(*n*). First, the screen generator sets the threshold matrix m in correspondence to halftone cells s like these, and data values expressed in terms of chromatic gradation are then compared with the matrix.

The 4×4 halftone cells with 16 dots/mm are generally known as mesh dots at 100 spi in a range of 16 steps in chromatic gradation, but, at this level, the picture images are coarse, so that the reproducibility of color images will be inferior. In this invention, therefore, this picture element (pixel) with 16 dots/mm is divided into four parts vertically (i.e. in the main scanning direction) as a method of increasing the chromatic gradation, and thus the ON/OFF frequency of the laser beam as viewed in relation to the picture element taken as the unit is set by the unit equivalent to ¼th of what is used in the conventional counterpart, i.e. the factor is improved to a level four times higher, as shown in FIG. 15(*o*), with the result that a chromatic gradation higher by four times has been achieved thereby. Accordingly, in correspondence with this, a threshold value matrix m' as shown in FIG. 15(*o*) is set up. Moreover, for increasing the number of lines, it will also be possible to employ a sub-matrix method.

For the example cited above is used the same threshold value matrix m which has the only nucleus of growth in the proximity of the middle of each halftone cell. Yet, the sub-matrix method has a construction comprising a plural number of the unit matrices with the nuclei of growth for the matrices located in two or more positions (i.e. in a plural number of positions) as shown in FIG. 15(*p*). With the employment of a screen pattern designing technique like this, it is possible to change the number of lines and the chromatic gradation freely in accordance with the distinction between dark areas and light areas, for example, by applying 141 spi in 64 chromatic grades to light areas while changing these factors to 200 spi in 128 chromatic grades according as the processed area grows darker. A pattern like this can be designed by judging the smoothness of the chromatic gradation and the fineness of lines, as well as such factors as the properties of grains, by visual observation.

Figure 15M:
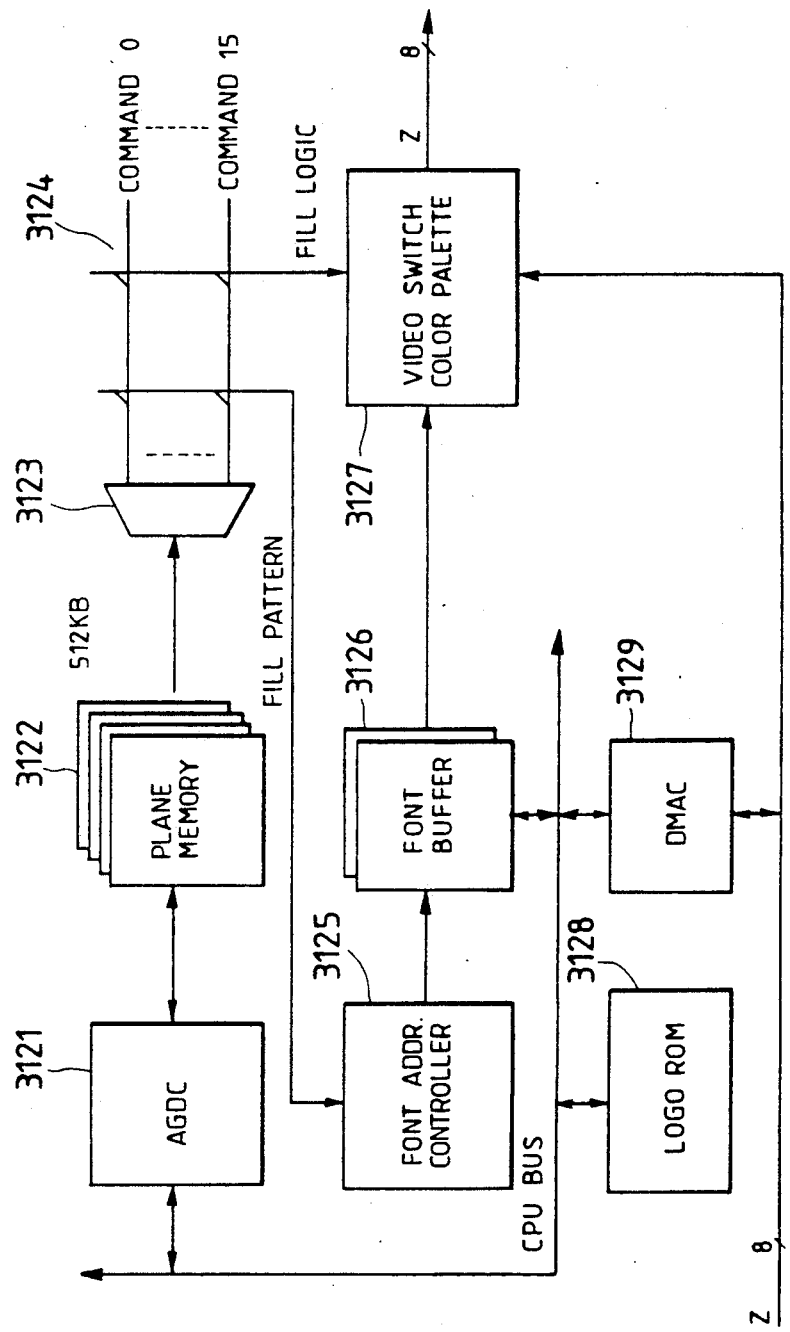
Figure 15N:
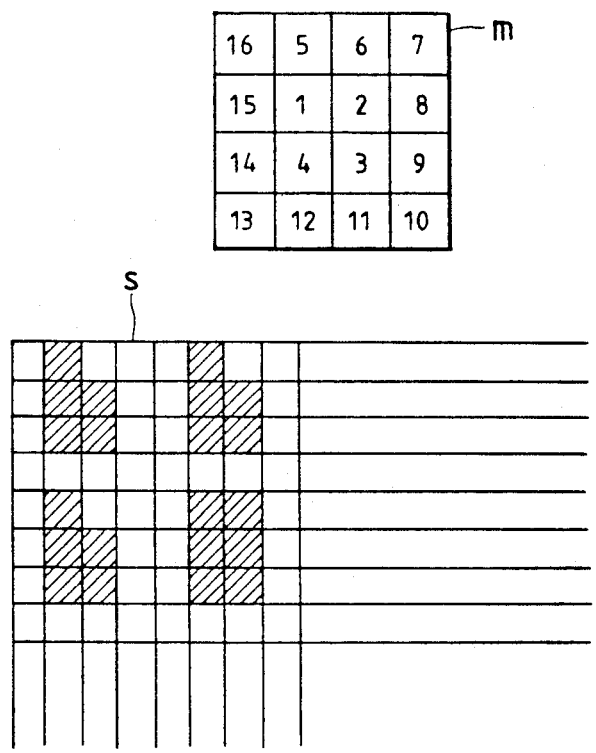
Figure 15O:
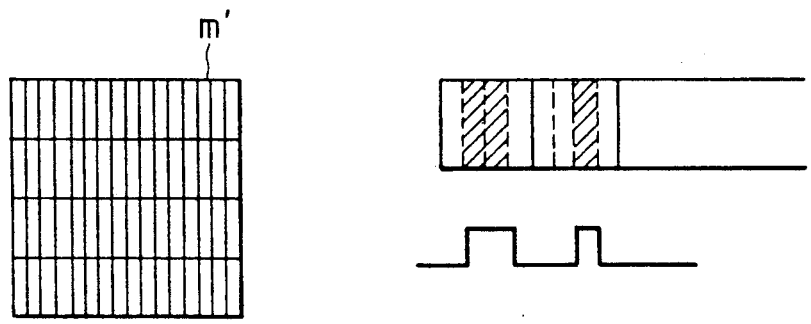
Figure 15P:
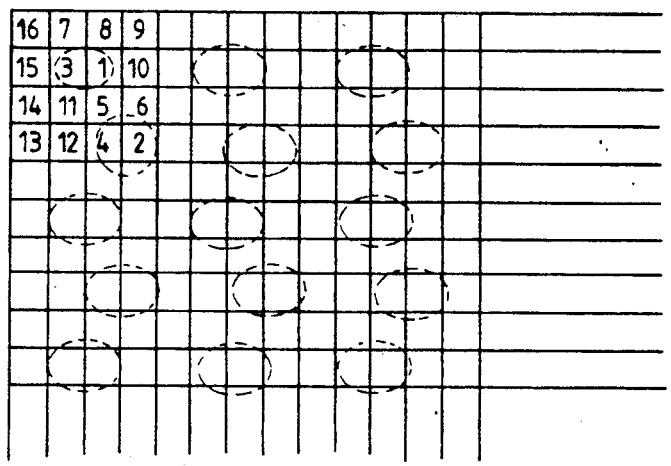
Figure 15Q:
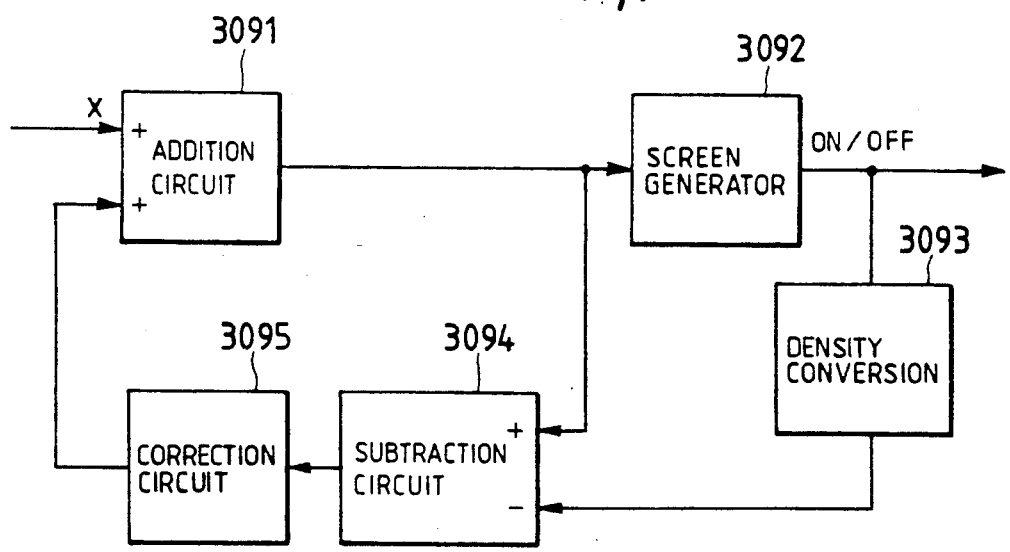

In case images in halftone are reproduced by dot matrices like those mentioned above, the number of steps in the chromatic gradation and the resolution will be in a mutually contradicting relation. In other words, these two factors are in the relationship that amounts to the point that an increase in the number of steps in chromatic gradation results in the deterioration of the resolution while an increase of the resolution causes a decline in the number of steps in the chromatic gradation. Moreover, when the matrix for the threshold data is made smaller, there occurs an error in determining the quantum basis for the picture images which are actually output. The error dispersion process works for improving the reproducibility of the chromatic gradation as viewed from a macroscopic standpoint by detecting the quantizing error of the ON/OFF signals as converted into binary values after they are generated by the screen generator 3092 and the chromatic gradation signals of the input, as shown in FIG. 15(q), with the density conversion circuit 3093 and the subtraction arithmetic operation circuit 3094 and then feeding the data by the use of the correcting circuit 3095 and the addition arithmetic operation circuit 3091. This process performs, for example, the error dispersion process, in which the picture elements in the corresponding position and the positions on both sides of the position in the preceding line are "folded in" through a digital filter.

The screen generator makes improvements on the reproducing characteristics of picture images in high chromatic gradation and with high precision by changing the threshold value data and the feedback coefficients for the error dispersion process for each original sheet or for each area in the original sheet, depending on the types of the picture images, such as the images in the neutral tones and the character images as described above.

(j) Area image control module

The area image control module 311 has a construction which makes it possible to set seven rectangular regions and their order of priority in the area generating circuit, and the control information for the areas is set in the switch matrices which correspond to the individual areas. The control information include the color conversion information, the color mode information, which relates to such points as whether the process calls for monochromatic processing or full-color processing, the modulation selecting information, which is related to photographs, characters, etc., the selection information for the TRC, and the selecting information for the screen generator, and these types of information are applied to the control of the color masking module 302, the color conversion module 304, the UCR module 305, and the space filter 306, and the TRC module 307. Moreover, the switch matrix is so designed that it can be set by software.

(k) Editing control module

The editing control module makes it possible to perform the outline drawing coloring process, which consists in painting the specified area not limited in shape with the specified color, reading the original sheet not in a rectangular form but in the form of a pie graph, or the like. As illustrated in FIG. 15(m), the AGDC (Advanced Graphic Digital Controllers) 3121, the font buffer 3126, the logogram ROM 128, and the DMAC (DMA Controller) 3129 are connected to the bus of the CPU. And, the encoded four-bit area command is transmitted from the CPU and written to the plane memory 3122 through the AGDC 3121, and the fonts are written to the font buffer 3126. The plane memory 3122 is composed of four planes, and it is possible to set the various points of the original sheet in four bits from plane 0 to plane 3, so that the original sheet can be output with the command being set at 0 when the value kept in the memory is "0000" for example. It is the decoder 3123 that decodes this four-bit information into the commands 0 through 15, and it is the switch matrix 3124 that determines which of the command 0 through 15 should be assigned as the command for performing the processing of which one of the fill pattern, the fill logic, and the logogram. The font address controller 3125 generates the addresses in the font buffer 3126 in correspondence to the patterns, such as the mesh dot shade and the hatching shade, with the two-bit fill pattern signals.

The switching circuit 3127 performs the selection, etc. of the original sheet data X, the font buffer 3126, and the color palette on the basis of the contents of the fill logic signals and the original sheet data X from the switch matrix 3124. The fill logic provides the information for the filling of the background (i.e. the background area of the original sheet) alone with color mesh, the conversion of the specific area into color, masking work, trimming work, and the painting of the entire area with its demarcation by an outline.

In the IPS according to this invention, the system first performs the END conversion and thereafter the color masking process on the signals read from the original manuscript by means of the IIT as mentioned above, performing the processing of the original sheet sizes, the erasure of frames, and the color conversion, which can be processed more efficiently in full color, and thereafter performing the removal of the undercolors and the generation of black with the operations being narrowed down to those on the process color. However, such processes as space filtering, color conversion, TRC, and size reduction and enlargement are designed to process the data on the process color, so that such processes may work with a smaller amount of processing work than in the case of the processing of the full-color data, with the conversion tables to be used being reduced to one third and yet with their types being proportionately increased, so that the improvements have been attained on the flexibility of the controlling operations, the reproducibility of colors, reproducibility of the chromatic gradation, and the reproducibility of fine details.

(II-2) Image Processing System (IPS)

FIGS. 16(a-d) are charts illustrating an example of the hardware construction of the IPS.

In the IPS according to this invention, the hardware components are separated into two parts, IPS-A and IPS-B, with the parts performing the basic functions of a color image forming equipment, such as those for achieving the reproducibility of colors, the reproducibility of chromatic gradation, and the reproducibility of details with high precision, being mounted on the first board IPS-A and with those parts performing the applied functions and the specialized functions, such as editing, being mounted on the second board IPS-B. The construction of the former is presented in FIG. 16(a) through 16(c) while that of the latter is given in FIG. 16(d). Above all, the system will be able to deal flexibly with the applied and specialized functions as required merely with design modifications of the second board, so long as it is capable of satisfactorily performing the basic functions with the first board. It follows from this that any attempt at further enhancing the functions of this system as a color image forming equipment can be accomplished merely by making modifications of the design features of the second board.

To the boards for the IPS are connected CPU buses as shown in FIGS. 16(a-d) (the address bus ADRSBUS, the data bus DATABUS, and the control bus CTRLBUS), and the video data B, G, and R from the IIT, the video clock IIT·VCLK as the synchronizing signal, the line synchronization signals IIT·LS (in the main scanning direction and for the horizontal synchronization), and the page synchronization signals IIT·PS (in the supplementary scanning direction and for vertical synchronization) are thereby connected to the IPS boards.

Now that the video data are processed with a pipeline in the END conversion section and the subsequent sections, there occurs a delay of the data by the clock unit necessary for the processing of the data at each processing stage. Therefore, it is the line-synchronizing signal generation and failure check circuit 328 that generates and distributes the horizontal synchronizing signals to deal properly with such delays at each of the individual processing stages and also performs failure checks on the video clock and the line-synchronizing signals. For this purpose, the line-synchronizing signal generation and failure check circuit 328 has the video clock IIT·VCLK and the line-synchronizing signal IIT·LS connected thereto, and, additionally, the CPU buses (the ADRSBUS, DATABUS, and CTRLBUS) and the chip-selecting signal CS are connected to the circuit, so that the internal setting may be re-written.

The video data B, G, and R from the IIT are input into the ROM 321 of the END conversion section. The END conversion tables may be constructed in such a way as to permit their loading from the CPU as required with a RAM used therefor, but, since there scarcely arises any necessity of rewriting in the course of the processing of picture images while the equipment is in its operating state, two 2k byte ROM are employed for each of B, G, and R to provide a LUT (Look Up Table) system composed of these ROM's. And, the system possesses 16 faces of conversion tables, which can be changed over from one to another with the four-bit selecting signal, END Sel.

The output generated from the ROM 321 after the END conversion performed thereon is connected to the color masking section composed of three pieces of the arithmetic operation LSI 322 which has two faces of 3×1 matrix for each of the colors. To the arithmetic operation LSI 322 are connected the individual buses for the CPU, and these buses make it possible to set the Matrix coefficients with the CPU. To these buses are connected the setup signal SU, which is to be used for the changeover from the processing of picture image signals to the CPU buses for such purposes as the rewriting of such signals by the CPU, and the chip selecting signal CS, and one-bit switching signal MONO, which is to be used for switching the selection of the matrix. In addition, the power down signal PD is input, and this signal stops the internal video clock while the IIT is not performing any scanning operation, i.e. while it is not performing any processing of picture images.

Figure 16A:
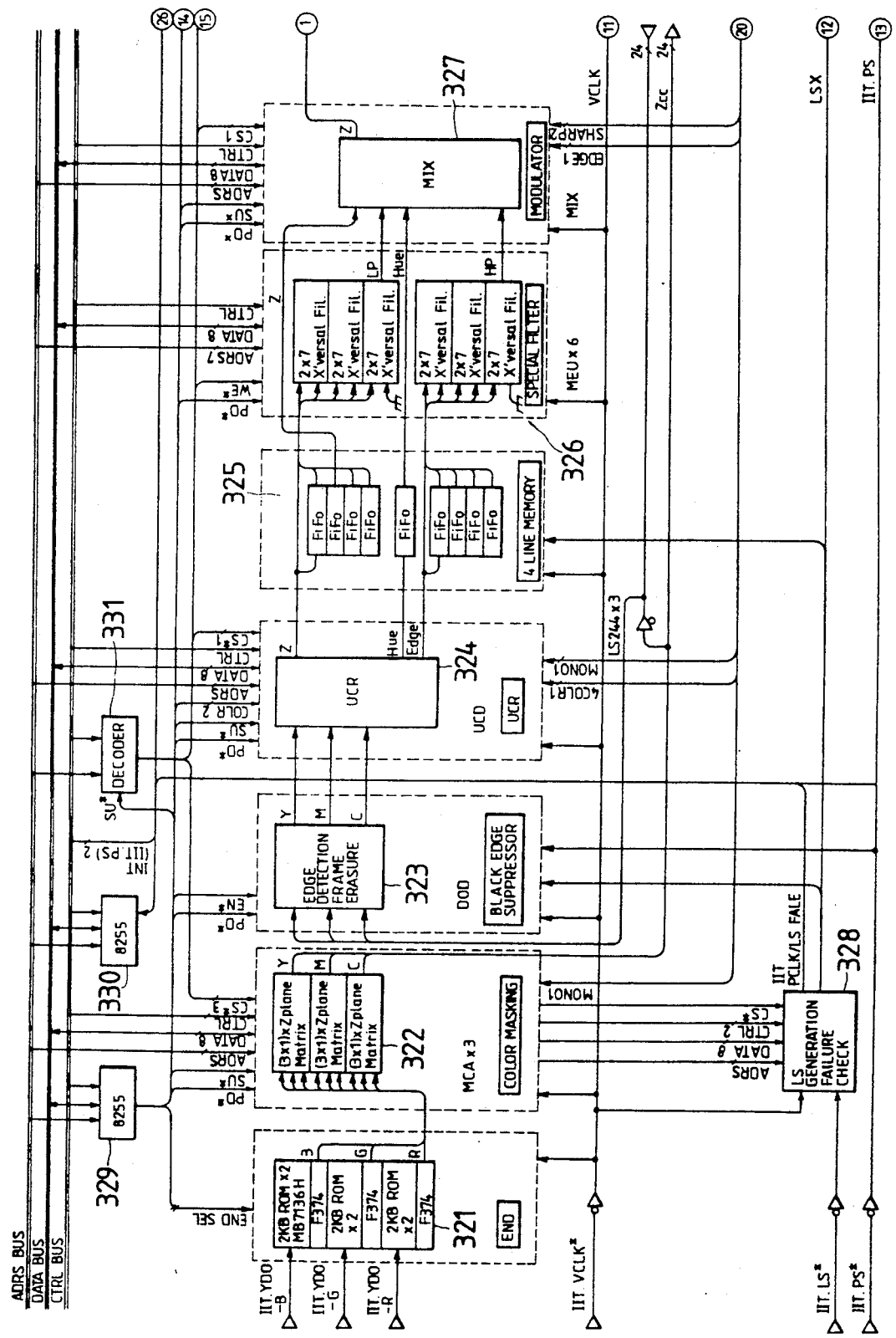
FIGS. 16(a) through 16(d) illustrate the hardware construction of the IPS.
Figure 16B:
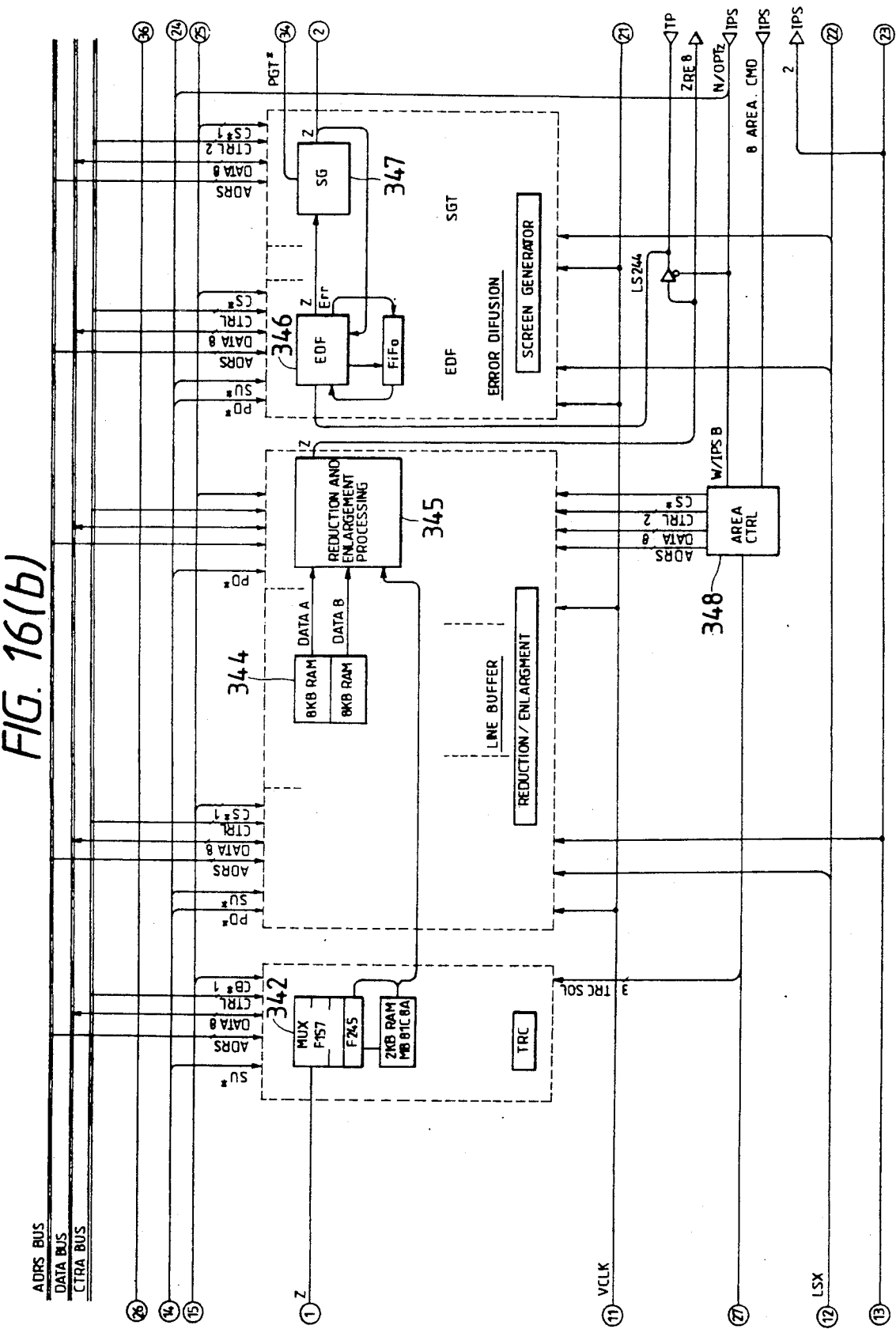
Figure 16C:
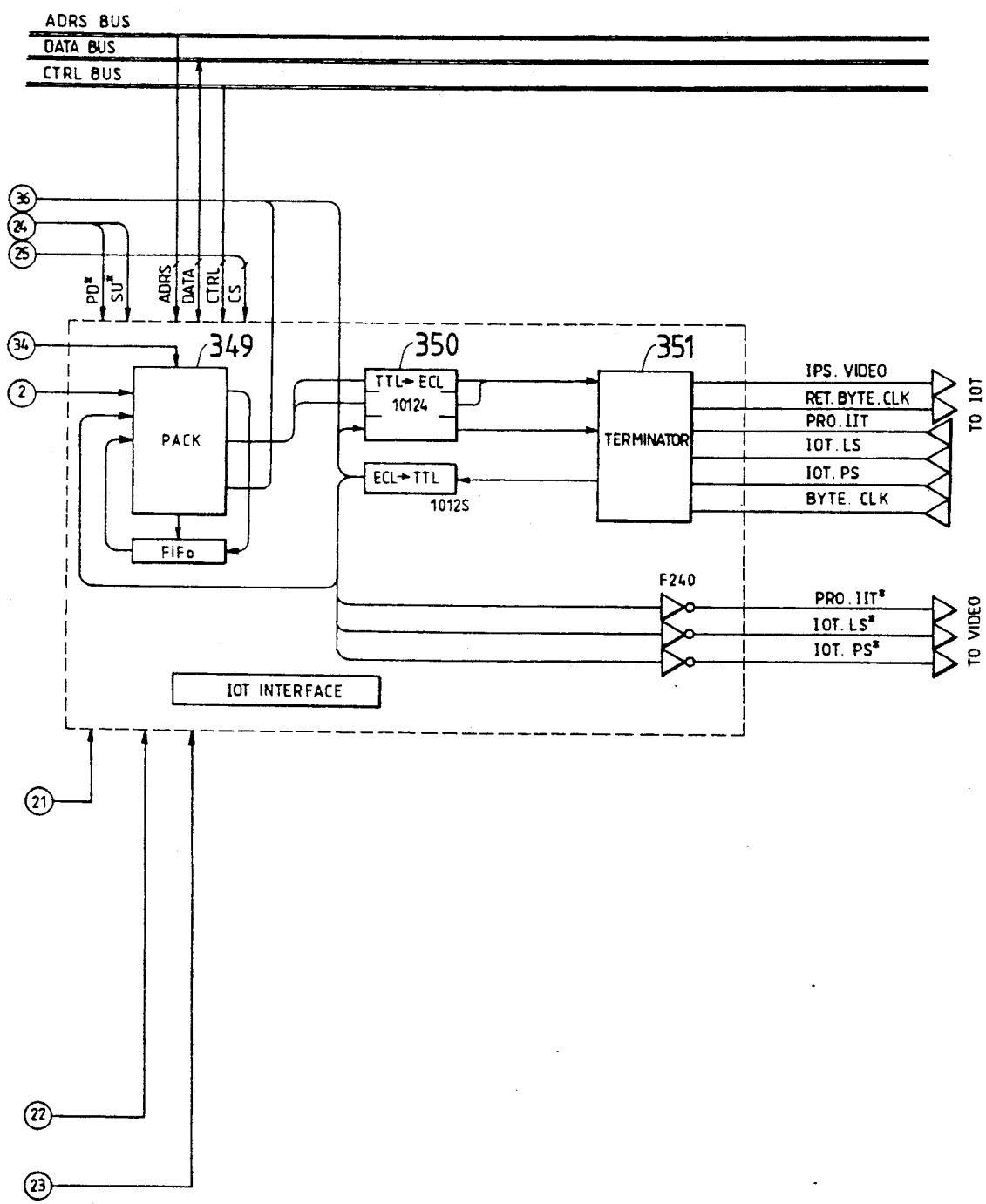
Figure 16D:
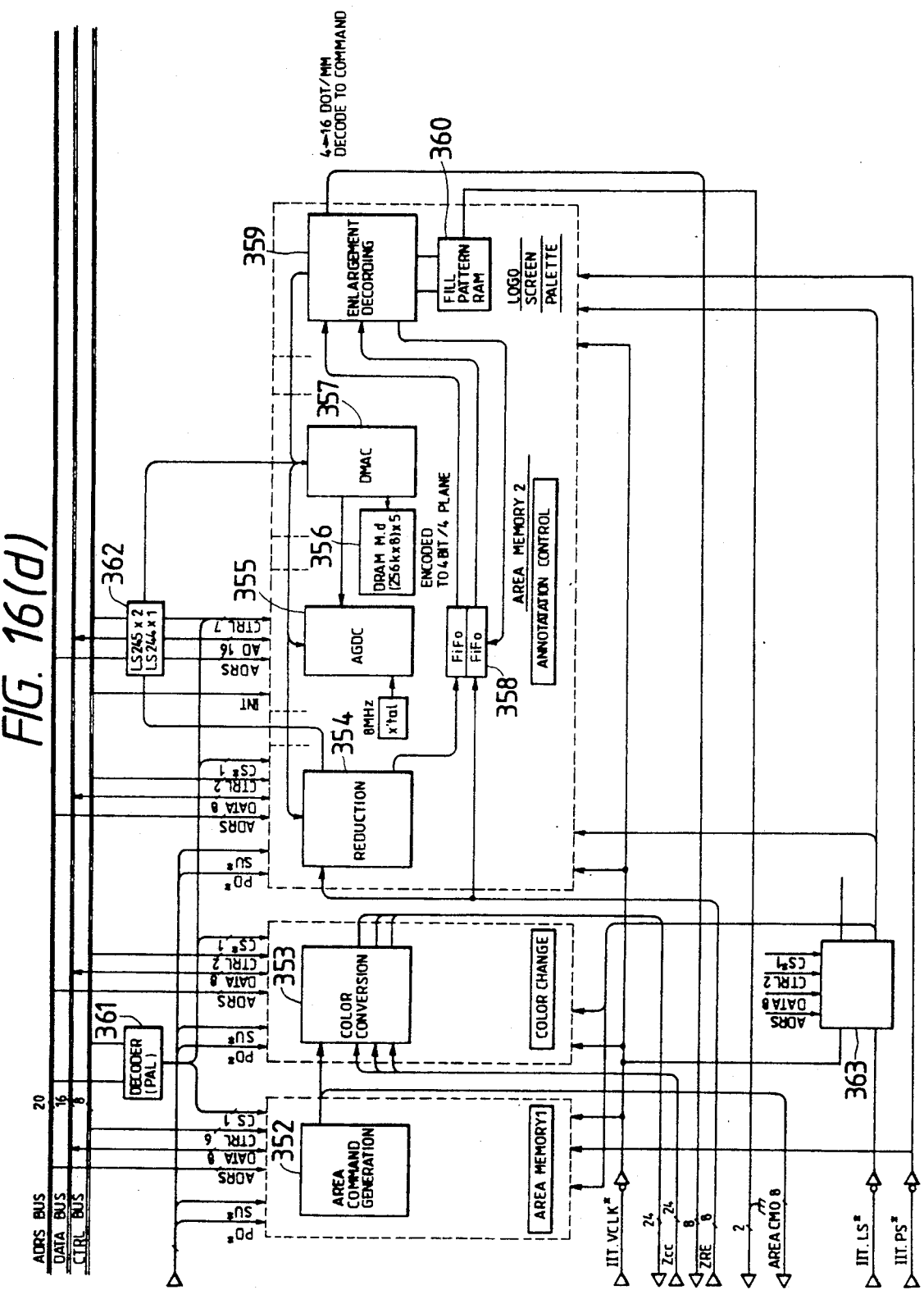

The signals converted from B, G, and R into Y, M, and C are processed for their color conversion through the color conversion LSI 353 on the second board (IPS-B) shown in FIG. 16(d), and the processed signals are then input into the LSI 353 for DOD. The color conversion LSI 353 is provided with four channels of color conversion circuits composed of a threshold register, which sets the colors not to be converted, and a color palette, which sets the colors to be converted, a comparator, and so forth, and the LSI 323 for DOD is provided with an edge detecting circuit, a frame erasing circuit, and so forth for the original sheets.

The output generated from the LSI 323 for DOD after it is processed for frame-erasure is transmitted to the LSI 324 for the UCR. This LSI contains the UCR circuit, a black-generating circuit, and additionally those circuits for generating the necessary colors and outputs each of the signals expressing the process color X, which is a signal corresponding to the color of the toner in the copying cycle, the necessary Hue, and the Edge. Accordingly, the COLR signal, which is a two-bit signal for specifying the process color, and also the color mode signals (4COLR and MONO) are input into this LSI.

The line memory 325 is composed of the FIFO, which accumulates the data for four lines in order to input into the 5×7 digital filter 326 each of the signals on the process color X, the necessary Hue, and the Edge output from the LSI 324 for the UCR, and the FIFO for adjusting the portion of the delay for matching. Here, with respect to the process color X and the Edge, the line memory accumulates the signals for the four lines in the FIFO and transmits those for five lines to the digital filter 326, but, with respect to the necessary color Hue, the system is so designed as to provide a delay to the signal on the necessary hue in the FIFO, so that the signal may be put into its synchronization with the output from the digital filter 326, and then to transmit the signal to the LSI 327 for the MIX.

The digital filter 326 is comprised of two sets (the low pass filter LP and the high pass filter HP) of 5×7 filters consisting of three LSI's for the 2×7 filter, and the digital filter 326 performs the processing operations in respect of the process color X with one of the sets of filters mentioned above and performs the processing operations in respect of the Edge with the other set of filters. The LSI 327 for the MIX performs such processes as the removal of mesh dots and the emphasis of the edges on these outputs with reference to the conversion tables, and then the resultant data are mixed into the signal on the process color X. Here, EDGE and Sharp are input as the signals for the changeover of the conversion tables.

The TRC 342 is composed of 2k-byte RAM provided with eight faces of conversion tables, which are structured in such a way as to accept the rewriting thereof by the use of the carriage return period before each scanning operation and are changed over by the switching signal TRC Sel. And, the processing output from this unit is transmitted by a transceiver to the LSI 345 for reduction and enlargement processes. The reduction and enlargement processing section is constructed in the form of a Ping-Pong buffer (line buffer) with two pieces of 8k-byte RAM 344, and the LSI 343 performs the generation of the resampling pitch and the generation of the address for the line buffer.

The output form the reduction and enlargement processing section returns to the LSI 346 for the EDF by way of the area memory section on the second board on FIG. 16(d). The LSI 346 for the EDF is provided with the FIFO for storing the information for the preceding line and performs the error dispersion process with the information on the preceding line. And, the signal X obtained after the performance of the error dispersion process is output to the IOT interface by way of the LSI 347 for SG, which forms the screen generator.

The IOT interface transmits the signals input into it from the LSI 347 for SG in one-bit ON/OFF signals in parallel to the IOT, putting the signals together into eight bits by means of the LSI 349.

Since the data actually flowing on the second board shown in FIG. 16 are for 16 dots/mm, the data are reduced to ¼th and converted into binary values by the reduction LSI 354 and then stored in the area memory. The enlargement decoding LSI 359 is provided with the filter pattern RAM 360, and this LSI reads the area information from the area memory and enlarges the data to 16 dots/mm when it generates a command therefrom, and then this LSI performs the processing operations for the generation of the logogram address, the color palette, and the fill patterns. The DRAM 356, which is composed of four faces, stores the coded four-bit area information. The AGDC 355 is a controller for its exclusive use for controlling the area command.

(II-3) Image Output Terminal (IOT)

(A) Schematic Construction

Figure 17:
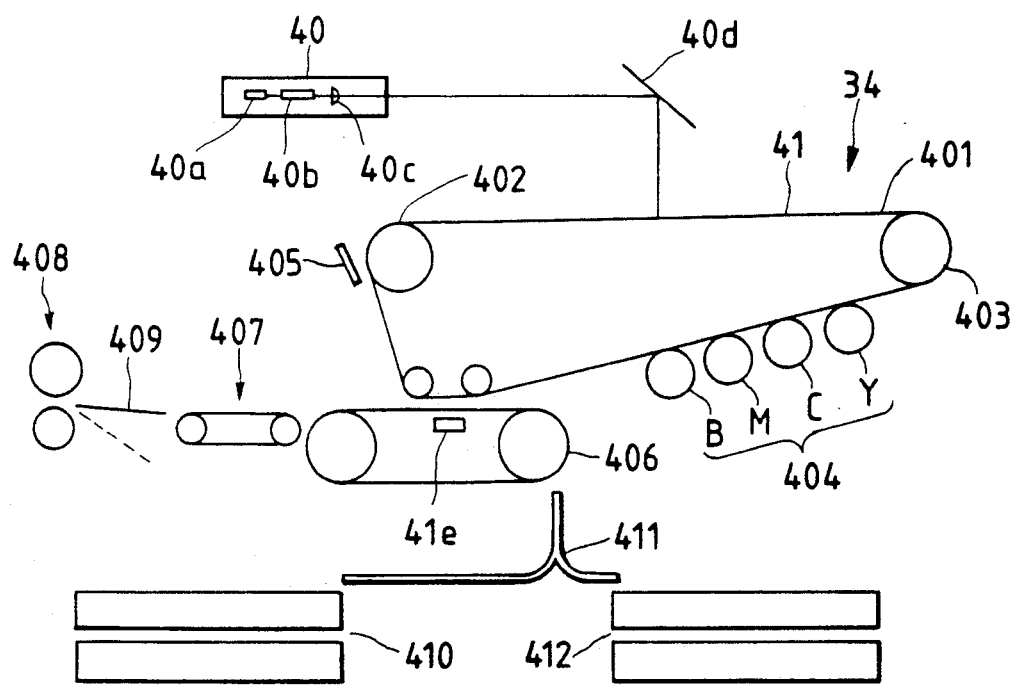
FIG. 17 illustrates the outline of the construction of the IOT.

FIG. 17 is a chart illustrating a schematic construction of the Image Output Terminal.

This equipment employs an organic belt of photosensitive material (Photo Receptor Belt), is provided with a developing unit 404 for Black (B), Magenta (M), Cyan (C), and Yellow (Y) for use for full-color development of images in four colors, the transfer device for transporting the paper to the image transfer section (Tow Roll Transfer Loop) 406, the vacuum transfer device (Vacuum Transfer) 407 for transporting the paper from the transfer device 404 to the fixing device 408, the paper trays 410 and 412, and the paper transfer channel 411, and the three units, i.e. the Photo Receptor Belt, the Developing Unit, and the Tow Roll Transfer Loop, are constructed in such a way that they can be pulled out towards the front side.

The information light obtained by modulation of the laser light from the laser light source 40 is radiated upon the photo-sensitive material 41 for its exposure by way of the mirror 40d, a latent image being thereby formed. The image formed on the photosensitive material is developed by the developing unit 404 and a toner image is formed thereby. The developing unit 404 is composed of the parts for the colors, K, M, C, and Y, which are arranged in the positional relations as illustrated in the Figure. This arrangement has been made by taking account, for example, of such factors as the relationship between the dark attenuation and the characteristics of the individual toners and the difference in the effect of the admixture of the toners for other colors into the black toner. However, the driving sequence for the full-color copying process is Y→C→M→K. In the meanwhile, the paper supplied from the unit 410, which is composed of paper trays in two stages, and from the other two-staged tray 412 is fed into the Tow Roll Transfer Loop 406 through the paper transfer channel 411. The Tow Roll Transfer Loop 406, which is positioned in the transfer section, is composed of two rolls connected by a timing chain or a belt, as well as a gripper bar mentioned later, and this loop transports the paper, gripping it with the gripper bar, and has the toner image on the photosensitive material transferred onto the paper. In the case of the full-color copying process with four colors, the paper is turned four times in the transfer loop section, so that the images in M, C, Y, and B, respectively, are transferred in this stated order. The paper after such transfer is released from the gripper bar, being thereafter handed over from the Tow Roll Transfer Loop 406 to the vacuum transfer device 407 and then fixed by the fixing device 408 and discharged from the system.

The vacuum transfer device 407 absorbs the speed difference between the tow roll transfer loop 406 and the fixing device 408, maintaining these in synchronization with each other. In this equipment, the transfer speed (i.e. the process speed) is set at 190 mm/sec., and, now that the transfer speed is 90 mm/sec. for the full-color copying process, etc., the transfer speed is different from the fixing speed. In order to secure the fixing performance, the process speed is slowed down. On the other hand, it is not possible to allocate any additional power to the fuser because it is necessary to keep the power consumption within 1.5 kVA.

Therefore, in the processing of paper in such smaller sizes as B5 and A4, the speed of the vacuum transfer device 407 is reduced from 190 mm/sec. to 90 mm/sec. to make the speed of the device equal to the fixing speed at the very moment when the paper bearing the image transferred thereto is released from the tow roll transfer loop 406 and gets on the vacuum transfer device. However, since this copying machine has been designed in an effort to offer it in a compact size by using as short a distance as possible between the tow roll transfer loop and the fixing device, this machine is not capable of accommodating the A3 paper in the space between the transfer point and the fixing device, and, if the speed of the vacuum transfer device were reduced, a deviation would occur in the color transferred onto the paper in consequence of the braking force working thereon because the rear end of the A3 paper would be still being processed for the transfer of the image. Therefore, a buffle board 409 is provided between the fixing device and the vacuum transfer device, so that the transfer channel is extended for the transport of the A3 paper by thrusting the buffle board 409 downward, so that the paper is transported via a loop so formed and that the leading edge of the paper reaches the fixing device after the image transfer process is completed, with the vacuum transfer device being operated at the same speed as the transfer speed and thus absorbing the difference in speed. Moreover, the same operating setup as that for the A3 paper is applied also to the processing of the OHP film sheets in consideration of their poor thermal conductivity.

In addition, this copying machine is designed to perform its copying operations without any deterioration of productivity not only for producing full-color copies but also even for producing black-and-white copies. In the case of copies in black, it is possible to perform the fixing operation well enough even with a smaller amount of heat because a smaller amount of the toner is needed to form a toner layer for image reproduction, and therefore this copying machine is designed for its operation at the fixing speed of 190 mm/sec. as set without any reduction of the transfer speed at the vacuum transfer device. In other words, the same setup is applied also to the single-color copying operations in any color other than black because it is not necessary to reduce the fixing speed so long as the toner layer is a single layer. Then, the toner which remains on the photosensitive material is scraped off with the cleaner 405 when the transfer of the image is finished.

(B) Construction of Tow Roll Transfer Loop

Figure 18A:
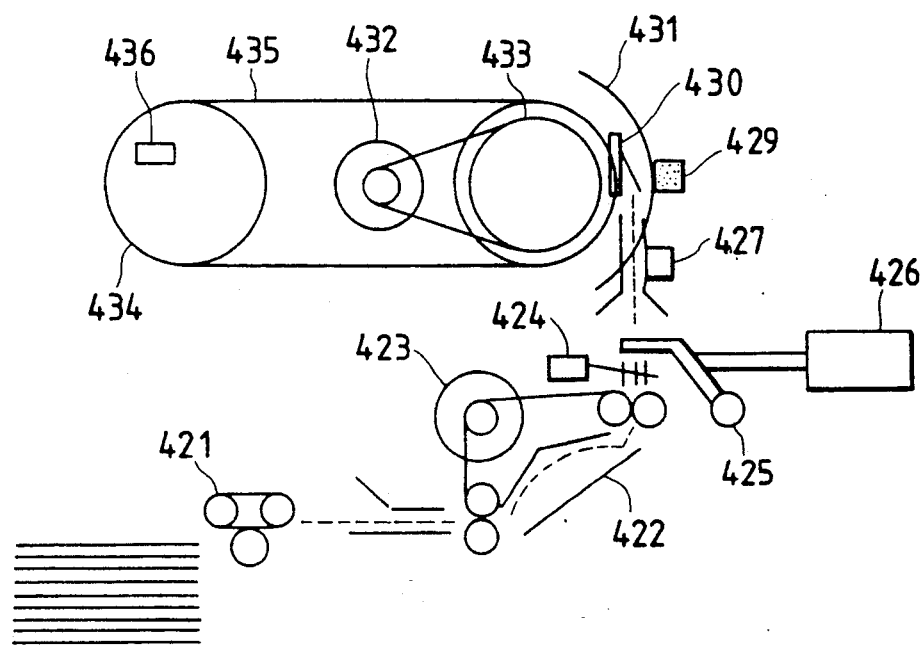
FIGS. 18(a) and 18(b) illustrate an example of the construction of the image transfer unit.

The tow roll transfer loop 406 has the construction as illustrated in FIG. 18(a). The tow roll transfer loop of this copying machine is characterized by having a construction without any mechanical paper-supporting structure, so that any lack of consistency in color will not affect the reproduction of color on the copies, and also by incorporating a feature for increasing the transfer speed through speed control performed on the device.

The paper is discharged from the tray by the feed head 421 and transported through the buckle chamber 422, which is driven with the paper pass servo motor unit 423, and then the paper is fed into the tow roll transfer loop by way of the registering gate 425, which is controlled for its opening and closure with the registering gate solenoid 426. The system is so designed that the arrival of the paper at the registering gate 425 is detected by means of the pre-registering gate sensor 424. The driving of the tow roll transfer loop is performed by driving the roller 433 with a servo motor 432 via a timing belt, the motor turning and driving the belt in the counterclockwise direction. The roller 434 is not driven in particular, but two pieces of timing chain or belt are put between the rollers, and a gripper bar 430, which is ordinarily closed by the action of elasticity but opens its mouth at the inlet of the tow roll transfer loop by the action of a solenoid, is provided between the chains (in the direction crossing at the right angles with the transporting direction). This gripper bar 430 transfers the paper by gripping o it and pulling it around at the inlet of the tow roll transfer loop. In the conventional mechanism, the paper is supported with a Mylar sheet or mesh attached to a supporting structure made of aluminium or steel, and, consequently, a difference in the thermal expansion coefficient causes concavities and convexities to develop on the surface, so that there arises a lack of flatness for the transfer of images, with resultant localized differences in the image transfer efficiency and a consequential lack of consistency in the colors reproduced on the copies. In contrast, the adoption of this gripper bar has rendered it unnecessary to provide any particular supporting structure for the paper, making it possible to prevent the occurrence of a lack of color consistency. Since this tow roll transfer loop is not provided with any supporting structure for the transported paper, the paper will be slung outwards by centrifugal force in the roller section, and the paper is attracted towards the roller with two rollers pulled by the action of vacuum in order that the paper may be prevented from being thrown out of its place, and the paper is transported in fluttering motion once it moves past the rollers.

At the transfer point, the paper is sucked by electrostatic force towards the photosensitive material on which Detackcolortron and Transfercolortron are arranged, and there the paper is processed for the transfer of images. After the transfer of the image is finished, the gripper home sensor 436 detects the position of the paper at the exit of the tow roll transfer loop, and, at a proper timing, the solenoid goes into action to cause the gripper bar to open its mouth to release the paper and to hand it over to the vacuum tow roll transfer loop 413.

Therefore, the paper is transported four turns in the case of the full-color copying process and three turns in the three-color copying process for the transfer of images onto the paper in the tow roll transfer loop.

Figure 18B:
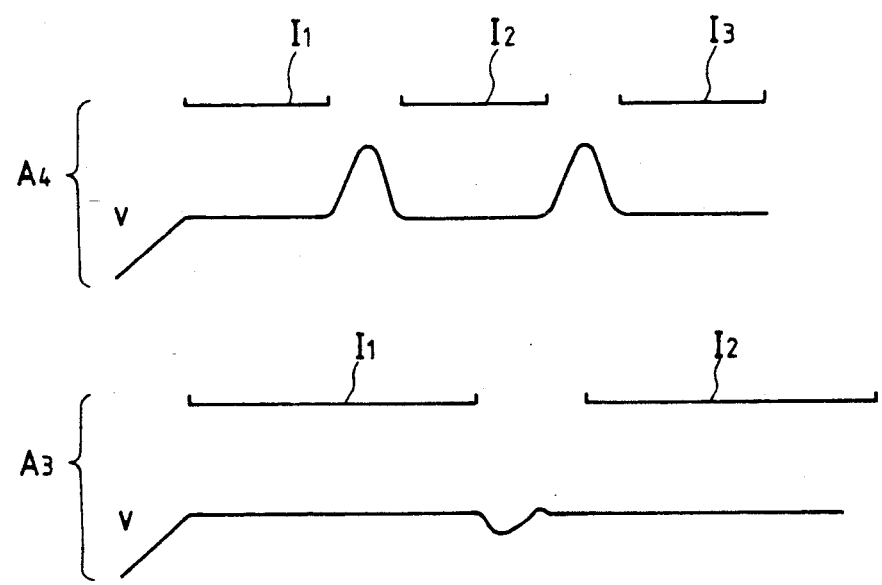

Now, the timing control for the servo motor 432 is described with reference to FIG. 18(b). In the tow roll transfer loop, it is satisfactory to control the servo motor 432 to run at a constant speed while the image transfer is being performed and to control the motor, after the completion of the image transfer, in such a way that the leading edge transferred onto the paper will be in synchronization with the point for the transfer of the subsequent latent image. On the other hand, the length of the Photo Receptor Belt (i.e. the photosensitive material belt) is a length sufficient for the formation of latent images on three sheets in the A4-size and two sheets in the A3-size, and, in addition, the length of the belt 435 is set slightly longer than the length of the A3-size paper (approximately 4/3 times the size of the A3 paper).

Accordingly, for performing color copying on the A4-size paper, the servo motor 432 is controlled to run at a constant speed when the latent image $I_1$ for the first color is being transferred and then the servo motor is controlled for a sharp acceleration in such a way that it will run in synchronization with the leading edge of the latent image $I_2$ for the second color. Moreover, in the case of the A3-size paper, the servo motor is controlled for a decceleration and a stand-by, upon the completion of the transfer of the latent image $I_1$, in such a way that the leading edge transferred onto the paper will be set in synchronization with the fore end of the second latent image $I_2$.

(II-4) User Interface (U/I)

(A) Adoption of Color Display

FIGS. 19(a–c) are charts illustrating the state of installation and the external view of the user interface system built by the use of a display unit while FIGS. 20(a–b) are charts for describing the angle and height of installation of the user interface.

The user interface forms a system for supporting easy-to-understand dialogues between the operator and the machine, and, as such, the user interface ought to constitute a system which is capable of impressing the necessary information on the operator while making simple operations possible and clearly presenting the interrelations of information items. In order to accomplish these objectives, an original user interface matching the user's manner of use has been developed for this copying machine, and it has been set as the aim for ensuring the operating facility and efficiency of this system to offer a system easy to understand for the beginners, but not burdensome to the skilled persons, to make it possible for the operator to perform direct operations for the selection of the particulars of the functions, to communicate information to the operator with as much accuracy and as promptly as possible through utilization of color, and to concentrate the operations on one place in so far as it is possible.

Those copying machines which are provided with a rich variety of functions and yet offer a high degree of reliability will win higher evaluations as equipment, but, if such machines should present difficulty in using those functions, they would suffer an extreme decline of their value and would eventually be expensive machines. Consequently, such machines would also suffer a very considerable decline of their overall evaluations on the ground that they are difficult to use even though they are equipment models offering high-level functions. From this standpoint, the user interfaces constitute a major factor that largely determines whether or not the equipment is easy to use, and, above all, the operating facility of the user interface will be an important issue all the more in view of the tendency towards the incorporation of more and more functions in copying machines, as experienced in the recent years.

With a view to making improvements on the important feature, the operating facility of the equipment, the user interface for this invention is provided with a 12-inch color display unit 501 and with a hardware control panel 502, which is positioned by one side of the display, as illustrated in FIGS. 19(a–c). Moreover, a menu easy to view and easy to comprehend is offered to the users through integration of features reflecting contrivances for displays in color, and additionally an infrared ray touch-board 503 is combined with the color display unit 501, which allows the user to gain direct access to the system with operations on the "soft buttons" on the screen. Moreover, the particulars of the operations are distributed for efficiency to the "hard buttons" on the hardware control panel 502 and the "soft buttons" put on display on the screen of the color display unit 501, and this feature has made it possible to simplify the operations and to achieve an efficient composition of the menu screen.

Figure 19A:
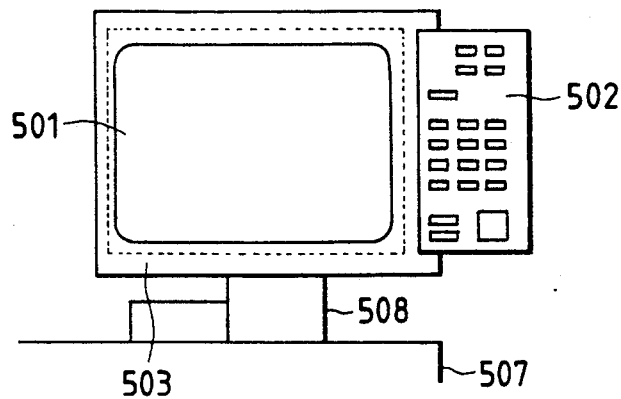
FIGS. 19(a) through 19(c) illustrate an example of the installation of the UI provided with a display unit.
Figure 19B:
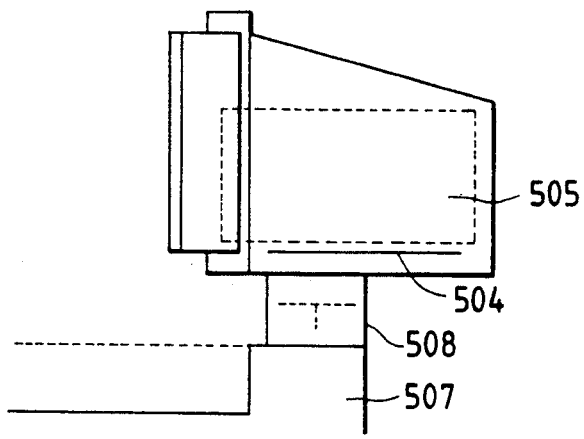
Figure 19C:
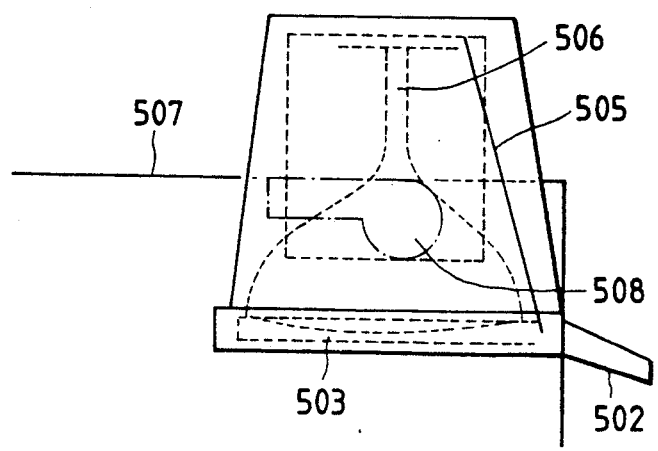

On the back sides of the color display unit 501 and the hardware control panel 502 are mounted the monitor control/power source board 504, the video engine board 505, the CRT driver board 506, and so forth, as shown in FIGS. 19(b) and 19(c), and the hardware control panel 502 is set at an angle for directing the control panel 502 further towards the center than the face of the color display unit 501 as shown in FIG. 19(c).

Figure 20A:
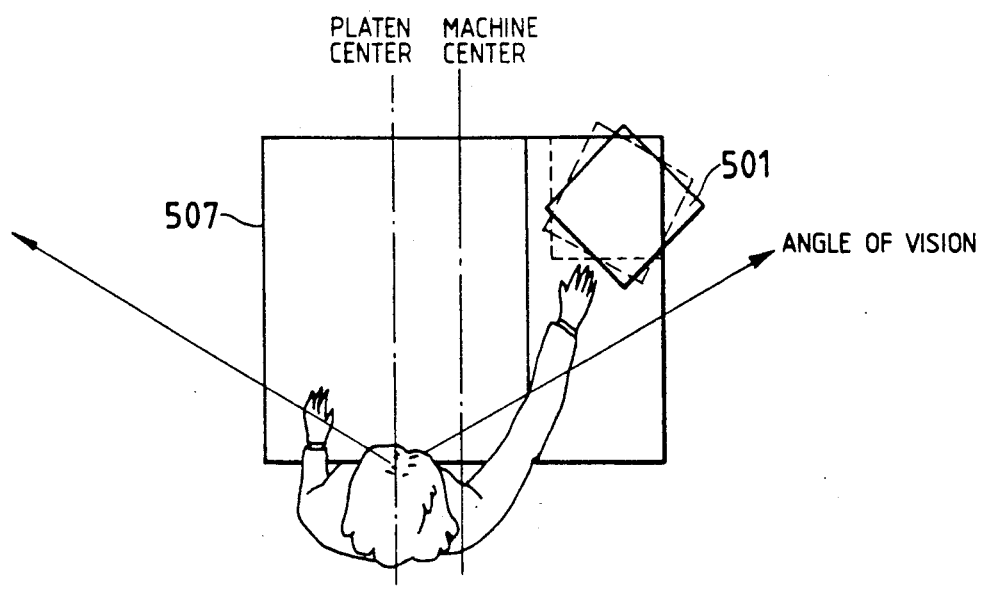
FIGS. 20(a) and 20(b) illustrate some examples for the setting of the angle and height for the installation of the UI.

Moreover, the color display unit 501 and the hardware control panel 502 are installed not directly on the base machine 507 (i.e. the main unit of the copying machine) but on the supporting arm 508 set up on the base machine 507. The adoption of a color display unit 501 thus mounted on a stand, without the adoption of a console panel as in practice with the conventional copying machines, makes it possible to install the color display unit in a position above the base machine 507 in a three-dimensional arrangement as illustrated in FIG. 19(a), and, therefore, by arranging the color display unit 501 in the right innermost position above the base machine 507 as illustrated in FIG. 20(a), it is possible to design a copying machine without giving consideration to the console panel, which in turn makes it possible to design such an equipment in a compact size.

Figure 20B:
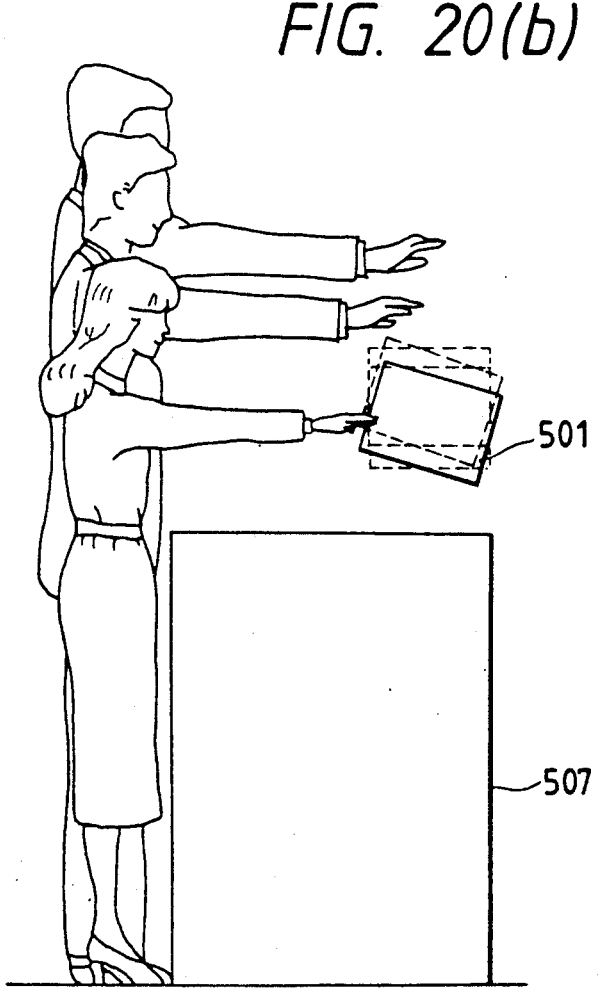

In a copying machine, the height of the platen, which in effect corresponds to the height of the equipment, is designed to measure up to the height of the operator's waist, which is quite convenient for setting the original sheets, and this height places limitations on the height of the equipment. The conventional console panels are installed in the uppermost position of copying machines and they are consequently positioned almost at the height of the operator's waist and thus in the neighborhood of the hands, which permits easy access to the panel for performing operations thereon, but this means that the operating panel section, which is to be used for the selection of the functions and the setting of the executing conditions, and the display section are positioned in a place at a distance quite remote from the eyes. In this respect, the user interface for this invention is installed in a position higher than that of the platen, i.e. at a level significantly closer to the height of the eyes, as shown in FIG. 20(b), and this arrangement offers greater ease in looking at the display and also provides greater ease in operation since its position is not at a lower level but in the forward direction as viewed by the operator. In addition, the height set for the installation of the display unit at a level close to the height of the eyes makes it possible to utilize the space below the display unit effectively as a space for the installation of such optional kits as the control board, the memory card device, and the key counter. Therefore, this design approach renders it unnecessary to make any structural change for the installation of a memory card device, and thus it is possible to install a memory card device as an additional item without making any change in the external appearance of the equipment, and, at the same time, it is possible to set the position and height for the installation of the display unit in such a way as to ensure ease in viewing. Moreover, it goes without saying that the display unit may be installed rigidly at a prescribed angle, but may also be set in a construction adopted to permit the changes in the setting angle of the unit.

(B) System Configuration

Figure 21:
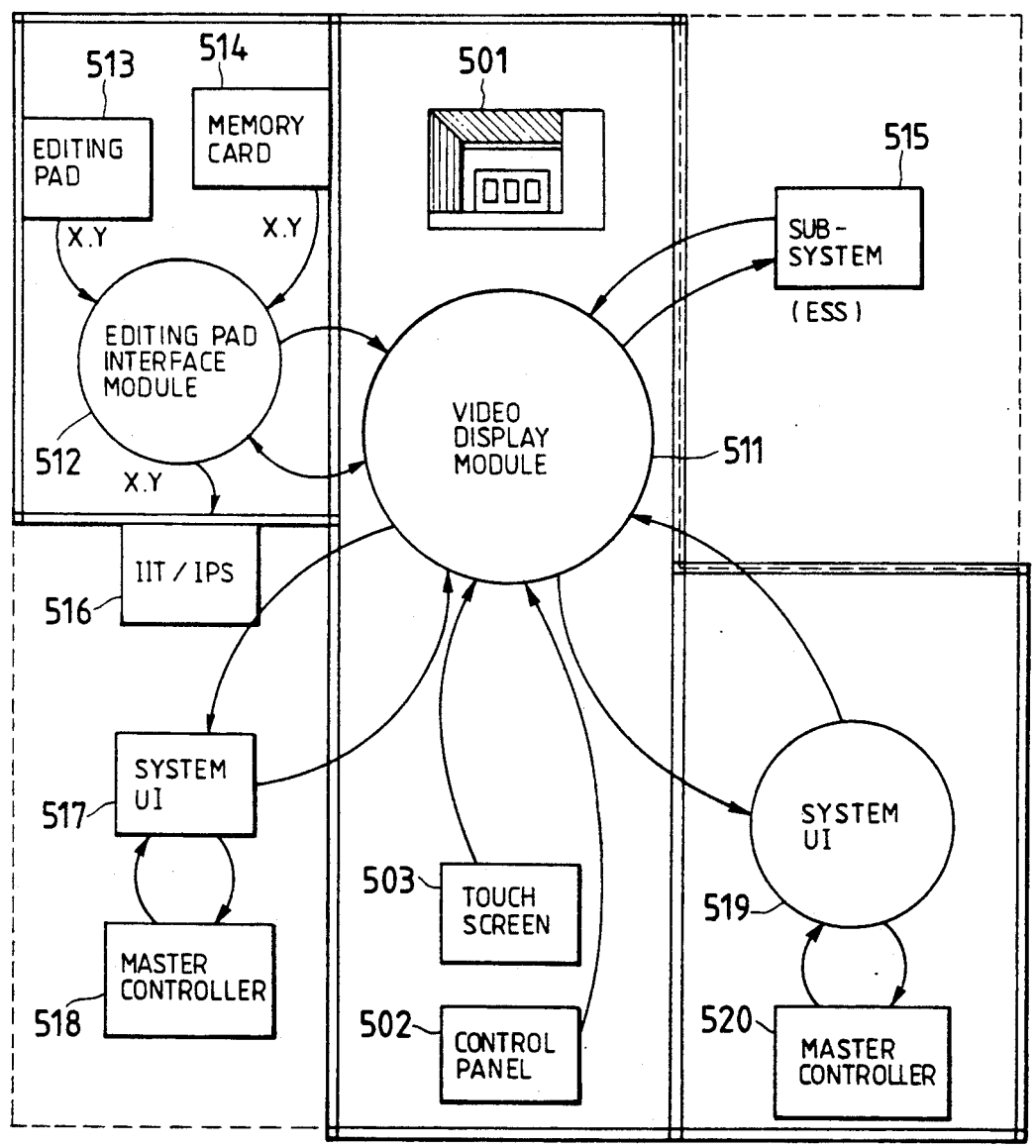
FIG. 21 illustrates the module construction of the UI.
Figure 29:
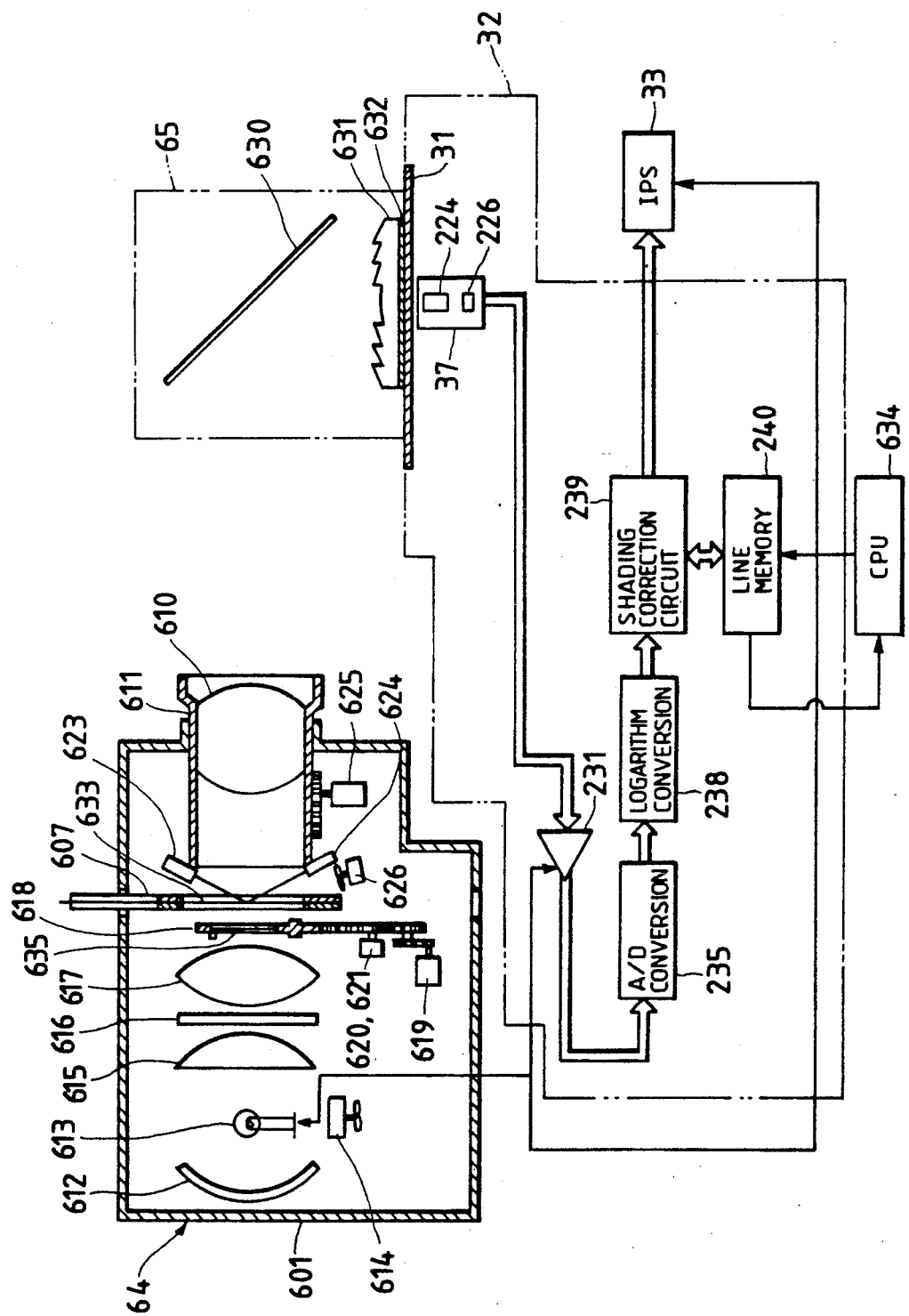
FIG. 29 illustrates the configuration of the F/P in outline and also the relations among the F/P, the M/U and the IIT.

FIG. 21 is a chart illustrating the module construction of the user interface, and FIG. 29 is a chart illustrating the hardware construction of the user interface.

The construction of the modules for the user interface of this copying machine is composed of the video display module 511, which controls the image screens put on display on the color display unit 501, and the editing pad interface module 512, which performs the processing of the input and output for the the editing pad 513 and the memory card 514, and the systems UI 517 and UI 519, the sub-system 515, the touch screen 503, and the control panel 502, which perform control over these modules and pads, are connected to the video display module 511, as shown in FIG. 21.

The editing pad interface module 512 accepts the input of the coordinates, X and Y, from the editing pad 513 and also the input of the jobs and the coordinates, X and Y, from the memory card 514, and it also transmits the video map display information to the video display module 511 and exchanges the UI control signals with the video display module 511.

By the way, the processes for specifying the areas for processing consist of the marker specification, which delimits the area for processing with markers in red or in blue for performing the trimming process or the conversion of color, the two-point specification of the area for processing, which consists in delimiting a rectangular area by the coordinates, and a closed loop specification, which is executed by tracing the demarcation of the area for processing on the editing pad. However, in contrast to the fact that the marker specification has no data in particular and that the two-point specification of the area has a small amount of data, the closed loop specification requires a large amount of data for the area to be processed for editing. This editing process of the data is performed in the IPS unit, but the amount of the data is too large for any transmission thereof at a high speed. Therefore, the system is so constructed as to use an exclusive-use transmission line, separate from the ordinary data transmission line, for the transmission of the data on the coordinates, X and Y, to the IIT/IPS 516.

The video screen module 511 recognizes the button ID data with reference to the input points as input for the vertical side and the horizontal side of the touch screen 503 (i.e. the positions of the coordinates on the touch screen) and inputs the button ID data for the control panel 502. Then, this module 511 transmits the button ID data to the systems UI 517 and UI 519 and receives the demand for display from the systems UI 517 and the UI 519. Moreover, the sub-system (ESS) 515 is connected, for example, to work stations and the host CPU, and thus it is the printer controller when this copying machine is used as a laser printer. In such a case, the information generated with the touch screen 503, the control panel 502, and the keyboard (not illustrated in the Figure) is transmitted as it is to the sub-system 515, and the contents on the display screen are transmitted from the sub-system 515 to the video display module 511.

The systems UI 517 and UI 519 transmit and receive the information on the copying modes and the states of the machine with the master controllers 518 and 520. As viewed in correspondence to FIG. 4 mentioned earlier, one of these systems UI 517 and UI 519 is the SYS UI module 81 for the SYS remote unit while the other of these is the MCB UI module 86 in the MCB remote unit illustrated in FIG. 4.

Figure 22:
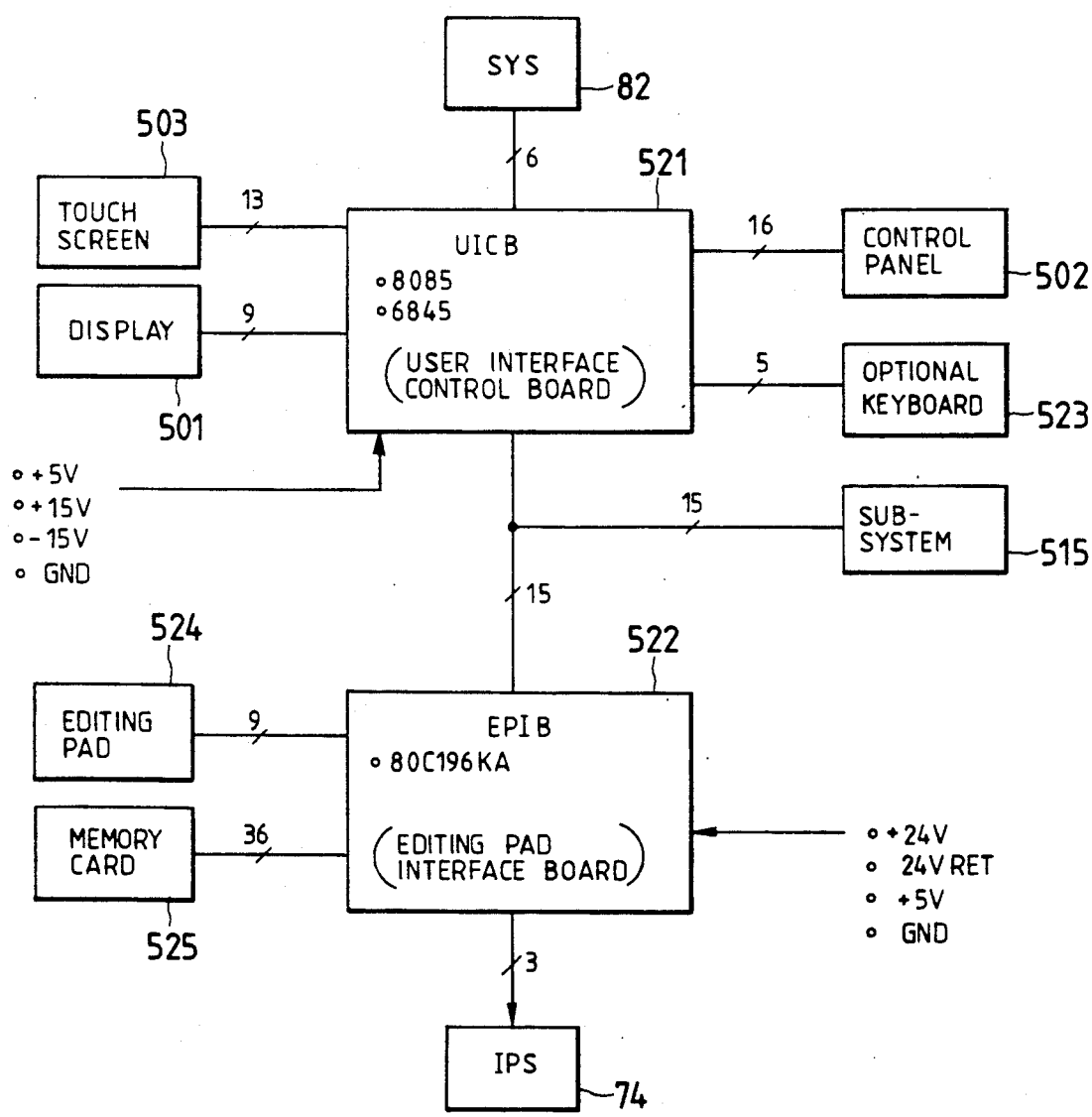
FIG. 22 illustrates the hardware construction of the UI.

The user interface for this invention, as hardware, is composed of two control boards, which are UICB 521 and EPIB 522, as shown in FIG. 22, and, in correspondence to the construction of the modules mentioned above, also the functions are divided into two major groups. And the UICB 521 is mounted with two CPU's (for example, a CPU equivalent to 8085 by Intel Corp. and a CPU equivalent to 6845 by the same corporation) for controlling the hardware of the UI and for driving the editing pad 513 and the memory card 514, and also for processing the input from the touch screen 503 and writing the input data on the CRT unit, and the EPIB 522 is mounted with a 16-bit CPU (for example, 80C196KA by Intel Corp.), because an 8-bit CPU is not sufficient for performing the functions for drawing picture images on the bit map area, and the system is constructed in such a way that the data on the images drawn in the bit map area are transmitted by the DMA to the UICB 521. Thus, this design of the user interface construction has been adopted in an effort to divide the functions.

Figure 23:
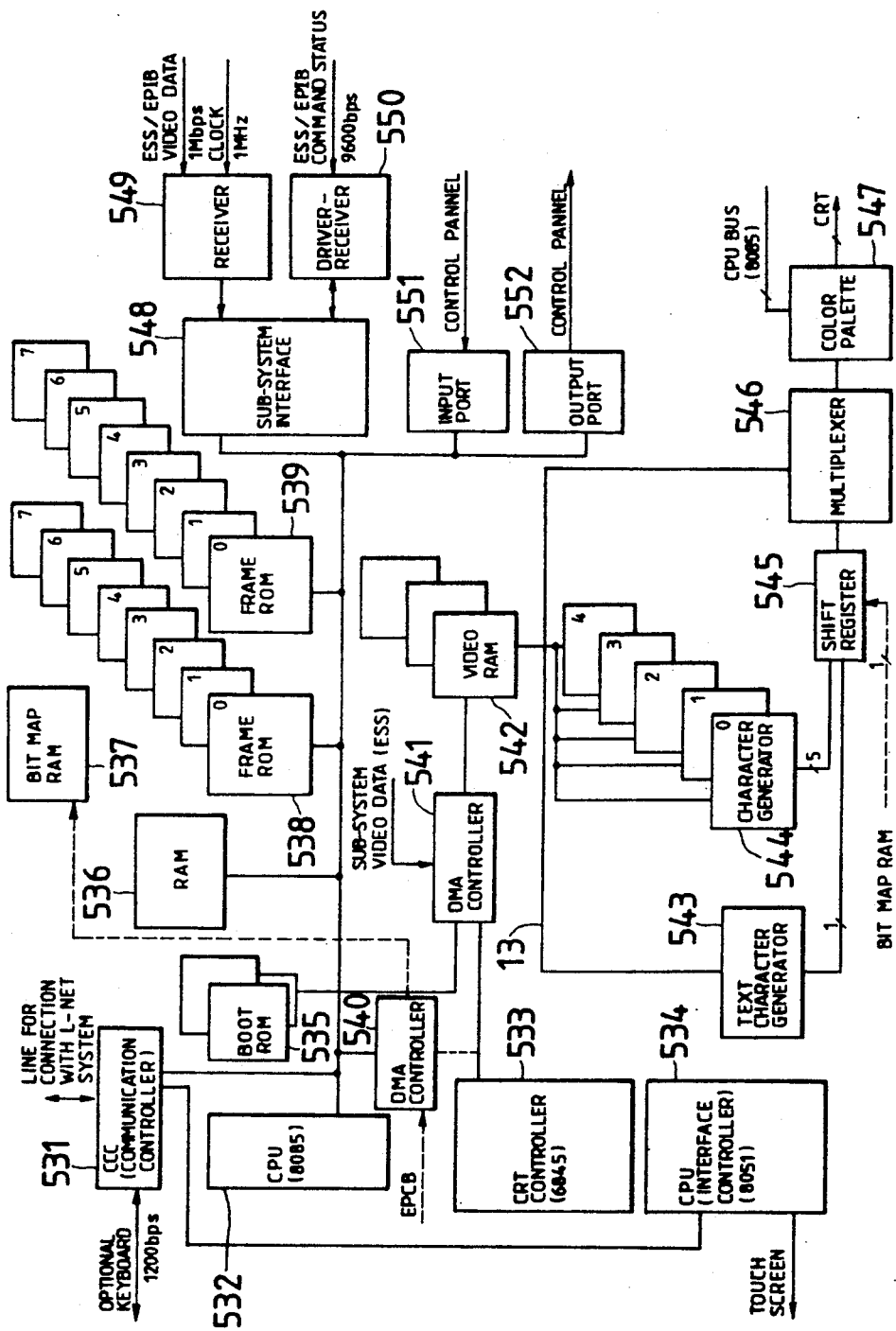
FIG. 23 illustrates the configuration of the UICB.

FIG. 23 is a chart illustrating the construction of the UICB. In the UICB, the CPU 534 (for example, a CPU equivalent to 8051 by Intel Corp.) is provided in addition to the CPU's mentioned above, and, with CCC 531 being connected to the data communication lines, such as the high-speed communication line L-NET and the optional keyboard, the CPU 534 and the CCC 531 together control the communications, and the CPU 534 is employed also for the driving of the touch screen The signals generated on the touch screen, as they are, i.e. in the form of the information on the positions of the coordinates on the screen, are taken into the CPU 532 from the CPU 534 through the CCC 531, so that the signals are processed by the CPU 532 for the recognition of the button ID data. Moreover, the UCIB is connected to the control panel through the input port 551 and the output port 552, and the UCIB is also designed to be capable of performing the transmission and reception of commands and the status information at the rate of 9,600 bps, receiving the video data at 1M bps, together with the clock signal at 1M Hz, from the EPIB 522 and the sub-system (ESS) through the sub-system interface 548, the receiver 549, and the driver 550.

As regards memory devices, the UICB is provided with the frame ROM's 538 and 539, the RAM 536, the bit map RAM 537, and the V-RAM 542 in addition to the boot RAM 535, which accommodates the boot strap. The frame ROM's 538 and 539 is a memory which stores the data for the display screen not in any bit map but in a data structure which allows easy handling by software, and, when a demand for display comes transmitted through the L-NET, image drawing data are first generated here by the CPU 532 using the RAM 536 as the work area, and the data are written in the V-RAM 542 by DMA 541. Also, the bit map data are transmitted and written in the bit map RAM 537 from the EPIB 522 by the DMA 540. The character generator 544 is for use for the graphic tiles, and the text character generator 543 are for use for character tiles. The VRAM 542 is controlled with reference to the tile codes, which are composed of 24 bits (three bytes), 13 bits being used for the information on the kinds of tiles, two bits for the information for making distinction among texts, graphics, and bit maps, one bit for the blinking information, five bits for the information on the colors of the tiles, and three bits for the information on the background or the fore-ground, respectively. The CRT controller 533 develops the display screen on the basis of the tile code information written in the VRAM 542 and transmits the video data to the CRT through the shift register 545, the multiplexer 546, and the color palette 547. The drawing of images in the bit map area can be changed over by the shift register 545.

Figure 24:
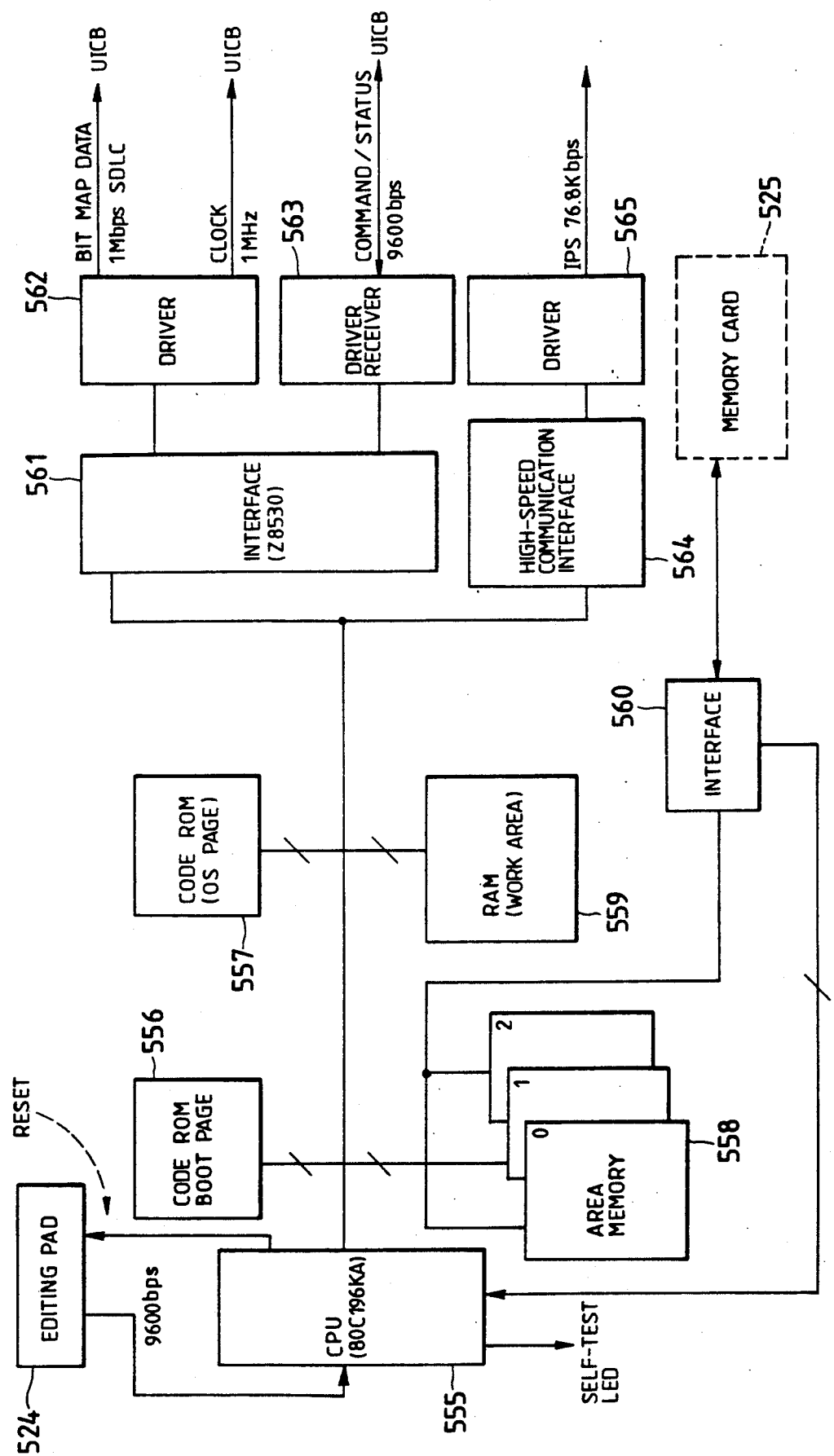
FIG. 24 illustrates the configuration of the EPIB.

FIG. 24 is a chart illustrating the construction of the EPIB. The EPIB is provided with a 16-bit CPU 555 (which is an equivalent, for example, to 80C196KA by Intel Corp.), the boot page code ROM 556, the OS page code ROM 557, the area memory 558, and the RAM 559, which is to be used as the work area. And, the EPIB performs the transmission of the bit map data to the UICB, as well as the transmission of the commands and the status information to the UICB and the reception of the same therefrom, through the interface 561, the driver 562, and the driver/receiver 563 and also performs the transmission of the data on the coordinates, X and Y, to the IPS through the high-speed communication interface 564 and the driver 565. In this regard, the reading and writing operations in relation to the memory card 525 are performed through the interface 560. Therefore, when any editing area specifying information for a closed loop or any copy mode information is input from the editing pad 524 or the memory card 525, these pieces of information are respectively transmitted as appropriate from time to time to the UICB through the interface 561 and the driver 562 and to the IPS through the high-speed communication interface 564 and the driver 565.

(C) Construction of Display Screen

Also in the adoption of a display unit for a user interface, the offer of information matching the integration of multiple functions will necessarily indicate a proportionately larger amount of information, for which it is estimated in simple perception that a more extensive display area should be necessary and that it is, in some respect, made difficult to deal adequately with the needs for a display in a compact area. If a display unit in a compact size is employed, it will be difficult to present all the necessary information on one screen, not merely because of the problems associated with the density of display, but also from the viewpoint of offering a display screen easy to view and intelligible to the operator.

For the user interface according to this invention, a display unit in a compact size is employed and yet contrivances have been made for the display on its screen and for its control within the framework of the unit. Particularly, through effective utilization of the merit that a color display unit, as compared with the LED's and liquid crystal indicators used in console panels, are capable of adopting a rich variety of displaying modes with the control of hues, luminance, and other displaying attributes, various contrivances have been put into the system in order to display the information in an easily understandable manner in spite of the compact size of the display unit.

For example, contrivances have been made to compose the display screens in a concise form by classifying the information to be displayed on the screen into major categories for their respective display on a plural number of screens and also, with a single screen taken as the unit, presenting the minimum of the necessary information on the primary screen with the details of information relegated to the pop-up type displays. And, with the screens which represent a plural number of information items thereon, contrivances have been made to develop characteristic features in the color indications and characteristic features in the emphatic indications so as to make it possible easily to recognize and to distinguish the necessary information on each screen.

(a) Screen layout

Figure 25A:
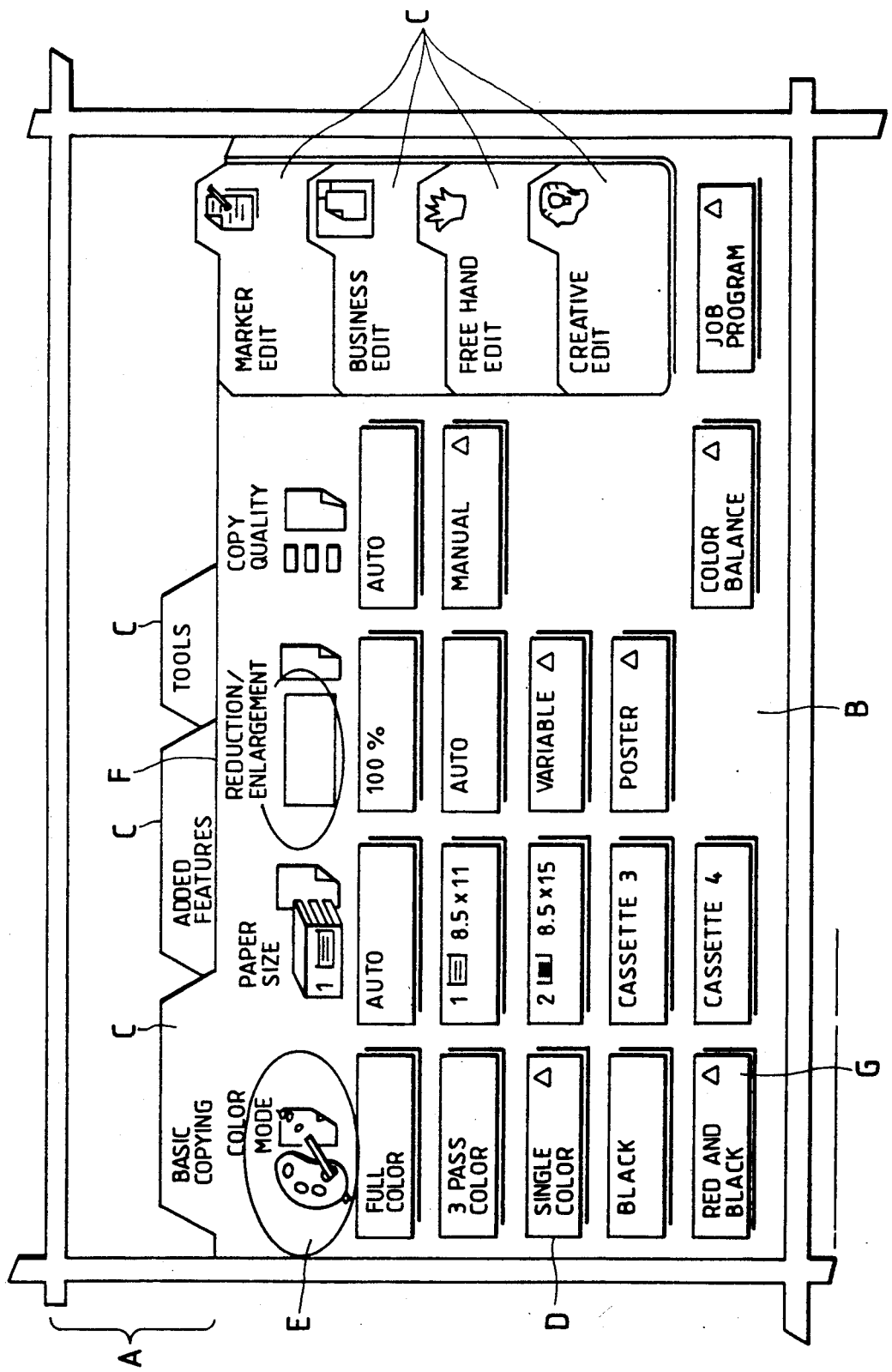
FIGS. 25(a) through 25(c) illustrate an example for the composition of the display screen.
Figure 25B:
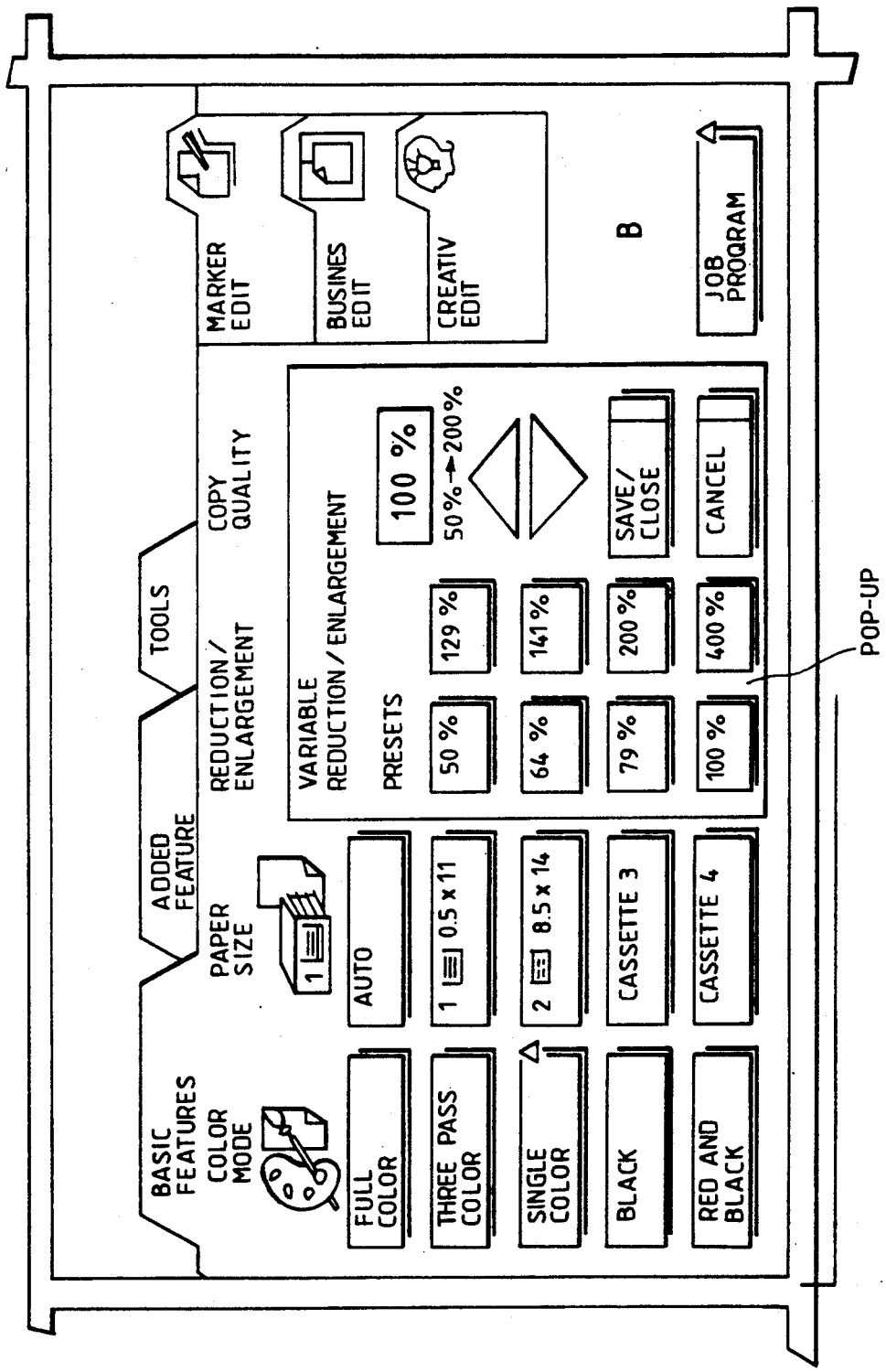
Figure 25C:
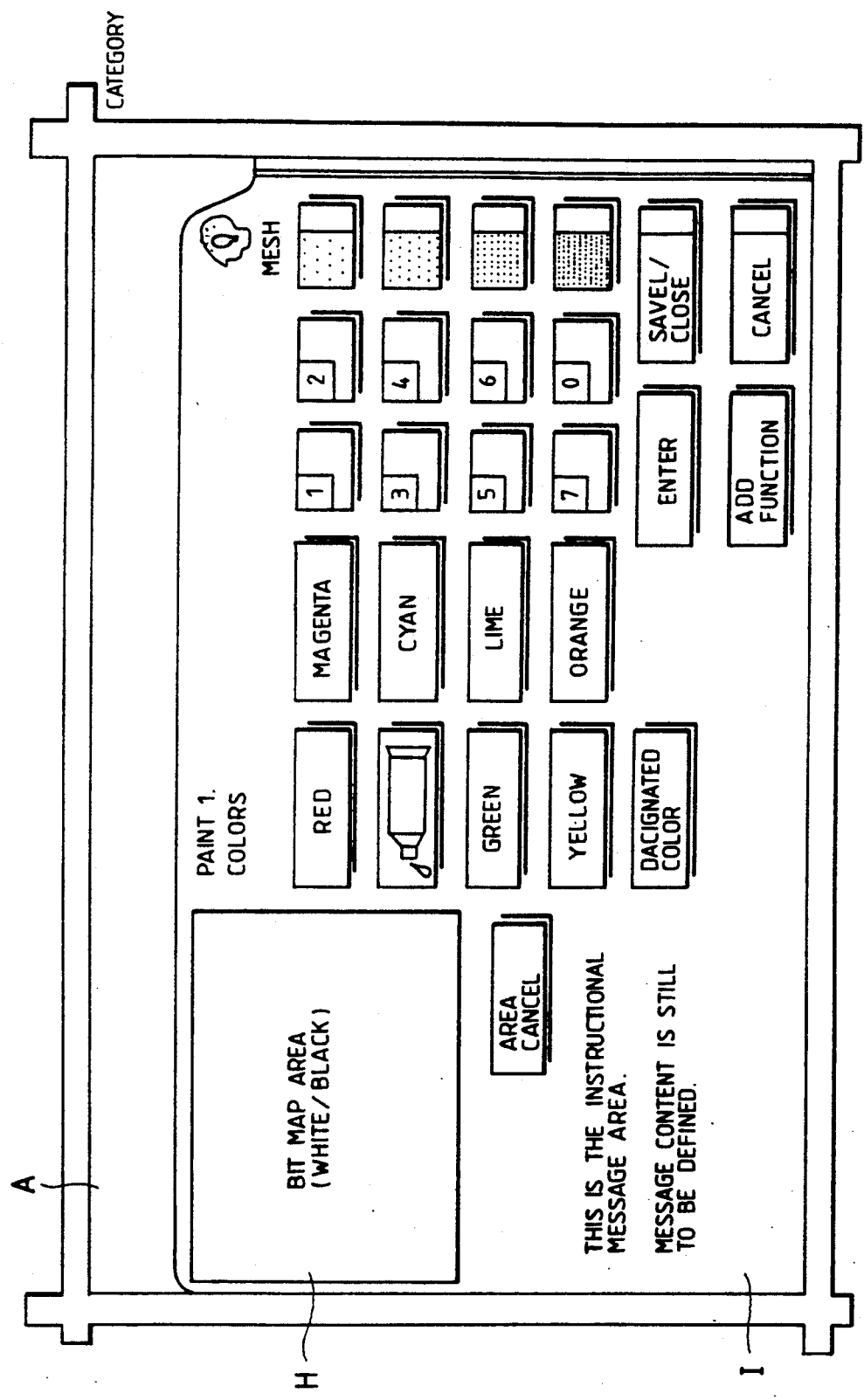

FIGS. 25(a-c) are charts illustrating an example of the composition of the screen on the display unit, and FIG. 25(a) is a chart showing the composition of the basic copying screen while FIG. 25(b) is a chart showing an example of the pop-up screens put on display on the basic copying screen, and then FIG. 25(c) is a chart showing the composition of the screen for Paint 1 for the creative editing process.

In the user interface for this invention, the basic copying mode screen shown in FIGS. 25(a-c), which is used for setting the copying modes, is put on display as the initial menu screen. The screen for setting the copying modes forms a "soft" control panel, which is a screen divided into two parts, i.e. between the message area A and the pathway B, as shown in FIGS. 25(a-c).

The message area A occupies the area equivalent to three lines in the uppermost area on the screen, the first line being used for the state message and the second line and the third line forming an area for use for guiding messages in case there is any contradiction in the selection of the functions, for use for messages concerning any abnormal state of the equipment, and for use for messages representing warning information, and the prescribed messages are put on display in this area. Moreover, the right-hand margin of the message area A is assigned to the area for indicating the number of sheets, and here the set number of sheets to be copies as input with the ten keys and the number of copies being produced are indicated.

The pathway B constitutes the area where selection is to be made of various kinds of functions, and it has the pathways of basic copying, aided features, marker editing, business editing, free-hand editing, creative editing, and tools, and, in correspondence with each of these individual pathways, the pathway tabs C are put on display. Additionally, each of the pathways is provided with pop-up menus for improving the operating ease and efficiency. In the pathway B, the system puts on display the "soft" button D, which forms a list of branched choices, with which selection is to be made of the functions by touching on the appropriate button, the icon E (picture), which changes, depending on the selected function, and represents the specific function, the indicator F, which indicates the reduction/enlargement ratio, and so forth. Those functions which are shown on the pop-up menus by operations on the "soft" buttons are indicated by the pop-up mark G Δ. And, by touching on the pathway tab C, the pathway can be opened, and the functions of the particular pathway can be selected by touching on the soft button. The selection of functions by touches on the soft buttons is so designed in consideration of its operating efficiency that the operation are to be performed from the upper left part of the screen towards the lower right-hand side thereof in regular steps.

As mentioned above, the display system features the division between the basic copying screen and the rest of the screens in order to provide the maximum compatibility with the other models of equipment and the maximum compatibility with the hardware console panel, and the editing screen, moreover, is designed to have a hierarchical structure composed of a plural number of levels so as to offer screens and functions in a manner suitable for the operator's skill level. Furthermore, this system offers a set of screens enabling the operator to use the functions with ease in a highly variegated way with the advantage of the pop-up representation of high-level functions and complicated functions among those presented on a given single screen through the combination of the screen composition as described so far and the pop-up functions.

The pop-ups contain detailed information for the setting of particular functions, and the composition for the screen for each pathway is made easy to observe and simple by providing the pop-up opening function and by having the detailed function-setting information as required from time to time. The pop-up menu is opened when a soft button with a pop-up mark thereon is touched. And, the pop-up menu is closed, for instance, when a close button or a cancel button is selected, or when the all clear button is pushed, or when the all-clear operation is put into action by the auto-clear function. It is FIG. 25(b) that shows the appearance of the screen where a pop-up is opened by a touch on the soft button for variable magnification in the reduction/enlargement function.

When the pathway tab for creative editing is touched upon in the basic copying screen, the screen for the pathway for creative editing appears by a shift of the screen on display, and it is FIG. 25(c) that illustrates the screen for Paint 1 in that particular pathway. On this screen, there are the bit map area H and the inductive message area I. The bit map area H occupies the upper left-hand part of the screen, and this area is designed to produce its indication of the bit map in black and white when the editing area is specified, for example, on the editing pad. In addition, the inductive message area I uses the lower left-hand part of the screen, and the message performs the function of inducing or guiding the user in correspondence to the editing job, and it changes in accordance with the particular job being performed. On the screen, the area excluding these areas, i.e. the bit map area H, the inductive message area I, and the message area A in the upper region of the screen, is used as the work area.

(b) Basic copying screen

The pathway for the basic copying function is provided with soft buttons (i.e. branched choices) for the selection of the individual functions for the color mode, paper selection, reduction and enlargement, copy quality, color balance, and job program, as illustrated in FIG. 25(a), and is also provided with the individual pathway tabs for marker editing, business editing, free-hand editing, and creative editing, as well as aided features and tools. These pathways are the initial-phase pathways, which are put on display, for example, after the power-on operation or after turning on the all-clear button, or when the auto-clear button is turned on.

The color mode is provided with the branched choices of full-color copying (four path color) for copying in the four kinds of color, Y, M, C, and K, three path color for copying with toners in the three kinds of color excluding K, single-color copying, which offers the choice of one color out of 12 colors, black, and black/red, and the default choice, which is selected automatically, is designed to permit its voluntary setting. Here, as the choices for black/red has detailed items to be set, those items are developed on the pop-up menu.

The selection of paper offers the four choices of automatic paper selection (APS), trays 1 and 2, and cassettes 3 and 4, and the APS works when a specific magnification is set for reduction or enlargement, but does not work when the automatic magnification system (AMS) remains set. The default setting is for the APS.

The reduction and enlargement function permits the choices of 100% reproduction, the AMS, which is to be used for setting the magnification for copying on the basis of the paper size and the original sheet size when the paper size is selected, and the voluntarily chosen magnification, and puts the set magnification, the computed magnification, or the automatic setting on display on the indicator in the top area of the equipment. For the variable magnifications, this system permits the setting of magnification by one percent in the range from 50% to 400% and also permits the setting of the vertical magnification and the horizontal magnification independently of each other (differential magnification). Therefore, the detailed setting items for these are developed on the pop-up menu. Moreover, the default magnification setting is 100%.

As mentioned earlier, this reduction and enlargement process is performed by changing the scanning speed for the subsidiary scanning direction (i.e. in the X-axis direction) and through reduction or enlargement in the main scanning direction (i.e. in the Y-axis direction) by a change in the manner of reading the signals out of the line memory for the IPS.

The copy quality function offers the choices of the automatic processes by which the system performs density control for original sheets in black and white and performs automatic color balancing for color original sheets and the manual processes by which the system permits the operator to perform density control in seven steps with the pop-up menu, and the IPS performs control over these processes.

The color balancing function enables the operator to specify the color to be reduced on the copy out of Y, M, C, B, G, and R by operations with the pop-up menu, and the IPS performs control over the process.

The job programming function offers branched choices that work effectively only while a memory card remains inserted in the slot of the reading device thereof, and, in this mode, it is possible to select the reading of the job data from the memory card, as well as the writing of such data to the memory card, by operations on the pop-up menu. As for the memory card, this system uses, for example, a memory card with the memory capacity of 32k bytes, with which the system is capable of performing the programming of all the jobs except for those in the film projector mode.

(c) Aided feature screen

The pathway for the aided features is provided with soft buttons (i.e. branched choices) for the selection of the individual functions for copy output, copy sharpness, copy contrast, copy position, film projector, page programming, job programming, and binding margins, and it is also provided with the pathway tabs for marker editing, business editing, free-hand editing, creative editing, and, in addition, basic copying and tools.

The copy output pathway offers the branched choices between the output of the copied paper to the top tray and the output of such paper in the sorting mode. The default choice is the output to the top tray, and, in case the sorter is not installed, this item is not put on display.

The copy sharpness pathway provides the branches choices of the standard sharpness, the manual copy sharpness control offering the functions for control in seven steps with operations on the pop-up menu, the processing of letters (characters), the print processing, the processing of photographs classified into photographs/characters, with operations on the pop-up menu, and the IPS performs control over these processes. The default choice can be set arbitrarily.

The copy contrast pathway offers the choices of control over copy contrast in seven steps. The copying position function provides the default choice of the automatic centering function, which positions the center of the copied image in the center of the paper.

The film projector pathway offers the mode for taking copies from various types of film as described under a separate item and permits access to the branched choices of 35 mm negatives or 35 mm positives by the projector and the 35 mm negatives, 6 cm×6 cm slides, or 4"×5" slides on the platen, with operations on the pop-up menu.

The page programming pathway gives access to the branched choices of the covering function, which puts cover on the copies, the inserting function, which inserts white paper or color paper between copies, the color mode, which sets the color mode for each page of the original sheets, the tray selecting function, by which the tray can be selected for each page of the original sheet. In this regard, this item will not be put on display unless the ADF is installed.

The binding margin pathway makes it possible to specify the binding margin by 1 mm in the range from 0 to 30 mm, and the margin can be set only in one position for one original sheet. The amount of the binding margin is the amount of space from the top edge of the paper to the top edge of the image area, and the main scanning direction is set by the shifting operations by means of the line buffer in the IPS and by a lag in the scanning timing of the IIT in the subsidiary scanning direction.

(d) Editing screen and tool screen

The editing screens are offered through the four pathways, which are marker editing, business editing, free-hand editing, and creative editing.

The marker editing pathway and the free-hand editing pathway provide the branched choices of the various individual functions relating to the extraction, deletion, color application (mesh/line/solid), and color change, and further have the pathway tabs for basic copying, aided feature, and tools.

The business editing pathway provides the branched choices of the individual functions relating to extraction, deletion, color application (mesh/line/solid), color change, color painting, logogram insertion, and binding margin, and has the pathway tabs for basic copying, aided features, and tools, in the same way as the marker editing pathway, etc.

The creative editing pathway offers the branched choices of the individual functions relating to extraction, deletion, color application (mesh/line/solid), color change, color painting, logogram insertion, binding margin, negative-positive reversal, image-setting synthesis, openwork synthesis, painting, mirror image formation, repeating, enlargement and continuous copying, partial shifting, corner/center shifting, manual-/automatic variable magnification, manual/automatic differential magnification, color mode, color balance control, continuous page copying, and chromatic synthesis and furthermore has the pathway tabs for basic copying, aided features, and tools, as is the case with the marker editing pathway, etc.

The tool pathway can be opened to the key operator and the customer engineer by inputting the verifying cipher numbers, and this pathway permits access to the branched choices of the various individual functions for the auditron, the setting up of the initial values for the machine, the selection of the default choices for the individual functions, the registration of colors, the registration of the film types, the film adjustments of the registered choices, the presetting of the various kinds of branched choices for the machine, the setting of the scanning area for the film projector, the control of the audio tone (the type of tone and the sound volume), and the setting of the timer for the paper transport system and the various kinds of other timers (those for the automatic clearing function, etc.), the setting of the billing meter and the dual languages, the diagram mode, the maximum value adjustment, and the formatting of the memory card.

The selection of the default choices is applied to the color mode, the selection of paper, the copying density, the copy sharpness, the copying contrast, the paper tray for the page programming process, the color for the single color process, the colors on the palette and the mesh for the application of color, the patterns of the logotypes, the amount of the binding margin, and the balance of colors.

(e) Other screen controls

The user interface performs constant monitoring on the status of execution of the copying operations and, in the event of the occurrence of any jamming, the interface puts on display a screen matching the particular type of jamming. Moreover, for the setting of the functions, the user interface provide an information screen corresponding to the screen currently put on display, the information screen being kept in a state ready for display as appropriate.

For the display on the screen, moreover, the system employs a tile indication measuring 3 mm (8 pixels) in width and 6 mm (16 pixels) in height, to the exclusion of the bit map area, and this indicating area contains 80 tiles in its width and 25 tiles in its height. The bit map area is displayed with 151 pixels on its vertical side and with 216 pixels on its lateral side.

In the user interface for this invention as described so far, it is designed to change over the screens on display for each of the categories of modes, such as basic copying, aided features, and editing, and to permit the specification of the branched choices and the input of the data for the executing conditions by touching operations on the soft buttons, with the menus for the selection of the functions and the setting of the executing conditions put on display in each of the modes. In addition, depending on the types and nature of branched choices on the menu, the system provides the pop-up displays for the items indicating their details by pop-up displays (overlapping displays or window displays) in an effort to achieve the repletion of the contents offered on the display. As the result of these features, the display screen can be presented in a neat and well-organized form, which makes it possible to achieve greater ease and higher efficiency in operation, even though there may be many functions available for selection and many conditions for setting.

(D) Hardware Control Panel

The hardware control panel is installed on the right side of the color display unit, at such an angle as positions the panel more in the direction looking towards the center than the display screen, as illustrated in FIG. 20. This control panel is mounted with the individual buttons for the operations for the ten keys, ten-key clear, all clear, stop, interrupt, start, information, auditron, and language.

The ten-key buttons are to be used for the setting of the number of copies, the input of codes in the diagram mode and the input of data, and the input of verifying cipher numbers for the use of the tools, and these buttons are rendered inoperative during the generation of a job or while a job remains interrupted.

The all-clear button is to be used for restoring all the copying modes set in operation to the default states and for restoring the operating process to the basic copying screen except in the duration when the tool screen remains open, and, although the copying mode is restored to the default state while any interrupting job is set, the interrupting mode is not canceled.

The stop button is to be used for suspending the job at a break of copies in the course of the execution of the job and it is used also for stopping the machine after the copy paper is discharged from the machine. Moreover, this button is used in the diagram mode to stop (to suspend) the operation for checking the input and output.

The interrupting button is to be used to set the system into the interrupting mode in the course of the execution of the primary job, except for the duration of any job suspension, and to restore the operation to the primary job while any interrupting work is being performed. Also, if this button is pushed while the primary job is being executed, the system will assume the reserve status, breaking off the job or finishing the job to enter into the interrupting job in the break between the discharges of copied paper.

The start button is to be used for starting a job and for re-starting the job after its suspension, and, in the diagram mode, this button is to be used for inputting and saving the code values and the data values and also for starting the input operation, the output operation, and so forth. If this button is operated in the course of pre-heating, the machine will make its automatic start upon the completion of the pre-heating process.

The information button is composed of the ON-button and the OFF-button, which are in the state ready to accept operations thereof except in the process of execution of the copying job. When the ON-button is pushed, the system indicates the information screen for the screen being put on display at this moment, and the OFF-button is used to retract the information screen.

The auditron button is the one which is operated for the input of the verifying cipher numbers at the time when a job is to be started.

The language button is the one which is operated for the time when the language on the screen on display is to be changed to another. Therefore, the system is designed to have data in a plural number of languages for each screen put on display, so that they may be selected voluntarily.

Furthermore, in addition to the individual buttons mentioned above, the hardware control panel is also provided with LED (Light Emitting Diode) lamps as appropriate in order to indicate the operating conditions of the buttons.

(II-5) Film Image Reading Device

(A) Schematic Construction of Film Image Reading Device

As shown in FIG. 2, the film image reading device is composed of a film projector (F/P) 64 and the mirror unit (M/U) 65.

(A-1) Construction of F/P

Figure 26:
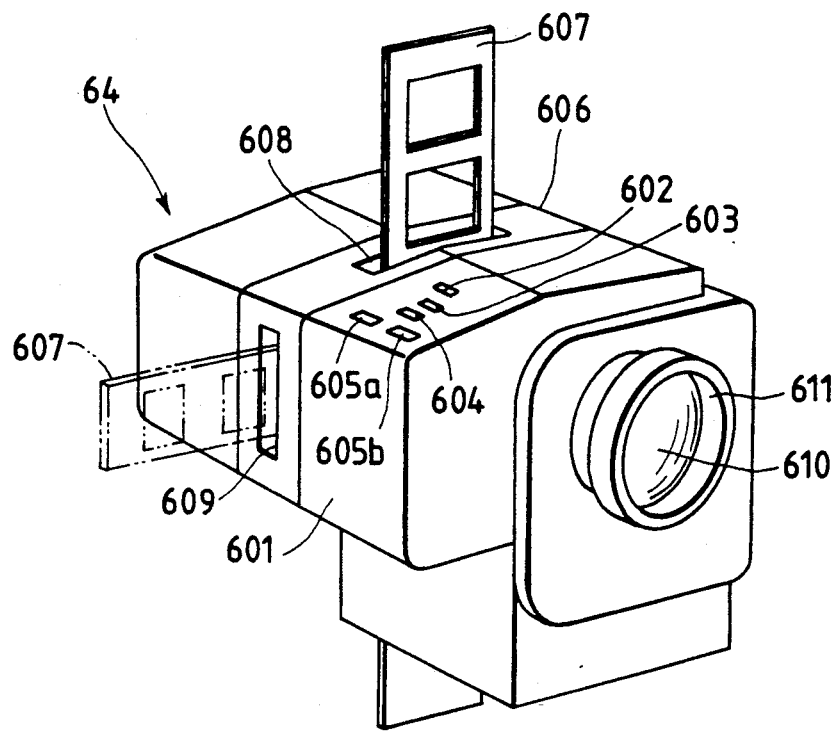
FIG. 26 is a perspective view of the F/P.

As shown in FIG. 26, the F/P 64 is provided with a housing 601, and this housing 601 is provided with the operation monitoring lamp 602, the manual lamp switch 603, the automatic focusing/manual focusing changeover switch (AF/MF changeover switch) 604, and the manual focusing operation switches (M/F operation switches) 605a and 605b. Moreover, the housing 601 is provided with an opening and closing section 606 which can be opened and closed voluntarily. Through the top surface area and side areas of this opening and closing section 606 are provided penetrating holes 608 and 609 respectively in a size large enough for accepting the film-holding case 607 holding the film 633 for original sheet when it is inserted into the housing 601 in the vertical direction or the lateral direction, depending on the manner how the subject recorded on the film 633 for the original sheet is photographed. Through the side opposite to these holes 608 and 609, also a hole (not shown in any figure) through which the film-holding case 607 can come out is made. The opening and closing section 606 is either installed in the housing 601 with a double-acting spring hinge in such a manner as to permit its movement or is designed for its mounting in the housing 601 in such a way as to permit its free mounting and demounting. With the opening and closing section 606 constructed in such a way as to permit its free opening and closure, it is made possible easily to remove small extraneous matter which may find their way into the inside region of the housing 601 through the holes 608 and 609.

For this film-holding case 607, a case for the 35 mm negative film and another case for the 35 mm positive film are made available. Accordingly, the F/P 64 are designed to be suitable for these types of film. Moreover, the F/P 64 is designed also to be compatible with the 6 cm×6 cm negative film and 4 inch×5 inch negative film. In such a case, this negative film is held on the platen glass 31 to remain in close contact therewith between the M/U 65 and the platen glass 31.

As illustrated in FIG. 26, a projector lens holding member 611 for holding the projector lens 610 is supported on the right side area of the housing 601 in such a way as to permit its freedom of sliding movement.

Moreover, inside the housing 601, a light source lamp 613 composed of a reflector 612 and a halogen lamp, etc. is arranged on the same axis as the projector lens 610. In the proximity of the light source lamp 613, a cooling fan 614 for cooling this lamp 613 is installed.

Furthermore, to the right of the lamp 613, a aspherical lens 615, which is used for the convergence of the rays from this lamp 613, a heat ray absorbing filter 616, which cuts off the rays in the prescribed wavelength, and a convex lens 617 are arranged respectively on the same axis as the projector lens 610.

To the right of the convex lens 617 is provided a correcting filter automatic exchanger provided with each of a correcting filter holding member 618, which, for example, supports a correcting filter 635 for adjusting the film density of 35 mm negative film and positive film (the correcting filter for one of these types of film is shown in the figure), a driving motor 619 for this correcting filter holding member 618, the first and the second position detecting sensor 620 and 621, which detect the rotating position of the correcting filter holding member 618, and the controlling unit, which controls the driving motor 619 (which is provided in the F/P 64 but not shown in the figure). And, this correcting filter automatic exchanger makes automatic selection of the correcting filter 635 matching the film 633 for the original sheet, out of the correcting filters 635 supported on the correcting filter holding member 618, and sets the filter in its properly aligned use position on the same axis with the individual lenses, such as the projector lens 610. The correcting filter 635 for this correcting filter automatic exchanger can be positioned at any point, for example between the platen glass 31 and the imaging unit 37, so long as it is on the axis of rays for the projected light.

Furthermore, the F/P 64 is equipped with an automatic focusing device provided with a light emitter 623 for the automatic focusing sensor and a photo receptor 624, which work in interlocking with the projector lens holding member 611, and a sliding motion driving motor 625, which turns the projector lens holding member 611 for the projector lens 610 in its sliding motion in relation to the housing 601. When the film-holding case 607 is inserted into the inside region of the housing 601 through the hole 608 or the hole 609, the film 633 for the original sheet, which is supported with this film-holding case 607, is so arranged as to be be set in its position between the correcting filter holding member 618 on one hand and the light emitter 623 and the photo receptor 624 on the other. In the neighborhood of the setting position for the film 635 for the original sheet, a film cooling fan for 626 is provided for its operation for cooling this film 633 for the original sheet.

This F/P 64 is provided with a power source separate from that for the base machine 30, but the power source for the former is housed in the base machine 30.

(A-2) Construction of M/U

Figure 27:
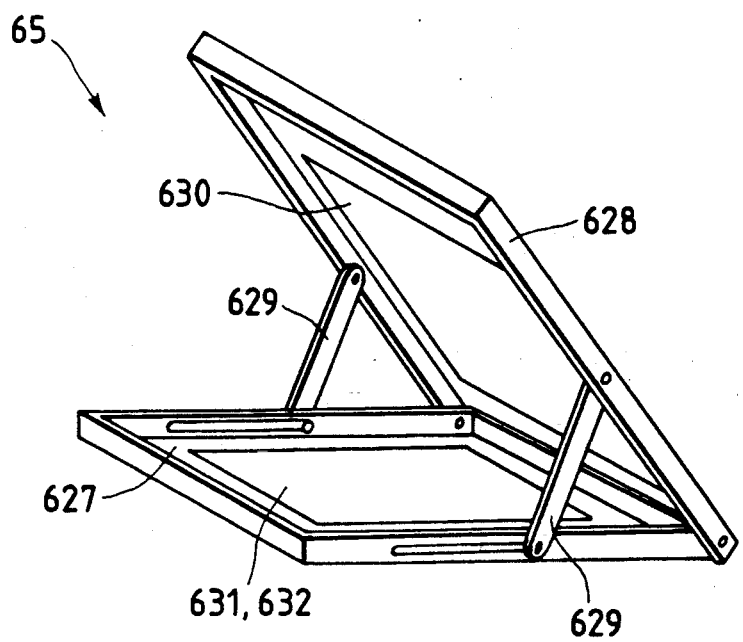
FIG. 27 is a perspective view of the M/U.

As illustrated in FIG. 27, the mirror unit 65 is provided with a base plate 627 and a cover 628 one end of which is installed on this base plate 627 in such a way as to permit the free rotating motion of the cover. Between the base plate 627 and the cover 628 are rigidly fitted a pair of supporting blocks 629 and 629, and these supporting blocks 629 and 629 are so constructed that they support the cover 628 in such a way as to keep the angle formed by this cover 628 and the base plate 627 at 45° when the cover 628 is opened to the maximum.

On the back side of the cover 628 is provided the mirror 630. Also on the base plate 627, a large opening is formed, and a Fresnel lens 631 and a diffusion plate 632 are provided in such a manner that they cover this opening.

As shown in FIG. 27, this Fresnel lens 631 and the diffusion plate 632 are made of one acrylic resin plate. On the surface of this acrylic resin plate, the Fresnel lens 631 is formed while the diffusion plate 632 is formed on the back side of the plate. The Fresnel lens 631 has the function of preventing the peripheral region of the image from getting dark since the lens is reflected by the mirror 631 so that the projecting light tending to undergo its diffusion is turned into parallel rays. The diffusion plate 632, moreover, performs the function of causing an infinitesimal diffusion of the parallel rays, so that the line sensor 226 will not be able to detect the shadow formed of the selfoc lens 224 inside the imaging unit 37 by the parallel rays from the Fresnel lens 631.

This mirror unit 65 is folded and stored in the prescribed storing position while the color copying process with F/P 64 is not performed. And, when the mirror unit 65 is to be used, it is opened and placed in its prescribed position on the platen glass 31 of the base machine 30.

(B) Principal Functions of Film Image Reading Device

The film image reading device has the principal functions described below.

(B-1) Correcting Filter Automatic Change Function

The halogen lamp which is commonly used as the light source lamp 613 in the F/P 64 generally has the spectroscopic characteristics marked by the fact that the light emitted therefrom contains much red (R) but a small amount of blue (B). Therefore, when the film is projected with this lamp 613, the ratios of red (R), green (G), and blue (B) in the projected light are susceptible to the influence by the spectroscopic characteristics of the lamp 613. For this reason, it is necessary to make correction of the spectroscopic characteristics of the projected light when the film is projected with a halogen lamp.

In the meanwhile, there are many types of film used for the recording of picture images as it is seen not merely in the fact that there are such types as negative film and positive film, but also in the fact that there are several types in the negative film itself or in the positive film itself. These types of film are respectively different in their spectroscopic characteristics. For example, negative film is colored in orange, which produces a high transmissivity of R while it gives a lo transmissivity of B. For this reason, it is necessary, in the projection of negative film, to make an adjustment of the spectroscopic characteristics of the projected light in such a way that the amount of light for B is augmented.

In the F/P 64, therefore, correcting filters are provided for correcting the spectroscopic characteristics of the projected light with a feature like this.

The F/P 64 is designed to be capable of automatically changing these correcting filters. The change of the correcting filters is performed by the correcting filter automatic change device, as mentioned above. That is to say, the microprocessor (the CPU) in the system (SYS) remote unit outputs a 2-bit command signal for setting the correcting filter in proper correspondence to the film 633 for the original sheet in the position for use, and the control device, then, drives and controls the driving motor 619 in such a way that the 2-bit signals from the first and the second position detecting sensors 620 and 621 come into agreement with the signal output from the CPU. Then, when the signals from the sensors 620 and 621 come into agreement with the signal from the CPU, the control device makes the motor 619 to stop. When the motor 619 has stopped, the correcting filter suitable for the film for the original sheet is automatically set in the position for its use.

Therefore, the correcting filters can be changed from one to another in a simple and accurate way.

(B-2) Function for Detecting the Inserting Direction of Film for Original Sheet

The original sheet film 633 can be inserted through either of the inserting holes 608 and 609 made in the opening and closing section 606. In specific terms, the system is so designed that the film 633 for the original can be installed in its position by moving it in either of the two directions, i.e. the longitudinal direction and the horizontal direction, in correspondence to the manner how the subject is photographed. In that case, at least either one of the inserting holes 608 and 609 is provided with a film detecting switch. That is to say, at least one film detecting switch is provided thereto. And, in case a film detecting switch is provided on the side of the hole 609, but not on the side of the hole 609, the detecting switch is turned on, generating a detection signal, when the switch has detected the film holding case 607 as inserted through the hole 608 When this detection signal is generated, the area necessary for the line sensor 226 is set in the vertical direction, i.e. in such a way as to set the direction of the subsidiary scanning in the direction longitudinal to the projected image. Moreover, when the film holding case 607 is inserted through the hole 609, the ON/OFF signals from the film detecting switch are set in such a way that the area necessary for the line sensor 206 is set with the main scanning direction set in the direction longitudinal to the projected image.

(B-3) Automatic Focusing Function (AF Function)

For the installation of the film holding case 607 in the F/P 64, a degree of precision on the order of several tens of mm is required of the mounting position for the film 633 for the original sheet. For this reason, it is necessary to make a proper adjustment of the focus after the film 633 for the original sheet is installed. When this focus adjustment is to be performed by manual operation, it is necessary to find the proper focus by sliding the projector lens holding member 611 through observation of the projected image formed by projecting the image of the film 633 for the original sheet upon the diffusing plate 632 in the M/U 65 as set in the prescribed position on the platen glass 31. In such a case, it is very difficult to make any accurate adjustment of the focus because the image projected on the diffusing plate 632 is extremely hard to see.

Therefore, the F/P 64 has been designed to be capable of making an automatic adjustment of the focus when the film 633 for the original is mounted on the F/P 64.

This AF function is performed by the AF device mentioned above in the manner described in the following.

The light emitter 623 emits light when the keys on the display for the U/I 136 are operated to set the system in the F/P mode, and also the AF device is put into a operatable state when the AF/MF changeover switch of the F/P 64 is set for the selection of the AF, as shown in FIG. 26. When the film case 607 containing the original sheet film 633 is set on the F/P 64, as shown in FIG. 29, the light emitted from the light emitter 623 will be reflected by this film 633 for the original, and the reflected light is detected, for example, by the two-element type light receptor 624 for the AF.

Then, each of the two elements in the light receptor 624 outputs to the CPU 634 signals in size proportionate to the amount of the reflected light which they have respectively detected. The CPU 634 finds the difference between these signals by performing arithmetic operations, and it generates an output signal, when the result of such arithmetic operations is anything other than zero, thereby driving the motor 625 in the direction in which the difference between the signals from the two elements will be reduced. Consequently, as the projector lens holding member 611 moves in sliding motion, both the light emitter 623 and the light receptor 624 also move in interlocking with the member. And, when the difference between the output signals from the two elements is reduced to zero, the CPU 634 stops the motor 625. It is at the time when the motor 625 stops that a properly focused state has been attained.

The AF operation is performed in this way. Owing to this function, it is rendered unnecessary to perform the adjustment of the focus by manual operation every time the film case containing the film for the original sheet is set in the F/P 64. It follows from this that this function not only saves the labor and the time, but also makes it possible to prevent the occurrence of failures due to a deviation from the proper focus.

(B-4) Manual Focusing Function (MF Function)

With the AF/MF changeover switch 604 turned to MF, the lamp 613 is automatically turned ON for the prescribed duration of time, when it is possible to perform the adjustment of the focus by manual operation. The MF (Manual Focusing) operation is to be performed with the operating switches 605a and 605b, which are pushed while the operator observes the image of the film for the original sheet as projected on the diffusing plate 632 in the mirror unit 65. With this MF operation, it will be possible to bring a particular part of the film image into proper focus.

(B-5) Manual Lighting Function for Light Source Lamp

This function makes it possible to turn on the lamp 613 unconditionally when the manual lamp switch 603 is pushed. Although this switch is not used ordinarily, it is used when back-lighting is to be applied to copying made of an image recorded on a relatively thick material, or when the image is viewed for a long duration of time in the course of the AF operation, or when it is to be checked whether or not the lamp has been burned off.

(B-6) Magnification Automatic Changing Function and Scanning Area Automatic Changing Function The system is designed to perform the automatic setting of copying magnification when the paper size is set with the U/I 36. Moreover, the system is also designed to be capable of performing the automatic selection of the copying area suitable for the size of the film when the type of the film for the original sheet is selected with the U/I 36.

(B-7) Automatic Shading Correction Function

In the ROM of the CPU 634 are stored the density data on the orange masks at ASA 100 for the negative films by FUJI (registered trademark), KODAK (registered trademark), and KONICA (registered trademark), which in general are used frequently for photographing, and, when any of these films is selected, the CPU 634 is capable of making automatic shading correction on the basis of the density data stored in the memory of the CPU. In such as case, it is not necessary to set the base film for the particular one of these films in the F/P 64.

Therefore, not only is it possible to save the labor and the time for setting the base film, but also it is possible to prevent the setting of a wrong film by mistake, and this function also makes it unnecessary to perform any administration of the base films.

Furthermore, this system is designed to permit the registration of the density data on the orange mask of one type of film other than these three brands of film. It is designed to store these data in the RAM in the system. Also in the case of this registered film, the shading correction function is performed automatically in the same way as for the three brands of film mentioned earlier.

(B-8) Automatic Image Quality Control Function

This function is provided for automatically performming the density controlling process and the color balancing process with such corrections as the $\Gamma$ correction on the basis of the density characteristics of the film for the original sheet and the various conditions, such as the exposure condition at work at the time when the photographing work was done with the film.

(C) Image Signal Processing

(C-1) Necessity of Correction of Image Signals and Principle of Correction

Generally, the density range which the film has is wider than the density range of the original sheet. Again, the density range is different in various types of film as one finds even in the case of the same brand of film, which shows a wider range of density in the positive film than in the negative film. Furthermore, the density range in film depends upon the photographing conditions for the particular film for the original sheet, such as the amount of exposure of the film, the density of the subject photographed, and the brightness at the time of photographing. As a matter of fact, the density of the subject is distributed extensively within the density of the film.

Therefore, in case it is intended to copy the images recorded on the film in such a density range by means of a copying machine, which performs the copying process with reflected light, good reproducibility cannot be achieved so long as the same method of signal processing is employed. This system is therefore designed to obtain a good reproducibility by adequately correcting the read image signals in such a manner as to condition the density of the principal subject to a proper level.

Figure 28:
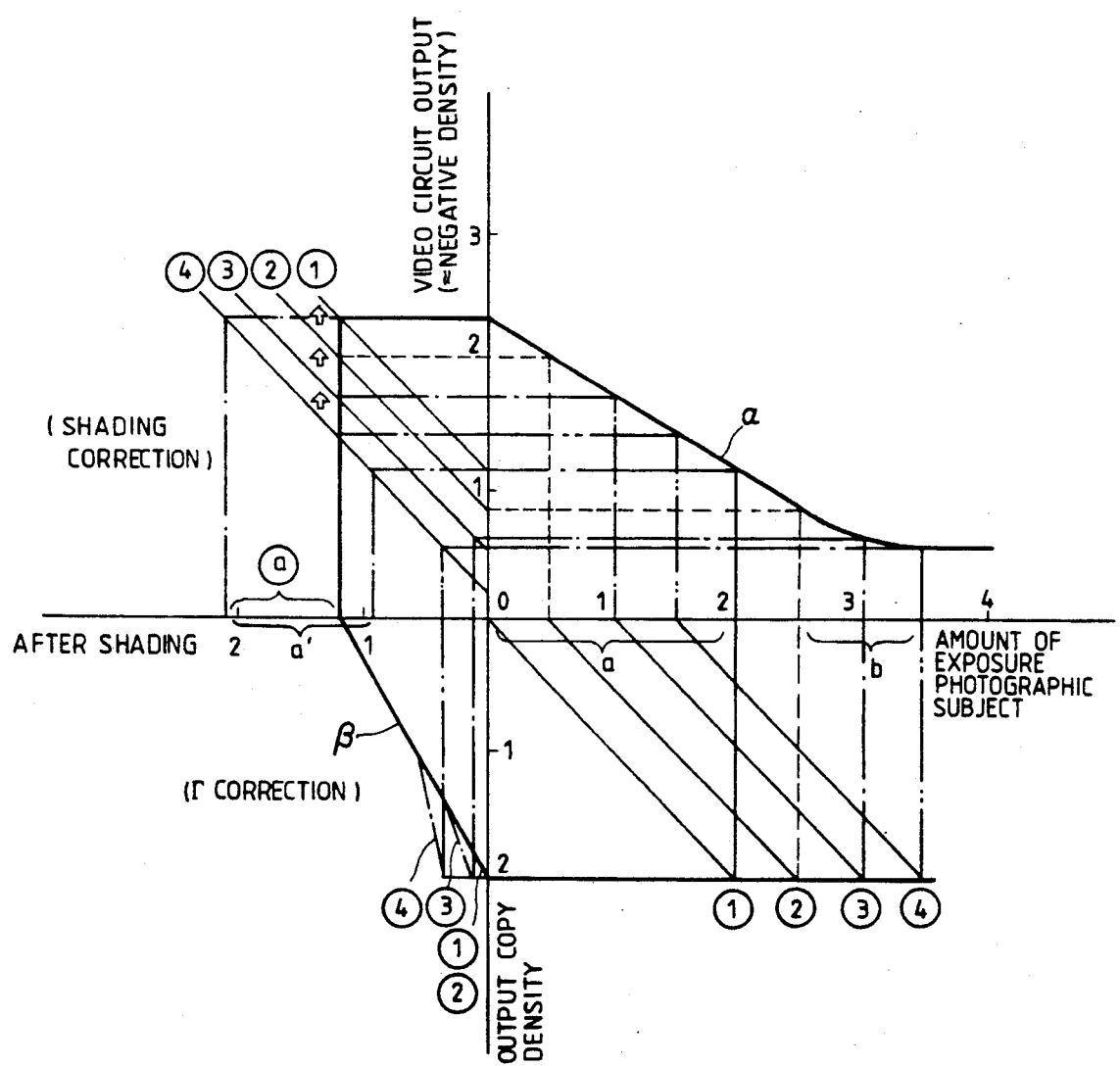
FIG. 28 explains the density characteristics and the principle of correction of a negative film.

FIG. 28 illustrates the density characteristics of a certain negative film and the principle of density correction. In this Figure, the horizontal axis in the right half area represents the amount of exposure given to the subject (which corresponds to the density of the subject) while the same axis in the left half area in the Figure represents the density after the shading correction. Moreover, the vertical axis in the upper half region represents the video circuit output (which is approximately equal to the density on the negative film) while the same axis in the lower half region represents the density on the output color copy. That is to say, the first quadrant expresses the density characteristics of the particular negative film, the second quadrant expresses the relationship of the shading correction, the third quadrant expresses the relationship of the $\Gamma$ correction, and the fourth quadrant expressed the relationship between the amount of exposure given to the subject and the density of the output copy, respectively.

The density characteristics of this negative film are indicated by the line $\alpha$ in the first quadrant of FIG. 28. Specifically, the density of the negative film is greater when the amount of exposure from the photographed subject is larger while the density of the negative film decreased linearly according as the amount of exposure from the photographed subject becomes smaller. When the amount of exposure from the photographed subject decreases to some extent, the linearity between the amount of exposure and the density of the negative film disappears. And now assume that the image recorded on the film is a bust of a human being, and if this amount of exposure is small, then the contrast between the face and the hair will not be maintained. Also, even when the amount of exposure is large, the copy will be in a soft tone unless the $\Gamma$ correction is made because the inclination of the line $\alpha$, i.e. the value of $\Gamma$, is smaller than 1.

In these circumstances, $\Gamma$ correction is necessary.

Next, the principle of correction is explained with reference to FIG. 28. In the third quadrant of the Figure, the END curve $\beta$ is set up for the $\Gamma$ correction. The inclination of the END curve $\beta$, which is expressed by $\Gamma'$, is set at $\Gamma'=1/\Gamma$, so that the relation between the amount of exposure from the photographed subject and the density of the output copy will be a linear relation at 45 degrees in the fourth quadrant.

For example, in the case of the area a where the amount of exposure from the photographed subject is relatively large, the density after the shading correction will be as indicated in the area a', provided that the density control value which is set in the register of the shading correction circuit is at the value expressed by the straight line (4) in the second quadrant. The inner are of this area a' will not be included in the conversion range marked by the END curve $\beta$, with the result that the entire part of this area will be rendered white on the copy. Therefore, the density control value is shifted from the straight line (4) to the straight line (1) in the second quadrant, and the density after the shading correction is thereby put into the conversion range of the END curve $\beta$. With this correction made in this manner, the relation between the amount of exposure from the photographed subject and the density of the output copy is made to be in accordance with the straight line (1) at 45 degrees in the fourth quadrant, and, owing to this correction, the copies can be produced with proper chromatic gradations.

Furthermore, the area b, which has a relatively small amount of exposure from the photographed subject, does not have any linearity in the relation between the amount of exposure from the photographed subject and the density of the negative film. In this case, the density control value for the shading correction circuit is set at the value of the straight line (4) in the second quadrant. Then, in the third quadrant, the END curve $\beta$, which is expressed by the line (4), is selected. By selecting this END curve $\beta$, it is possible to make the amount of exposure from the photographed subject and the density of the output copy to be as expressed by the straight line (4) at 45 degrees as shown in the fourth quadrant. For example, assume that a person with black hair is wearing a brown hat, the correction just described will prevent the rendition of the hair and the hat in almost the same density, so that it will become possible to produce a clear contrast between the hair and the hat.

Thus, correction is made so that the density of the photographed subject may be adjusted to an adequate level.

(C-2) Image Signal Processing Method

As shown in FIG. 29, the line sensor 226 reads in analog signals the projected light of the image on the film 633 for the original sheet in terms of the amount of light for R, G, and B, and these signals expressed in terms of the amount of light are amplified to the prescribed level by means of the amplifier 231. The image signals so amplified are converted into digital signals and further converted from light signals into density signals by the logarithmic converter 238.

The image signals expressed in terms of density are then processed for their shading correction by the shading correction circuit 239. This shading correction removes from the image signals the lack of uniformity in the amount of light through the selfoc lens 224, the lack of uniformity in the sensitivity of the individual picture elements in the line sensor 226, the lack of uniformity in the respective spectroscopic characteristics and the light amount level of the correcting filters and the lamp 613, or the components due to the influence of the chronological changes.

Prior to the performance of this shading correction, the correcting filter will first be set for a filter for a positive film is one of the three brands of film or the registered film is selected as the film for the original sheet, and the system reads the signals on the amount of light from the lamp 613 in the state without the film 633 for the original sheet set in position and amplifies the signals and converts them into digital signals, then converting the signals further into density signals, which the system uses as the basis for developing the data which it stores in the line memory 240 as the standard data. In specific terms, the system performs sampling operation with 32-line step scanning on the imaging unit 37 for each picture element for R, G, and B and then transmits these sampling data to the CPU 634 through the line memory 240, and then the CUP 634 performs arithmetic operations to find the mean density value of the 32-line sampling data, thereby obtaining the shading data. It is designed to eliminate errors for each picture element by finding the mean value in this manner.

Furthermore, with the film for the original sheet set in position, the CPU 634 finds the density adjusting value $D_{ADj}$, at the time when it reads the image of the film for the original sheet, by arithmetic operations which it performs on the basis of the density data for the negative film as stored in memory in the ROM, thereafter rewriting the $D_{ADj}$ value set in the register of the LSI in the shading correction circuit 239. Moreover, the CPU 634 makes adjustments of the amount of light of the lamp 613 and the gain in the amplifier 643 in proper correspondence to the selected film.

And, the shading correction circuit 239 makes a shift in the read density value by adding the $D_{ADj}$ value to the actual data obtained by reading the film for the original sheet. In addition, the shading correction circuit 239 makes a shading correction by subtracting the shading data for each of the picture elements from the data derived by these adjustments.

Moreover, in the case of any film which is not kept in the memory in the ROM of the CPU 634 and is not registered in the RAM of the system, either, it is necessary to set the base film in place, to obtain the density data on the film, and to find the $D_{ADj}$ value by arithmetic operations based on the obtained density data.

When the shading correction is completed, the IIT 32 outputs the density signals on the R, G, and B to the IPS 33.

Then, the CPU 534 selects the END curve on the basis of the actual data on the film for the original sheet and outputs the correction signal in order to have the Γ correction performed on the basis of the selected curve. With this correction signal, the IPS 33 performs the Γ correction, correcting the obscure contrast resulting from the deviation of the [gamma] of the film for the original sheet from 1 and the nonlinearity characteristics.

(D) Timing of Operating Steps and Signals

Figure 30:
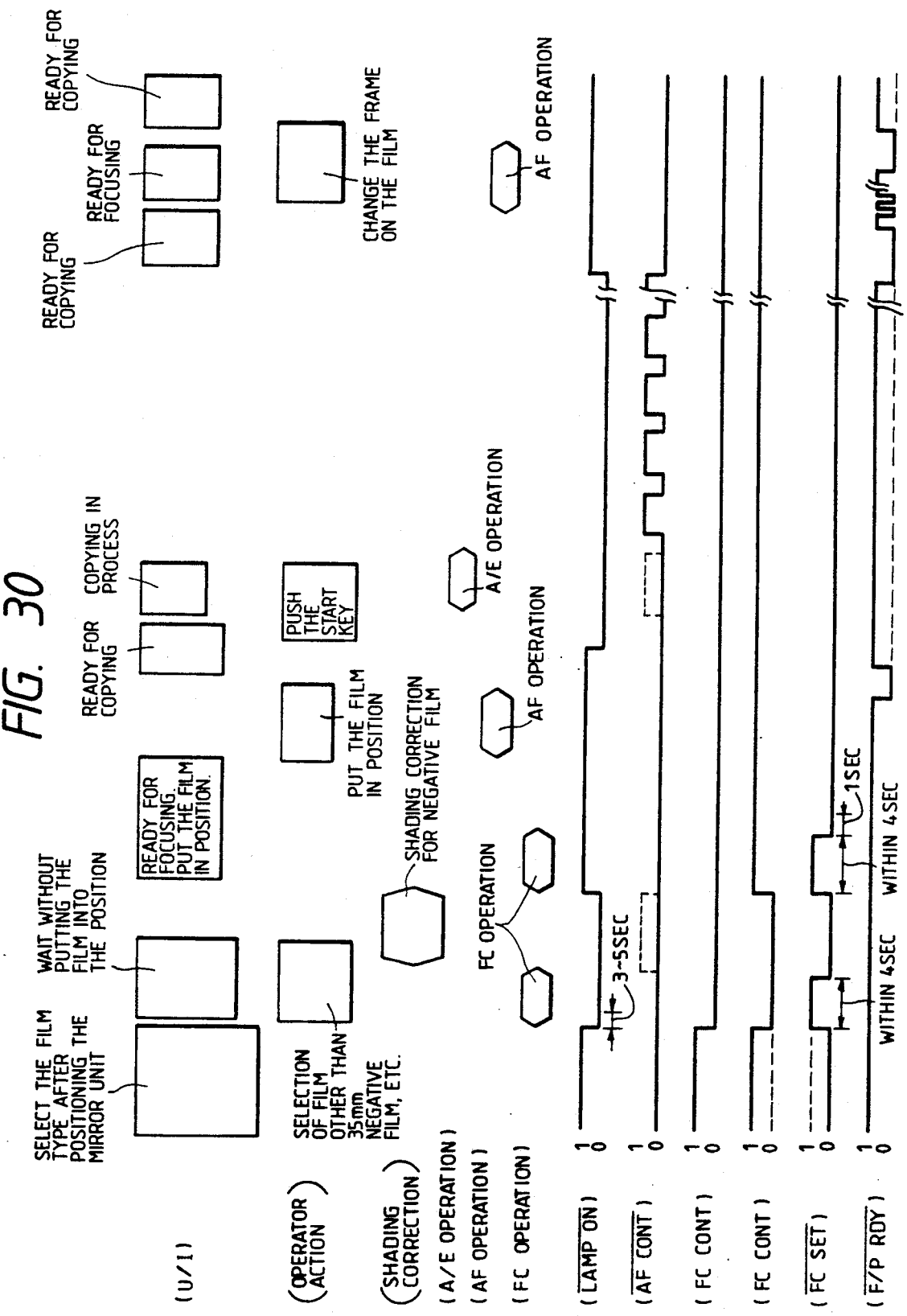
FIG. 30 explains the operating steps and the timing.

On the basis of FIG. 30, the timing of the operating steps and signals is described. In this regard, the broken line placed on a signal indicates that the signal can be used.

The operation of the F/P 64 is performed mainly on the U/I 36 for the base machine 30. That is to say, the base machine 30 is set in the F/P mode by operating the F/P operation key put on display on the screen of the display unit for the U/I 36. On the assumption that the film for the original sheet is one of the three brands of film mentioned above or the registered film, there appears a message reading "Put the mirror unit in place, and then select the type of film" on the screen of the display unit for the U/I 36, as illustrated in FIG. 30. Accordingly, the first step is to open the M/U 65 and to set it in the prescribed position on the platen glass 31.

Next, when the film selection key on the screen is pushed, the message, "Please wait without inserting the film," is put on display on the screen. At the same time, the lamp 613 is turned on, and also the correcting filter control (FC CONT) signals becomes (0, 0), and, with this, the FC operation is performed. In other words, the correcting filter automatic changing device is put into action, and the position correcting filter is set in the position for its operation. When the correcting filter is so set, the correcting filter change completion ($\overline{\text{FC SET}}$) signal becomes LOW.

With this change of the signal to LOW and also the elapse of three to five seconds after the lamp 613 is turned on working as the trigger, the collection of the shading data is started for the performance of the shading correction process. When this shading data collection is completed, and, with the completion of this process working as the trigger, the FC CONT becomes (0, 1), when the correcting filter automatic changing device goes into action and sets the film correcting filter in its operating position. Furthermore, with the shading correction working as the trigger, the message, "Focusing operation is ready to start. Please put the film," is shown on the screen, when the lamp 613 is turned off. Therefore, the film case 607 containing the film 633 for the original sheet therein should be installed in on the F/P 64. With this, the light from the light emitter 623 is reflected by this film, and the reflected light is detected by the photoreceptor 624.

In case the reflected light does not correspond to the finite difference of 0 in the amount of the received light between the two elements of the light receptor 624, the motor 625 for the AF device is put into action, and the focus is properly adjusted thereby. In other words, the AF operation is performed. Upon the completion of the focus-adjustment, the F/P operation completely ready ($\overline{\text{F/P RDY}}$) signal becomes LOW. After this ($\overline{\text{F/P RDY}}$) signal becomes LOW and after the elapse of one second after the FC SET signal becomes LOW, the message, "Copying Ready," is indicated on the screen. When the start key on the U/I 36 is pushed, the message, "Copying," is put on display on the screen and also the lamp 613 is turned on, and, after the passage of the building up time for the lamp 613, the collection of data for the automatic density adjustment (A/E) is started In other words, the imaging unit 37 performs one stroke of scanning operation and reads one part or all of the projected image, in order to obtain the data for its performance of the density adjustment, the color balance adjustment, and the Γ correction, and so forth Next, the copying job is performed, with the imaging unit 37 performing the scanning operation four times if for copying in full color. In such a case, the shading correction and the density adjustment are performed automatically on the basis of the shading data and the automatic density adjustment data. When the copying job is completed, the lamp 613 is turned off and, at the same time, the message, "Copying Ready," is put on display on the screen. Accordingly, a new copying job will be performed when the start key is pushed again. If it is desired to copy another image, the frame of the film is to be changed to another. When the film frame is changed to another, the $\overline{\text{F/P RDY}}$ signal becomes HIGH and also the message, "Focusing Ready," is displayed on the screen. Then, when a new frame of the film is set, the AF operation is performed, and, at the same time, the $\overline{\text{F/P RDY}}$ signal becomes LOW and also the message, "Copying Ready," is displayed on the screen. After that, a push on the start key puts the copying process into operation.

(III) IMAGE INPUT TERMINAL (IIT)

Now, a description is made of the preferred embodiment of this invention with reference to the Image Input Terminal (IIT) for a copying machine, which is taken as an example here.

(III-1) Driving Mechanism for Imaging Unit

Figure 31:
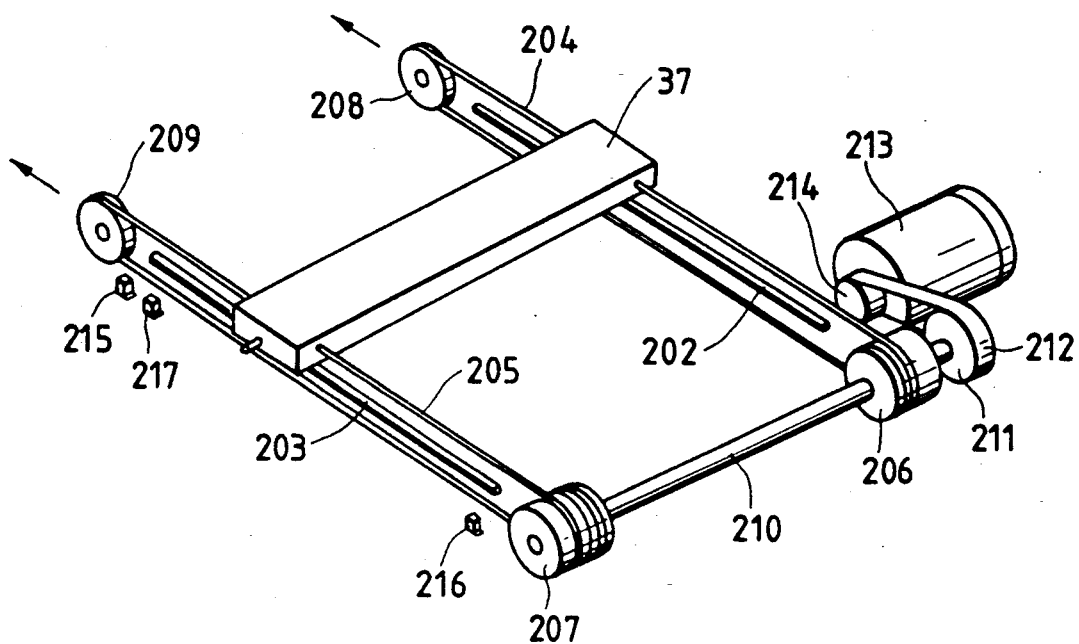
FIG. 31 is a perspective view of the driving mechanism for the imaging unit.

FIG. 31 shows a perspective view of the driving mechanism for the imaging unit, and the imaging unit 37 is installed, in a manner permitting its free movement, on two sliding shafts 202 and 203, and both ends of the imaging unit are fixed rigidly on the wires 204 and 205. These wires 204 and 205 are wound around the driving pulleys 206 and 207 and the tension pulleys 208 and 209, with tension being applied to the tension pulleys 208 and 209 in the direction indicated by the arrow mark in the Figure. On the driving shaft 210, on which the driving pulleys 206 and 207 are installed, is installed a speed reduction pulley, which is connected to the output shaft 214 of the stepping motor 213 by way of the timing belt 212. Moreover, the limit switches 215 and 216 are the sensors for detecting the abnormal operation of the imaging unit 37, and the registering sensor 217 is the sensor for setting the reference point for the starting position for the reading of the original sheet.

The reason for employing the stepping motor 213 for the driving of the imaging unit 37 is as mentioned below. In order to obtain one sheet of color copy in the four colors, R, G, B, and K, it is necessary for the imaging unit to repeat its scanning operation four times In such a case, it is a major task to develop a workable solution to the question how it can be made possible to reduce the deviation in synchronization and the deviation in positioning in the course of the four times of the scanning operation. To accomplish this objective, it is highly important to suppress the deviation of the imaging unit 37 from its stopping position, to inhibit the fluctuations in the duration of time for the arrival of the imaging unit 37 from its home position to its registering position, and to achieve reproducibility in the fluctuations in its scanning speed. However, the use of a DC servo motor will make it difficult to suppress the deviation in the stopping position of the imaging unit 37 and the fluctuation in the duration of time for the arrival of the imaging unit 37 from its home position to its registering position, and, for this reason, the stepping motor 213 is employed.

However, the stepping motor 213 generates larger vibrations and noises in comparison with the DC servo motor, and, in addition, the stepping motor is also liable to the vibrations which occur by the effect of such factors causing mechanical instability as the secular changes affecting the timing belt 212, the wire 204 and the wire 205 and the viscosity resistance between the sliding rails 202 and 203. Therefore, it is necessary to take appropriate measures in order to attain higher image quality and higher operating speed in image recording equipment.

Figure 32:
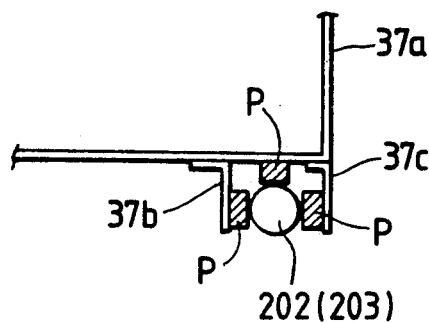
FIG. 32 is a sectional view of the principal parts of FIG. 31.

For this purpose, the preferred embodiment of this invention is provided with two sliding shafts 202 (203) set in parallel, and the vibrations of the imaging unit 37 in its main scanning direction are controlled by the effect of an oil-containing pad P set with an angle 37b and a plate spring 37c between the housing 37a and the sliding shafts 202 (203) in the imaging unit, as illustrated in FIG. 32.

(III-2) Control System for Stepping Motor

Figure 33A:
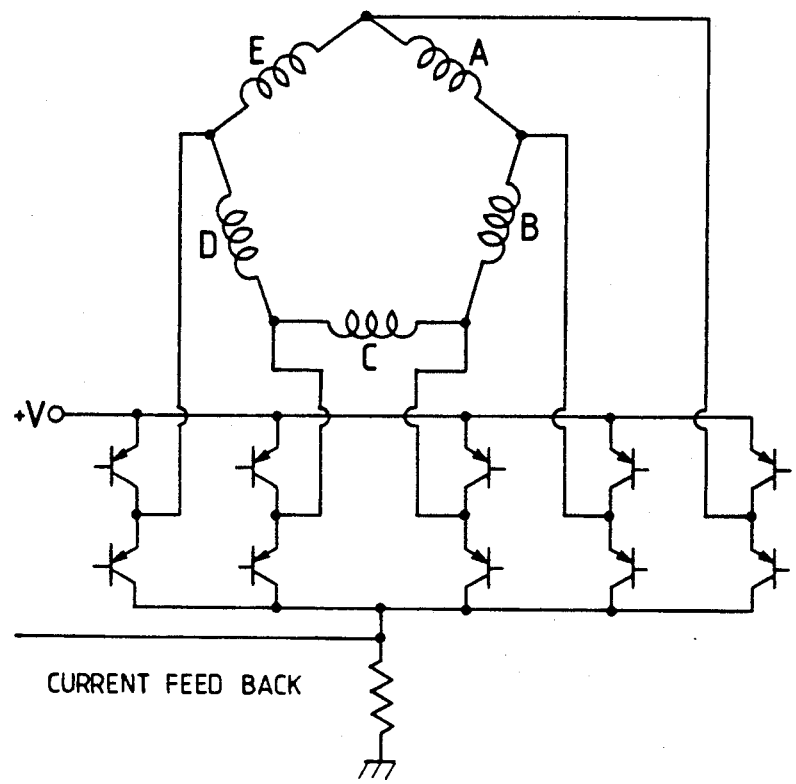
FIG. 33(a) illustrates the driving circuit for the stepping motor.
Figure 33B:
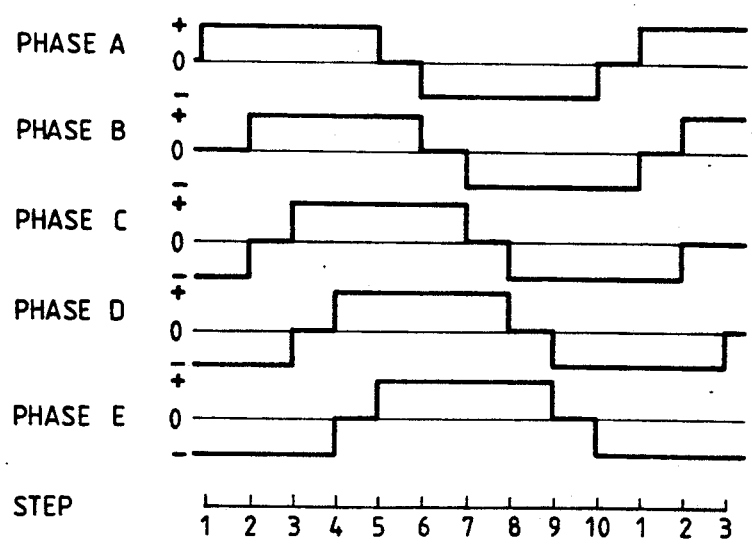
FIG. 33(b) illustrates the sequence of magnetic excitation.

FIG. 33(a) illustrates the circuit for the driver of the stepping motor 213. The driver circuit is designed to operate by bipolar driving with 10 switching transistors, with the motor winding connected in a hexagonal shape and with its connecting points connected to the positive terminal or the negative terminal of the power source by way of two transistors, respectively. Moreover, with the feedback of the value of the electric current conducted to the motor, the motor is driven under such control as to maintain the electric current fed thereto at a constant rate. For the magnetic excitation sequence, the one remaining phase is short-circuited at the same positive or negative potential while the four phases are magnetically excited, as illustrated in FIG. 33(b).

Figure 34A:
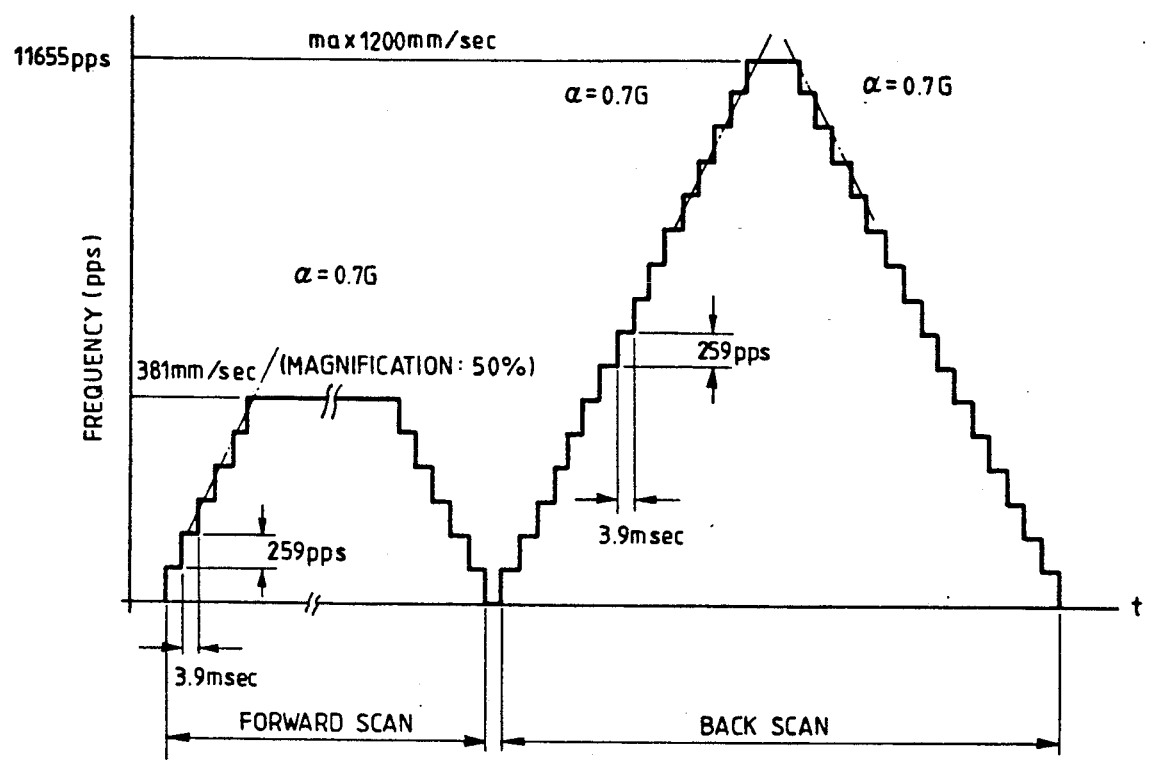
FIGS. 34(a) and 34(b) explain the cycle of scanning with the imaging unit.
Figure 34B:
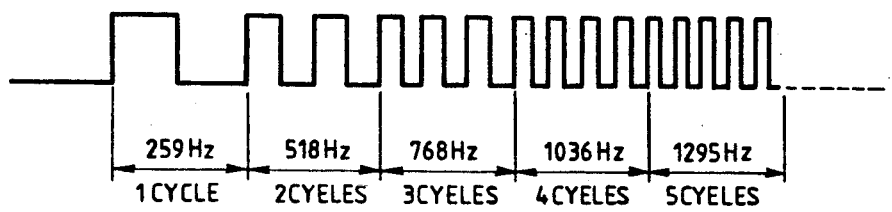

FIG. 34(a) shows the scanning cycle of the imaging unit 37, which is driven with the stepping motor 213. The Figure shows the speed of the imaging unit 37, i.e. the relationship between the frequency which is placed on the imaging unit 37 and the time when the unit is operated to perform its forward scanning operation and the backward scanning operation at the magnification of 50 percent, i.e. at the maximum moving speed. At the time of its acceleration, as illustrated in FIG. 34(b), the frequency 259 Hz, for example, is incrementally multiplied and increased to approximately 11 KHz or 12 KHz in the maximum. By giving regularity to the pulse column in this manner, it is made easy to generate the pulses. And, as shown in FIG. 34(a), the imaging unit is given regular stage-by-stage acceleration at 259 pps/3.9 ms, thereby forming a trapezoidal profile. Moreover, a pause is provided between the scanning operation and the returning operation and also between the returning operation and the scanning operation, so that the unit may wait until the vibrations in the system of the IIT mechanism are reduced and also that the operation of the unit may be set in synchronization with the image output in the IOT.

In the meantime, when a color original sheet is to be read, the imaging unit 37 is driven to perform its scanning operation four times, so that the unit may thereby reads the signals on the four colors, and it is consequently a major task to find a satisfactory solution to the question how the color deviation of the four colors can be reduced to an acceptably low level. In order to accomplish this objective, it is important to suppress the deviation in the stopping position of the imaging unit 37, thereby inhibiting the fluctuations in the duration of time for the arrival of the imaging unit from the home position to the registering position and inhibiting the fluctuations in the scanning speed.

Figure 35A:
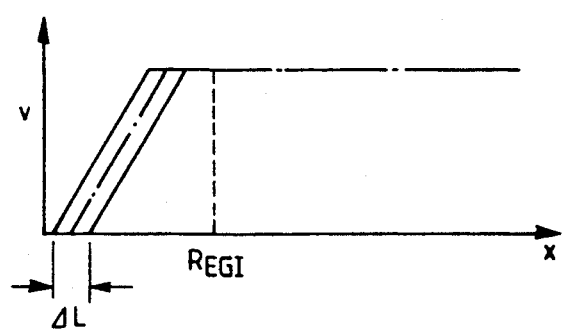
FIGS. 35(a) through 35(c) explain the causes of deviations of colors on color copies.
Figure 35B:
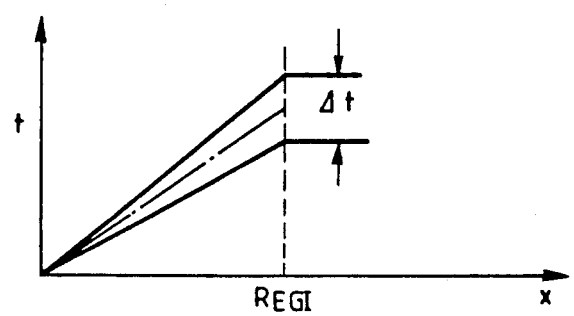
Figure 35C:
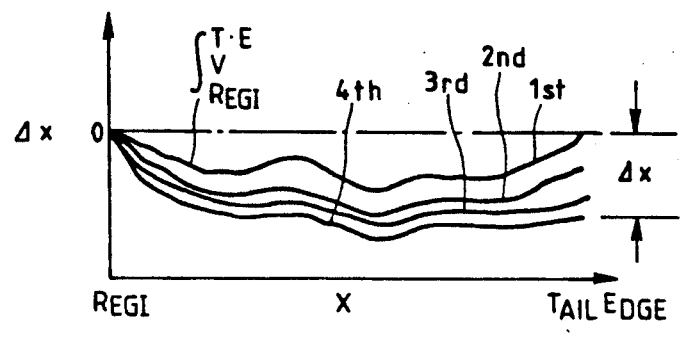

FIGS. 35(a-c) are charts intended for explaining the causes of the color deviations arising from the occurrence of the vibrations as mentioned above, and FIG. 35(a) shows the fact that the position where the imaging unit stops after it has performed its scanning operation deviates by $\Delta L$ from the original position from which it starts. When the unit starts next, there occurs a deviation in the time which it takes until it reaches the registering position, with the result that there occurs a deviation in color. Also, as shown in FIG. 35(b), the transient vibrations (i.e. the fluctuations of the revolutions that occur before the motor attains its steady-state speed) results in a deviation by $\Delta t$ in the time which the unit takes until it reaches the registering position, so that there occurs a deviation in colors on the copy. Also, FIG. 35(c) shows a dispersion of the constant-speed scanning characteristics recorded in the period from the time when the unit passes over the registering position to the time when the unit reaches the tail edge, and this figure indicates that the dispersion in the scanning speed as recorded at the first time of scanning is greater than the dispersion observed at the second to fourth times of scanning With this fact being taken into account, the machine in this embodiment is designed to develop the yellow color Y, which is less conspicuous in case of a color deviation, when it performs the first scanning operation.

(III-3) Control System for IIT

The IIT remote unit performs the functions of the sequential control for the various types of copying operations, the service support functions, the self-diagnostic functions, and the fail-safe functions. The sequential controls with the IIT are divided among the ordinary scanning, the sample scanning, and the control over the initializing operation. The various types of commands and parameters for the control of the IIT come transmitted by serial communication from the SYS remote unit 71.

Figure 36A:
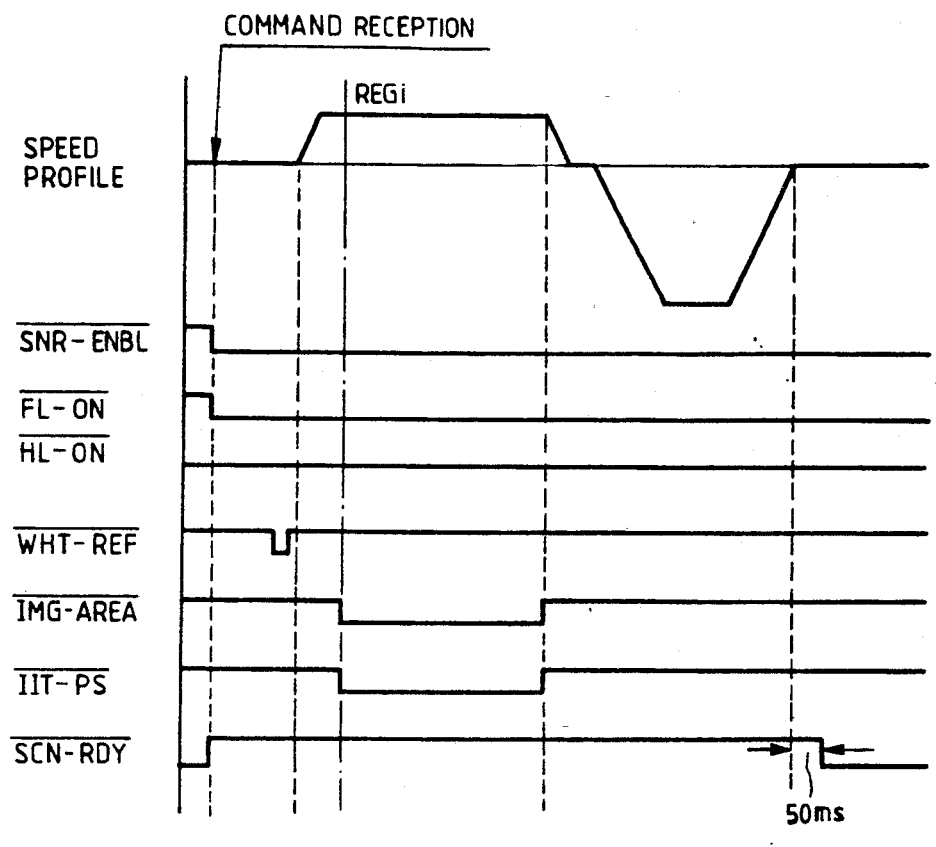
FIGS. 36(a) through 36(c) explains the controlling modes of the IIT.

FIG. 36(a) shows the timing chart for the ordinary scanning process. The data on the scanning length are set in the range from 0 to 432 mm (by 1 mm step), depending on the length of the paper and the magnification, and the scanning speed is set on the basis of the 5 magnifications (from 50% to 400%), and also the prescanning length (the distance from the stopping position to the registering position) is set on the basis of the magnifications (from 50% to 400%). When the unit receives a scanning command, it turns on the fluorescent lamp by the FL-ON signal and also turns on the motor driver by the SCN-RDY signal and generates the shading correction pulse WHT-REF signal after the elapse of the prescribed duration of time, starting the scanning operation therewith. When the unit passes over the registering sensor, the image area signal, IMG-AREA, comes down to a level lower by the prescribed scanning length, and, in synchronization with this, the IIT-PS signal is output to the IPS.

Figure 36B:
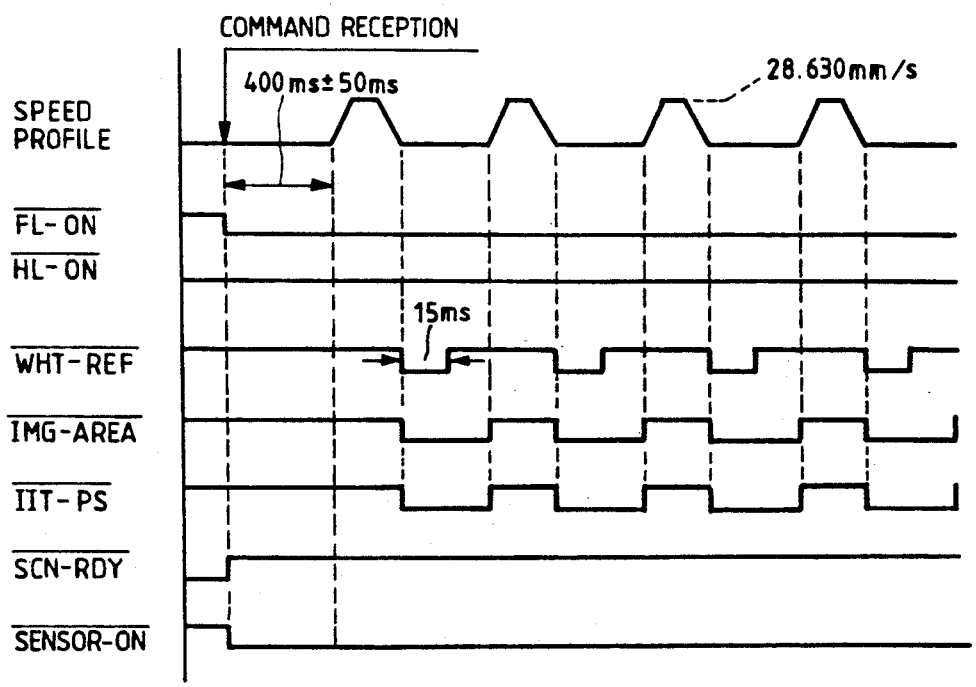

FIG. 36(b) is a timing chart for the sample scanning operation. The sample scanning process is applied to the detection of color at the time of the color conversion and the correction of the color balance, as well as the shading correction, at the time when the F/P is employed. On the basis of the data on the stopping position from the registering position, the moving speed, and the frequency of minute actions, and the step intervals, the unit moves to the target sampling position, where it repeats a temporary stop or minute actions several times, thereafter coming to a halt.

Figure 36C:
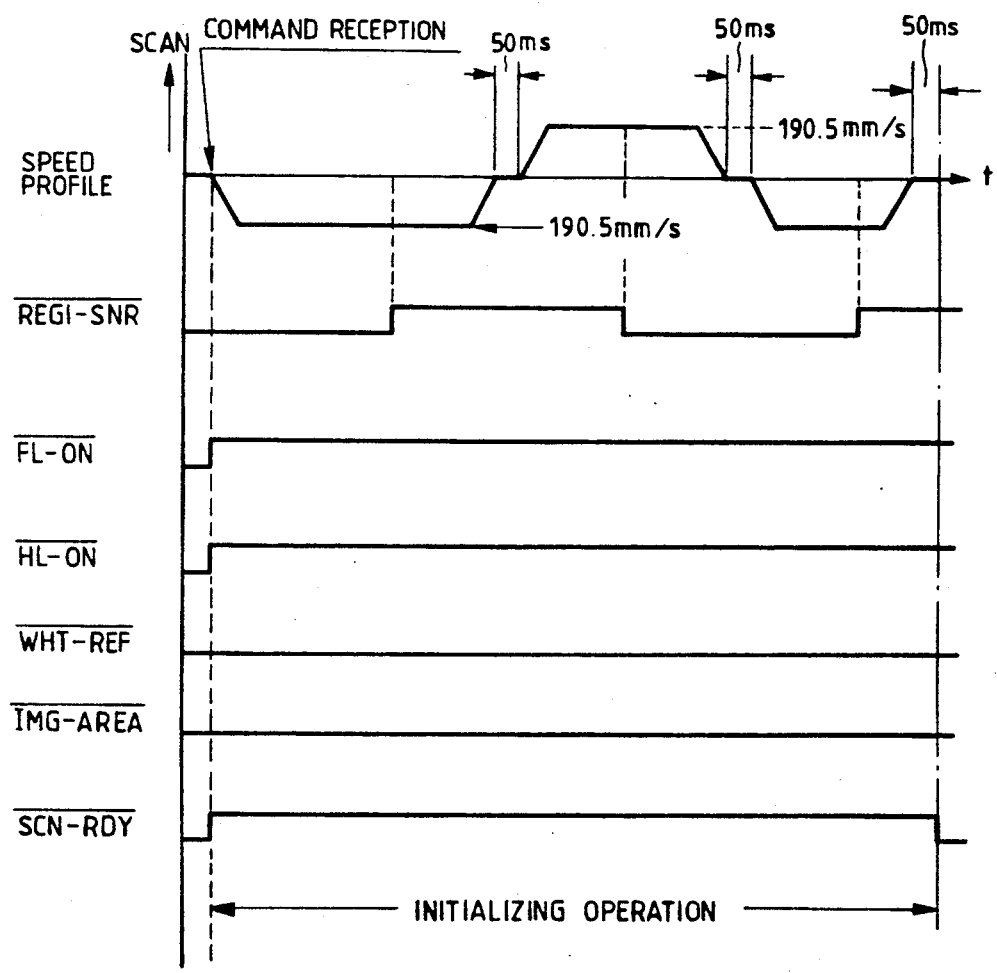

FIG. 36(c) shows the timing chart for the initializing process. When the power source is turned on, the unit receives a command from the SYS remote, and it performs the verification of the registering sensor, the verification of the operations of the imaging unit by the registering sensor, and the correction of the home position of the imaging unit by means of the registering sensor.

(III-4) Imaging Unit

Figure 37:
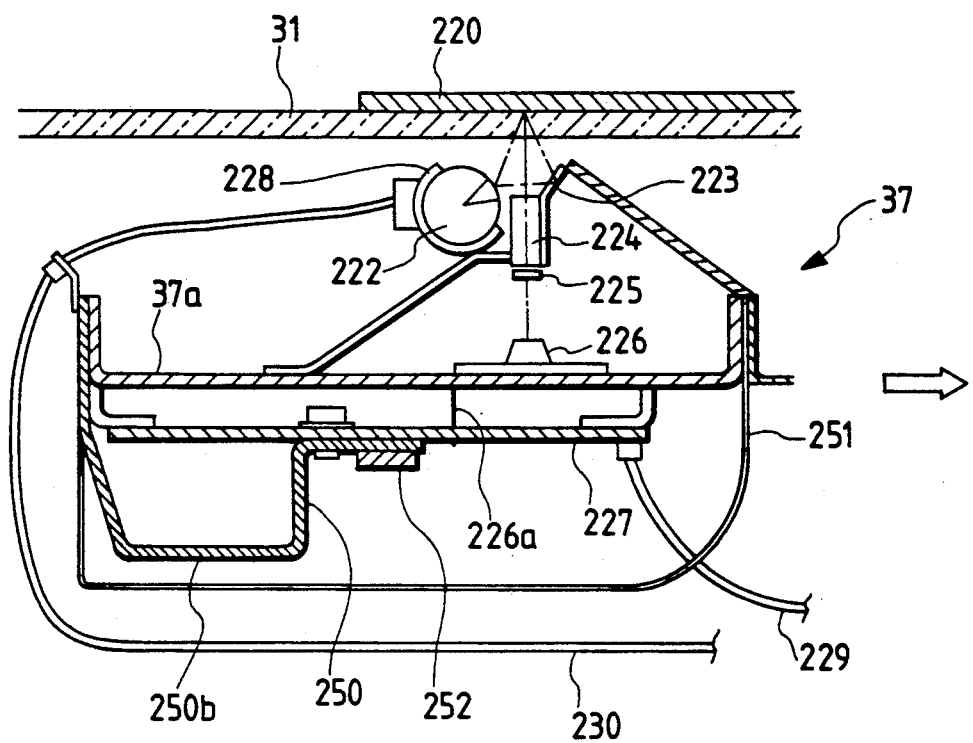
FIG. 37 is a sectional view of the imaging unit.

FIG. 37 presents a sectional view of the imaging unit 37, and the original sheet 220 is set with its image surface kept face down on the platen glass, and the imaging unit 37 moves underneath the platen glass in the direction shown with the arrow mark in the Figure, giving the surface of the original sheet exposure to the light with a daylight fluorescent lamp 222 and a reflecting mirror 223. Then, by causing the light reflected from the original sheet 220 to pass through the selfoc lens 224 and the cyan filter 225, the unit forms an erect image in identical dimensions on the light-receiving surface of the CCD line sensor. The selfoc lens 224 is a compound-eye lens composed of fiber lenses in four rows, and, since this lens has high brightness and high resolving power, it offers advantages in that it permits a reduction of the electric power to be consumed for the light source to a low level and also permits the fabrication of this unit in a compact size. Moreover, the imaging unit 37 is mounted with a circuit board 227 which carries thereon the CCD line sensor driving circuit, the CCD line sensor output buffer circuit, and so forth. Moreover, 228 indicates the lamp heater, 229 shows the flexible cable for the controlling signals, and 230 represents the flexible cable for the power source for illumination. On the lower part of the housing 37a, on which the CCD line sensor 226 is fixed rigidly, is mounted a circuit board 227, and also a heat radiating plate 250 having a protruding part 250b is installed between the circuit board 227 and the housing 37a. In addition, a punched metal piece 251 for electro-magnetic shielding is mounted in such a way as to cover the heat radiating plate 250. The driving IC chip 252 is arranged on the circuit board 227, and the CCD line sensor 226 is connected electrically to the circuit board 227 by means of the connecting pin 226a.

Figure 38:
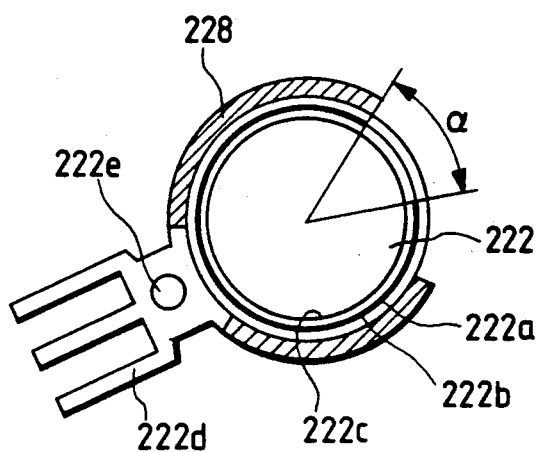
FIG. 38 is a sectional view of the fluorescent lamp.

FIG. 38 presents a detailed drawing for the daylight fluorescent lamp 222 mentioned above. A reflecting film 222b is formed on the inside area of the glass tube 222a, except for the area at the aperture angle $\alpha$ (at approximately 50 degrees), and a fluorescent screen 222c is formed on the inner side of the film. This design feature reflects an attempt at a reduction of the power consumption by the effect of the highly efficient radiation of the amount of light from the fluorescent lamp 222 over the surface area of the original sheet. In this regard, the reason for the formation of the fluorescent screen 222c on the entire inner area and the formation of the reflecting film 222b on the inside area except for the area set at the aperture angle is that this structural feature contributes to a reduction of the peak of the bright line generated by the mercurial stream although it accompanies a decrease in the amount of the fluorescent light. Furthermore, on the surface at the outer circumference of the fluorescent lamp 222 are provided a lamp heater 228 and a heat sink (heat radiating material) 222d, and these devices perform the control of the lamp heater 228 and the cooling fan on the basis of the detection of the temperature with the thermistor 222e.

Figure 39A:
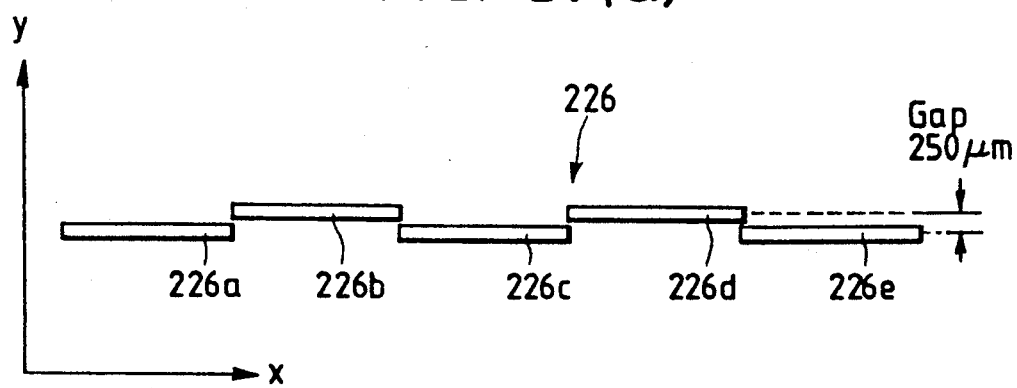
FIG. 39(a) illustrates an example of the arrangement of the CCD line sensors.

FIGS. 39(a-c) show an example of the arrangement of the CCD line sensor 226 mentioned above, and, as illustrated in FIG. 39(a), the five pieces of the CCD line sensors marked 226a through 226e are arranged in a zigzag pattern in the main scanning direction X. This arrangement of the CCD line sensors has been adopted in view of the fact that it is difficult, by reason of the wafer size, the yield, and the cost, to use a single CCD line sensor to attain any uniform photosensitivity, without any deficiency in proper exposure for a large number of light-receiving elements, and that it is difficult to form the picture elements which will reach the two ends of the CCD line sensors in case a plural number of CCD line sensors are arranged in one line, with the result that any such arrangement would cause the occurrence of illegible areas on the copies.

Figure 39B:
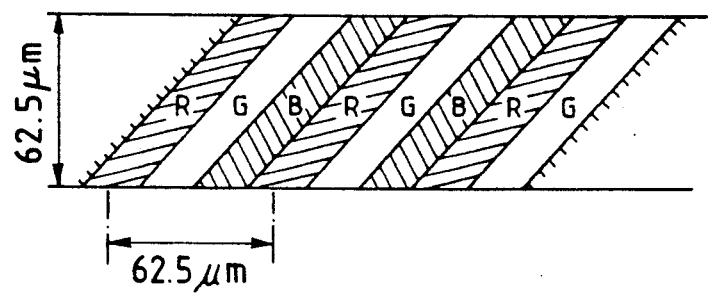
FIG. 39(b) illustrates an example of the arrangement of the color filters.

The sensor section of this CCD line sensor 226 is so constructed that three mutually adjacent bits constitute one picture element at the time of reading, with the filters for the three colors, R (red), G (green), and B (blue), being arranged in this stated order and applied repeatedly on the surface of the individual picture elements on the CCD line sensor 226, as illustrated in FIG. 39(b). Provided that the density of the picture elements for the reading of each color is 16 dots/mm and that the number of the picture elements on each chip is 2,928, then the length of one chip will be: 2,928/(16×3)=61 mm, which will correspond to 61×5=305 mm in length for the five chips as a whole. It follows from this that this construction of the picture elements offers an isometric-type CCD line sensor capable of reading the A3-size paper. Additionally, the individual picture elements for R, G, and B are arranged with an inclination by 45 degrees, so that the moire is thereby reduced.

In case a plural number of CCD line sensors 226a through 226e are arranged in a zigzag pattern in this manner, mutually adjacent CCD line sensors will perform the scanning operation for mutually different original sheet surfaces. In other words, when the original sheet is read with the CCD line sensors moved in the subsidiary scanning direction Y, which crosses at the right angles with the main scanning direction X of the CCD line sensors, a deviation in time corresponding to the positional deviation between the mutually adjacent CCD line sensors will occur between the signals from the first row of the CCD line sensors 226b and 226d and the signals which occur subsequently from the second row of the CCD line sensors 226a, 226c, and 226e.

Therefore, in order to obtain the consecutive signals for one line from the picture image signals read in divided parts by means of a plural number of the CCD line sensors, it is at least necessary to store in memory the signals from the CCD line sensors 226b and 226d in the first row, which perform the scanning operation in advance of the sensors in the other row, and then to read the signals in synchronization with the output of the signals from the CCD line sensors 226a, 226c, and 226e in the second row, which work subsequently to those in the first row. In this case, it would be necessary to provide a lag by an amount of time corresponding to four lines, provided that it is assumed that the amount of deviation is 250 $\mu$m and that the degree of resolution is 16 dots/mm.

Furthermore, the reduction and enlargement with image reading equipment are generally performed by "thinning out" and "watering" and other processes in the video circuit in respect of the main scanning direction and by increasing or decreasing the moving speed of the imaging unit 37 with regard to the subsidiary scanning direction. That is to say, the degree of resolution is changed only for the subsidiary scanning direction by changing the moving speed of the imaging unit 37 for the image reading equipment, while the reading speed (which means the number of the lines read per unit duration of time) is kept fixed. Therefore, if the resolution is 16 dots/mm at the time when the reduction/enlargement ratio is 100%, the relationship among the relevant factors will be as indicated in the following table:

| Reduction/Enlargement ratio (%) | Speed (times) | Resolution (dot/mm) | Zigzag Correction (number of lines) |
|---|---|---|---|
| 50 | 2 | 8 | 2 |
| 100 | 1 | 16 | 4 |
| 200 | ½ | 32 | 8 |
| 400 | ¼ | 64 | 16 |

Figure 40:
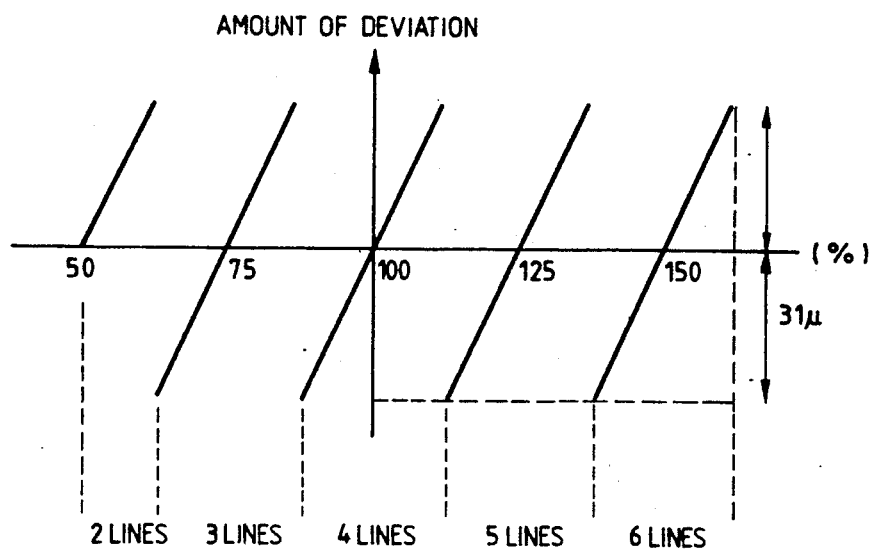
FIG. 40 illustrates the relationship between the reducing and enlarging ratio and the amount of the deviation in reading.

Therefore, according as the reduction/enlargement ratio increases, the resolution will increase, and consequently the number of the lines needed to correct the difference by 250 $\mu$m in the zigzag arrangement mentioned above will also increase. FIG. 40 illustrates the relationship between the reduction/enlargement ratio and the amount of deviation, and a correction by one line is applied by a change of the reduction/enlargement ratio for every occurrence of deviation by one picture element. An amount of deviation by 31 $\mu$m occurs for the correction by every one line, but it is not observed that this process gives any influence to the image output therefrom.

(III-5) Video Signal Processing Circuit

Figure 41:
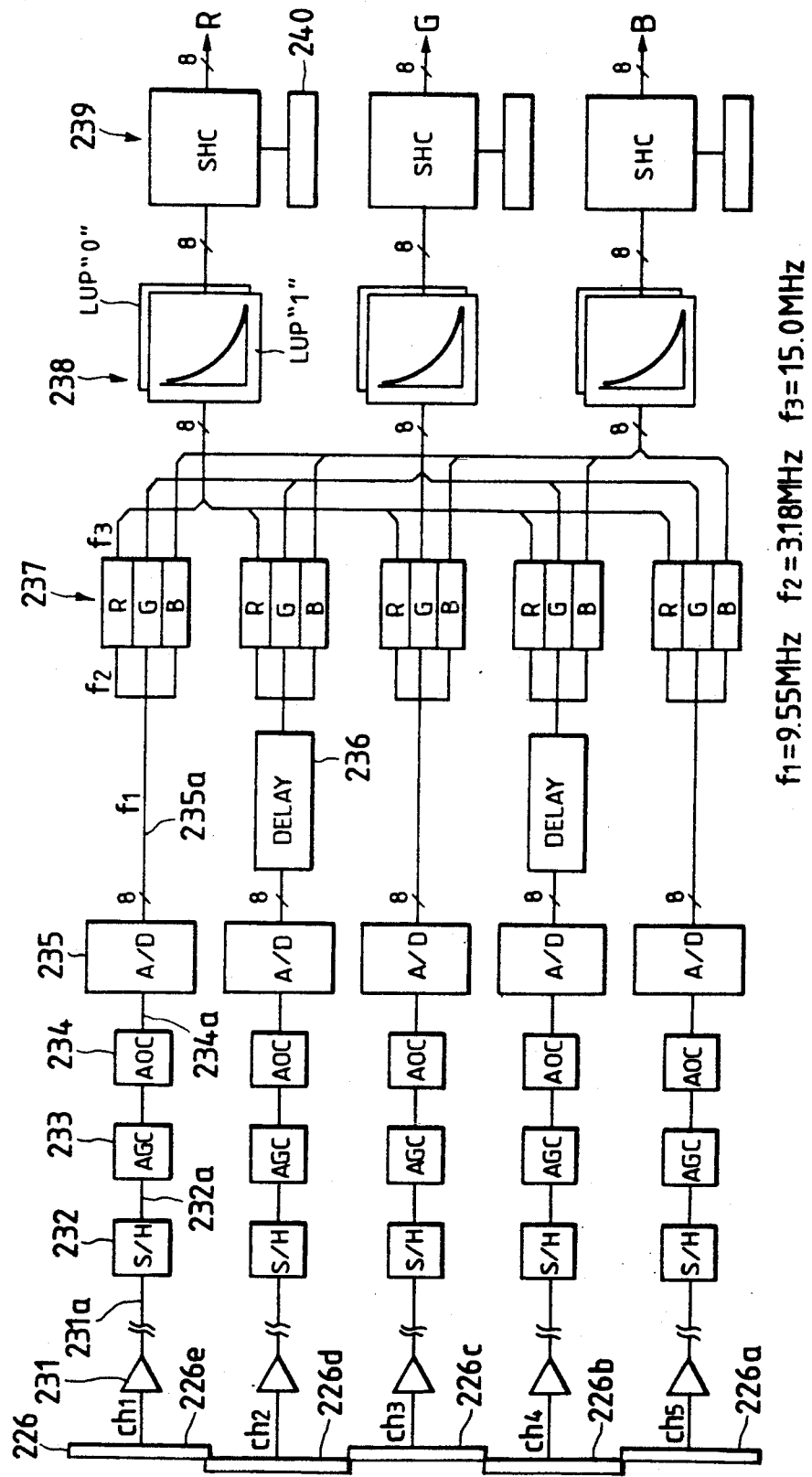
FIG. 41 is a circuit diagram for the processing of video signals.

Next, with reference to FIG. 41, a description is made of the video signal processing circuit, which reads the original sheet in color in the form of the reflexive ratio signals for each of R, G, and B by means of the CCD line sensors 226 and then, taking these as the density signals, converts these into digital signals.

Figure 42:
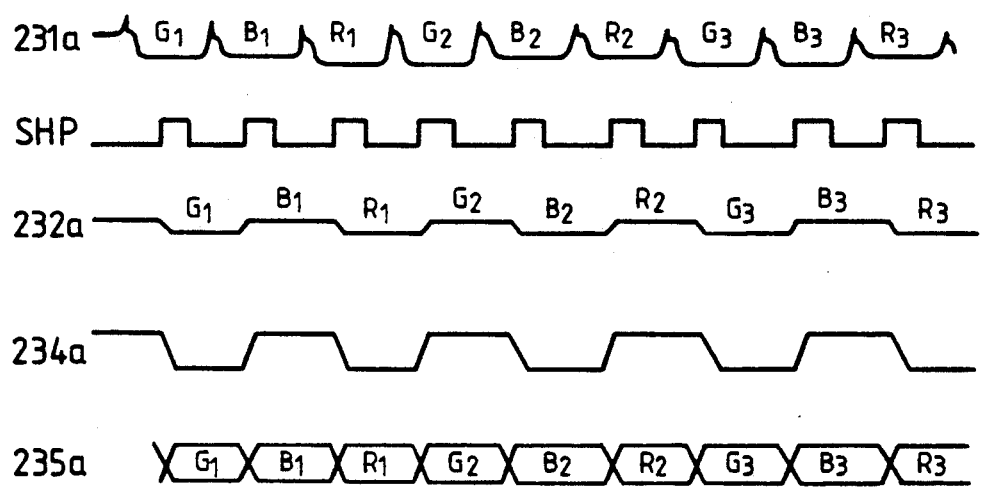
FIG. 42 illustrates the output waveform.

The original sheet is read as resolved into the colors, R, G and B, in five channels, which correspond to the five divided parts, by means of the five CCD line sensor units 226 in the imaging unit 37, and the data so read is amplified by the amplifying circuit 231 up to the prescribed level, and then the data signals are transmitted to a circuit on the main unit side by way of the transmission cable connecting the unit and the main unit (231a in FIG. 42). Subsequently, in the sample hold circuit, SH 232, the signals are processed for the rectification of their waveforms through the removal of the noise components by means of the sample hold pulse SHP (232a in FIG. 42). However, since the photoelectric conversion characteristics of the CCD line sensors are different for each picture element and for each chip, the output from the different CCD line sensors reading the original sheet with the same density will be different, so that the data will cause streaks or unevenness in the picture image data if they are output as they are. For this reason, it is necessary to apply various kinds of rectifying processes.

Figure 43:
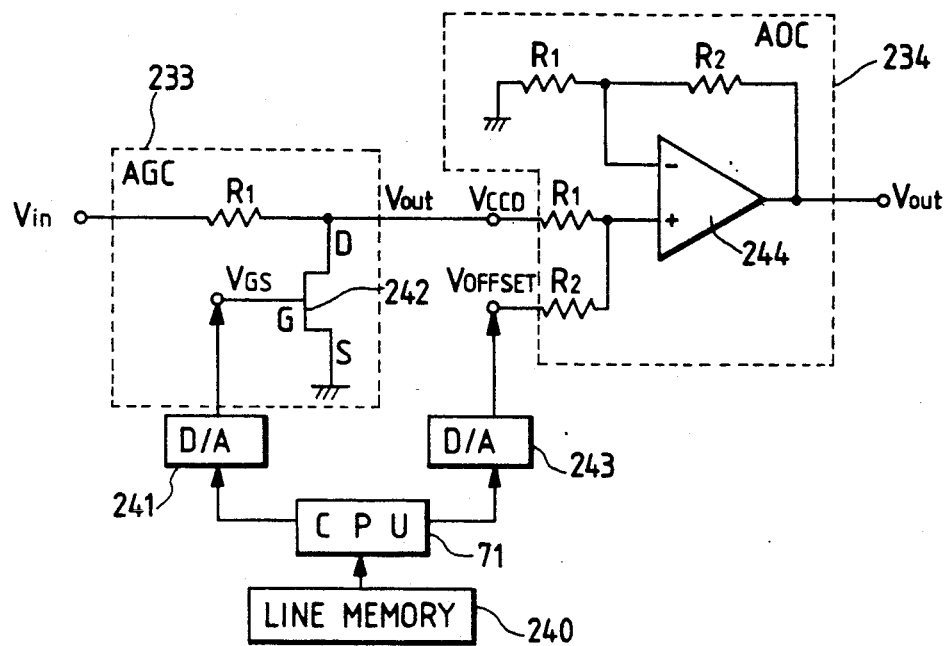
FIG. 43 is a circuit diagram for the AGC and the AOC.

The gain control circuit AGC (AUTOMATIC GAIN CONTROL) 233 is a circuit for amplifying the output from each sensor to the volume adequate for the input signal range for the A/D converter 235, and the white reference data are read in advance by means of the individual sensors prior to the reading of the original sheet, the data so obtained being stored in a digitalized form in the shading RAM 240, and these data are compared for judgment thereof with the prescribed reference value in the CPU 71, as shown in FIG. 43, and an adequate ratio of amplification is thereby determined and the digital data corresponding to such a ratio of amplification are transmitted to the D/A converter 241, the gains of the individual sensors being set automatically therewith. The AGC 233 is provided with a voltage control type variable resistor element 242, and it is designed to permit the control the gate electric voltage $V_{GS}$, thereby making it possible to make variable the resistance value $R_2$ between the drain and the source in the element 242. The gain is expressed by the following:

$$V_{OUT}/V_{IN} = R_2/(R_1 + R_2)$$

Figure 44:
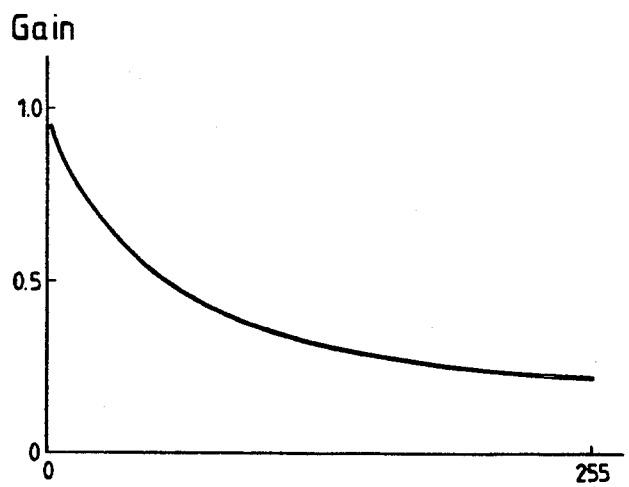
FIG. 44 illustrates the relationship between the digital gain setting values and the gains.
Figure 45:
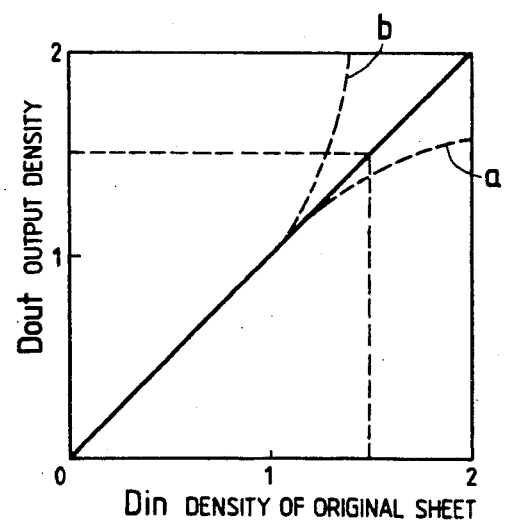
FIG. 45 illustrates the relationship between the density of the original sheet and the density of the output from the sensor.

With the gate voltage $V_{GS}$ as converted into an analog value in the D/A converter 241 being input into this circuit, this AGC is capable of adjusting the gain in 256 stages as shown in FIG. 44.

The Offset Control Circuit AOC 234 is called the "black level control" and it a circuit which controls the dark time output voltage from each sensor. For this purpose, the dark time output is read with each sensor while the fluorescent lamp is turned off, and the data thus obtained are converted into digital data and stored in the shading RAM 240, and, as illustrated in FIG. 43, these data for one line are compared for judgment thereof with the prescribed reference value in the CPU 71, which then outputs the offset value to the D/A converter 243. The AOC 234 is provided with an operating amplifier 244, and, to the non-reversal terminal side of this amplifier, the video signal, $V_{CCD}$, and the offset value, $V_{OFFSET}$, which is output from the D/A converter 243, are connected respectively by way of the resistors $R_1$ and $R_2$ while the connecting points for the resistors $R_1$ and $R_2$ are connected to the reversal terminal side, as shown in the Figure. Therefore, the output, $V_{OUT}$, from this offset control circuit AOC will be as expressed in the following:

$$V_{OUT} = (R_2/R_1) V_{CCD} + V_{OFFSET}$$

Thus, it is possible to amplify the video signals at a fixed magnification ratio and also to adjust the offset voltage in 256 stages. This output from the AOC is output as shown by 234a in FIG. 42 and is controlled in such a way that the density of the output will ultimately be at the prescribed value in relation to the read original sheet.

Also this offset value is converted into a digital value in the A/D converter 245 (as shown by 235a in FIG. 42) and output in the form of an eight-bit data line in the sequence GBRGBR. The delay amount setting circuit 236, which is a memory device for storing the data for a plural number of lines, has the FIFO construction. This circuit has the signals from the line sensors 226b and 226d in the first row stored in the memory device and outputs the signals in synchronization with the output of the signals from the line sensors 226a, 226c, and 226e in the second row, which work subsequently to those in the first row.

Figure 46A:
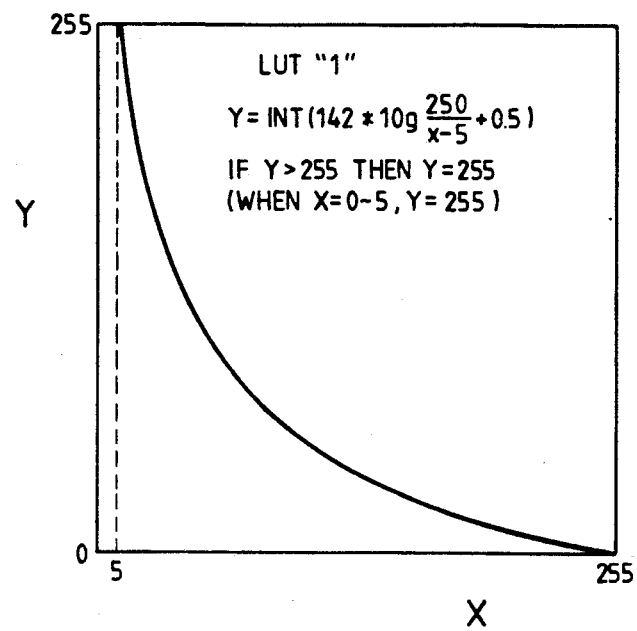
FIGS. 46(a) and 46(b) present the conversion tables.
Figure 46B:
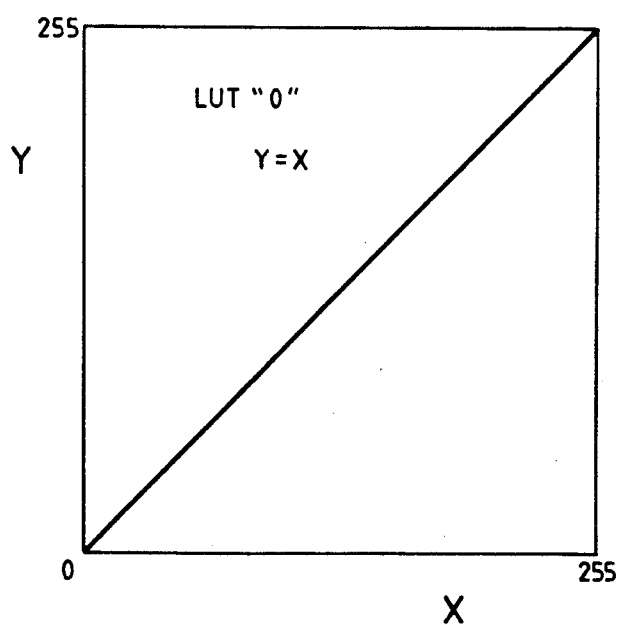

Next, the separating and synthesizing circuit 237 separates the eight-bit data forming the sequence, BGR, for each of the line sensors, thereafter serially synthesizing and outputting the signals for R, G, and B, for each line sensor for every line on the original sheet. The converter 238 is composed of a ROM accommodating the logarithmic conversion table, LUT "1", which is shown in FIG. 46(a), and, when digital values are input into the ROM as address signals, this converter outputs the output values of the logarithmic conversion table, LUT "1", and the data on the reflecting ratios of R, G, and B are converted into the information on density.

Next, a description is made of the shading correction circuit 239. First, this circuit performs the correction for a deviation of the picture elements prior to its performance of the shading correction. As mentioned earlier, the signal processing circuit takes the data on R, G, and B in parallel into itself, and, as shown in FIG. 39(b), there occur such deviations as shown in FIG. 47(a) in the outputs of R, G, and B in the same picture element in consequence of the fact that the positions of the R, G, and B filters are in deviation from one another as illustrated in FIG. 39(b). Consequently, the black line K will have a deviation when it is read into the system. Therefore, the black line K is brought into agreement as illustrated in FIG. 47(b) by making R shift rightward by $\frac{2}{3}$ of a picture element and making B shift rightward by $\frac{1}{3}$ of a picture element by the application of an weighted mean process.

The shading correction is a process for rectifying the dispersion in the performance of the optical system due to the characteristics of the distribution of light from the light source or due to the secular change of the light source and the scattering caused in the optical system by stains or the like on the reflecting mirror, etc., and the dispersion in sensitivity among the individual bits in the CCD line sensors, on the basis of the reference value derived from the white color data.

Thus, at the time when the shading correction is started, the reflected light from the white color board irradiated with light is input into the line sensor for use as the reference density data for the shading correction process, and the the A/D conversion and the logarithmic conversion are performed in the signal processing circuit mentioned above, and these reference density data log ($R_i$) are stored in the line memory 240. Then, by subtracting the reference density data log ($R_i$) mentioned above from the image data log ($D_i$) read through the scanning of the original data, the result expressed in the equation, the following value is obtained:

$$\log (D_i) - \log (R_i) = \log (D_i/R_i)$$

Thus the logarithmic values produced by the shading correction for the individual picture elements are derived. In this way, the performance of the shading correction after the completion of the logarithmic conversion permits the simple execution of arithmetic operations by the use of a general-purpose total adder IC without the necessity of any hard logic divider to be built with a highly complex and large-scale circuit construction as was the case in the past.

Figure 48:
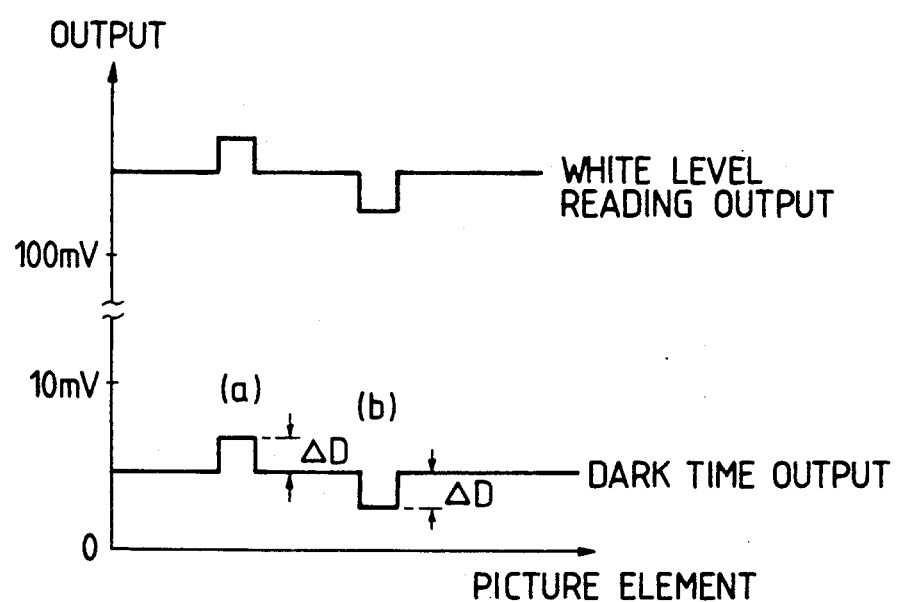
FIG. 48 illustrates the photoelectric conversion characteristics of the line sensors.
Figure 49A:
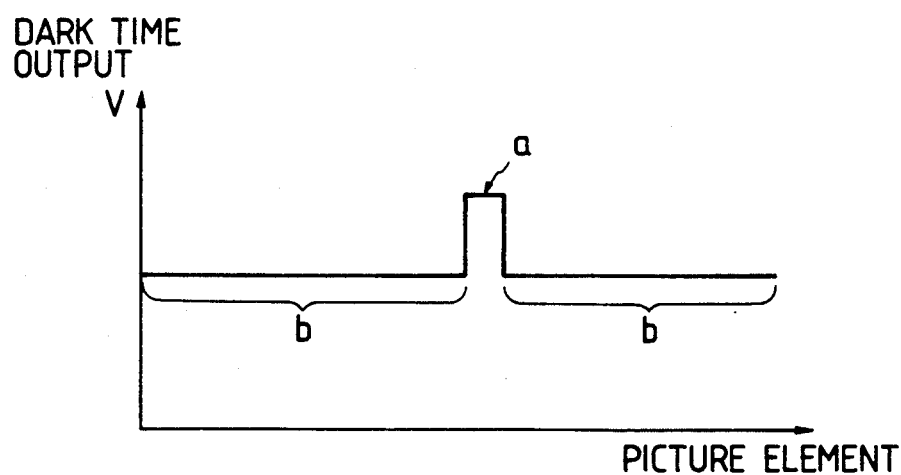
FIGS. 49(a) through 49(c) explain the conventional black level correction.
Figure 49B:
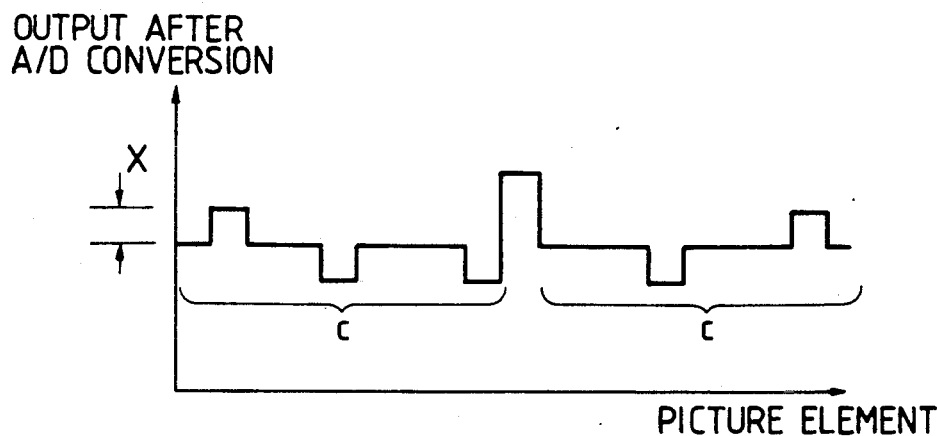
Figure 49C:
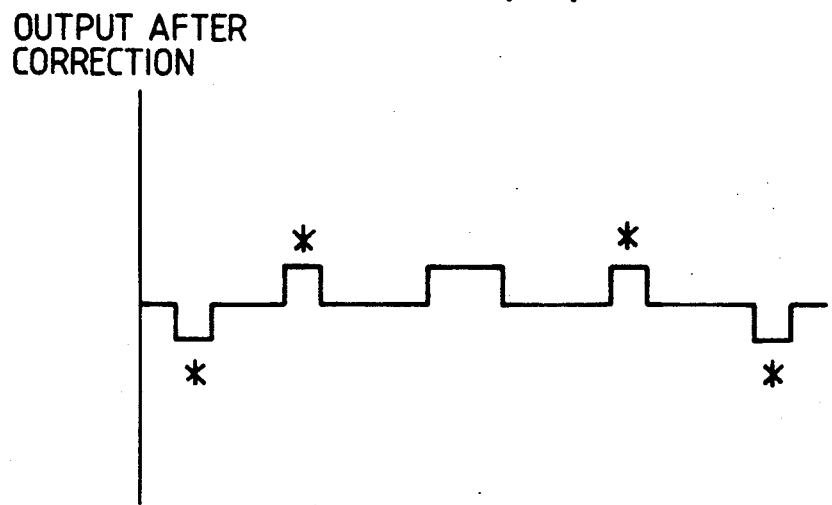

Next, with reference to FIG. 51 through FIG. 55, a detailed description is made of the black level correction, which forms a feature characteristic of the present invention. As already explained in FIG. 48 through FIGS. 50(a–b), the existing method of black level correction tends to make a large correcting error as the result of the error in the A/D conversion, the overlapping of noises, a lack of uniformity in the distribution of temperature within a chip, and so forth, with the result that it is found in some cases that it is on the contrary better not to perform any shading correction.

Figure 51:
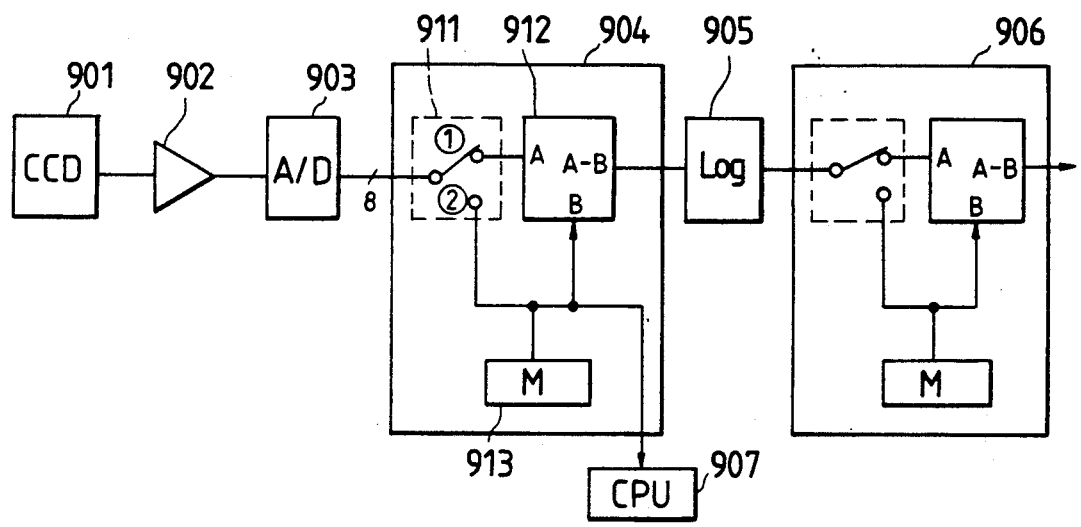
FIG. 51 is a block diagram illustrating one embodiment of the black level correction according to the present invention.
Figure 52:
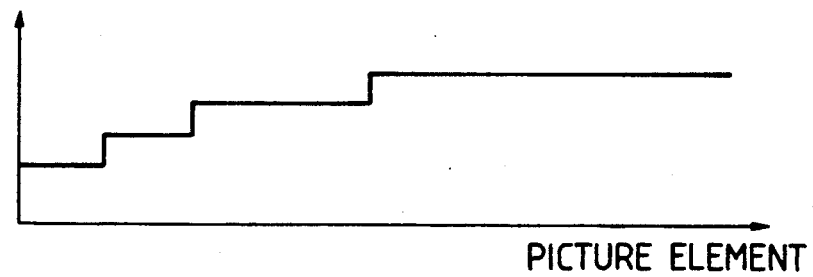
FIG. 52 illustrates the data for the correction of the black level.

FIG. 51 shows the construction of the circuit for the black level correction to be performed in case one line sensor is used, and the circuit is composed of a line sensor 901, an amplifier 902, an A/D converter 903, a black level correcting circuit 904, a logarithmic converter 905, a shading correction circuit 906, and a CPU 907.

Figure 50A:
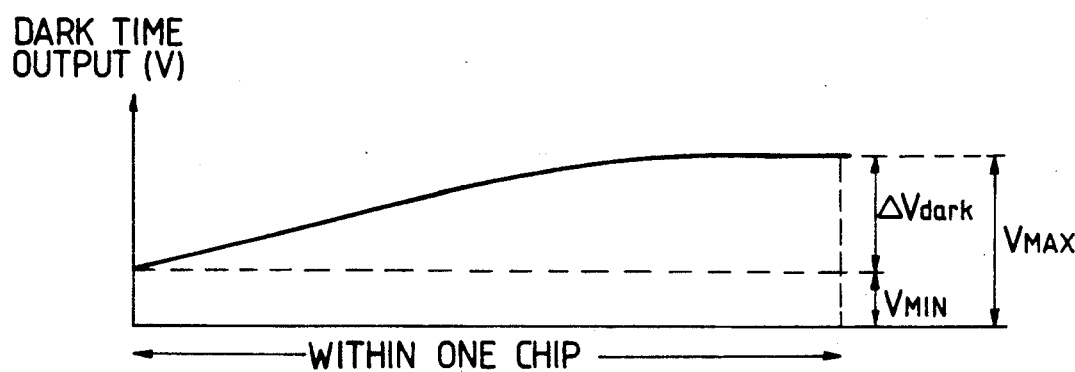
FIGS. 50(a) and 50(b) sow the dark time output for one line from the sensor.
Figure 50B:
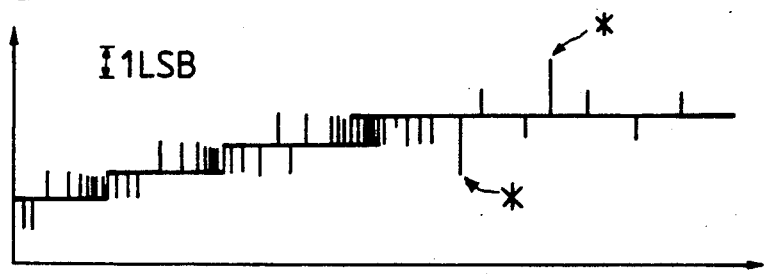

The black level correcting circuit 904 is composed of a changeover switch 911, a subtracter 912, and a line memory 913, and, with the changeover switch 911 first turned to the side (2), the line sensor 901 reads the black level correcting data (FIG. 50(a), and the data processed for the A/D conversion thereof (FIG. 50(b)) are transferred to the CPU 907. In the CPU 907, these data as already processed for their A/D conversion are divided into a plural number of sections, and the average values are then found by calculation for the individual sections, and the values are stored in the line memory 913.

When the original sheet is to be read, the changeover switch 911 is turned to the side (1), and the subtracter 912 reads the black level correcting data from the line memory 913, where the data are stored, in synchronization with the data read of the original sheet, and then finds the difference between these two types of data and outputs the value to the logarithmic converter 905. In this regard, the arithmetic operations for these black level correcting data may be performed every time when the scanning operation is performed on the original sheet, but it is also permissible to perform the operations only at a time when it is necessary to do so, for example, when the power source is turned on, the resulting data being stored in the NVM (non-volatile memory) of the CPU, so that they may be loaded into the line memory when the power source is turned on.

As the result, the level of the dark time output per picture element from the line sensors is made flat, making it possible to produce good images.

Next, a description is made of the black level correction to be performed with a plural number of line sensors positioned side by side in a line.

Figure 53A:
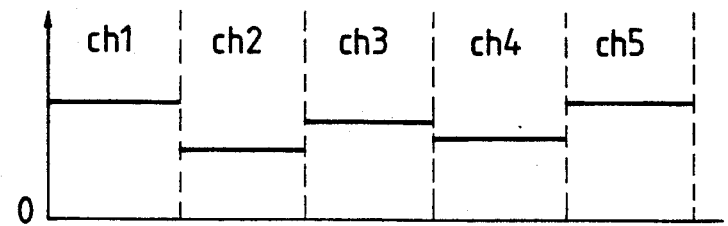
FIGS. 53(a) through 53(e) explain the dark time output from the individual channels when five-chip sensors are arranged.
Figure 53B:
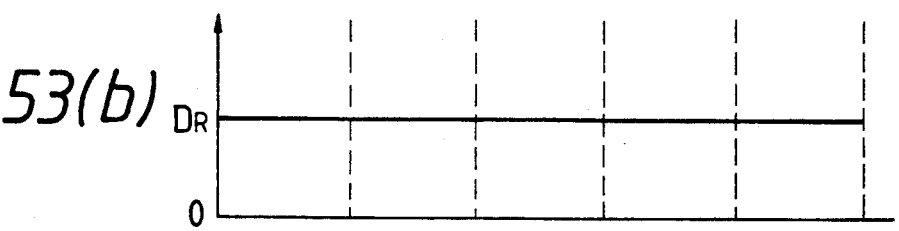

FIG. 53(a) shows the state in which the dark time output generated from each of the channels when five line sensors are placed side by side has discontinuity between the chips. If the reading of the original sheet is performed with the dispersions in the dark time output left as they are, the result is that there appear streaks and unevenness in the output images. In order to resolve this problem, it has hitherto been in practice to obtain the average value of the dark time output voltage for all the picture elements in each chip and to make an adjustment in such a way that each of such average values attains the target value $D_R$ indicated in FIG. 53(b).

Figure 53C:
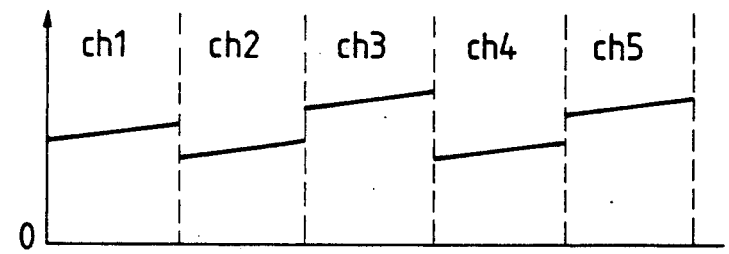
Figure 53D:
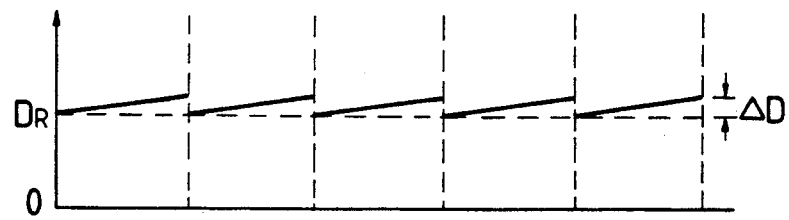

In practice, however, the dark time output voltage from the line sensors have moderate fluctuations within each channel, as shown in FIG. 53(c). If the adjusting method mentioned above should be applied to a line sensor having such a characteristic feature like this, a difference in level $\Delta D$ appears in the boundary region between the channels as illustrated in FIG. 53(d), so that the differences in density in the boundaries between the channels will be expressed in the form of streaks or unevenness if the data are output as they are.

Figure 54:
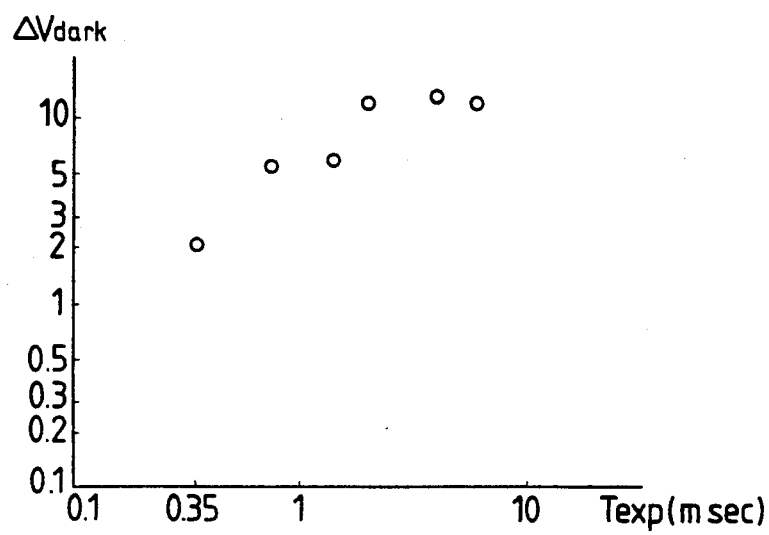
FIG. 54 illustrates the relationship between the un-uniform components in the electric power of the dark time output and the exposure time.

On the other hand, a measurement of the dark time output voltage for one line from the line sensor reveals that there is a lack of uniformity in the dark time output voltage as seen in the one example given in FIG. 50(a) mentioned above. FIG. 54 gives an example of the result of a measurement of the exposure time, $T_{exp}$ and the difference $\Delta V_{dark}$ between the maximum value, $V_{MAX}$, and the minimum value, $V_{MIN}$, of the output voltage. It is noted that there is approximately 2 mV of the $\Delta V_{dark}$ even when the $T_{exp}$ is 350 μsec. The influence of this $\Delta V_{dark}$ grows larger in proportion as the density of the original sheet increases and according as the amount of the illuminating light becomes lower and according as the white level decreases, and the influence manifests itself in moderate changes in density between the left side and the right side of a strip with a width of 61 mm for one chip of the line sensor.

Figure 55:
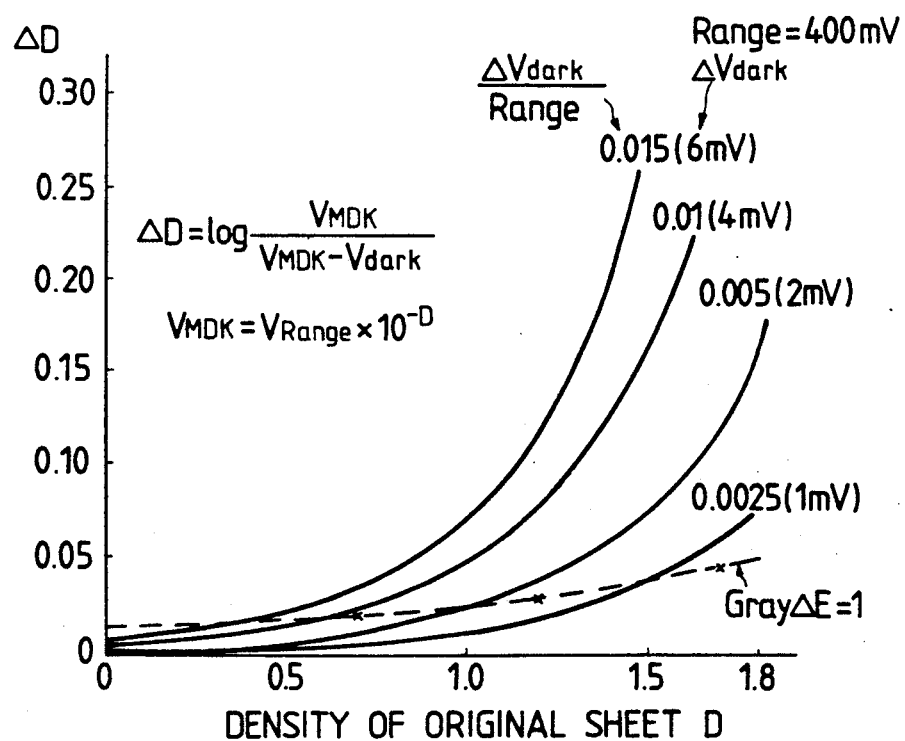
FIG. 55 illustrates the relationship between the density of the original sheet and the changes in the density for one chip of the sensor.

The results obtained from the calculation of that relation are presented in FIG. 55. This Figure shows the relation between the density D of the original sheet and the change in density $\Delta D$ between the left side and right side of the one chip portion as read by the line sensor for each ratio of the $\Delta V_{dark}$ against the white background output. According to the data in the Figure, the density change $\Delta D$ occurs at the level of 0.075 when the density of the original sheet D is 1.5 in case there is approximately 2 mV of the $\Delta V_{dark}$ as mentioned above while the white background output amounts, for example, to 400 mV, and this value as converted into the chromatic difference $\Delta E$ is at the level of approximately 2 on the gray scale. Thus, if the level difference $\Delta D$ in the boundaries between the channels as shown in FIG. 53(d) is output as it is to form an image, the difference in density in the boundaries between the channels will express itself in the form of a streak or unevenness. If it is to be attempted to reduce the chromatic difference $\Delta E$ on the gray scale at a level downward of 1 in order to cancel off this defect, it is necessary either to suppress the $\Delta V_{dark}$ to 1 mV or to increase the white background output to 800 mV by doubling the amount of the light.

Figure 53E:
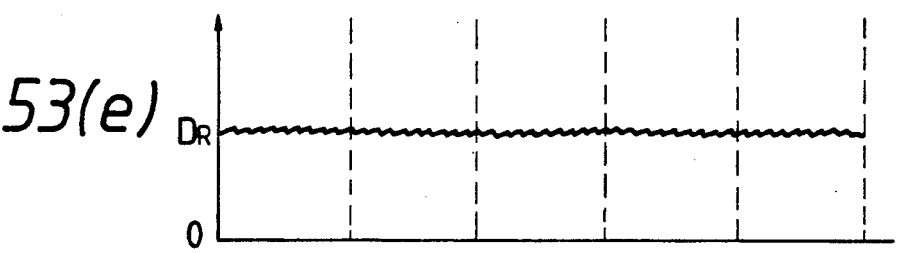

In order to solve this problem, it is necessary to reduce the density difference in the boundaries of the channels. For this purpose, the black level correcting circuit 904 mentioned above is connected to the back stage of the A/D converter 235 for each channel illustrated in FIG. 41, and, in order that the data in the leading part of each channel will attain the target value $D_R$, the difference in the density in the boundaries between the channels can be reduced by achieving flatness in the black level of each sensor as illustrated in FIG. 53(e) through performance of the above-mentioned black level correction for each channel after an adjustment first made of the offset in the manner shown in FIG. 53(d) in the AOC 234 mentioned above.

(III-6) Self-Diagnostic System (Principal Component Unit of the Present Invention)

In the event any abnormal condition affects the copying output image, it is necessary to remove the problem. For this purpose, it is necessary to ascertain the component in which the problem has occurred, because it would not possible to replace the defective parts unless the location or the component having the problem is identified specifically.

Then, it will be a problem in what unit of parts such replacement should be made. While the parts of such component parts as a motor and a sensor can be replaced individually, it is not any advantageous measure to replace the individual part in such circuit components as a CPU, an integrated circuit, or a memory device. That is because the replacement of the individual parts in a circuit would require the identification of the faulty part a serviceman would be required to check the individual parts of the circuit one by one with such measuring instruments as a tester or to provide adequate detectors or the like to check on the functions of the individual component parts of each circuit.

However, identifying faulty individual parts results in an extension of the servicing time. A long duration of time necessary for the repair of defective parts translates into extended machine down time, in which the user is barred from using the machine. In addition, as there are so many units of copying machines, one serviceman has to service quite a large number of copying machines. If he is engaged for a long time in a job on a single unit of a machine, it will not be possible for him to work efficiently when several problems have occurred at the same time. Thus, it is undesirable from the viewpoint of the service cost for a serviceman to perform service for an extended period of time on one machine.

Moreover, the latter of the steps mentioned above would make it necessary to install many detectors in the machine. Although the detection of problems can be performed automatically, this approach would unavoidably entail a considerable increase in cost.

Therefore, in the copying machine embodying the present invention, it is designed to set a circuit board as the unit for replacement in the repair of the circuits in the machine, so that the serviceman will be able to specify the source of the problem easily and in as short a time as approximately 30 minutes. Owing to this feature, it is sufficient to limit the search for the source of the problem to the circuit boards, and thus servicing time can be reduced and costs can be held down to a minimum because trouble-shooting devices are provided in the individual circuit boards.

Figure 56:
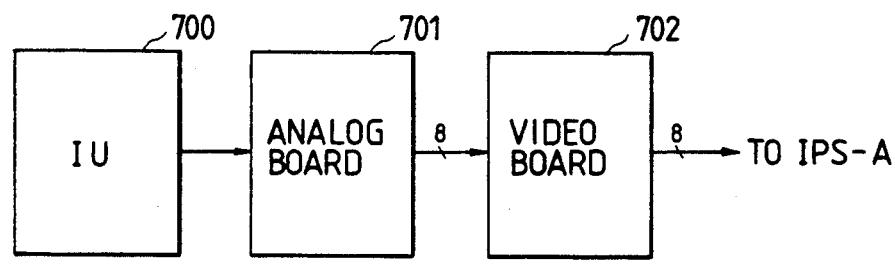
FIG. 56 illustrates the block construction of the IIT

The IIT, which has the mechanism described above and performs the processing of signals in the manner described above, is composed of three blocks, an IU 700, an analog board 701, and a video board 702, as illustrated in FIG. 56. The IU 700 is comprised of CCD line sensors, an exposure lamp, drive circuits for taking the output of video signals from the image forming optical system and the CCD line sensors, buffer circuits, etc. The analog video signals output from the IU 700 are input into the analog board 701, which includes the circuits from the sample hold circuit (S/H) 232 to the A/D converter 235 as illustrated in FIG. 41, and the analog video signals thus input are output as 8-bit digital video signals to the video board 702. The video board 702, which includes the circuits from the delay circuit 236 to the shading correction circuit (SHC) 239 as illustrated in FIG. 41, performs the separation and synthesis, logarithmic conversion, and shading correction of the video signals input into it. The video signals of which the shading correction has been made are led from the video board 702 to the IPS-A board (not illustrated), where the prescribed imaging processing operations are performed subsequently.

As mentioned above, a board is taken as the unit for the replacement of parts. Accordingly, in the construction shown in, FIG. 56, it is sufficient to isolate the source of the problem to the analog board 701, the video board 702, or the IU 700.

Figure 57:
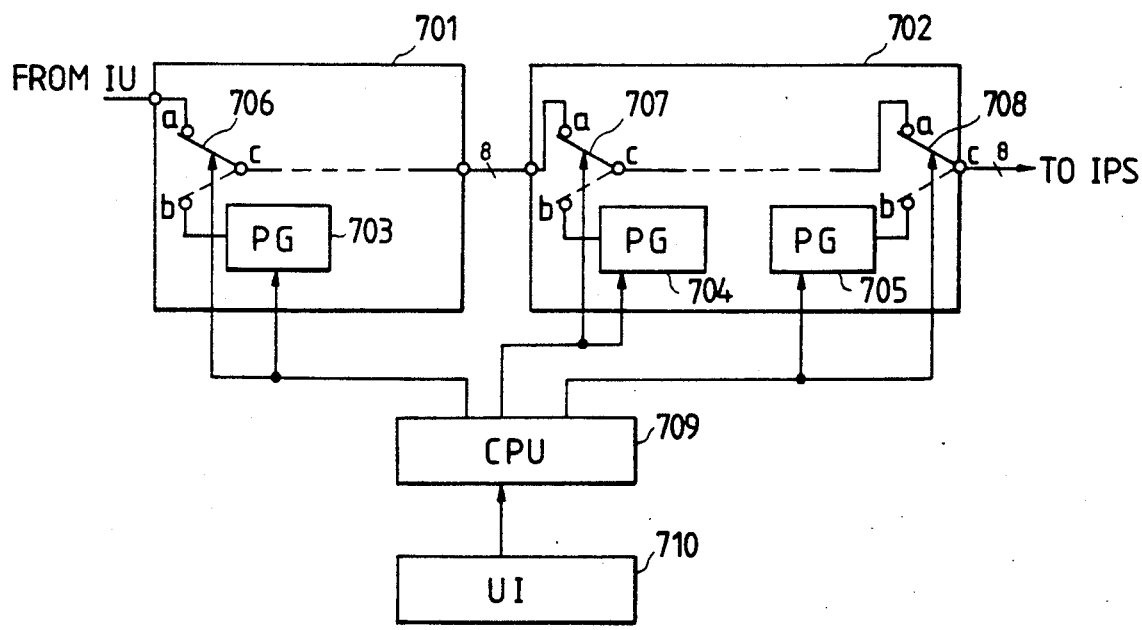
FIG. 57 illustrates one example for the construction of the self-diagnostic system for the image reading equipment.

Therefore, the self-diagnostic system embodied in the image reading equipment according to the present invention is formed in the construction illustrated in FIG. 57.

As shown in FIG. 57, a switch 706 is provided on the input end of the analog board 701, so that the video signal from the IU is supplied to the terminal a and the video signal from the PG 703 is supplied to the terminal b. The switch 706 is connected ordinarily to the terminal a, as illustrated with a solid line in the Figure, and the video signal thereafter passes through a S/H circuit, AGC circuit, AOC circuit, etc. and is converted into a digital signal with the A/D converter and is then led from the output end of the analog board 701 to the video board 702. At the input end of the video board 702 is provided a switch 707 in such a manner that it is possible to perform the switching of the 8-bit video signal supplied from the analog board 701 and the digital pattern signal from the PG 704. The switch 707 is kept ordinarily in the state of connection as shown by the solid line in the Figure, and the video signal supplied from the analog board 701 is supplied to the terminal a of a switch 708 after passing through a color separating/synthesizing circuit, logarithmic conversion circuit, and shading correction circuit. To the terminal b of the switch 708, the digital pattern signal from the PG 705 is supplied. Ordinarily, the switch 708 forms a connection with the side of the terminal a, as illustrated by the solid line in the Figure, so that the video signal output from the video board 702 is supplied to the IPS-A board not illustrated in the Figure, and the prescribed image processing operations are performed therein.

A CPU 709 performs overall control of the signal processing operations performed on the analog board 701 and the video board 702, and this CPU is mounted on the video board 702. Moreover, the CPU 709 performs the changeover of the switches 706, 707, or 708 on condition that the serviceman performs the prescribed operation on the user interface (UI) 710.

Moreover, as it can be understood with reference to FIG. 41, the analog board 701 is provided with five channels of signal processing circuits corresponding to the individual channels of the CCD line sensors in five channels, and yet only one channel is illustrated in FIG. 57 in representation of all the channels, and thus the illustration applies equally to the other channels.

In the construction presented in FIG. 57, the isolation of faulty components in the IIT is performed in the following manner.

In the event that there is any abnormal condition on the copied image, the serviceman gives the system instructions, using the UI 710, to cause the switch 708 to be connected to the side of the terminal b. Under such instructions, the CPU 704 changes over the switch 708 to the side of the terminal b, as shown with the broken line in the Figure and at the same time puts the PG 705 into operation. Next, the serviceman performs copying operations, using the customer simulation mode in the DIAG mode. At this moment, the pattern signal generated by the PG 705 is output from: the video board 702, and the copied image output will therefore be an image in the prescribed pattern set in the PG 705. Accordingly, if the particular copied image does not show any abnormal condition, then it is to be concluded that there is no problem in the IPS and the subsequent circuit but that the trouble has occurred in one or another of the IU 700, the analog board 701, and the video board 702.

Now, provided that the pattern obtained in the PG 705 is in its normal state, the serviceman gives instructions, using the UI 710, for a changeover of the switch 707. Thereupon, the CPU 709 operates the switch 707 for its changeover to the side of the terminal b, as illustrated with the broken line in the Figure and at the same time puts the PG 704 into operation. Moreover, the switch 708 is thereupon changed by the CPU 709 to the side of the terminal a. Then, the copying operation is performed likewise in the customer simulation mode. If the prescribed pattern set in the PG 704 is output as a result of the copying operation, it is to be found that there is no abnormal condition in the video board 702. If the prescribed pattern is not output, then it is thereby ascertained that one problem or another has occurred in the video board 702.

In case it has been confirmed that the video board 702 does not produce any abnormal condition, the serviceman then gives instructions, using the UI 710, to cause the switch 706 to be changed to the side of the terminal b, as illustrated with the broken line in the Figure. Thereupon, the CPU 709 connects the switch 706 to the side of the terminal b and connects the switches 707 and 708 to the side of the terminal a respectively, and also puts the PG 703 into operation. With the system set in this state, the serviceman performs the copying operation, using the customer simulation mode. If the prescribed pattern set in the PG 703 is obtained as a result of the copying operation, it is ascertained that there is no abnormal condition in the analog board 701, but that a problem exists in the IU 700. If there is any abnormal condition in the copying output, then it is ascertained that a problem exists in the analog board 701.

In this regard, the operating steps are described above as an example, and it is evident that the checks can be started from the side of the PG 703 in a reversed sequence of the steps described above.

In searching for the source of a problem in the video signal system, it is in common practice to check the video signals themselves. In order to do so, the serviceman has to take along with him such measuring instruments as an oscilloscope. In contrast with this, the self-diagnostic system embodying this invention as applied to the image reading equipment enables the serviceman to locate the source of a problem easily and in a short time, without using any measuring instrument in particular, because the serviceman does not have to do anything but operate the copying machine and observe the pattern from the PG in the process of this self-diagnosis. On top of this, the system embodying the present invention also holds down a resulting increase in cost to the minimum because the hardware items to be added for building this system are no more than three switches and three PG units.

The manner how each of the PG 703, the PG 704, and the PG 705 is constructed varies, depending on the forms of the input signals and the output signals of each board, and some specific examples are described below.

(A) PG for Analog Board

Figure 58A:
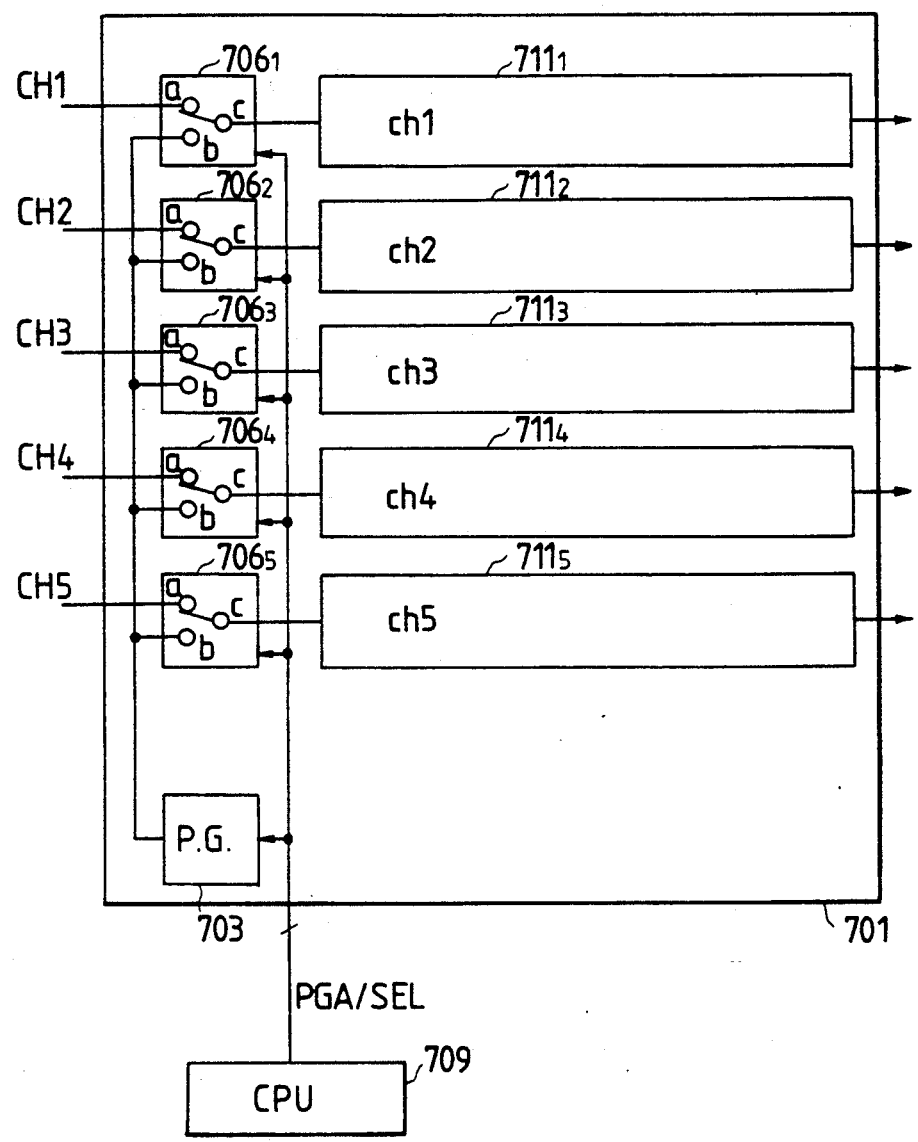
FIGS. 58(a) through 58(f) illustrate an example of the construction of the PG for the analog board.

As illustrated in FIG. 58(a), the PG 703 is installed for its common use for tho individual channels. In this regard, the reference numbers $711_1$ to $711_5$ in this Figure represent as one block the circuits from the S/H circuit 232 to the A/D converter 235 shown in FIG. 41.

With the setup shown in FIGS. 58(a-f), the serviceman, using the UI, gives instructions for copying the pattern set by the PG 703, and the CPU 709 then outputs the PGA/SEL signal in response to the instructions. Thereby the switches $706_1$ through $706_5$ change over from the state of connection shown in the Figure to the state in which the terminal b is connected with the terminal c, and at the same time, the prescribed signals set in advance are supplied from the PG 703 to the signal processing circuits $711_i$ to $711_5$. This operation is performed since it is necessary also to feed the signal from the PG 703 into the individual channels at the same time because the reading from the CCD line sensor for each channel is performed at the same time.

As the signal at the input end of the analog board 701 is an analog signal, the PG 703 can be composed of an analog generator in an appropriate form. It is a matter of arbitrary choice what type of signal the PG 703 is to be designed to generate, and yet it is recommended to make the PG generate a sawtooth wave signal, so that it is possible not only to isolate the problems, but also to judge the appropriateness of the halftone expression.

Figure 58B:
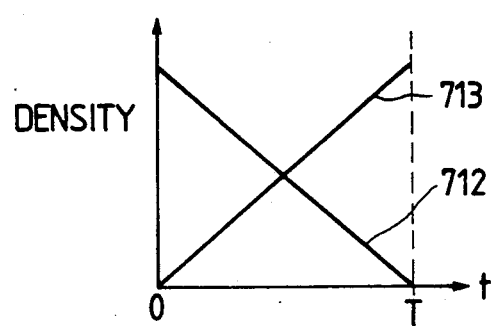
Figure 58C:
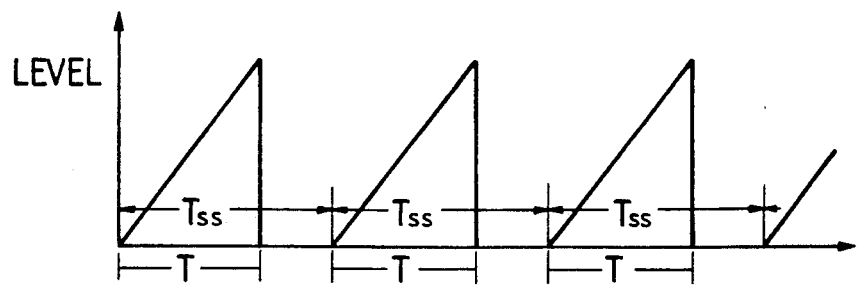

From the viewpoint described above, the PG 703 is designed to generate a signal to form a pattern in which the density changes from black to white along the main scanning direction as indicated by the reference number 712 in FIG. 58(b) or, on the contrary, a pattern in which the density changes from white to black along the main scanning direction as indicated by the reference number 713 in FIG. 58(b), as viewed in terms of the copying output image. In this regard, T in the Figure indicates the time necessary for reading by the CCD line sensor for one channel. Also, it is evident that the PG 703 has to generate the prescribed signal every time the main scanning operation is performed. Therefore, for the pattern in which the density changes as indicated by the reference number 712 in FIG. 58(b), the PG 703 will generate a signal as shown in FIG. 58(c) since this copying machine produces black when the signal level is low while it produces white when the signal level is high. In this Figure, the symbol $T_{ss}$ indicates the period of the scanning line, namely, the period of the line sync (LS).

Figure 58D:
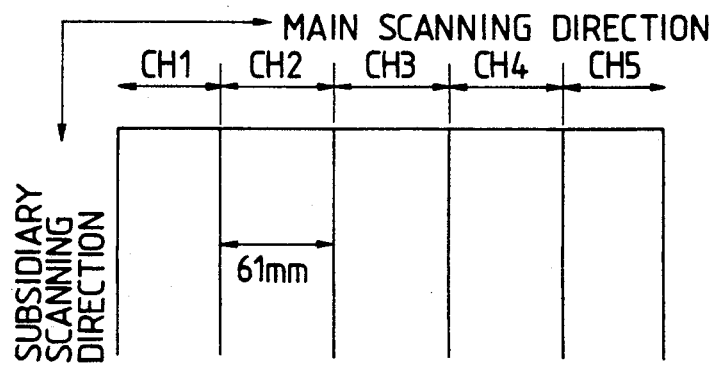
Figure 58E:
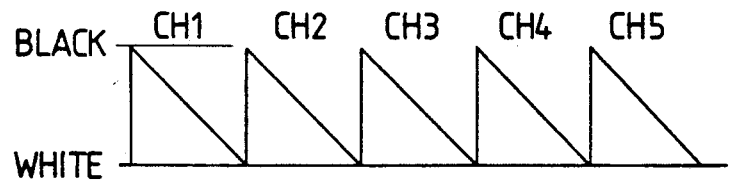
Figure 58F:
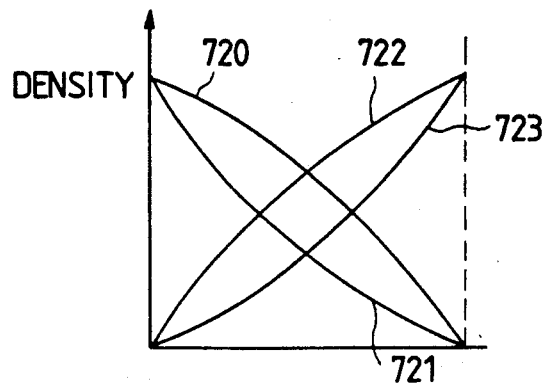

The copying output image obtained by the use of the PG mentioned above is shown in FIGS. 58(d) and 58(e). FIG. 58(d) shows the image as copied on a A3-size paper, and this copied image gives a pattern with five stripes corresponding to the individual channels being arranged in the main scanning direction. The individual stripes undergo changes in their density from black to white along the main scanning direction, as illustrated in FIG. 58(e).

Therefore, it is possible not only to identify a problem in the analog board 701 and the subsequent parts but also to verify the presence or absence of any problem in each of the channels in the analog board 701. For example, in case the coloration resulting from copying in the ordinary manner turns out to be extremely thin or virtually absent in some area, there should be a problem either in the CCD line sensor in the channel concerned or in the signal processing system for the particular channel. If the pattern output for the channel in question is normal, then it can be ascertained that the problem has occurred on the CCD line sensor side.

Moreover, the video signals input to the analog board 701 are dot sequential signals on G, B, and R, and are in such nature that the pattern signal is supplied from the PG 703 to replace the dot sequential signals. Thus, it is obvious that all of the G, B, and R assume the same value and a black-and-white image is formed.

In the example given above, a description has been made of a case in which the PG 703 is a sawtooth wave generator that generates a pattern with a linear change in density. Yet, the generator for the PG 703 is not limited to this type. For example, the PG can be a generator which produces a signal showing such change in density in the main scanning direction for each of the channels as illustrated by a curve indicated by the reference number 720, 721, 722, or 723 in FIG. 58(f).

Now, a description will be made of the several points which call for careful attention in the performance of copying by the use of the PG 703 in the manner mentioned above.

First, also for the case of copying a pattern fed by the PG, the IU should be designed to perform its subsidiary scanning operation in the same way as in the ordinary copying job. The video signals read by the CCD line sensors are not utilized at all. However, it would be necessary to set up a new operating timing utterly different from the ordinary operating timing, and such a task is quite troublesome, if the system is so designed that the IU does not operate in the same way as in the ordinary process. If the system is so designed that the IU operates in the same may as in the ordinary process, there will be an advantage in that it is possible to verify the normal operation of the driving mechanism on the basis of a check on the operation of the IU.

Also, the shading correction is not to be made when the pattern generated by the PG 703 is copied. In specific terms, the white reference data taken into the system at the time of the last copying operation are saved in the line memory of the SHC, and if any shading correction should be made with the white reference data, then the prescribed density change shown in FIG. 58(e) would not be output, so that the serviceman may form a mistaken judgment that the copied pattern is indicative of the occurrence of a problem. On this ground, the CPU 709 is to clear the SHC line memory prior to the copying of the pattern by the PG 703.

Furthermore, it is necessary to pay careful attention also to the AGC and the AOC. In case there are considerably large dispersions in the gain and in the offset among the individual channels, it sometimes happens that considerable differences occur in the density of the stripes shown in FIG. 58(d) and also it is conceivable, depending on the circumstances in some particular cases, that the pattern signal from the PG 703 is clipped, so that the prescribed changes in density are not output. Hence, in case the pattern from the PG 703 is to be copied, it is advisable, for instance, to have the CPU 709 to write the data for the particular copying job to the D/A converters (241 and 243 in FIG. 43) for the AGC and the AOC.

Now that the particular copying job is performed in the customer simulation mode within the DIAG mode, it is possible to make adjustments of density in the same manner as at the time of the ordinary copying operation. This is an important matter. That is to say, it is obviously desirable to reduce the amount of the toner thus consumed while the copying operation in the customer simulation mode can be performed free of charge since billing is not applicable to it. Of course, a reduction of the consumed toner could be achieved if gray is used for the black as shown in FIG. 58(e), but this approach would make it impossible to judge the adequacy of halftone expressions and it is consequently necessary to adjust the density.

In the description made hereinabove, a sawtooth wave generator is used as the PG 703 and the output images are therefore rendered in black and white. However, a combination of a memory device storing the prescribed digital data and a D/A converter may be used instead. In essence, any generator capable of ultimately generating the desired analog signals is acceptable for its use as the PG. Above all, it is evident that a pattern of gradation in the specified color can be formed with the latter construction, if adopted, can be made to generate signals at different levels in a manner adjusted to the timing of the dot sequential signals on G, B, and R.

As mentioned in the foregoing part, it is possible to output a gradation pattern varying from black to white or from white to black by using the PG 703 on the analog board 701. Accordingly, it is possible not only to isolate the problem with ease, but also to perform such jobs as a check on the driving mechanism for the IU and a judgment on the adequacy of halftone expressions.

(B) PG for Video Circuit

Figure 59A:
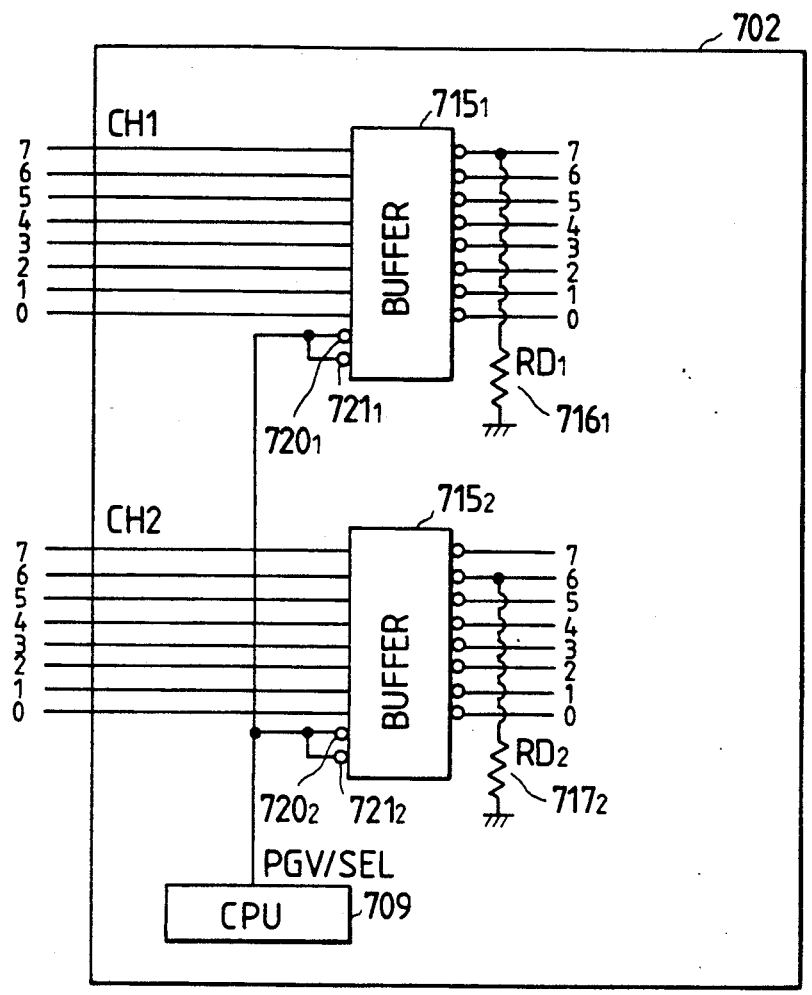
FIGS. 59(a) through 59(h) illustrate an example of the construction of the PG for the video circuit.

This PG corresponds to the PG 704 shown in FIG. 57, and its construction is illustrated in FIG. 59(a).

The video signals for the individual channels as converted into eight-bit digital signals by the A/D converter at the final stage of the analog board are supplied to the video board 702, in which the signals are first input into the buffer 715. In the Figure, only the channel 1 (CH1) and the channel 2 (CH2) are shown. The constructions of the CH3 through CH5 are identical to what is shown in this Figure, and they are omitted from the illustration.

A pull-down resistor $R_D$ is connected to the lines for the appropriate bits among the eight-bit output from the buffer 715. Also, the buffer 715 has control terminals or interrupt terminals 720 and 721, and it is so designed that the PGV/SEL signal is input from the CPU 709 into the terminals. Ordinarily, the PGV/SEL signal is at the low (L) level, and it is so designed that the video signals input into the buffer 715 while the PGV/SEL signal is thus at its low level will pass through the buffer 715 as it is, but that the output from the buffer 715 will have high impedance when the PGV/SEL signal attains a high level.

In this construction just described, the PGV/SEL signal attains a high level, the output from the buffer 715 thereby having high impedance and the input into the subsequent stage attaining H, when the serviceman performs the prescribed operations on the U/I, but, as the pull-down resistor $R_{D1}$ is connected to the most significant bit (MSB) in the buffer $715_1$, only the MSB in the output from the buffer $715_1$ remains at the low level while the other bits attain the high level. Therefore, the value of the video signal in the CH1 will be $7F_H$. Also, as regards the CH2, the pull-down resistor $R_{D2}$ is connected to the second MSB in the output from the buffer $715_2$, and the value of the video signal will consequently be $BF_H$. The same holds true in respect of the other channels, and, with a pull-down resistor connected to the prescribed bit in the output from the buffer, it is thus possible to feed a video signal in the desired value to the processing circuit at the subsequent stage. Moreover, it goes without saying that the value of the pull-down resistor is selected in such a way as to give no influence to the ordinary operations.

Figure 59B:
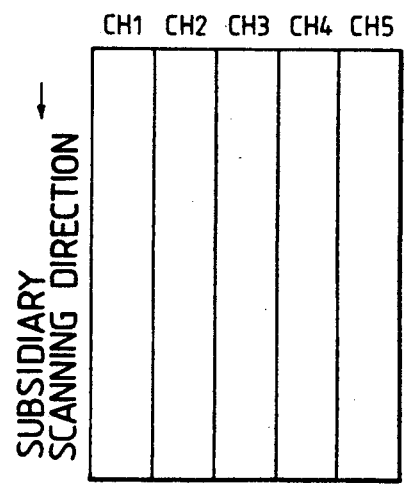
Figure 59C:
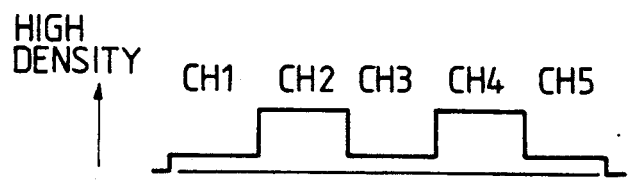
Figure 59D:
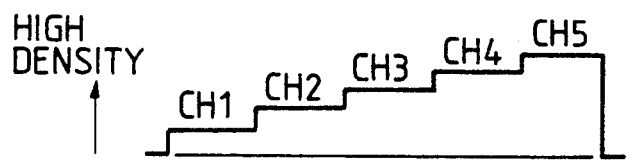

When a copying operation is performed on the A3-size paper with such a video signal used in the process, the output image will be in a stripe pattern as illustrated in FIG. 59(b). Yet, as the values of the video signals in the individual channels are identical, the values of the G, B, and R will become identical. Therefore, the image pattern will be a stripe pattern in gray in what is called "solid painting" without any gradation of density. An example of such a density pattern is shown in FIG. 59(c) or 59(d). In the example given in FIG. 59(c), the density is kept equal for CH1, CH3, and CH5, and the density is kept equal between CH2 and CH4. In FIG. 59(d), the example shows a pattern with a progressive increase of density, starting with CH1.

Figure 59E:
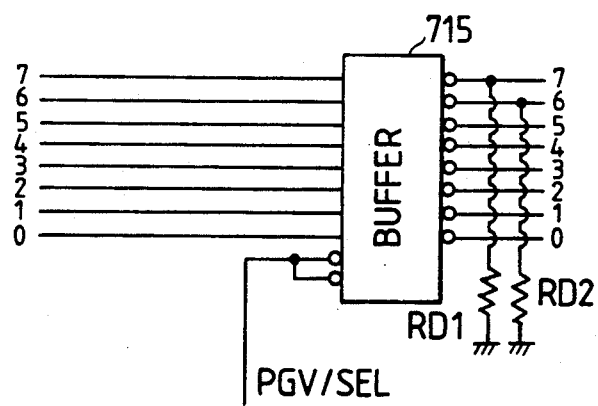

In FIG. 59(a), only one pull-down resistor is connected for each channel, and yet it is clear that two or more pull-down resistors can be connected for each channel. For example, when two pull-down resistors, as shown in FIG. 59(e), are connected, the value of the video signal will be $3F_H$. A stripe pattern in the desired density can be obtained in this manner.

For the setting of the density for a stripe pattern, it is of course necessary to make a stripe pattern easy to look at, and it is also important to keep the amount of the consumed toner to the necessary minimum. Therefore, it is desirable to connect the pull-down resistors with priority given to the more significant bits.

Moreover, in the performance of the copying of the stripe pattern, the shading correction should not be performed as in the case of the copying operation performed with the PG for the analog board mentioned above.

In the foregoing part, a description has been made of one specific example, but various other forms are conceivable for the construction of the PG.

Figure 59F:
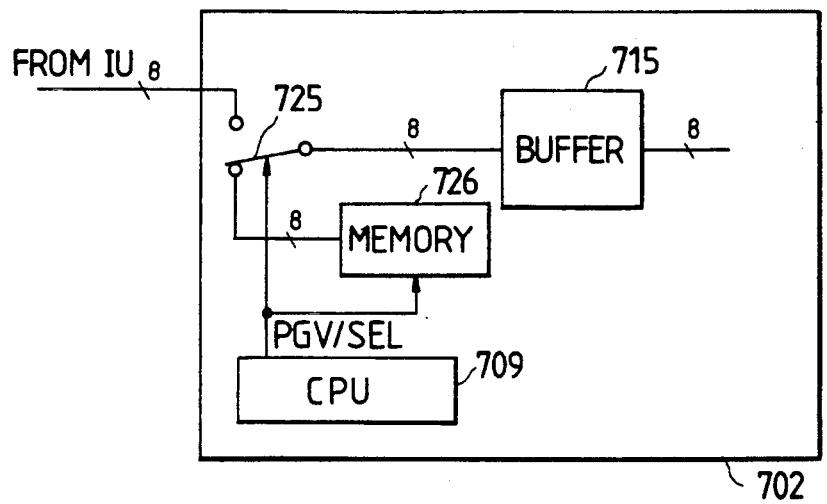
Figure 59G:
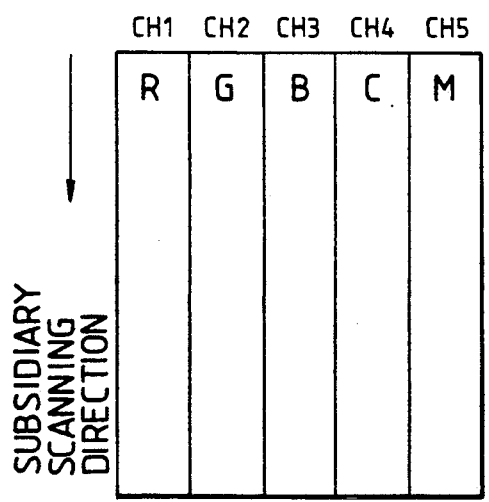
Figure 59H:
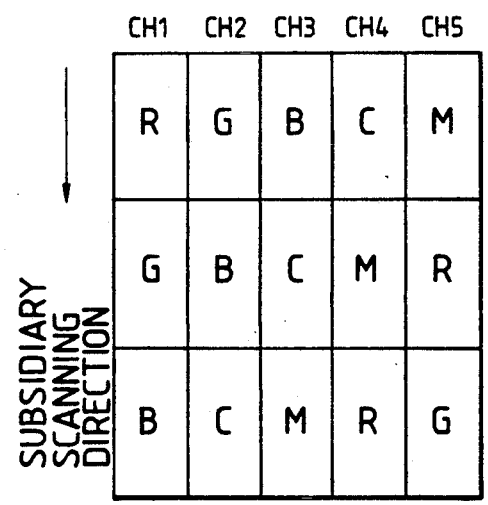

For example, a switch 725 is provided at the front stage of the buffer 715, with the output from the memory device 726 being supplied to one of the terminals of the switch 725, as illustrated in FIG. 59(f). Then, as the switch 725 is changed over as shown in the Figure upon its reception of the PGV/SEL signal from the CPU 709, the pattern data is read out of the memory device 726. With this construction, the value of the data stored in the memory device 726 is supplied to the subsequent stage as the video signal and then output in the form of a copy. Now, if the data stored in the memory device 726 contains one value, the values of G, B, and R will be identical, and therefore a stripe pattern in gray will be output. Yet, with three types of data all of which are not identical in their values being stored in the memory device and read out in regular sequence at the timing in the dot sequence of G, B, and R, it is possible, for example, to output a desired color stripe pattern, as illustrated in FIG. 59(*g*). Further, with more data stored in the memory and with the values of the data on the video signals for G, B, and R changed over from one to another in prescribed periods, it will be possible, for example, also to output a color pattern in a lattice form, as shown in FIG. 59(*h*).

However, it would not be an advantageous measure to adopt a construction as shown in FIG. 59(*f*). Certainly, a color pattern as shown in FIG. 59(*g*) or 59(*h*) could be easier to see and also to form a judgment thereon than a pattern in gray. However, it would not only entail an increase in the costs, but also result in the usage of the color toners in large quantities. It is sufficient for the PG merely to be used for isolation of problems, and it is not proper to allow an increase of the costs for the sake of the PG, and it is not desirable to consume large quantities of the color toners, which are not low-priced.

In contrast with this, the construction shown in FIG. 59(*a*) is formed merely by connecting pull-down resistors to the output lines from the buffers and can therefore be built at a very low cost.

As mentioned above, with one board taken as the unit for replacement, it is sufficient, for the purpose of isolating a problem, specifically to identify the board in which the problem has occurred. In order to find, easily and in a short time, whether or not there is any problem in a given board, it is necessary at least to install a PG on the input stage for each board. Accordingly, the manner in which the PG for each board is constructed is determined in consideration of the form of the signals at the input stage and the circuit construction, etc. of the particular board, and a construction at as low a cost as possible and yet capable of checking the board in an efficient way will be adopted. In the example given above, the construction shown in FIG. 59(*a*) is adopted by making use of the fact that the input to the video board 702 for this copying machine is composed of digital video signals in the dot sequence and that the buffer 715 is provided at the initial stage. Provided that the input signals to the video board 702 are not dot sequential signals for G, B, and R but are the output from the separating and synthesizing circuit 237 (FIG. 41), it is necessary for the PG to furnish the values of data constituting video signals to each of the G, B, and R, and the construction feeding such data values from a memory device, as illustrated in FIG. 59(*f*), will therefore be effective.

(C) PG for IPS

This PG corresponds to the PG 705 shown in FIG. 57. Of course, this PG is not necessarily required so long as a trouble-shooting circuit, such as a PG, is provided at the input end of the next IPS-A board, but the PG described here is installed at the output end of the video board 702, in order that the separation of troubles in the IIT may be performed within the IIT. Owing to this construction, it is not necessary to provide any PG at the input end of the IPS-A board. In other words, it is obvious that the installation of a PG at either one of the output end of the preceding stage or the input end of the succeeding stage, is sufficient for the location of the source of problems between the board at the preceding stage and the board at the succeeding stage. Thus, in the example of the embodiment described above, a PG is installed at the input end of the video board 702, as this approach permits the construction of the PG at a lower cost. Thus, for the source of problems to be located on the video board 702 and the IPS-A board, it is feasible to select a manner whereby the PG can be constructed at a lower cost. Hence, this embodiment employs a construction with a PG installed at the output end of the video board 702, in view of the possibility of generating the prescribed pattern through utilization of the SHC circuit, which forms the output end of the video circuit 702, as it is.

An outline of the construction of the SHC and the line memory is illustrated in FIG. 60(*a*), and their operations will be described below. At this juncture, FIG. 60(*a*) illustrates only one of the three channels for G, B, and R, the other channels have the same construction.

The eight-bit digital video signals are processed for the correction of the deviations of the picture elements in a picture element deviation correcting circuit 832 and then input into the terminal B of an adder 833. The data for the density is furnished by the CPU (not illustrated) to the terminal A of the adder 833, which performs the addition of the two values. Thus, the correction of density is performed.

The output from the adder 833 is fed to the terminal A of a subtracter 834 while the data for the shading correction as read out of the line memory device 831 is fed to the terminal B of the subtracter 834 via a directional coupler 838, and the data for the shading correction is subtracted from the video signals. These operations constitute the shading correction, in which the white reference data read off prior to the copying operation are used as the data for the shading correction. That is to say, the IU reads the white reference data before its reading of the original sheet, and the white reference data are stored in the line memory 831 by way of the picture element deviation correcting circuit 832, a selector 836, and a directional coupler 837. In this process, a selector 841 selects the write signal fed from the CPU, and an address counter 842 generates the address data on the basis of the write signal and feeds the address data to the line memory device 831, which performs the writing operation on the basis of the address data. Moreover, the preset signal input into the terminal A of the address counter 842 is the signal for setting the initial-phase address in the line memory device 831.

The selector 841 is designed to select the video clock when the shading correction data are read out of the line memory device 831, and the address counter 842 generates the address data on the basis of the video clock and feeds the address data thus generated to the line memory device 831. With this, the shading correction data are read out in synchronization with the video clock.

The video signals subjected to the shading correction as described above are input into the terminal A of the selector 835. The output from the subtracter 834 is output as it is to the IPS-A board since the selector 835 is ordinarily set in such a way as to select the signals input into its terminal A.

In this regard, all the operations mentioned above are performed under control by the CPU.

The flow of signals at the time of the shading correction in the ordinary copying operation is as described above, and next a description will be made of the operations performed for the output of the prescribed pattern with this construction.

When the serviceman gives instructions, using the UI, to cause a copying job to be performed by the use of the PG for the IPS, the CPU first writes the pattern data for each picture element in the main scanning direction to the line memory device 831 via the directional coupler 839, the selector 836, and the directional coupler 837. When the copying operation is started, the pattern data stored in the line memory device 831 are read out in synchronization with the video clock and fed via the selector 835 to the IPS and the subsequent circuits, and thus the copying operation is performed. Moreover, the address data for writing and reading, which are fed to the line memory device 831, are generated in the same manner as described above. Besides, it goes without saying that all the operations mentioned above are performed under control by the CPU.

Figure 60A:
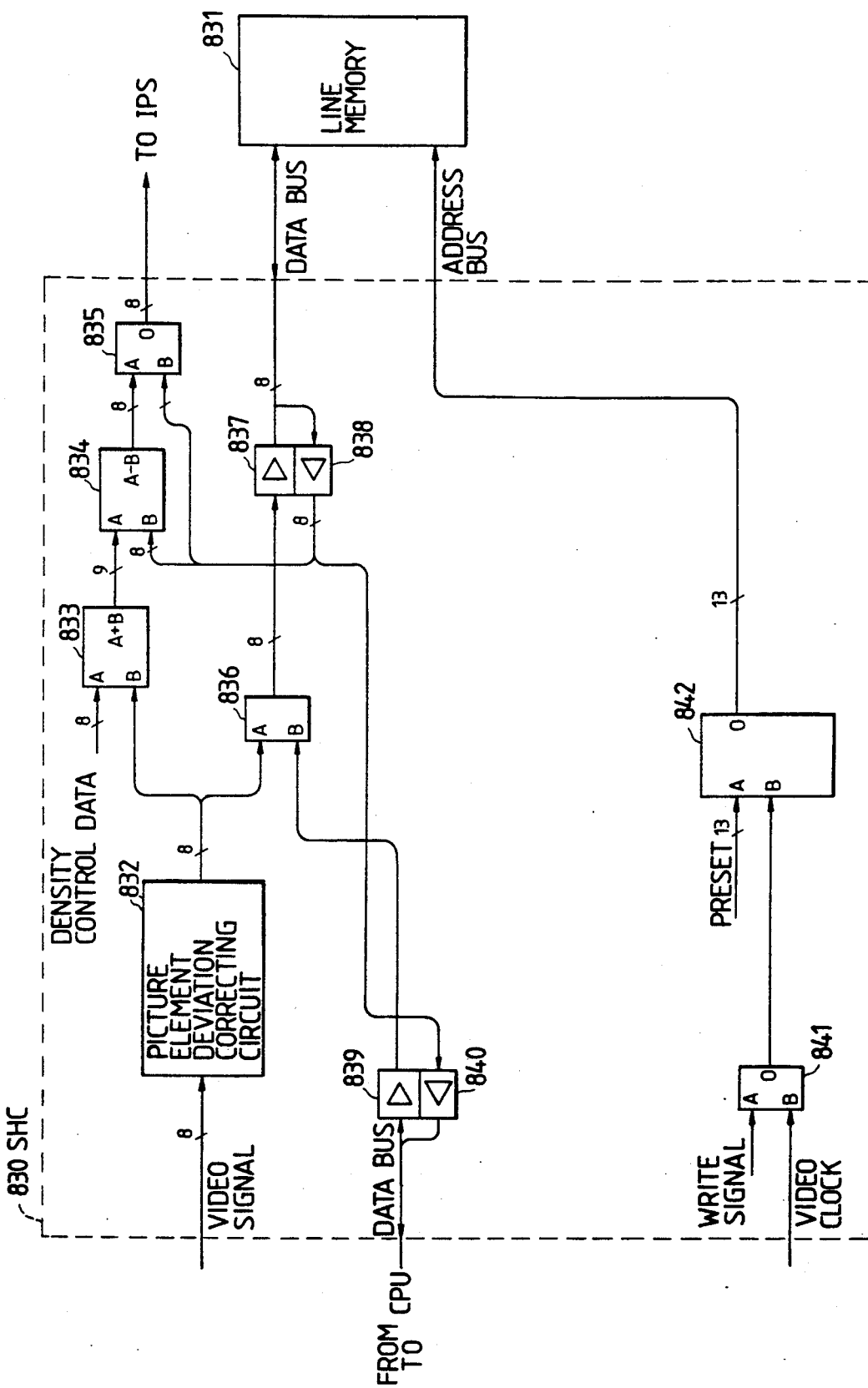
FIGS. 60(a) through 60(e) illustrate an example of the construction of the PG for the IPS.
Figure 60B:
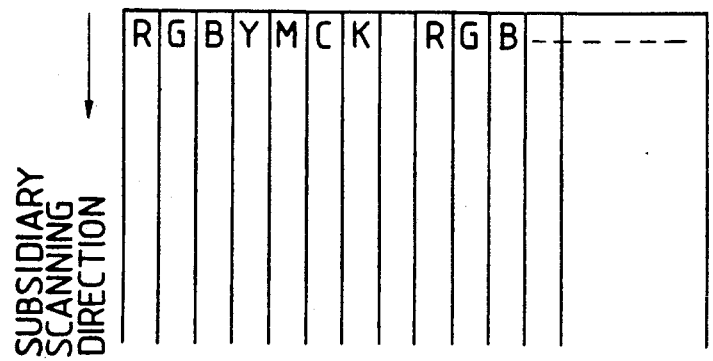

An example of an image output in this manner is presented in FIG. 60(b). The pattern data is given to the line memory device 831 in correspondence with the individual picture elements in the main scanning direction, and the pattern data are merely read out repeatedly for each scanning line, and, as a result, a stripe pattern given in FIG. 60(b) is obtained. It is possible arbitrarily to determine the manner of setting the width, color, and density of each stripe on the basis of the data to be written to the line memory device 831.

Figure 60C:
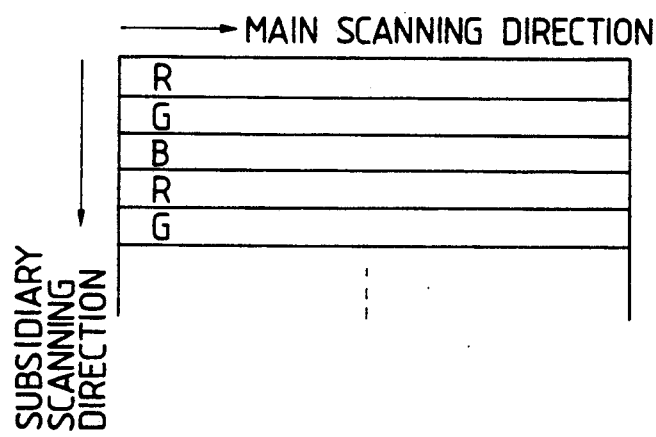
Figure 60D:
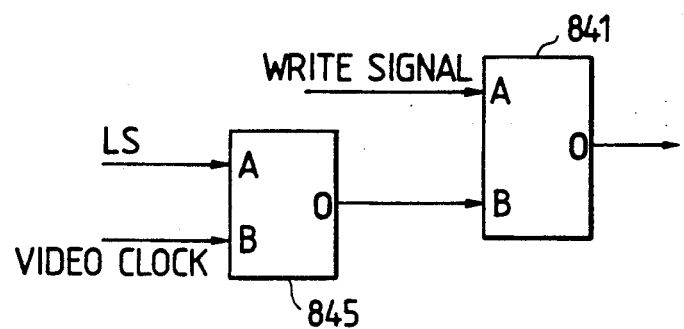

In the construction illustrated in FIG. 60(a), the output image forms a stripe pattern shown in FIG. 60(b) since the reading of the data from the line memory device 831 is performed in synchronization with the video clock, and yet, if the reading address is generated on the basis of the line synchronizing signal (LS), a pattern consisting of lateral stripes as shown in FIG. 60(c), for example, can be formed. In order to accomplish this, the selector 845 is installed at the stage preceding the terminal B of the selector 841, as illustrated in FIG. 60(d), thereby making it possible to select the changeover of the LS signal and the video clock by the selector 845. Moreover, with the construction illustrated in FIG. 60(d), it is possible also to provide the capability of changing over the LS signal and the video clock in a prescribed period, and the output pattern in that case will be a mosaic pattern as shown in FIG. 60(e).

Figure 60E:
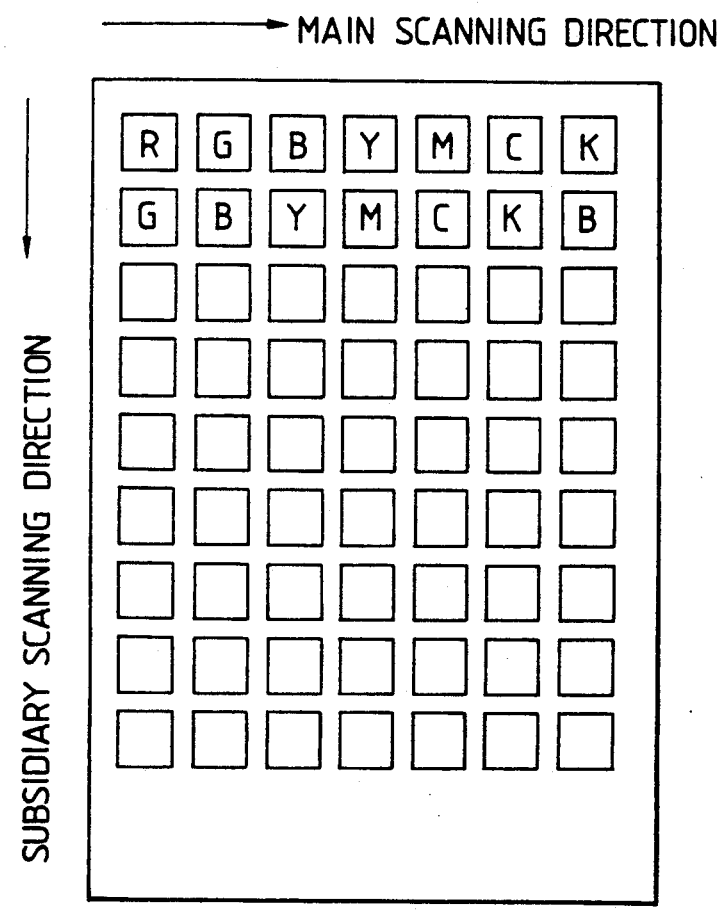

Above all, the patterns shown in FIG. 60(c) or FIG. 60(e) are effective for the identification of the source of problems in the IIT and the IOT. For instance, when the copied image is elongated to an excess in the subsidiary scanning direction, an abnormal scanning speed of the IU or an abnormal state in the IOT are conceivable as the source, and yet, if it is observed that an abnormal state is present in the pattern obtained as a result of the output of the pattern shown in FIG. 60(c) or FIG. 60(e), it is found that the source is present at the side of the IOT. If there is no abnormal condition in the pattern, then it is ascertained that the source is an abnormal state in the IU.

Furthermore, while an example of a color pattern is given in each of FIGS. 60(b), 60(c), and 60(e), it is evident that a pattern in solid gray over the entire area can be obtained if the same data value is written to the picture elements in the same positions in the line memory device for G, B, and R. This approach makes it possible to locate the source of problems without using the expensive color toner. Moreover, as the copying of such a pattern with the PG for the IPS is performed in the customer simulation mode, it is possible to make adjustments of the density on the copy, by which the amount of the consumed toner can be reduced to the minimum.

In the foregoing, a description has been made of the PG for the IPS, for which the construction in FIG. 60(a) is the construction for the shading correction used as it is, so that the hardware items that need to be added are approximately nothing more than the selectors and the signal wires for the changeover of the selectors, in addition to software for the diagnostic system to the CPU. Therefore, it is possible to construct the PG at a very low cost.

As evident from the description presented hereinabove, a self-diagnostic system for image reading equipment according to this invention makes it possible to identify a problem affecting the image reading equipment merely by arranging a PG of the input end and/or output end on a board in the image reading equipment and copying a pattern by the PG. Therefore, this system enables a serviceman to locate the problem, that is, to identify the source of the problem in the image reading equipment easily and in a short time without taking along with him even a test chart, not to mention of an oscilloscope. Furthermore, the PG is constructed with a minimum of additional hardware through utilization of the circuits employed in the copying machine to the maximum extent possible, so that it is made possible to keep an increase of the cost to the necessary minimum.

What is claimed is:

1. An image reading apparatus having a self-diagnostic system, comprising:
   an imaging unit for reading image information from an original document;
   a first circuit board connected to the imaging unit for processing the image information obtained from the imaging unit;
   a first pattern generator, selectively connected to an input end of said first circuit board, for generating a prescribed pattern signal which may be used to determine whether a problem exists in said imaging unit; and
   a second pattern generator, selectively connected to an output end of said first circuit board, for generating a prescribed pattern signal which may be used to determine whether a problem exists in said first circuit board.

2. The image reading apparatus according to claim 1, wherein said imaging unit is provided with a plurality of line sensors which output color video signals in a dot sequence and said image reading apparatus further comprises a second circuit board connected to the output end of said first circuit board.

3. The image reading apparatus according to claim 2, wherein said first circuit board includes a plurality of signal processing systems, corresponding to said line sensors, for receiving the color video signals from said line sensors, performing automatic gain control, automatic offset control, and analog-to-digital conversion on the color video signals, and for outputting converted signals to said second circuit board.

4. The image reading apparatus according to claim 3, wherein said second circuit board creates primary color signals by separating and synthesizing the converted signals received from the first circuit board, performs shading correction on the primary color signals, and then outputs corrected signals to a third circuit board which is connected to said second circuit board.

5. The image reading apparatus according to claim 3, further comprising a plurality of first switches each selectively connecting the output of either a corresponding one of said line sensors or said first pattern generator to a corresponding channel at the input end of said first circuit board.

6. The image reading apparatus according to claim 5, wherein the pattern signal generated by said first pattern generator corresponds to an output image having a stripe pattern for each of the channels, and to an output image having a pattern in gradation on the gray scale changing from black to white or from white to black along a main scanning direction of said imaging unit.

7. The image reading apparatus according to claim 5, wherein said first pattern generator is a sawtooth wave generator.

8. The image reading apparatus according to claim 5, wherein said first pattern generator includes a memory for storing prescribed pattern data, and a digital-to-analog converter, and wherein said first pattern generator outputs the prescribed pattern data in synchronism with the timing of dot sequential signals for red, green, and blue.

9. The image reading apparatus according to claim 5, wherein each of the first switches is operated to connect the output of said first pattern generator to a corresponding channel at the input end of said first circuit board said first pattern generator when prescribed operations have been performed in a user interface.

10. The image reading apparatus according to claim 5, wherein said imaging unit performs prescribed operations when recording the image of the pattern according to said first pattern generator.

11. The image reading apparatus according to claim 5, wherein the automatic gain control and the automatic offset control in said first circuit board are performed on the basis of predetermined values when recording the image of the pattern according to said first pattern generator.

12. The image reading apparatus according to claim 5, wherein the shading correction is not performed when recording the image of the pattern according to said first pattern generator.

13. The image reading apparatus according to claim 5, wherein the density of the image may be controlled when recording the image of the pattern according to said first pattern generator.

14. The image reading apparatus according to claim 13, wherein a third pattern generator is installed at an input end of the second circuit board, and said third pattern generator includes a plurality of buffer circuits, each arranged at an input end of each of a plurality of channels on said second circuit board, and a pull down resistor connected to a prescribed bit output line from at least one of the buffer circuits.

15. The image reading apparatus according to claim 14, wherein the output of the at least one buffer circuit develops high impedance and maintains a low level said prescribed bit to which the pull down resistor is connected when prescribed operations have been performed in a user interface.

16. The image reading apparatus according to claim 14, wherein the image produced by said third pattern generator is a stripe pattern having one stripe for each of the channels and each such stripe is gray and has a constant density.

17. The image reading apparatus according to claim 14, wherein the pull down register is connected to a prescribed bit output line such that the density of the recorded image for a particular pattern output from the at least one buffer circuit is not too high but produced easily viewable density.

18. The image reading apparatus according to claim 14, wherein the pull down resistor is connected to a plurality of bit output lines which have significant bits as selected from the output of the at least one buffer circuit.

19. The image reading apparatus according to claim 14, wherein the shading correction is not performed when recording the image of the pattern according to said third pattern generator.

20. The image reading apparatus according to claim 13, wherein a third pattern generator is installed at an output end of said second circuit board, and said third pattern generator is used concurrently as a line memory for storing data for shading correction.

21. The image reading apparatus according to claim 20, wherein prescribed pattern data is written into the line memory when a prescribed operation has been performed in a user interface.

22. The image reading apparatus according to claim 21, wherein an address for reading out the prescribed pattern data stored in the line memory is generated on the basis of a video clock signal.

23. The image reading apparatus according to claim 21, wherein an address for reading out the prescribed pattern data stored in the line memory is generated on the basis of a line synchronization signal.

24. The image reading apparatus according to claim 21, wherein an address for reading out the prescribed pattern data stored in the line memory is generated on the basis of a video clock signal and a line synchronization signal.

25. A self-diagnostic system for an image reading apparatus having an imaging unit and at least one circuit board connected to the imaging unit for processing image information obtained from the imaging unit, said self-diagnostic system comprising:

a first pattern generator, selectively connected to an input end of the at least one circuit board, for generating a prescribed pattern signal which may be used to determine whether a problem exists in said imaging unit; and a second pattern generator, selectively connected to an output end of the at least one circuit board, for generating a prescribed pattern signal which may be used to determine whether a problem exists in the at least one circuit board.

* * * * *